United States Patent
Treyz et al.

(10) Patent No.: US 6,587,835 B1
(45) Date of Patent: Jul. 1, 2003

(54) SHOPPING ASSISTANCE WITH HANDHELD COMPUTING DEVICE

(76) Inventors: G. Victor Treyz, 37 Vanderburgh Ave., Larchmont, NY (US) 10538; Susan M. Treyz, 37 Vanderburgh Ave., Larchmont, NY (US) 10538

( * ) Notice: Subject to any disclaimer, the term of this patent is extended or adjusted under 35 U.S.C. 154(b) by 0 days.

(21) Appl. No.: 09/501,053

(22) Filed: Feb. 9, 2000

(51) Int. Cl.[7] .............................................. G06F 17/60
(52) U.S. Cl. ............................ 705/14; 705/26; 705/27
(58) Field of Search .............................. 705/14, 26, 27

(56) References Cited

U.S. PATENT DOCUMENTS

| | | | | |
|---|---|---|---|---|
| 4,558,300 A | * | 12/1985 | Goldman | 340/286.1 |
| 5,047,614 A | | 9/1991 | Bianco | 235/385 |
| 5,250,789 A | | 10/1993 | Johnsen | 235/383 |
| 5,424,524 A | | 6/1995 | Ruppert et al. | 235/462 |
| 5,648,768 A | * | 7/1997 | Bouve | 340/988 |
| 5,664,110 A | | 9/1997 | Green et al. | 705/26 |
| 5,664,231 A | | 9/1997 | Postman et al. | 395/893 |
| 5,857,201 A | | 1/1999 | Wright, Jr. et al. | 707/104 |
| 5,905,246 A | | 5/1999 | Fajkowski | 235/375 |
| 5,970,469 A | | 10/1999 | Scroggie et al. | 705/14 |
| 5,970,474 A | | 10/1999 | LeRoy et al. | 705/27 |
| 5,977,908 A | | 11/1999 | Nichols | 342/357.08 |
| 5,979,757 A | | 11/1999 | Tracy et al. | 235/383 |
| 6,014,634 A | | 1/2000 | Scroggie et al. | 705/14 |
| 6,035,280 A | | 3/2000 | Christensen | 705/14 |
| 6,091,956 A | * | 7/2000 | Hollenberg | 455/456 |
| 6,101,483 A | | 8/2000 | Petrovich et al. | 705/26 |
| 6,185,541 B1 | | 2/2001 | Scroggie et al. | 705/14 |
| 6,199,753 B1 | | 3/2001 | Tracy et al. | 235/375 |
| 6,246,997 B1 | | 6/2001 | Cybul et al. | 705/27 |
| 6,292,786 B1 | | 9/2001 | Deaton et al. | 705/14 |
| 2001/0001145 A1 | | 5/2001 | Barnett et al. | 705/14 |
| 2001/0014868 A1 | | 8/2001 | Herz et al. | 705/14 |

FOREIGN PATENT DOCUMENTS

| | | | |
|---|---|---|---|
| EP | 1035485 A2 | 9/2000 | G06F/17/60 |
| EP | 1054335 A2 | 11/2000 | G06F/17/60 |
| EP | 1087318 A2 | 3/2001 | G06F/17/60 |
| WO | WO 97/50045 | 12/1997 | G06F/15/16 |
| WO | WO 98/21713 | 5/1998 | |
| WO | WO98/38589 A1 * | 9/1998 | |
| WO | WO 99/57670 | 11/1999 | G06F/19/00 |
| WO | WO 00/43912 | 7/2000 | G06F/17/30 |
| WO | WO 00/45511 | 8/2000 | H03J/1/00 |
| WO | WO 00/70504 | 11/2000 | G06F/17/30 |
| WO | WO 01/20526 A1 | 3/2001 | G06F/17/60 |
| WO | WO 01/20527 A1 | 3/2001 | G06F/17/60 |
| WO | WO 01/27831 A1 | 4/2001 | G06F/17/60 |

OTHER PUBLICATIONS

"Let the directory do the walking: electronic footsteps lead shoppers through Del Amo mall", Chain Store Age Executive with Shopping Center Age, V. 65 No. 11, p. 116(1), Nov. 1989.*

(List continued on next page.)

Primary Examiner—Donald L. Champagne

(57) ABSTRACT

A system is provided in which a handheld computing device may be used to provide a user with shopping assistance services. A shopping assistance service may allow a user to obtain directory information for a shopping mall. A user may use the handheld computing device to handle shopping lists. The handheld computing device may display promotional material based on the shopping lists. The handheld computing device may be used to obtain information on products being sold in a store. Products may be purchased using wireless financial transactions. Reminders and other messages may be sent to the handheld computing device. The location of the handheld computing device may be monitored. Services may be provided to the user based on the location of the handheld computing device. The handheld computing device may communicate with communications equipment in retail establishments using a local wireless link.

21 Claims, 118 Drawing Sheets

OTHER PUBLICATIONS

Selected web pages from the Stop & Shop website (URL http://www.stopandshop.com/), as printed from the Internet on Feb. 7, 2000.

Selected web pages from the Mall of America website (URL http://www.mallofamerica.com/), as printed from the Internet on Feb. 7, 2000.

"Shop Till You Drop With Your Wireless Phone or PDA," ZDNET PC Magazine, as printed from the Internet on Jan. 31, 2000.

"Safeway Go One–on–One With Their Customers and the 'Virtual Shop Assistant'," press release of Symbol Technologies, dated Jan. 17, 2000.

"Malls Get Tech Savvy", by Justin Bachman, ABCNEWS.com, dated Dec. 28, as printed from the Internet Feb. 1, 2000.

"LodgeNet/LookSmart Portal Page Goes 'Live' Across U.S.," press release of LodgeNet Entertainment Corporation, dated Dec. 9, 1999.

"Mall Giant Catches E–commerce Bug," by Margaret Kane, ZDNet News, dated Nov. 4, 1999.

"Palm Point of Sale System Offered," Internet.com Corp., dated Oct. 5, 1999.

"Minneapolis Regal Hotel Wires Guest With Cyberroom," press release dated Jun. 24, 1999.

"Cyberroom Announces Strategic Partnerships With Compaq and Lucent Technologies," press release of Cyberroom, dated Jun. 22, 1999.

"Mobile Computing Solution Enables Express Curbside Hotel Check–In," press release of Symbol Technologies, Inc., dated Jun. 22, 1999.

"Sony's Digital Path Leads to Record Stores," by Beth Lipton Krigel, CNET News.com, dated Jun. 9, 1999.

"Teens Entering the Virtual Mall," by Margaret Kane, ZDNet News, dated Jun. 1, 1999.

"LodgeNet Rolls Out 'Next Generation' Graphical User Interface to Hotel Customers," press release of LodgeNet Entertainment Corporation, dated May 6, 1999.

"Net Fridge Comes in From the Cold," by Tom Dunlap, CNET News.com, dated Feb. 25, 1999.

"The Coolest Internet Appliance" by Leander Kahney, Wired News, dated Feb. 12, 1999.

"IBM and Safeway Create Enjoyable Grocery Shopping Experience", copyright dated 1999 International Business Machines Corporation.

"Microwave Madness," Wired News, dated Sep. 10, 1998.

"Why Wait in Line When You Can Shop On–line?," by Liz Weiss, CNN.com, dated Sep. 26, 1995.

* cited by examiner

DIRECTIONS TO
PAYLESS SHOES

1. GO STRAIGHT TOWARDS FOUNTAIN

2. TURN LEFT AND PROCEED FOR 50 FEET

3. PAYLESS IS ON THE RIGHT

┌─────────────────────────────── 578
│
│              STOP !
│
│
│    DID YOU KNOW THAT ALL MEN'S
│      SUITS ARE HALF PRICE AT
│         MEN'S WEARHOUSE
│
│
│       LOWER LEVEL ACROSS
│      FROM THE SKATING RINK
│
│
└───────────────────────────────

CALIFORNIA GRILLE

WE HAVE AMPLE SEATING
AVAILABLE ON THE TERRACE

SPECIAL TODAY

2 FOR 1
PIZZA SLICES

AT MAMA'S PIZZERIA

IN THE FOOD COURT

IF PURCHASED BEFORE NOON

FIG. 55

EARLY BIRD SPECIAL

$10 OFF ANY CLOTHING
PURCHASE TODAY AT
OLD NAVY OVER $30
IF YOU RESPOND TO THIS OFFER
BY 1:00 PM

RESPOND NOW

REMIND ME LATER

FIG. 56

TO: MR. & MRS. SMITH

FROM: WONDER KIDS CHILD CARE

PLEASE COME TO CHECK ON
SARAH AT YOUR EARLIEST
CONVENIENCE

THANK YOU

ADVERTISEMENT

REMINDER

YOU HAVE A $ 5 COUPON

FOR OLD NAVY

THAT EXPIRES IN 2 HOURS

FIG. 64

| MESSAGE TYPE | ALERT RESPONSE | RETENTION TIME |
|---|---|---|
| PROXIMITY | VIBRATION | 5 MIN. |
| LOCAL | VISUAL ONLY | 2 HOURS |
| NOTIFICATIONS | TONE | INDEFINITE |
| REMINDERS | TONE | 1 HOUR |
| E-MAIL | VISUAL ONLY | INDEFINITE |

FIG. 69

```
                                        ,-678
┌─────────────────────────────────────────┐
│                                         │
│      MESSAGE TYPE : PROXIMITY           │
│                                         │
│                                         │
│   FILTER CRITERIA                       │
│                                         │
│       BLOCK ALL ADS FOR                 │
│                                         │
│           CLOTHING                      │
│                                         │
│           FOOD                          │
│                                         │
│           ELECTRONICS                   │
│                                         │
│                                         │
│                                         │
│                                         │
└─────────────────────────────────────────┘
```

FIG. 70

SET LIMITS

| TYPE OF TRANSACTION | LIMITS |
|---|---|
| CLOTHING PURCHASE | $200.00 TOTAL |
| AUDIO AND VIDEO | $50.00 TOTAL |
| FOOD | $30.00 |
| TOYS | NOT PERMITTED |

PERMITTED SHOPPING DATE(S) [JANUARY ▽] [29 ▽] [2000 ▽]
TO
[JANUARY ▽] [29 ▽] [2000 ▽]

FIG. 75

SHOPPING ASSISTANCE WITH HANDHELD COMPUTING DEVICE

BACKGROUND OF THE INVENTION

This invention relates to systems based on handheld computing devices, and more particularly, to systems based on handheld computing devices that assist users in shopping and in performing wireless transactions.

Computer systems have been developed that allow users to shop on-line for a variety of products. For example, users may order groceries over the Internet. Users may also obtain product information using the Internet and may obtain information on retail establishments. For example, users may use the Internet to obtain store hours and general information about a store. A web site for a shopping mall may allow the user to obtain information about a particular store in the mall.

When the user travels to a store or other shopping establishment, the user's options are limited. Shopping malls have printed directories and maps that the user may consult to locate stores of interest. Product brochures may sometimes be obtained from store personnel. A user with a cellular phone may be able to call a store for information such as the store's hours.

In some supermarkets, users may use a kiosk to place a deli order. Department stores may have kiosks that allow users to obtain access to gift registry information for customers who have registered with the department store.

Although handheld computers have been developed that allow users to keep track of appointments, play games, record voice memos, and obtain certain limited information from the Internet, such devices have not generally been able to assist the user in shopping and in performing wireless transactions.

It is an object of the present invention to provide improved systems based on handheld computing devices for assisting users in shopping and wireless transactions.

SUMMARY OF THE INVENTION

A system is provided that allows users with handheld computing devices to obtain information using local and remote wireless links. Handheld computing devices may also be used to order products and services.

A shopping assistance service may be used that provides users with handheld computing devices access to directory information. The service may also provide product information. Interactive advertisements may be provided.

The system may support electronic shopping techniques in which users make financial commitments toward purchases prior to completing purchase transactions.

The handheld computing device may have an expansion slot that accepts accessories such as local wireless communications accessories. Accessories may include a bar code scanner, a radio-frequency identification (RFID) unit, a smart card attachment, etc. These attachments may be integrated into the handheld computing device if desired.

The handheld computing device may be used in financial transactions. For example, the handheld computing device may be used to wirelessly pay for products in stores. Expense reports may be automatically created using information on such wireless purchase transactions. If desired, the smart card features of a smart card attachment or accessory may be used during these transactions.

The handheld computing device may also be used for communications functions such as sending and receiving e-mail. Wireless communications may involve short-range or local wireless links and may also involve longer-range or remote wireless links.

If desired, a user may use the handheld computing device to exchange virtual business cards or other personal information with other handheld computing devices.

The handheld computing device may be used for electronic ticket applications. For example, the handheld computing device may be used to replace paper tickets on trains or other forms of transportation, in amusement parks, etc.

The handheld computing device may communicate with a merchant over a wireless communications link. For example, the handheld computing device may communicate with the merchant over a remote wireless link.

If desired, the handheld computing device may communicate with merchants and other entities by forming a local wireless link. A local wireless transmitter/receiver may be used to communicate with the handheld computing device. The local wireless transmitter/receiver may be connected to a communications network such as the Internet. Such a local wireless transmitter/receiver may serve as a local access point to the Internet or other such communications network for the handheld computing device. The handheld computing device may communicate with remote service provider servers and other computers over the communications network through the local access point.

The coverage of a number of local wireless transmitter/receivers may be arranged to overlap to form a wireless local area network. The location of the user may be determined by determining which local wireless transmitter/receiver the handheld computing device is in communication with. The location of the user may also be determined by using a GPS receiver associated with the handheld computing device or by using network-based techniques such as triangulation and time-of-flight measurements when the user is in communication with an appropriate wireless network.

The handheld computing device may use a bar code scanner or radio-frequency identification (RFID) circuitry to identify items in stores. Categories of products and manufacturers may also be identified. Shopping lists may be created based on products that are identified. The user's current shopping list may be displayed and modified using in-home equipment, an automobile personal computer, a handheld computing device, or in-store equipment.

The handheld computing device may display price comparison information for the user while the user is in a store. Product information may also be displayed by the handheld computing device when the user is in the store. Product information from multiple manufacturers may be obtained. If desired, product information may be organized in various product-categories. The handheld computing device may allow the user to search for information on products and manufacturers of interest while the user is in the store. The handheld computing device may display product information screens with interactive features.

The user may be alerted when a shopping assistance service is available. The shopping assistance service may then be used to obtain shopping information. A shopping mall shopping assistance service may be provided. The shopping mall shopping assistance service may provide information on current events. A general information screen may be provided. If desired, the shopping assistance service may provide directory information. Maps and directions may be provided.

The shopping assistance service may display information on specials. The user may search for desired products, services, and stores at the mall. Various types of messages may be provided to the handheld computing device. For example, a proximity message may be provided. The user may be alerted when a message is received from a nearby merchant. The user may also be alerted to the availability of a special. Messages regarding specials may include interactive features. Messages may be provided to the user to notify the user or to remind the user of certain events. The user may adjust alert settings for various message types.

The user may track the location and use of the handheld computing device. For example, the user may track the financial transactions that are made with the handheld computing device. The user may also establish restrictions on the financial transactions that may be made with the handheld computing device.

A supermarket shopping assistance service may be used to display information on products available in a supermarket. Targeted specials and other advertising and promotional material may be displayed on the handheld computing device. Such promotional material may be displayed in combination with shopping list information. The promotional material that is displayed may be targeted based on the contents of the shopping list. For example, if a shopping list includes a particular dessert item, logos and advertisements for dessert-related products may be displayed.

A supermarket shopping assistance service may provide a search screen for searching for products. Menu ideas may be provided. Ingredients from recipes provided by the supermarket shopping assistance service may be added to the user's shopping list.

If desired, location-based shopping services may be provided. For example, location-based advertisements may be displayed on the handheld computing device. Manufacturers may provide discounts and other financial benefits to supermarket customers using handheld computing devices.

The supermarket shopping assistance service may also be used to place orders for products. The products may be delivered to the user from an order fulfillment facility or may be picked up by the user in the supermarket. As an example, the user may use the handheld computing device to place a deli order to be picked up in the store. The order may be place over a local or remote wireless link. The deli may send a notification to the user over the remote or local wireless link when the order is ready to be picked up. This arrangement may also be used in other retail environments. For example, orders may be placed and notifications sent at shopping malls, department stores, airports, etc.

A department store shopping assistance service may be provided using the handheld computing device. A directory screen may be displayed by such a department store shopping assistance service. The service may allow a user to use a handheld computing device to request sales assistance. The handheld computing device may be used to provide access to a gift registry service.

If desired, a shopping list may be created based on video content. The video content may be displayed on in-home electronic equipment or the handheld computing device. The user may order ingredients associated with the video or may add ingredients associated with the video to the user's shopping list.

The handheld computing device may interact with kiosks. For example, audio files containing music or the like may be downloaded to handheld computing device from an audio kiosk. Images and video content may also be downloaded from a kiosk. The user may arrange for home delivery of audio and video content from a kiosk if desired.

The handheld computing device may be used in an automobile for financial transactions such as purchasing gasoline, paying tolls, paying for parking, purchasing food from drive-through restaurants, etc. Records may be maintained of these transactions and expense reports automatically generated based on the records.

Further features of the invention, its nature and various advantages will be more apparent from the accompanying drawings and the following detailed description of the preferred embodiments.

BRIEF DESCRIPTION OF THE DRAWINGS

FIG. 43 shows an illustrative screen of directions that a shopping assistance service may display in accordance with the present invention.

FIG. 51 shows a screen containing an illustrative proximity message in accordance with the present invention.

FIG. 52 shows a screen containing another illustrative proximity message in accordance with the present invention.

FIG. 55 shows a screen containing an illustrative passive special that may be provided in accordance with the present invention.

FIG. 56 shows a screen containing an illustrative interactive special that may be provided in accordance with the present invention.

FIG. 61 shows a screen containing another illustrative notification that may be displayed in accordance with the present invention.

FIG. 64 shows a screen containing an illustrative reminder that may be displayed in accordance with the present invention.

FIG. 69 shows an illustrative screen that may be displayed to provide the user with an opportunity to adjust alert settings for various message types in accordance with the present invention.

FIG. 70 shows an illustrative screen that may be displayed to show information on filter criteria in accordance with the present invention.

FIG. 75 shows an illustrative screen that may be displayed for the user when the user is setting up restrictions for financial transactions with a handheld computing device in accordance with the present invention.

DETAILED DESCRIPTION OF THE PREFERRED EMBODIMENTS

Figure 1:
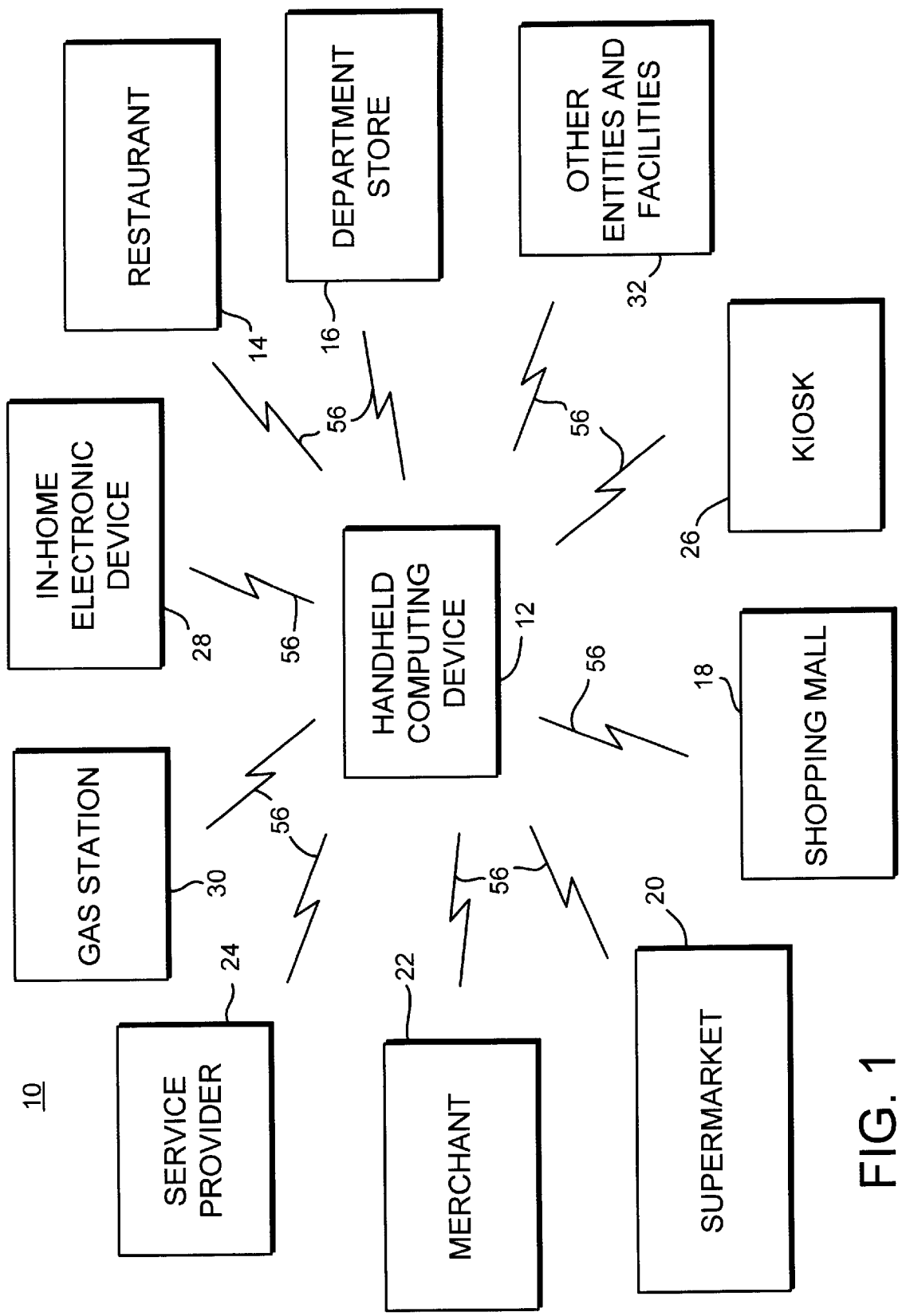
FIG. 1 is a schematic diagram of an illustrative system in accordance with the present invention.

An illustrative electronic commerce system 10 is shown in FIG. 1. Handheld computing device 12 may interact with various entities using wireless and wired communications. Handheld computing device 12 may be a handheld computer or any other suitable handheld computing device. As an example, a cellular telephone with computing capabilities may be used to perform some of the functions of handheld computing device 12. For many functions, handheld computers may be preferable to cellular telephones. Handheld computers generally have larger screens than cellular telephones and have superior computing capabilities. Handheld computers may also more readily accept attachments that allow their capabilities to be extended. Handheld computers and handheld computing devices are examples of mobile electronic devices. In some instances, mobile electronic devices such as shopping-cart-mounted electronic devices or the like may be used to perform the functions of handheld computing devices such as handheld computers or the like. The features of the present invention are described primarily in connection with handheld computing devices for clarity.

Handheld computing device 12 may be used to interact with restaurant 14, department store 16, shopping mall 18, supermarket 20, and other merchants such as merchant 22. Handheld computing device 12 may be used to place orders and to obtain information on the products and services offered by such merchants. Handheld computing device 12 may also be used to display promotional materials provided by these merchants. A service provider such as service provider 24 may be used to provide information, process orders, etc. Service provider 24 may be associated with one or more merchants or may operate independently.

Handheld computing device 12 may be used to obtain information and products and services from kiosks such as kiosk 26. Handheld computing device 12 may also be used to obtain information and products and services from other such devices such as vending machines, jukeboxes, etc.

In-home electronic device 28 may be used in requesting information, creating shopping lists, and placing orders for products and services. For example, in-home electronic device 28 may also be used to generate a grocery list of items to be picked up by the user in a brick-and-mortar store. The shopping list may be transmitted from the in-home electronic device to handheld computing device 12 for use in assisting the user when shopping in the store.

If desired, handheld computing device 12 may be used in an automobile. Handheld computing device 12 may be used to pay for gasoline at gas stations such as gas station 30. Handheld computing device 12 may also be used to pay for tolls and parking by interacting with toll collection facilities and parking facilities. In addition, food may be purchased from drive-through restaurants using handheld computing device 12. Handheld computing device 12 may also be used to interact with various other entities and facilities 32.

Figure 2:
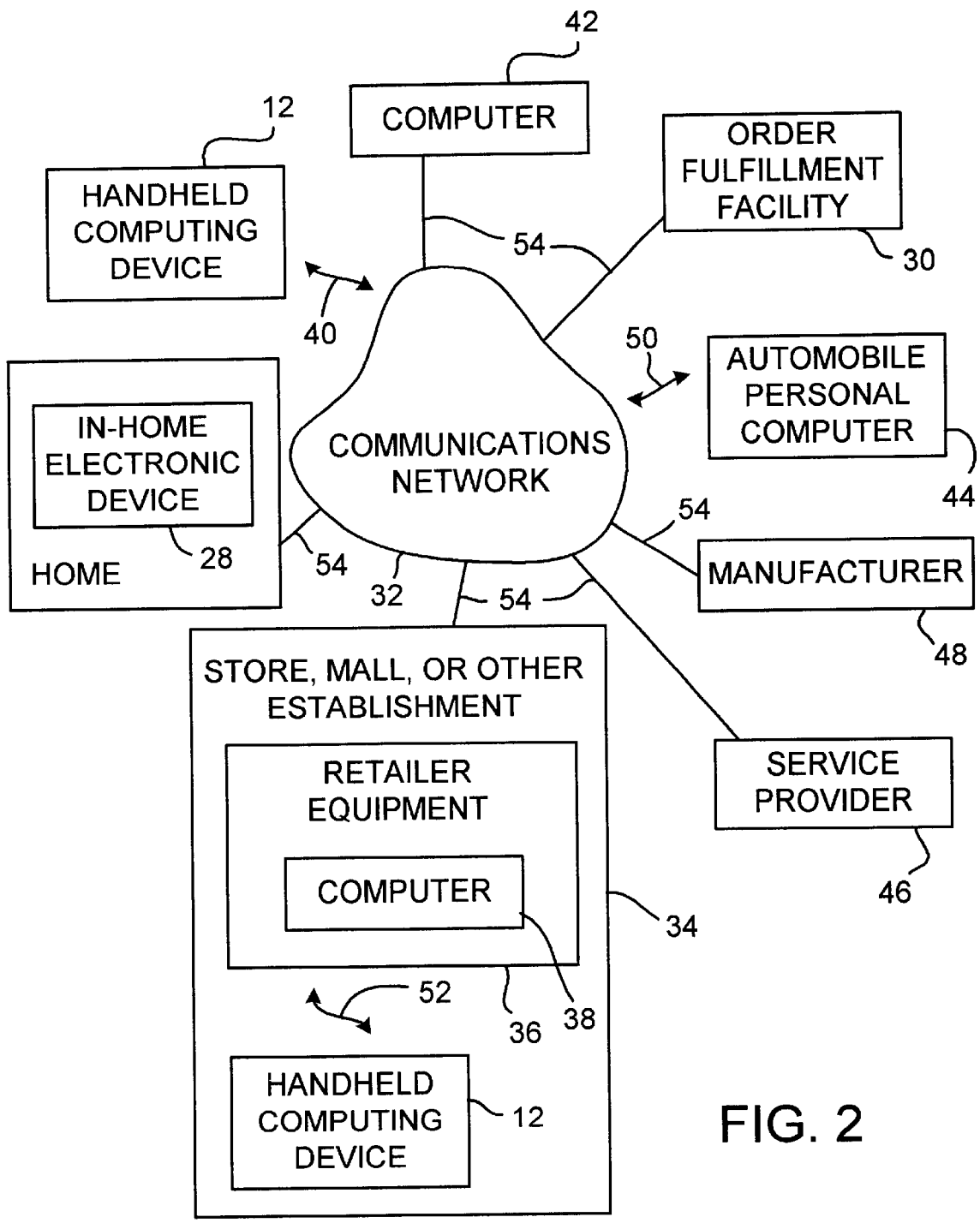
FIG. 2 is a diagram showing further aspects of an illustrative system in accordance with the present invention.

An illustrative arrangement in which in-home electronic device 28 may be used to request information and place orders is shown in FIG. 2. In-home electronic device 28 may be any suitable in-home electronic device or appliance, such as a personal computer, a web appliance, a refrigerator-mounted computing device, a countertop electronic device, a dedicated information and control appliance, a residential gateway device, a security system controller, a peripheral or client device or other such device that is that is connected to a residential gateway, personal computer, security system controller, or other in-home computer or electronic device. As an example, in-home electronic device 28 may be a computing device located in the user's kitchen.

The user may enter grocery items into device 28 to create a grocery order. The order may be transmitted to an order fulfillment facility such as order fulfillment facility over communications network 32. This type of order may be placed using a web interface. Order fulfillment facility 30 may support a web-based grocery delivery service. The communications network 32 may included the Internet. The user may access the grocery delivery service over the Internet using a web browser or the like. Orders may be created while the user is on-line with the grocery ordering service or may be created off-line and transmitted to the grocery ordering service later. Such orders may, for example, be transmitted at periodic intervals, when requested by the grocery delivery service or in-home electronic device, when desired by the user, continuously, or using a combination of such transmission arrangements or any other suitable arrangement.

Grocery items are merely an illustrative example of the type of products that may be ordered using in-home electronic device. In-home electronic device 28 may be used to create on-line orders for any suitable products and services if desired. For example, in-home electronic device may be used to create orders for department store items, electronics, appliances, gifts, etc.

The user may also use in-home electronic device 28 to create shopping lists. For example, family members in the user's household may occasionally think of grocery items or other items that need to be purchased. These items may be added to a shopping list using in-home electronic device 28. The information from the shopping list may be provided to the user when shopping in a store, mall, or other establishment 34. As an example, the shopping list information may be provided to a kiosk or other retailer equipment 36 that includes a computer 38. A user may print out the list from the kiosk.

The user may also access the shopping list by downloading the shopping list in the store or other establishment. The shopping list may be downloaded using a physical connection or a wireless communications path.

Shopping lists and orders for products and services may also be created using devices other than in-home electronic device 28. For example, lists and orders may be handled using a handheld computing device 12 that is in communication with communications network 32 over a wireless or wired communications link 40. A personal computer at the office or other suitable computer 42 may be used by the user or other parties to create shopping lists and orders for products and services. If desired, an automobile personal computer 44 may be used to generate shopping lists and orders for products and services.

Platforms such as in-home electronic device 28, handheld computing device 12, computer 42, and automobile personal computer 44 may support remote interactions with stores, malls, and other establishments and with one or more service providers 46. Service providers may be used to provide shopping assistance services for in-store shoppers. Service providers may also be used to supply content to various platforms. Services such as product and service ordering may be supported by service providers. In addition, shopping list services may be supported by service providers.

As an example, a shopping list creation service that is supported by a service provider may allow a user to add items to a shopping list maintained at a remote server (e.g., a server located at service provider 46 or associated with service provider 46). When the user is shopping in a store or other establishment 34, the user may access the shopping list from service provider 46.

If desired, service provider 46 may support multiple services. For example, service provider 46 may support a product ordering service (e.g., on-line grocery deliveries or grocery orders processed for in-store pickup) and a shopping assistance service (e.g., a shopping list service or the like).

Service provider 46 may communicate with manufacturers such as manufacturer 48. Manufacturers may offer coupons, discounts, or other benefits to users. It may or may not be readily apparent to the user that the manufacturer is providing a benefit. For example, a service provider may provide a user with an opportunity to make a financial commitment towards making a shopping purchase. The user may, for example, select a certain grocery item that the user desires to purchase. The user may offer to pay a certain price for the item or may make another suitable financial commitment toward purchasing the item. A given manufacturer may subsidize the user's purchase by offering a discount provided that the user purchases the item from that given manufacturer. Such discounts may be provided by the service provider, the store, mall, or other establishment, or any other suitable entity.

Information may be delivered to platforms such as in-home electronic device 28, handheld computing device 12, automobile personal computer 44, and computer 42. For example, the user may request a media file while shopping. The user's request may be passed to a service provider that may deliver the requested file to in-home electronic device 28, handheld computing device 12, automobile personal computer 44, or computer 42. As an example, a recipe video may be delivered in this way.

Services may be provided using applications that are implemented locally on platforms such as in-home electronic device 28, handheld computing device 12, automobile personal computer 44, and computer 42. For example, a recipe service that assists the user in selecting menu items for dinner may be implemented using a locally-executed application.

Services may also be provided using remote applications. For example, the recipe service may be implemented using a remote server connected to communications network 32 (e.g., a remote server located at or associated with service provider 46). The user may use a platform such as in-home electronic device 28, handheld computing device 12, automobile personal computer 44, or computer 42 to access the remote server. A web browser or other suitable browser application such as a microbrowser may be used to access the remote server.

Remote applications and services may be desirable when providing centralized access to certain information. For example, a shopping list service that is based on a remote server may be accessed from various platforms, whereas a shopping list service that is run using a local application may only be used where that local application has been implemented or when the local application may be accessed by other devices.

Services that are accessed remotely may use client-server or distributed computing arrangements. Remotely implemented services may also interact with locally-executed applications. In general, services may be provided using local arrangements, remote arrangements, or arrangements that use a combination of local and remote arrangements. The applications that individually or collectively support the features of such services are generally referred to herein as "applications" or "services" regardless of the nature of the platform or platforms on which they are implemented.

The components of FIGS. 1 and 2 may be interconnected using any suitable wired or wireless communications paths. Analog and digital transmissions may be involved. Communications paths may use the Internet. Packet-based arrangements may be used. Wired paths may use cable or other wires or fiber optics. Wireless paths may use optical or radio-frequency communications. Certain types of communications favor wireless paths. For example, handheld computing device 12 and automobile personal computer 44 of FIG. 2 typically communicate with the components of FIG. 2 via wireless paths such as paths 40, 48, and 52, because handheld computing device 12 and automobile personal computer 44 are mobile devices. If desired, however, handheld computing device 12 or automobile personal computer may be connected to various components in system 10 using wired paths. In the arrangement of FIG. 2, communications paths such as paths 50 and 52 are typically wireless paths. Paths such as paths 40 and 54 may be wired or wireless paths. The paths 56 that are illustrated in FIG. 1 may be wired or wireless, but typically involve at least some wireless communications.

Wireless communications paths may use infrared (IR) communications. For example, an infrared transmitter/receiver may be provided in retailer equipment 36. An IR communications link may be formed between retailer equipment 36 and handheld computing device 12 using an IR transmitter/receiver in handheld computing device 12.

Wireless radio-frequency (RF) communications may use any suitable radio frequencies. For example, frequencies such as 900 MHz or 2.4 GHz or other ultra-high frequencies (UHF) may be used. These are merely illustrative examples. Any suitable frequency or frequencies may be used for wireless RF transmissions.

Wireless communications paths that use short-range optical connections such as IR links and short-range RF links over distances from a fraction of a foot to hundreds of feet are referred to herein as "local" communications paths or links. An example of a local communications path is an IR link between handheld computing device 12 and a kiosk or cash register. Another example of a local communications path is a Bluetooth connection between handheld computing device 12 and a wireless transmitter/receiver associated with a store, merchant, mall, or other establishment or entity. Such a connection may operate at 2.4 GHz. Another example of a local communications path is a wireless path between handheld computing device 12 and a wireless local area network. Such a wireless local area network may act as a local access point to a larger communications network such as the Internet.

Wireless communications paths over longer distances (e.g., fractions of miles or more) are referred to herein as "remote" communications paths or links. Examples of remote communications paths include cellular telephone links to terrestrial cellular base stations, satellite links (e.g., to communications satellites that provide Internet access, wireless telephone services, or data services or the like), links to FM data services that are distributed from terrestrial broadcast stations, etc.

Figure 3:
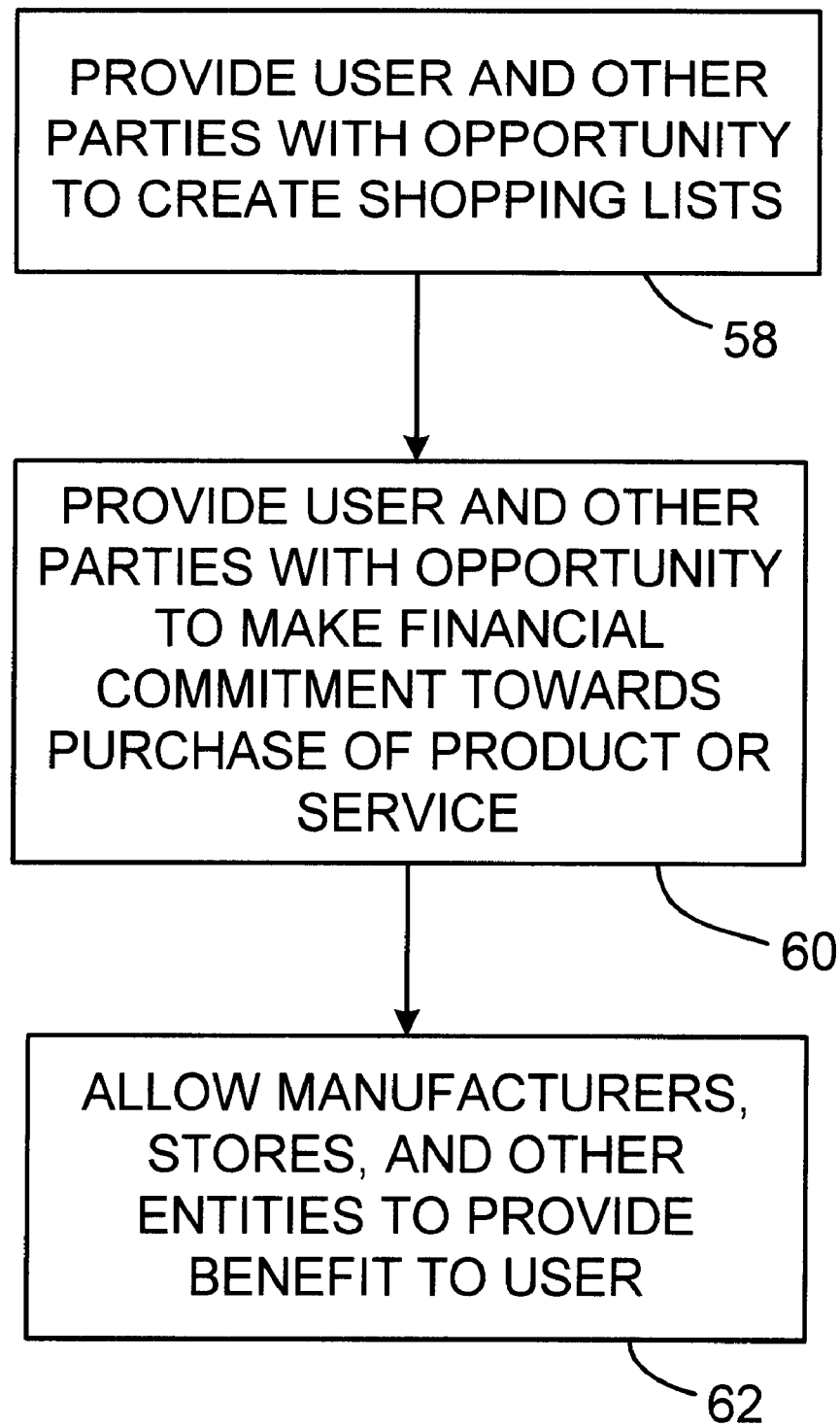
FIG. 3 is a flow chart of illustrative steps involved in electronic shopping techniques in which a user makes a financial commitment toward a purchase in accordance with the present invention.

Illustrative steps involved in providing a shopping list service are shown in FIG. 3. At step 58, a shopping list application is used to provide a user at a user device such as an in-home electronic device 28, handheld computing device 12, automobile personal computer 44, and computer 42 with an opportunity to create a shopping list. For example, an in-home electronic device such as a refrigerator-mounted or countertop electronic appliance may be used to display interactive options to the user that allow the user to select shopping list items from an on-screen list of possible items or to enter shopping list items.

If desired, the process of booting up a full-fledged personal computer may be avoided by using an in-home electronic device that is less complex than a traditional personal computer. Such an in-home electronic device may, for example, be in an always-on or nearly always-on state. The operating system may be less complex than a traditional personal computer operating system. Only a limited number of applications may be supported by the device. The in-home electronic device may also use a touch screen. The in-home electronic device may use a tablet or flat-panel design. Such devices may be mounted on the front of a refrigerator or a kitchen cabinet or on the wall. The in-home electronic device may be battery powered or may use DC power supplied from a wall-mounted AC-to-DC power supply. These are merely illustrative examples of the types of arrangements that may be used to make the in-home electronic device more accessible than a traditional personal computer. If desired, however, a traditional personal computer in the home may be used to enter the shopping list items at step 58.

Other individuals such as other family members may add to the shopping list at step 58. For example, a family member may add to the list from the office using an office computer connected to the Internet. Another family member may add to the list using an automobile personal computer. The list may be generated by allowing each contributor to the list to access a central shopping list file. Such a file may be maintained, for example, on a server associated with a service provider. The list may also be generated by allowing each contributor to create lists locally. Such locally-generated lists may be combined locally or at a remote location (e.g., at a service provider or a merchant, etc.).

Shopping list information may be provided to a service provider or merchant at suitable predefined intervals (e.g., once every 10 minutes, once per day, etc.). Information for the list may also be provided to a service provider or merchant a certain period of time after each time the list is last modified (e.g., 10 minutes after each time the list is last modified). List information may also be provided to the service provider when requested by the service provider or the user. The service provider may store the information until requested by the user (e.g., when shopping) or may provide the information to the store or other establishment in advance for local retrieval by the user when shopping. A combination of these approaches or any other suitable approach may be used if desired. These are merely illustrative examples, any suitable arrangement may be used to provide the user and other parties with an opportunity to create shopping lists at step 58.

If desired, the user may designate certain items for home delivery. In this capacity, the shopping list service serves as an on-line merchant. Other shopping list information may be used to assist the user in locating products of interest during in-store shopping.

Regardless of whether the shopping list items are ordered on-line, are used for an order to be picked up by the user at a merchant, or are used to assist the user during in-store shopping, the user and other parties may be provided with an opportunity to make a financial commitment towards the purchase of a product or service at step 60. The financial commitment may be, for example, an agreement by the user that the user's credit card account or other financial account will be charged if suitable products are found matching the user's requests.

Manufacturers, stores, and other entities may respond to such a financial commitment by providing the user with a discount or other financial benefit or the like at step 62. Such benefits may be provided, for example, in the form of an electronic discount on the purchase price for an item that is awarded during the purchase transaction at step 62. The user may also be provided with a benefit by having multiple sellers compete against one another for the lowest selling price. A computer associated with the service provider may match the user to the seller with the lowest price. During shopping, information may be displayed to the user with a handheld computing device or the like based on which items are in the user's shopping list.

Figure 4:
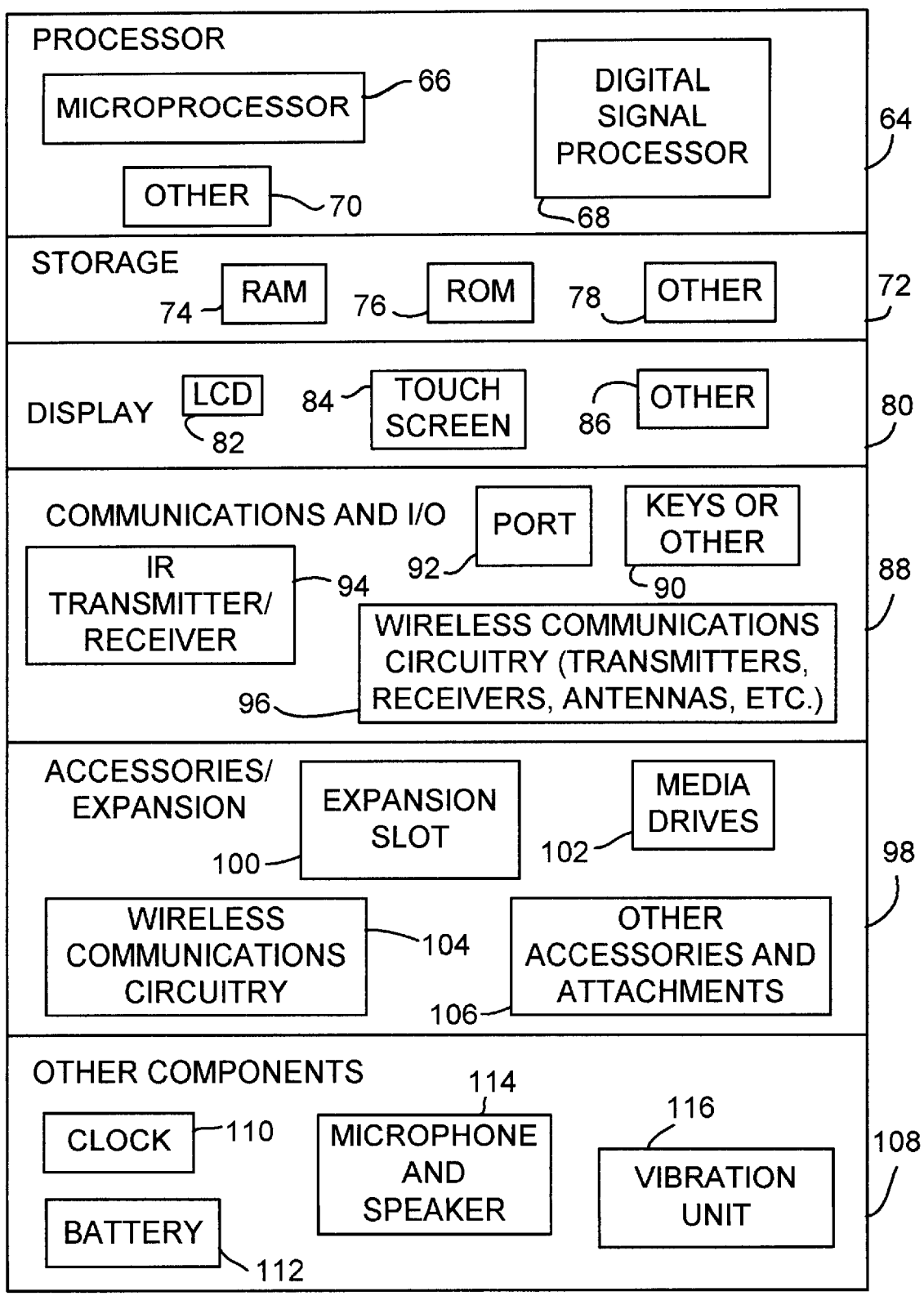
FIG. 4 is a schematic diagram of an illustrative handheld computing device in accordance with the present invention.

Illustrative components of handheld computing device 12 are shown in FIG. 4. Handheld computing device 12 may contain a processor circuitry 64 that is based on a microprocessor or microcontroller 66, a digital signal processor 68, and other processing and control circuitry 70.

Storage 72 may include random-access memory (RAM) 74, read-only memory (ROM), and any other suitable volatile or non-volatile memory or storage device 78.

Display 80 may include a liquid-crystal display (LCD) 82, a touch screen 84, or any other suitable display screens 86. Display 80 may be color or monochrome and may be front-lit or back-lit. An active matrix design may be used if desired.

Communications and I/O 88 may include keys or other input interface devices 90 such as a touch pad, track ball, or other pointing device, a keypad a keyboard, dedicated buttons, etc. Small keys or buttons may be used to ensure that handheld computing device is relatively small and lightweight. A port 92 may be used to connect handheld computing device 12 to an external computer or other electronic device. Port 92 may be any suitable port or ports, such as a FireWire port (IEEE 1394), a universal serial bus (USB) port, etc. An IR port may be supported using IR transmitter/receiver 94. Wireless communications circuitry 96 may include one or more antennas, transmitters, tunable transmitters, receivers, and tunable receivers. Wireless communications circuitry 96 may support remote wireless communications (e.g., cellular telephone communications, cellular modem communications to a terrestrial base station, satellite communications, etc.) and local wireless communications (e.g., a Bluetooth RF connection or other RF connection or an IR connection to a nearby wireless device).

Handheld computing device 12 may include accessories and expansion components 98. An expansion slot 100 may be used to add expansion cards or accessories to handheld computing device 12. For example, a flash card containing software or other content may be added as an expansion module. Another accessory that may be added is a bar code scanner or a radio-frequency identification (RFID) unit. Bar code scanners use light to identify products with bar code labels. RFID units may identify products by wirelessly communicating with integrated circuits embedded in or attached to or otherwise associated with products. These circuits may contain information that uniquely identifies the products.

If desired, a Bluetooth module or other wireless communications circuitry 104 may be added as an accessory or expansion module. An expansion module may be provided that provides video capabilities to handheld computing device 12 (e.g., MPEG-2 or MPEG-4 capabilities). If handheld computing device is already configured to include such capabilities, an expansion module may be provided that enhances the video capabilities of handheld computing device 12. Media drives 102 such as a CD drive, a floppy drive, a PC card reader, a memory card reader, a DVD drive, or any other suitable drives may be added to or attached to handheld computing device 12. Other accessories and attachments 106 may be used if desired. Such other accessories and attachments may include, for example, a scanner, a printer, etc.

Other components 108 that may be included in handheld computing device 12 include clock 110. Clock 110 may be implemented as one or more clock circuits or as a software timing routine or using a combination of such arrangements.

A battery 112 may be used to provide power. A microphone and speaker 114 may be used to support audio functions. Audio tones and other alert signals may be presented to the user through the speaker. The microphone may be used in voice communications, voice memos, etc. Vibration unit 116 may be used to vibrate handheld computing unit 12 when it is desired to alert the user by vibrations (e.g., without disturbing people in the vicinity of handheld computing unit 12 by using an audible alert). Vibration unit 116 may be used to transmit vibrations using different codes. For example, one vibration may signify an incoming e-mail message, whereas two vibrations may be used to alert the user to a calender event. A security device that tracks whether handheld computing device 12 has been removed from a store or other establishment may be provided if desired.

Figure 5:
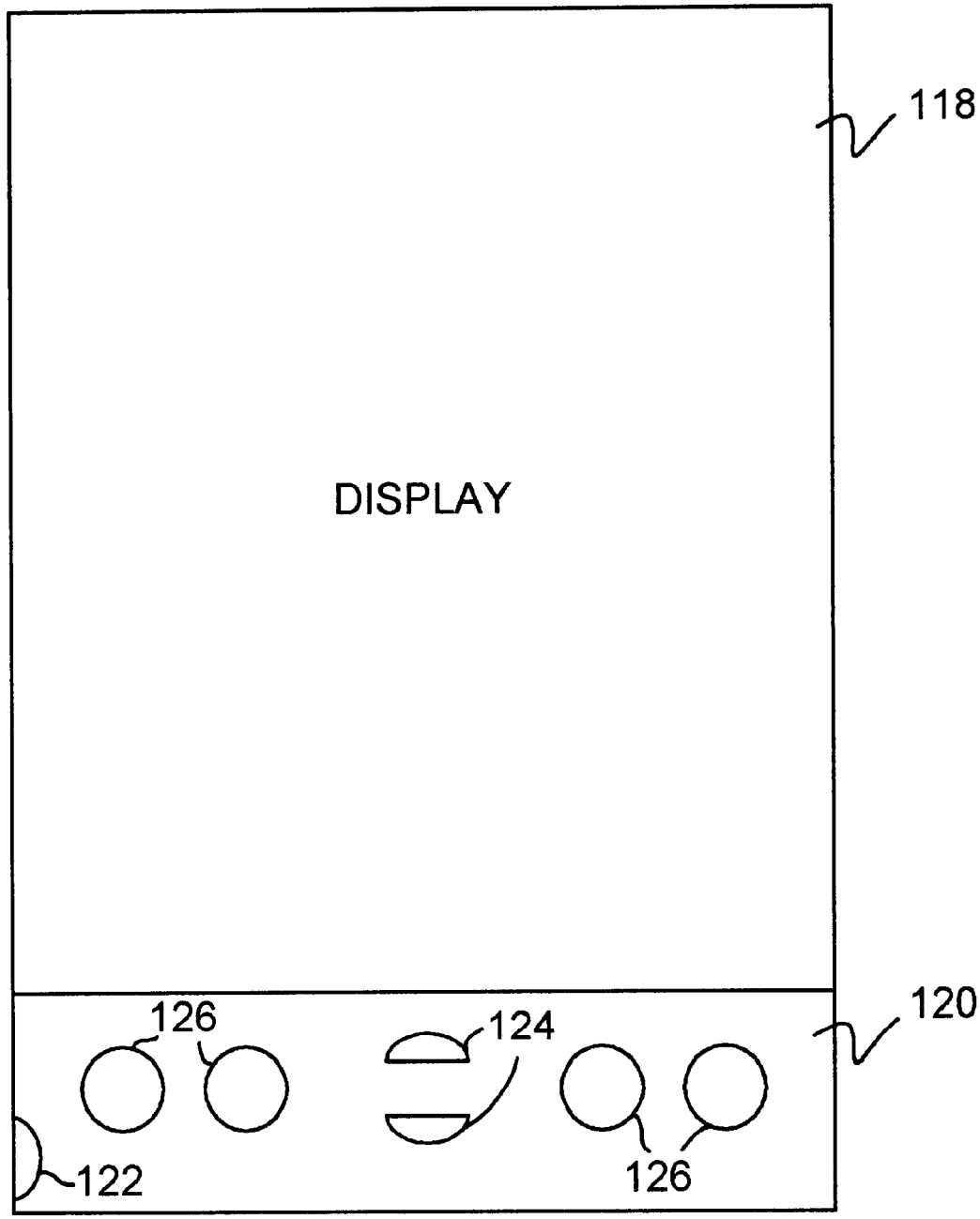
FIG. 5 is a front view of an illustrative handheld computing device in accordance with the present invention.

An illustrative handheld computing device 12 is shown in FIG. 5. Display 118 may be a touch screen monochrome or color display, or any other suitable display screen. Keys and buttons 120 may include a power button 122, navigation keys 124, and dedicated function buttons 126. Each of the dedicated function buttons 126 may be used to perform a different task.

Figure 6:
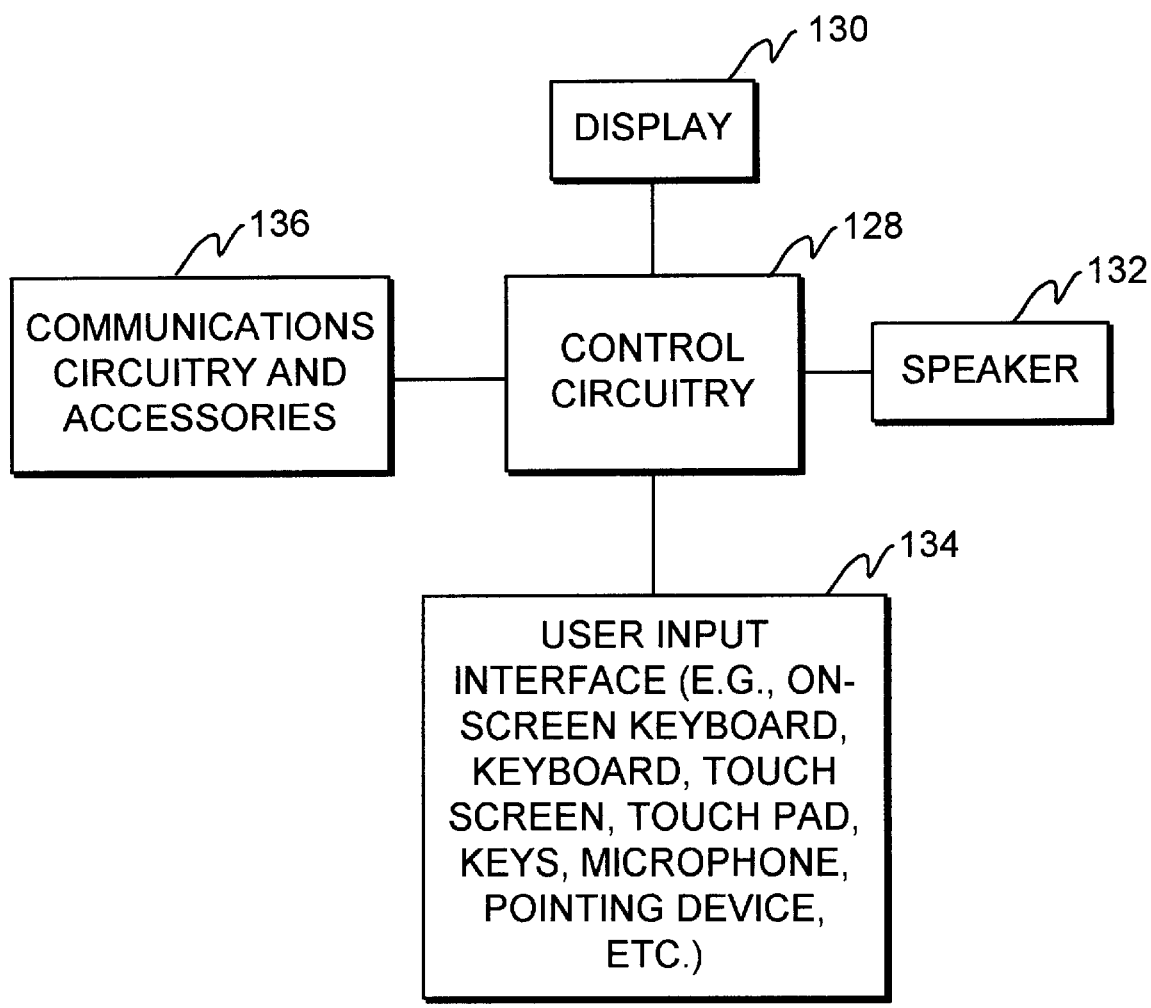
FIG. 6 is a schematic diagram of an illustrative handheld computing device in accordance with the present invention.

A generalized diagram of handheld computing device 12 is shown in FIG. 6. The device may be controlled by control circuitry 128. Control circuitry 128 may be based on one or more processors such as a microprocessor or microcontroller, application specific integrated circuits, analog-to-digital and digital-to-analog converter circuits and digital signal processors (e.g., to handle voice recognition functions and the like), and any other suitable type of processor or control circuitry. Visual information may be displayed for the user on display 130. Audio information may be presented to the user through speaker 132. Speaker 132 may be integrated into handheld computing device 12 or may be provided as headphones or any other suitable external component.

The user may provide inputs using user input interface 134. User input interface 134 may be, for example, an on-screen keyboard, a keyboard, a touch screen, a touch pad, keys or buttons, a microphone (e.g., for voice commands), a pointing device (e.g., a trackball or mouse, etc.), etc. Communications circuitry and accessories 136 may include antennas, transmitter/receivers, and other communications circuitry and may be used to handle wired and wireless communications tasks. Wireless communications circuitry may be provided for local communications functions, remote communications functions, or both local and remote communications functions. Communications and accessories 136 may include IR communications circuitry for local optical communications. Communications and accessories 136 may also include a bar code scanner for scanning bar code labels on items in stores and the like or an RFID unit for identifying items wirelessly. Other features, such as printing, scanning, and the like may be provided by other suitable communications circuitry and accessories.

Figure 7:
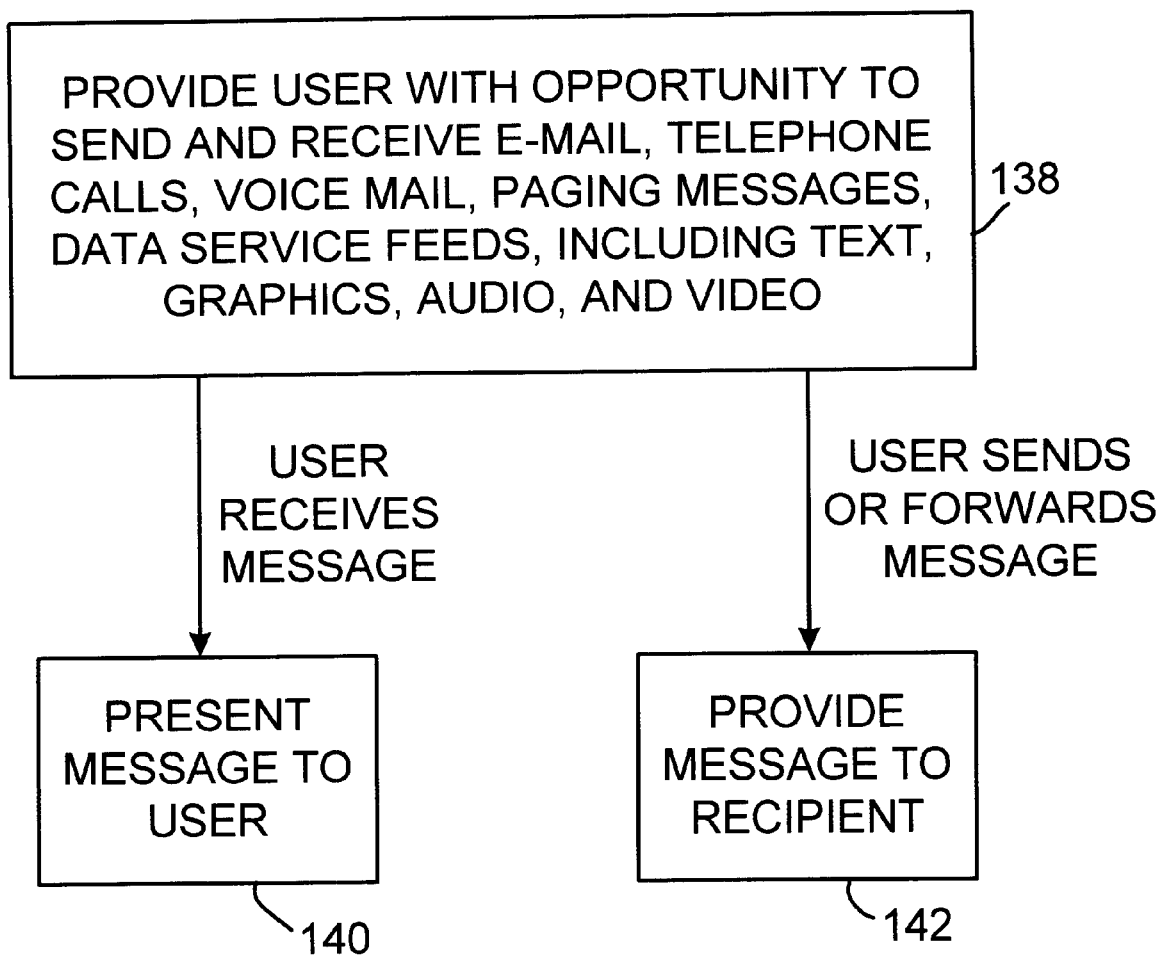
FIG. 7 is a flow chart of illustrative steps involved in financial transaction and communications functions involving the handheld computing device in accordance with the present invention.

Handheld computing device 12 may be used to provide a user with various communications functions, financial functions, etc. Illustrative steps involved in providing the user with such functions are shown in FIG. 7. At step 138, handheld computing device 12 may be used to provide the user with an opportunity to send and receive e-mail, telephone calls, voice mail, paging messages, data service feeds, and any other suitable information or messages. Such messages may include text, graphics, audio, and video. Audio files may be sent using any suitable audio format. One illustrative audio format for audio files is MP3. Video may also be sent using any suitable format. One illustrative video format is MPEG-4, but any suitable format may be used if desired. Text, graphics, audio, and video may be provided as part of the messages sent by handheld computing device 12 or may be provided as attachments to such mail.

If the user receives an incoming message, handheld computing device 12 may be used to present the message to the user at step 140. Text, graphics, and video may be displayed on the display of the handheld computing device. Audio and the audio component of the video may be played through the handheld's speaker or speakers.

Handheld computing device 12 may allow the user to send or forward voice mail messages and e-mail messages and the like. If the user sends or forwards a message, the system may provide the message to the appropriate recipient at step 142.

If desired, handheld computing device 12 may be used for calendar and voice memo functions. The calendar function may be provided by using handheld computing device 12 to display on-screen options that allow the user to make entries in a calendar. The voice memo functions may be used to record voice memos. Voice memos may be recorded using analog-to-digital circuitry to digitize the user's voice. The digitized signals may be stored in storage 72 (FIG. 4).

Voice memos and calendar entries may be forwarded from handheld computing device 12 to other devices, such as a personal computer, automobile personal computer, in-home electronic device, etc.

Figure 8:
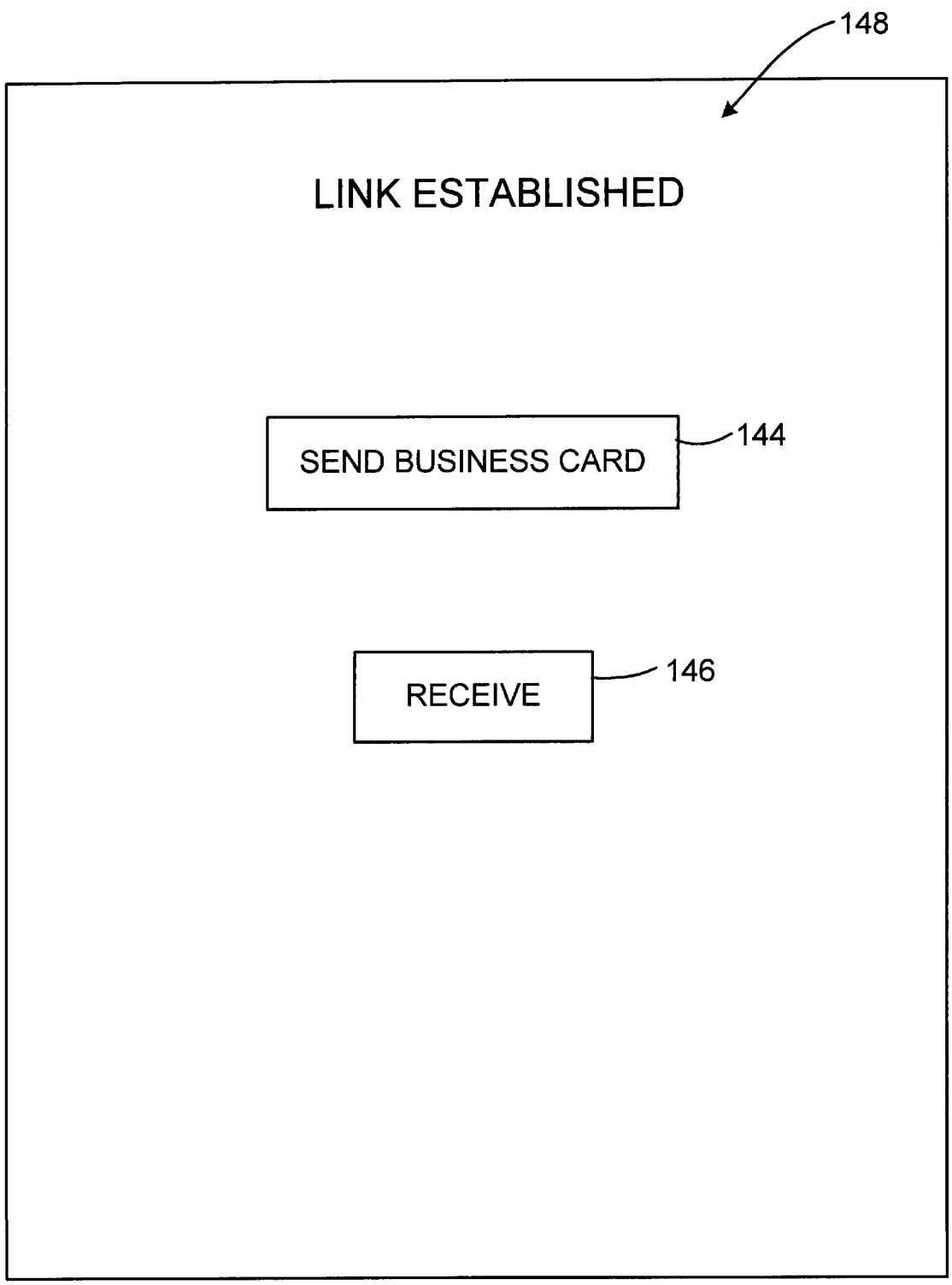
FIG. 8 shows an illustrative screen that may be used in exchanging virtual business cards in accordance with the present invention.

Handheld computing device 12 may be used to send and receive graphic facsimiles or images of real business cards. As shown in FIG. 8, handheld computing device 12 may provide the user with options such as send business card option 144 and receive option 146. Options such as option 144 and 146 may be displayed, for example, after a wireless link has been established between handheld computing device 12 and another handheld computing device. A confirmation message 148 may be displayed to confirm that the link has been established. The link may be established using any suitable IR communications protocols. If desired, the nature of the transmission (an image or graphic facsimile of a business card) may be identified during the link setup process. This may allow handheld computing device 12 to display options such as options 144 and 146 with little or no direction from the user. The user may generate an image of the user's own business card using a scanner. A graphic facsimile may be generated using a drawing application or the like.

Figure 9:
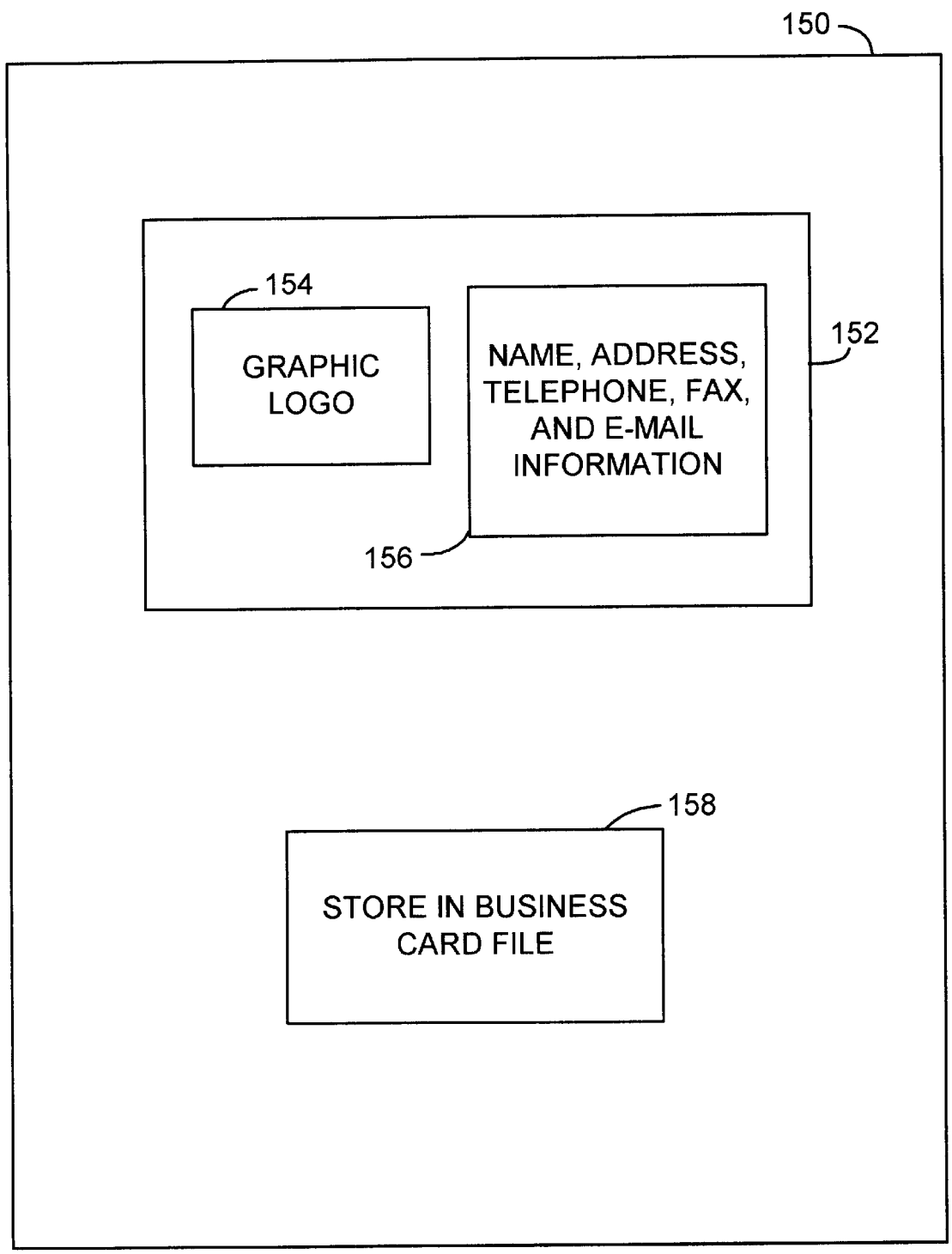
FIG. 9 shows another illustrative screen that may be used in exchanging virtual business cards in accordance with the present invention.

Electronic business cards based on images and graphic facsimiles may include digital images of the user and may have associated audio and video clips. For example, the user's voice may be recorded and associated with the user's electronic business card. An illustrative screen 150 that handheld computing device 12 may display is shown in FIG. 9. In the example of FIG. 9, electronic business card 152 contains a graphic logo 154 and personal information 156.

Electronic business cards that the user receives from others may be organized using an address book application. Options such as option 158 may be displayed to provide the user with an opportunity to save received business cards for later retrieval.

Handheld computing device 12 may be used for financial transactions. For example, the user may pay for a product in a store by wirelessly conveying information on the user's credit card, debit card, account, or other financial information to equipment in the store such as a cash register with wireless financial transaction capabilities.

Figure 10:
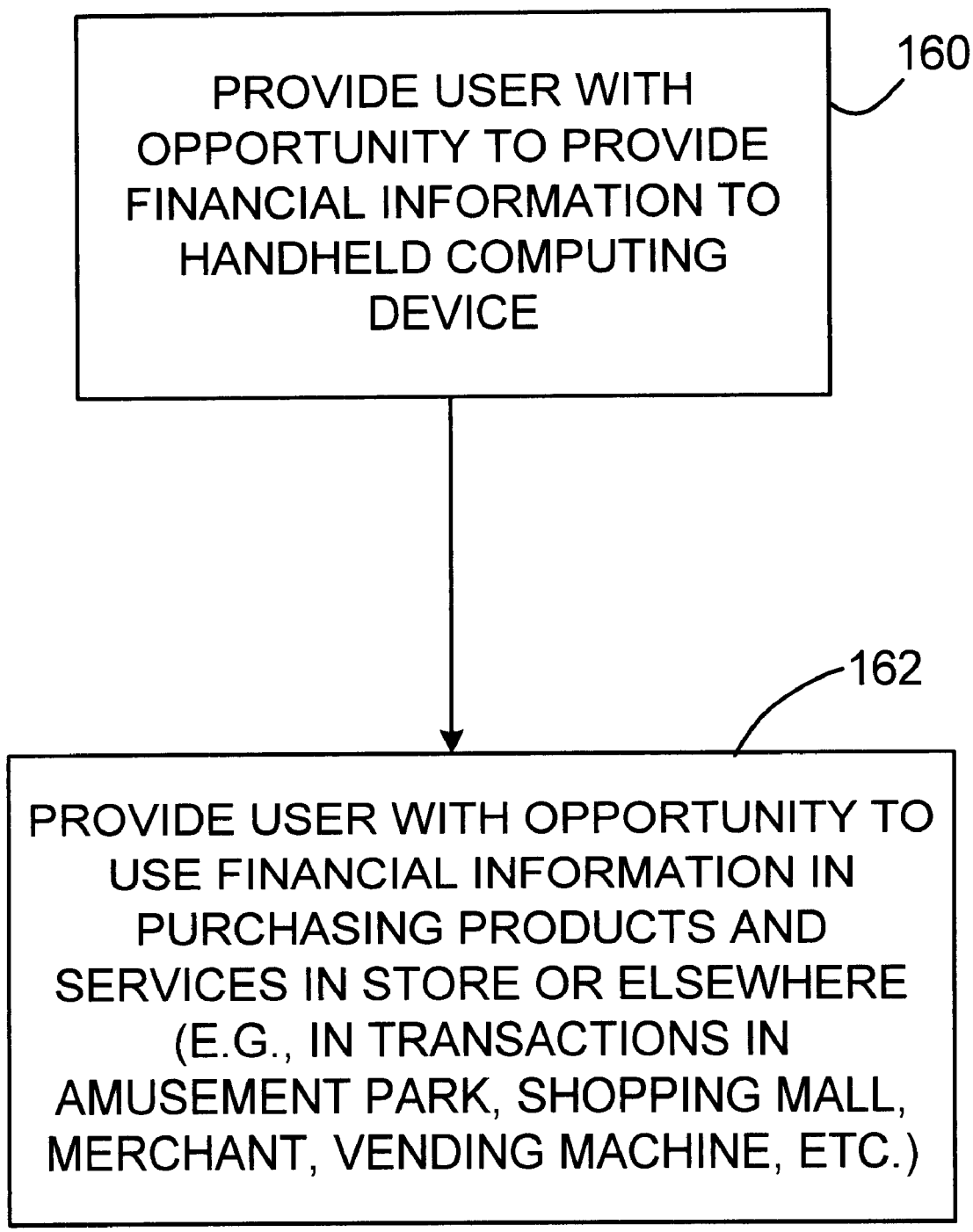
FIG. 10 is a flow chart of illustrative steps involved in using handheld computing device in wireless financial transactions in accordance with the present invention.

Illustrative steps involved in using handheld computing device 12 in financial transactions are shown in FIG. 10. At step 160, handheld computing device 12 may be used to provide the user with an opportunity to provide financial information to handheld computing device 12 that is to be used in a financial transactions. For example, handheld computing device 12 may present on-screen options that allow the user to enter the digits for the user's credit card, debit card, or other account. Account information may relate to an account maintained by a store, mall, or other merchant or entity, or by a third-party service provider. Handheld computing device 12 may also allow the user to enter financial information by downloading the information from a personal computer or other device, by entering the information using dedicated keys, or by using any other suitable approach. If desired, the financial information may be stored at a remote location such as on a server associated with a service provider connected to communications network 32 of FIG. 2. Handheld computing device 12 may be provided with financial information and financial transaction capabilities using a smart card attachment or smart card circuitry that is integrated into handheld computing device 12 or using smart card protocols.

At step 162, the handheld computing device may be used to provide the user with an opportunity to use the financial information that was provided to handheld computing device 12 in a financial transaction. For example, handheld computing device 12 may display an on-screen option labeled "pay now" that the user can select when paying for a product or service. If the option is displayed on a touch screen, for example, the user may select the pay now option by pressing the option on the screen. Selecting the pay now option directs handheld computing device 12 to authorize the purchase transaction. Wireless signals transmitted between handheld computing device 12 and the wireless cash register or other in-store equipment allow the cash register and handheld computing device to consummate the transaction. This type of arrangement is merely illustrative. Any suitable arrangement for using handheld computing device 12 to consummate a financial transaction based on the financial information stored at step 160 may be used if desired.

The transactions performed at step 162 may be placed under password control. The user may supply a password using keys or an on-screen keyboard. The user's identity may also be verified using handwriting or signature recognition arrangements. If desired, handheld computing device 12 may be configured to recognize a voice print or voice password. A fingerprint recognition device may be used as an attachment to handheld computing device 12 or as a part of handheld computing device 12. With such an arrangement, the user's identity may be verified for financial transactions using fingerprint recognition. If desired, a smart card key may be used as an attachment to handheld computing device 12. When the smart card is attached to handheld computing device 12, purchasing is authorized. When the smart card is not attached to handheld computing device 12, wireless transactions are prohibited. These approaches are illustrative. Any suitable approaches for verifying the user's identity may be used if desired.

The wireless financial transaction of step 162 may be performed with any suitable hardware or entity. For example, wireless payments may be made with kiosks, vending machines, ticket machines, parking garage gates, toll collection facilities, cash registers and other equipment associated with stores, malls, amusements parks, and other entities, ticket collection equipment, mass transit turnstiles and other entrance and exit equipment, parking meters, gas pumps or gas station equipment, fast food restaurants, drive through facilities, banks or any other suitable entity or equipment. Financial transactions may involve either debiting or crediting the user.

Any suitable wireless communications link may be used to consummate the wireless transaction of step 162. For example, a local IR or RF communications path may be used. Wireless financial transactions may also be performed over remote wireless links. Wired links may be used if desired. For example, the handheld computing device 12 may be connected to the other equipment being used in the transaction using a cable or by placing the handheld computing device 12 in a cradle. The cradle may be adapted to receive the handheld computing device and to form an electrical connection with the handheld computing device. The electrical connection allows the handheld computing device 12 to communicate with the other equipment during the financial transaction.

If desired, these types of communications techniques may be used for non-financial transactions, such as transactions in which information or content is exchanged rather than financial information.

When handheld computing device 12 is used in wireless financial transactions, handheld computing device 12 may retain information on each of the financial transactions. If desired, this financial information may be retained on a remote server or the like. Regardless of where the financial transaction information is stored, the financial transaction information may be used in other applications. For example, the financial transaction information may be provided to an expense report application, a tax application, a money management application or banking application, a general-purpose financial records application, etc. The financial transaction information may be provided to applications such as these using any suitable technique, such as by transferring the information to the application or informing the application where the financial transaction information is stored (e.g., on handheld computing device 12 or on a remote server, etc.).

Figure 11:
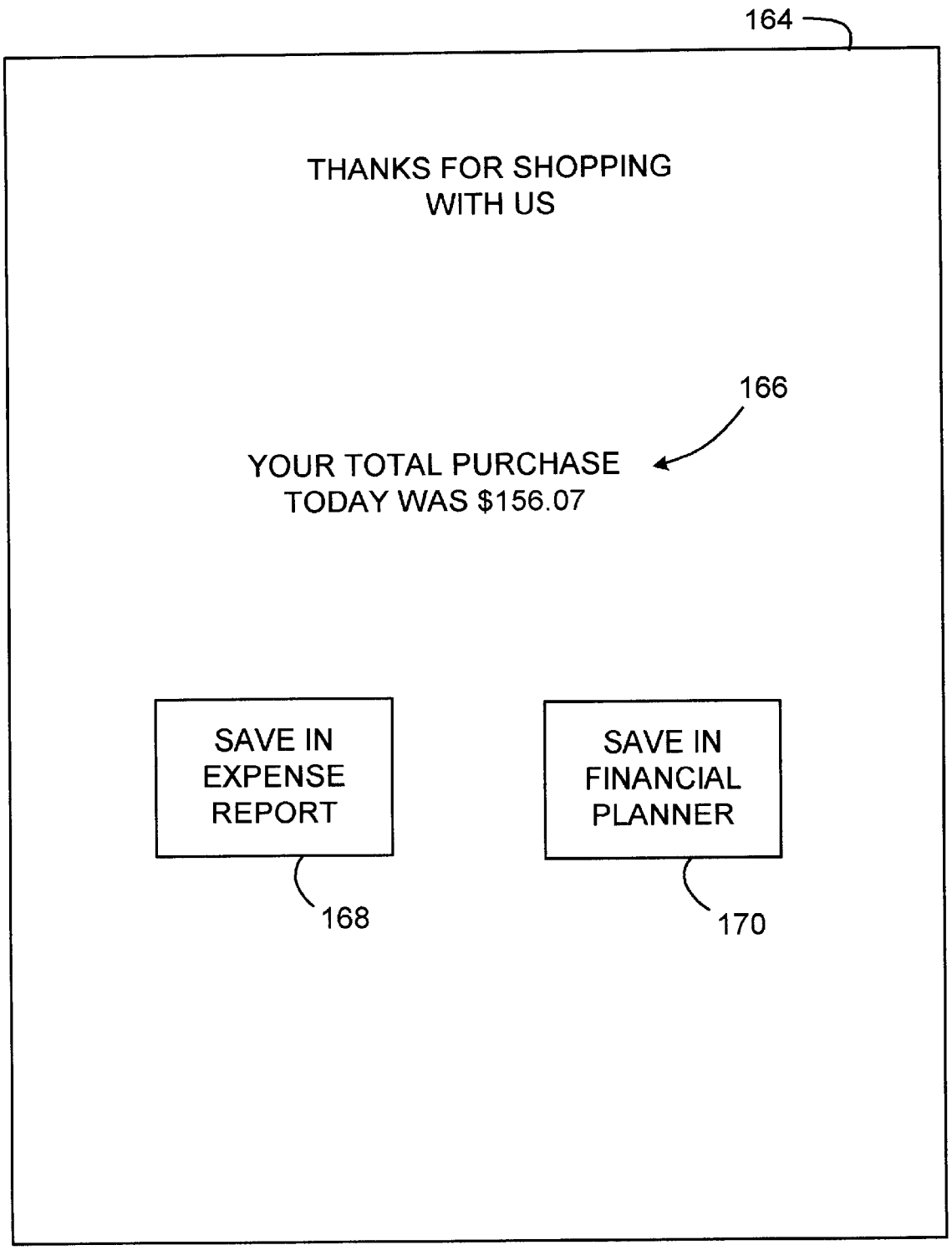
FIG. 11 shows an illustrative screen that may be used in providing an expense report based on wireless financial transactions in accordance with the present invention.

An illustrative screen that handheld computing device 12 may display for the user when a financial transaction has been consummated is shown in FIG. 11. Handheld computing device 12 may display information on the financial transaction such as information 166. Handheld computing device 12 may also display on-screen options such as options 168 and 170 that allow the user to save the financial transaction information (e.g., information on the $156.07 purchase in the example of FIG. 11) to either an expense report application or a financial planning application. These are merely illustrative examples of ways in which to save the financial transaction information and illustrative examples of suitable applications to which the information may be provided.

Figure 12:
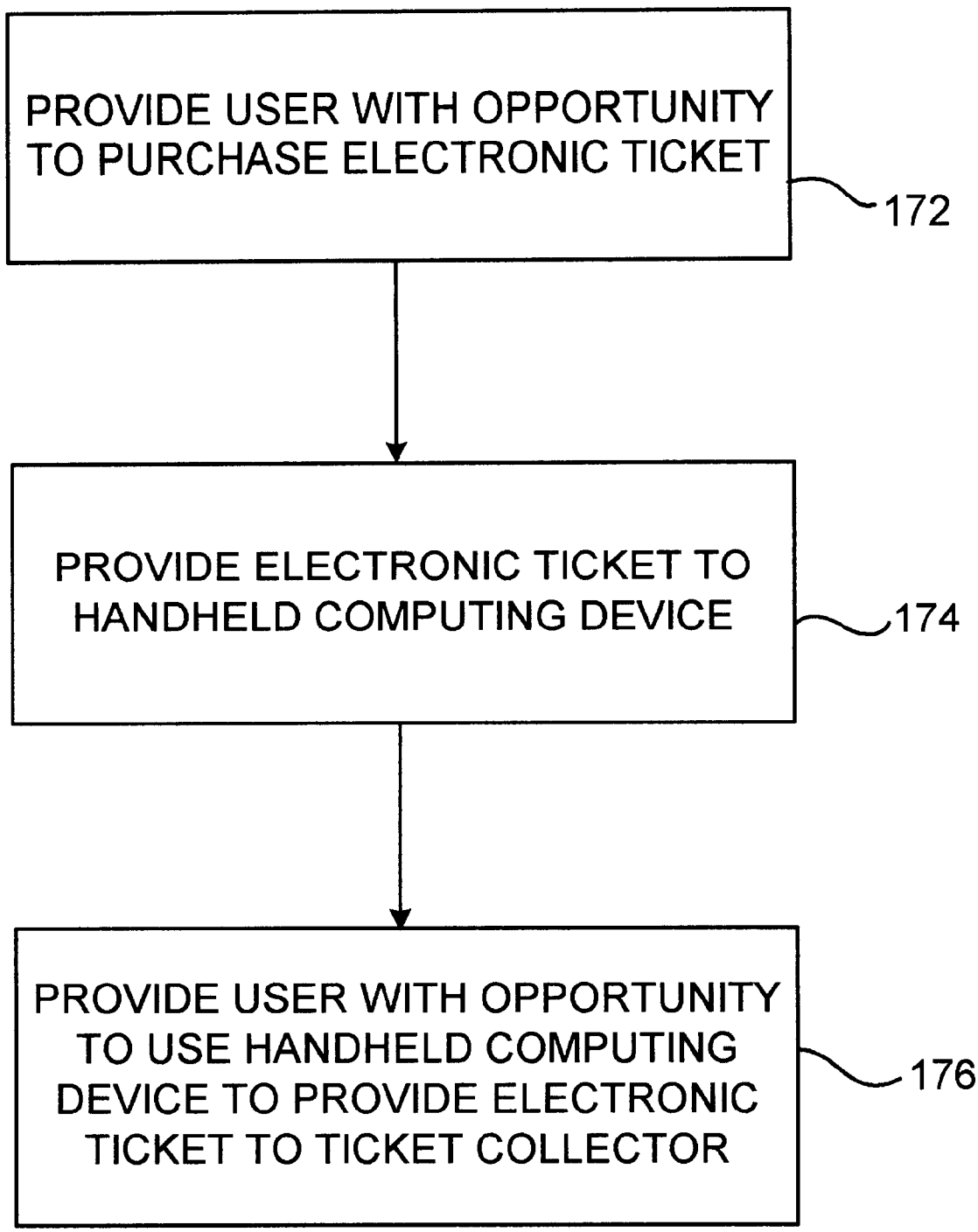
FIG. 12 is a flow chart of illustrative steps involved in using a handheld computing device for electronic ticket applications in accordance with the present invention.

Handheld computing device 12 may be used to electronically pay for train fares or other transit fares, or other services that would normally require tickets, fares, fees, etc. Handheld computing device 12 may be used, for example, to pay fees in an amusement park in which fees or tickets are collected for each ride or may be used at a ski area or the like for lift tickets. Illustrative steps involved in using handheld computing device 12 for such electronic ticketing applications are shown in FIG. 12. The steps of FIG. 12 are described in connection with electronic tickets, but this is merely illustrative. The steps of FIG. 12 apply to any type of fares, fees, etc.

At step 172 of FIG. 12, the user may be provided with an opportunity to purchase an electronic ticket. For example, a computer may be used to purchase an electronic ticket on-line over the Internet or other suitable communications network. The user or a travel agent or other suitable personnel may purchase the ticket through a web site or other suitable interface. An electronic ticket may also be purchased from a kiosk with a credit or debit card reader or the like.

Electronic tickets may also be purchased in person. A credit card, debit card, account number, or any other suitable financial instrument may be used to pay for the ticket.

Once the ticket has been paid for, handheld computing device 12 may be provided with a corresponding electronic ticket credit at step 174. If the electronic ticket was paid for in person, handheld computing device 12 may be provided with the electronic ticket from a computer at the ticket counter through a physical link or local wireless link. If the electronic ticket was purchased at a vending machine, handheld computing device 12 may be provided with the electronic ticket from a computer inside the vending machine through a physical link or local wireless link. If the electronic ticket was purchased on-line, handheld computing device 12 may be provided with the electronic ticket from the computer used to access the on-line service through a physical link or local wireless link. The server from which the on-line electronic ticket was purchased may also be used to deliver the electronic ticket to the handheld computing device (e.g., through a remote wireless link). A remote wireless link may also be used to deliver electronic tickets to handheld computing device 12 from ticket counter computers or vending machines or the like. These are merely illustrative examples of entities that may provide the electronic ticket to handheld computing device 12. Any suitable entity may provide handheld computing device 12 with an electronic ticket or other such financial instrument if desired.

At step 176, handheld computing device 12 may be used to provide the electronic ticket to a ticket collector or ticket collection equipment. If the ticket is based on a pay-per-use fare system, the user's account or may be debited by one fare. If the ticket is a monthly pass or other such multiple use ticket, the ticket collector need only verify that the user's ticket is valid.

Ticket validation or collection at step 176 may be performed using any suitable computer equipment, such as a computer located in a turnstile, a handheld computing device operated by a ticket collector, or any other suitable arrangement. The ticket collecting computer and the handheld computing device may consummate the ticket verification or collection process using a wired or wireless connection. For example, an IR link or local wireless link may be established between handheld computing device 12 and the ticket collecting device. If desired, handheld computing device 12 may display a code or image of a ticket that the ticket collector or ticket collection device can verify visually or using a scanning apparatus. These arrangements are merely illustrative. Any suitable techniques for collecting the electronic ticket may be used if desired.

Figure 13:
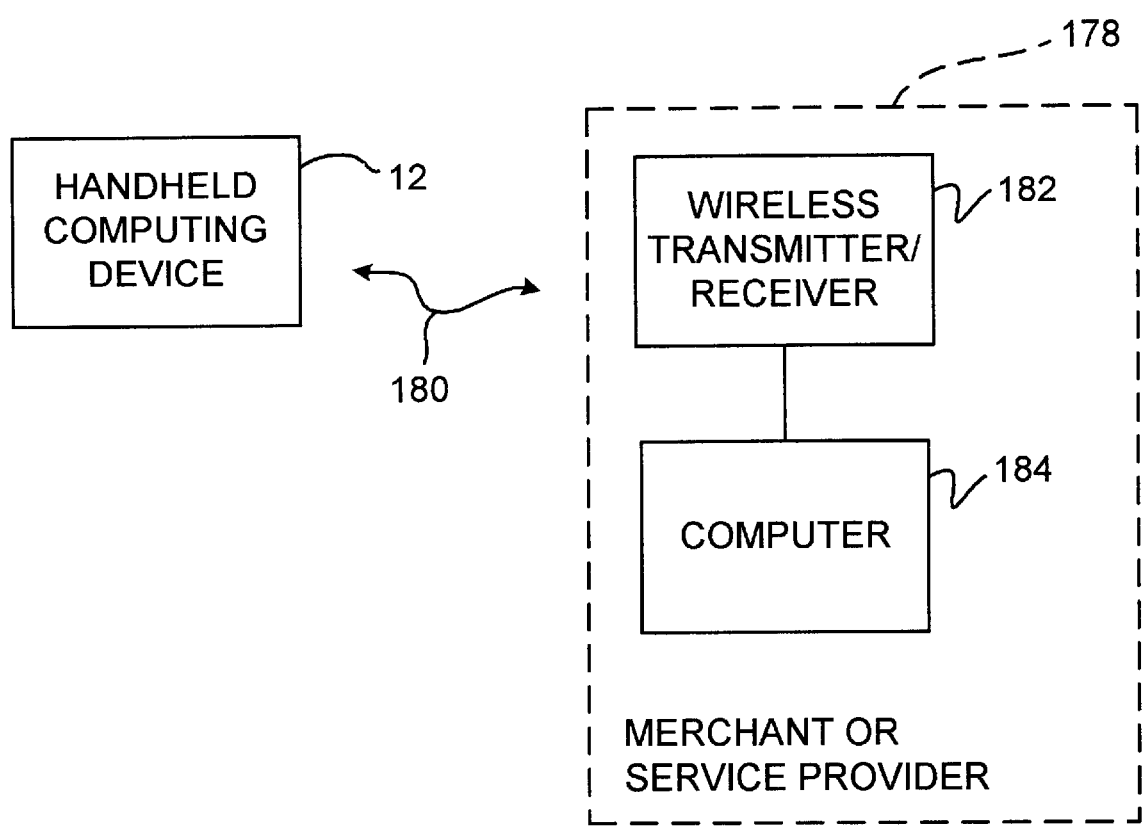
FIG. 13 is a schematic diagram showing how a handheld computing device may establish a wireless communications link with a merchant in accordance with the present invention.

Handheld computing device 12 may be used to interact with a merchant or service provider or other entity. As shown in FIG. 13, handheld computing device 12 may interact with a merchant or other entity over a wireless link 180. Wireless link 180 may be a local or remote wireless link. Merchant 178 may have an associated computer 184. Computer 184 may be located on the merchant's premises, in a nearby location, or at a remote location. Computer 184 may have an associated wireless transmitter/receiver 182. Computer 184 may communicate with handheld computing device 12 using wireless transmitter/receiver 182.

If wireless transmitter/receiver 182 supports IR communications, handheld computing device 12 may communicate with merchant 178 over an IR communications link. This type of link may be used, for example, to receive materials from a kiosk associated with the merchant 178 or other entity. IR links may also be used for local purchase transactions with wireless cash registers or the like. If wireless transmitter/receiver 182 supports local RF wireless communications, handheld computing device 12 may communicate with merchant 178 over a local RF wireless link. Such a link may be used, for example, to push promotional materials or other information to a user's handheld computing device or to consummate a wireless purchase transaction or to receive a shopping list or directory from computer 184. If wireless transmitter/receiver 182 supports remote wireless communications, handheld computing device 12 may communicate with merchant 178 or other entity over a remote wireless link. A remote link may be used to obtain a shopping list from a remote server, to retrieve a directory, to retrieve product information from a remote database, to access a remote web site containing product information or personal information, to access a service implemented at a remote service provider, etc. These are merely illustrative examples.

Figure 14:
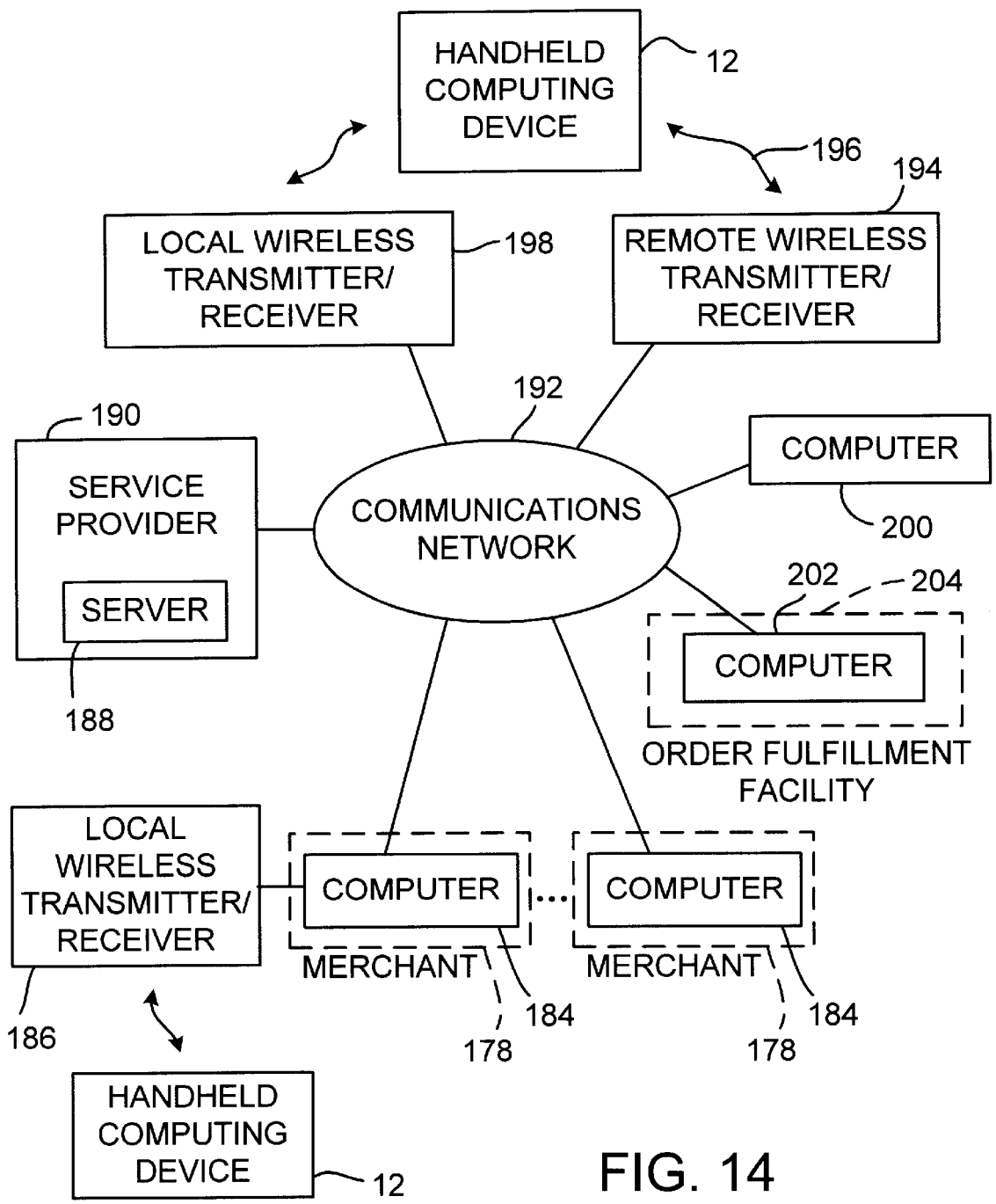
FIG. 14 is a schematic diagram of a system arrangement involving multiple merchants and other parties and equipment in accordance with the present invention.

Handheld computing device 12 may be used to interact with a number of merchants or services in malls and other such environments. As shown in FIG. 14, each merchant 178 may have a separate computer 184. This allows merchants to handle sales and inventory on a platform that is controlled by the merchant. A user with a handheld computing device 12 may interact with a merchant using a local wireless transmitter/receiver 186 associated with that merchant's computer 184. This may allow the user to obtain, for example, information on products and services sold by the merchant.

If the user desires information that is not maintained locally by the merchant, the merchant or user may access a database on a computer such as server 188 of service provider 190 over communications network 192. Service provider 190 may be located near to the merchant (e.g., in the same mall or complex). If desired, service provider 190 may be located at a distant location.

A user may also use a handheld computing device 12 to access service provider 190 over communications network 192 using remote wireless transmitter/receiver 194. For example, a cellular telephone base station may have a remote wireless transmitter/receiver 194 with which handheld computing device 12 may communicate over remote wireless link 196.

If desired, a user may use handheld computing device 12 to access service provider 190 over communications network 192 using a local wireless transmitter/receiver 198. Local wireless transmitter/receiver 198 and remote wireless transmitter/receiver 194 need not be associated with a particular merchant. Local communications equipment such as local wireless transmitter/receiver 198 or a wireless local area network formed of such transmitter/receivers FIG. 15 may serve as a local access point to communications network 192.

When the user has access to a computer 200 (e.g., a personal computer at the office or at home), the user may access server 188 over communications network 192.

The user at computer 200 or handheld computing device 12 or a merchant 178 with computer 184 may also access a computer 202 at an order fulfillment facility 204. For example, a user at a handheld computing device that is in communication with a merchant using a local wireless transmitter/receiver such as local wireless transmitter/receiver 186 may order a product by communicating with computer 202 of order fulfillment facility 204 over communications network 192. As another example, a user at a handheld computing device that is communicating with a remote wireless transmitter/receiver such as remote wireless transmitter/receiver 194 may order a product by communicating with computer 202 of order fulfillment facility 204 over communications network 192. A user at a handheld computing device that is communicating with a local wireless transmitter/receiver such as local wireless transmitter/receiver 198 may also order a product by communicating with computer 202 of order fulfillment facility 204 over communications network 192.

Figure 15:
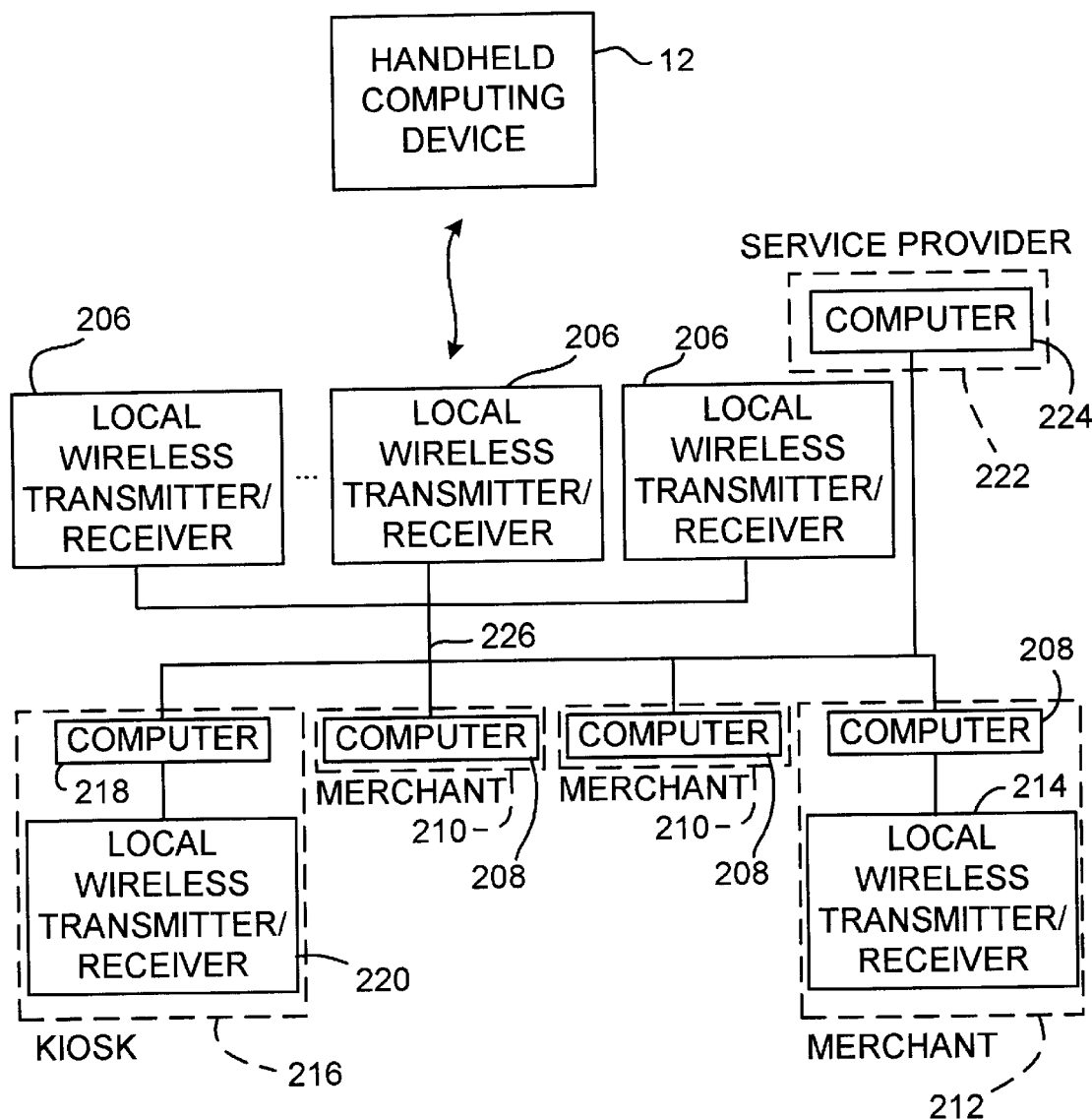
FIG. 15 is a schematic diagram of a system that includes multiple local wireless transmitter/receivers in accordance with the present invention.

Local wireless transmitter/receivers may not have sufficient range to cover an entire mall or large store. As shown in FIG. 15, a network of local wireless transmitter/receivers 206 may be used to provide local wireless communications coverage for the entire establishment. Transmitter/receivers 206 may form a wireless local area network. The spacing of the local wireless transmitter/receivers 206 depends on the size of the establishment being covered and the range of each transmitter/receiver. Local communications equipment such as local wireless transmitter/receivers 206 may serve as a local access point to communications networks such as the Internet by connecting local wireless transmitter/receivers 206 to the Internet or other such communications network.

A number of computers 208 may be interconnected with the local wireless transmitter/receivers 206. Computers 208 may be associated with merchants without local wireless transmitter/receivers such as merchants 210 and may be associated with merchants with local wireless transmitter/receivers such as merchant 212, which has an associated local wireless transmitter/receiver 214. Merchants such as merchants 210 may interact with handheld computing device 12 via local wireless transmitter/receivers 216. Merchants such as merchant 212 may interact with handheld computing device 12 via shared local wireless transmitter/receivers 216 and the merchant's local wireless transmitter/receiver 214.

Kiosks such as kiosk 216 may interact with handheld computing device 12. Handheld computing device 12 may have a computer 218 and an associated local wireless transmitter/receiver 220. Kiosk 216 may provide information over a local wireless link using local wireless transmitter/receiver 220. For example, a user may download a mall directory or the other directory from kiosk 216. Kiosk 216 may also be used as a vending machine to supply products or services to the user. The user may use local wireless communications between handheld computing device 12 and kiosk 216 to consummate a financial transaction for such products or services.

A service provider such as service provider 222 may use a computer such as computer 224 to provide services to the user, merchants, and kiosk. For example, the user may access personal information such as a personal shopping list stored on computer 224 using local wireless transmitter/receivers 206 and communications network 226. Computer 224 may be a remote server to which the local access point formed using local wireless transmitter/receivers 206 may be connected over a communications network such as the Internet or the like.

Computer 218 at kiosk 216 may access a content database on computer 224 using network 226. Merchants 210 may access a database of wireless advertisements stored on computer 224. Merchant 212 may access computer 224 to retrieve audio files and videos ordered by a user through local wireless transmitter/receiver 214. These are merely illustrative examples of the use of a network of local wireless transmitter/receivers. Any suitable arrangement of such local wireless transmitter/receivers may be used if desired.

Figure 16:
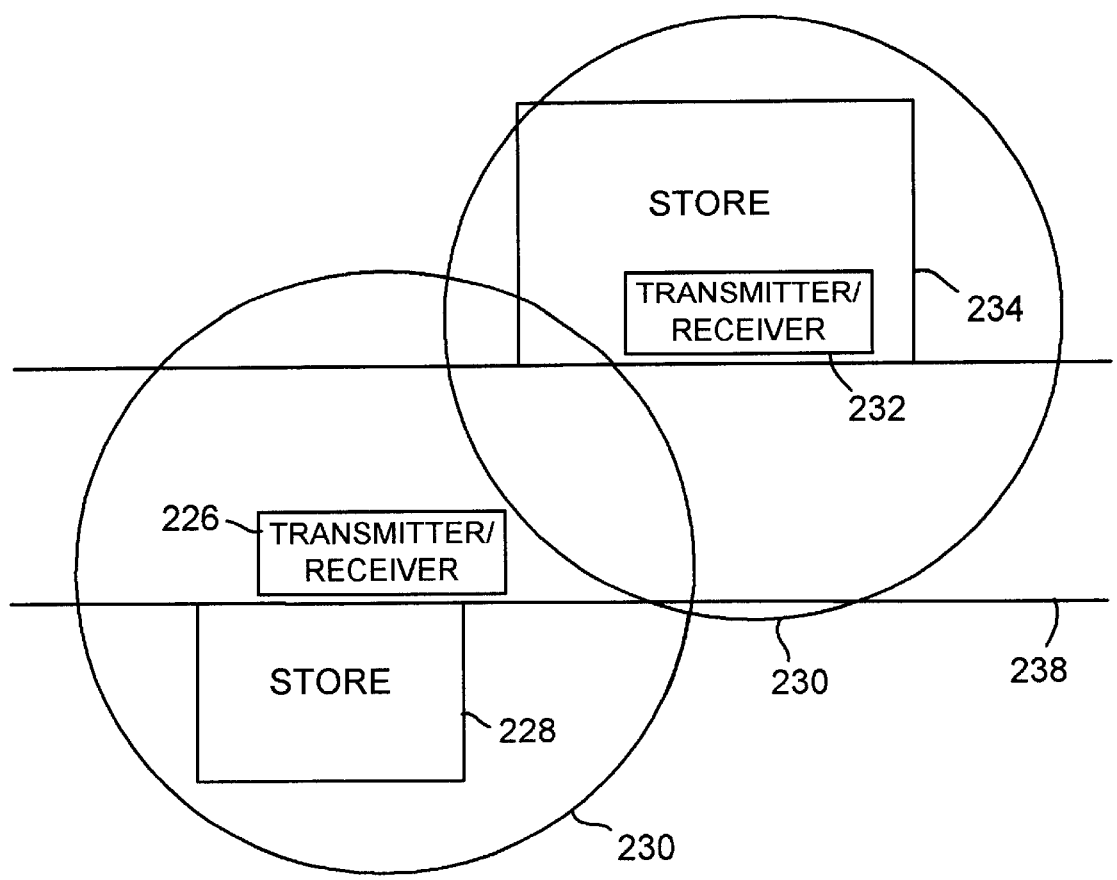
FIG. 16 is a top view of a corridor with multiple merchants showing the coverage of illustrative local wireless transmitter/receivers in accordance with the present invention.

As shown in FIG. 16, local wireless transmitter/receivers may have ranges that are localized near certain stores. For example, transmitter/receiver 226 is in the proximity of store 228. The range of transmitter/receiver 226 is shown by circle 230. Transmitter/receiver 226 may or may not be associated with or controlled exclusively by store 228. Transmitter/receiver 232 is located in store 234. The range of transmitter/receiver 232 is shown by circle 236. Transmitter/receiver 232 may be associated with store 234 and may be controlled primarily by or exclusively by store 234. The ranges of both transmitter/receivers 226 and 232 may overlap substantially with corridor 238, so that users with handheld computing devices 12 in the corridor 238 may interact with stores 228 and 234 or other entities using local wireless communications.

Figure 17:
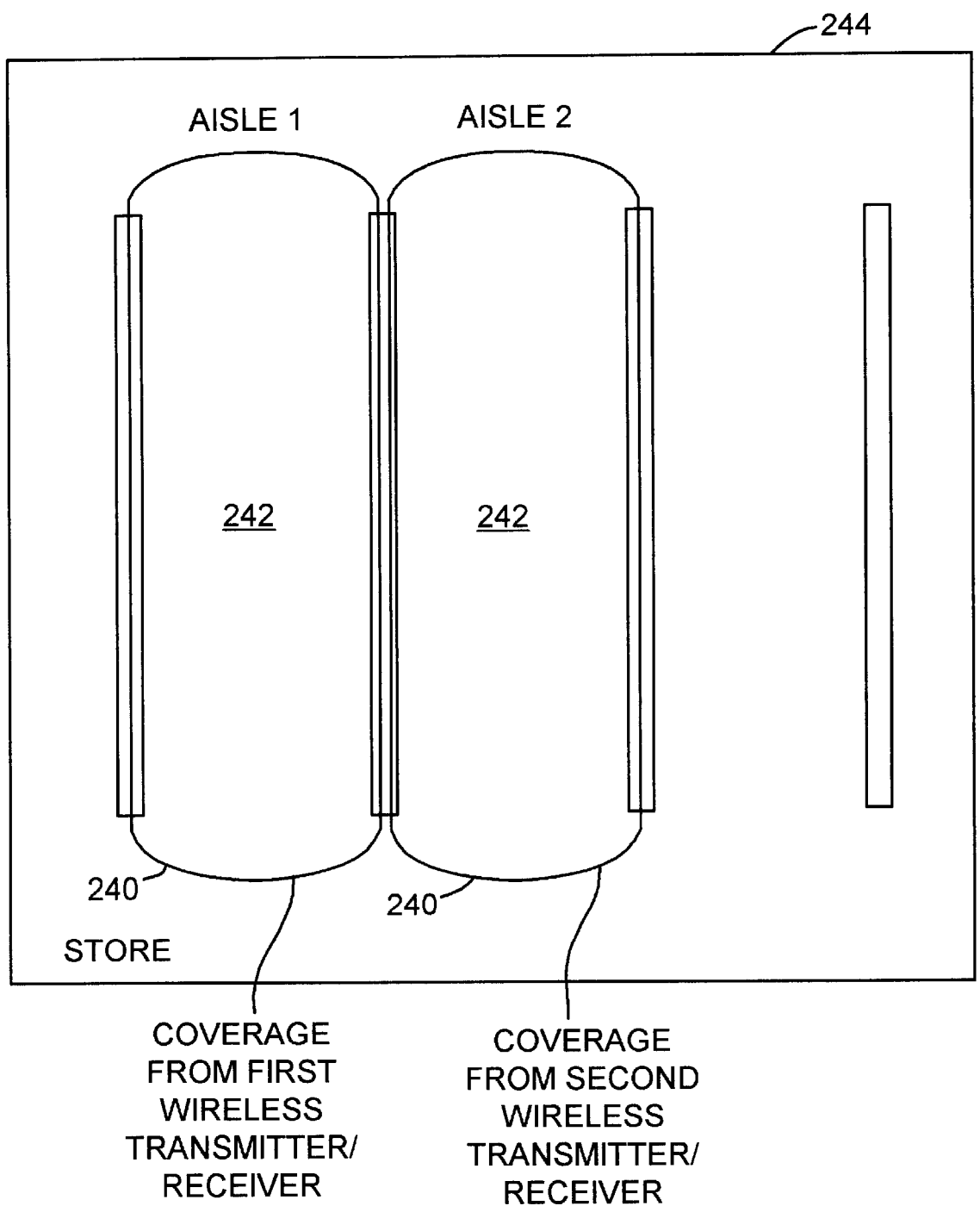
FIG. 17 is a top view of a store showing the wireless coverage provided by multiple wireless transmitter/receivers in accordance with the present invention.

In the arrangement of FIG. 17, the range or footprint 240 of each local wireless transmitter/receiver covers a separate area or aisle 242 of store 244.

In arrangements such as those shown in FIGS. 15, 16, and 17, the range of each local wireless transmitter/receiver is limited. Accordingly, when a handheld computing device 12 is communicating with a particular local wireless transmitter/receiver, the location of the handheld computing device 12 can be determined. In particular, with an arrangement such as that of FIG. 16, it can be determined when the user is within the proximity of certain stores. With an arrangement such as that of FIG. 17, the particular aisle in which the user is located may be identified.

Figure 18:
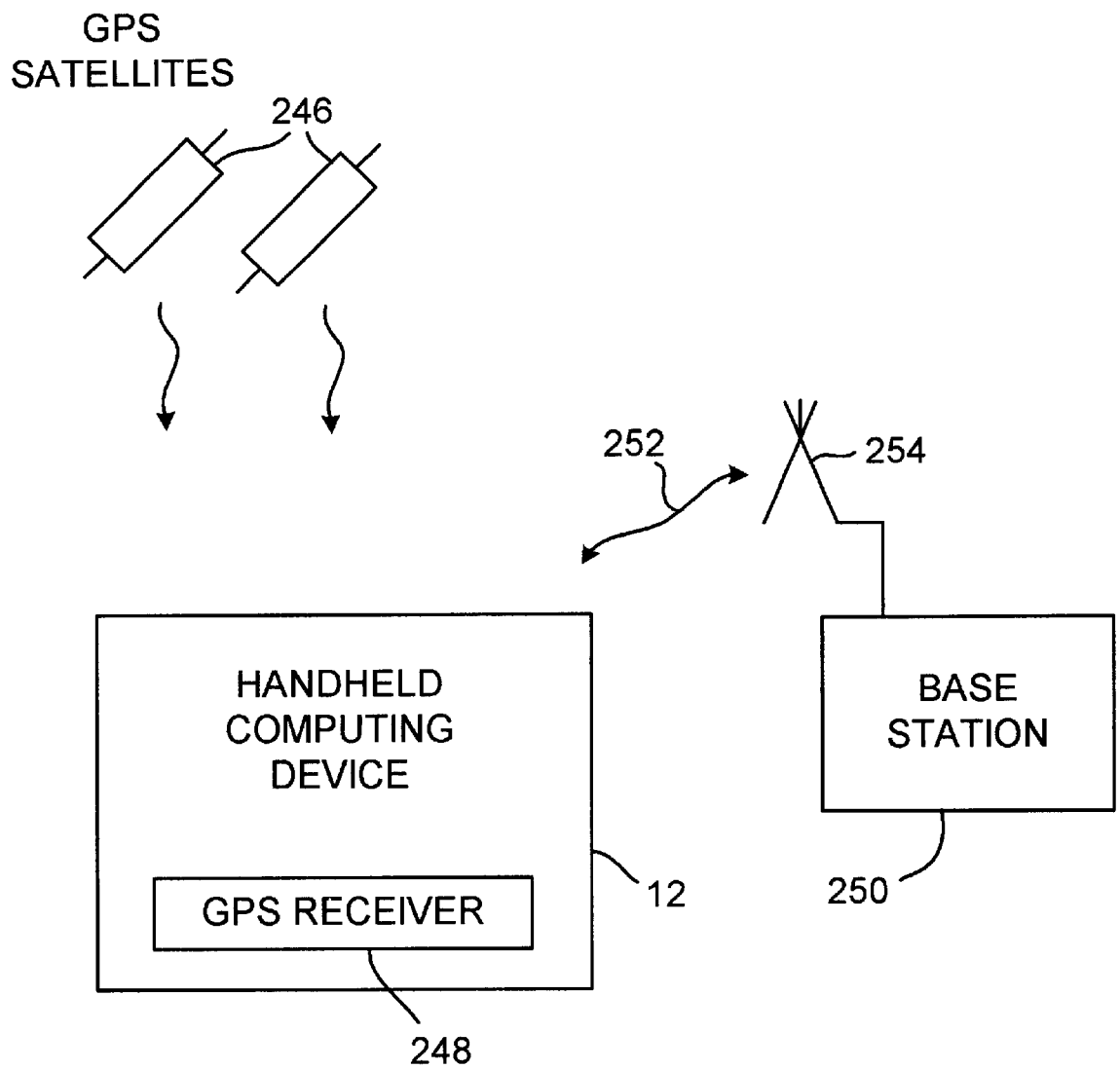
FIG. 18 is a diagram showing how global positioning system satellites may be used to determine the location of a handheld computing device in accordance with the present invention.

If desired, the location of handheld computing device 12 and therefore the user may be determined using global positioning system (GPS) satellites, as shown in FIG. 18. Handheld computing device 12 may receive satellite signals from GPS satellites 246. By analyzing these signals with GPS receiver 248, handheld computing device 12 can determine the location of the user. The resolution of current GPS systems is purposefully limited by the government. If a higher resolution is desired, a differential GPS (DGPS) system may be used. In DGPS systems, the known (e.g., surveyed) position of a base station such as base station 250 may be used as a reference point. By comparing the known position of base station 250 that is indicated by a GPS receiver at station 250, the error of the GPS signal in the proximity of base station 250 can be determined. If a handheld computing device 12 is relatively close to such a base station (e.g., within a number of miles), the handheld computing device's GPS location may be corrected by the same amount that was determined to be necessary to correct the position of base station 250.

If desired, handheld computing device 12 and base station 250 may be in wireless communications (e.g., over a remote wireless link 252 using antenna 254). The DGPS correction to the position of handheld computing device 12 may be made at the handheld computing device 12 (by supplying the needed correction data to the handheld computing device 12 from base station 250), at base station 250 (e.g., by providing the handheld computing device's raw GPS position to base station 250), or may be performed elsewhere (e.g., by providing an appropriate facility with the error correction data from base station 250 over a communications network and by providing the GPS position data of the handheld computing device using wireless communications and a communications network path).

Other techniques may be used for determining the location of handheld computing device 12 if desired. For example, a rough position of handheld computing device 12 may be obtained by determining which terrestrial antennas (or more broadly which satellites) are receiving communications from handheld computing device 12. An approach of this type that uses terrestrial antennas in communication with handheld computing device 12 over remote wireless links may be sufficiently accurate to place handheld computing device in a particular city or portion of a city or the like. More precise location information may be obtained using time-of-flight and triangulation techniques. Such techniques may involve the use of multiple terrestrial antennas.

Figure 19:
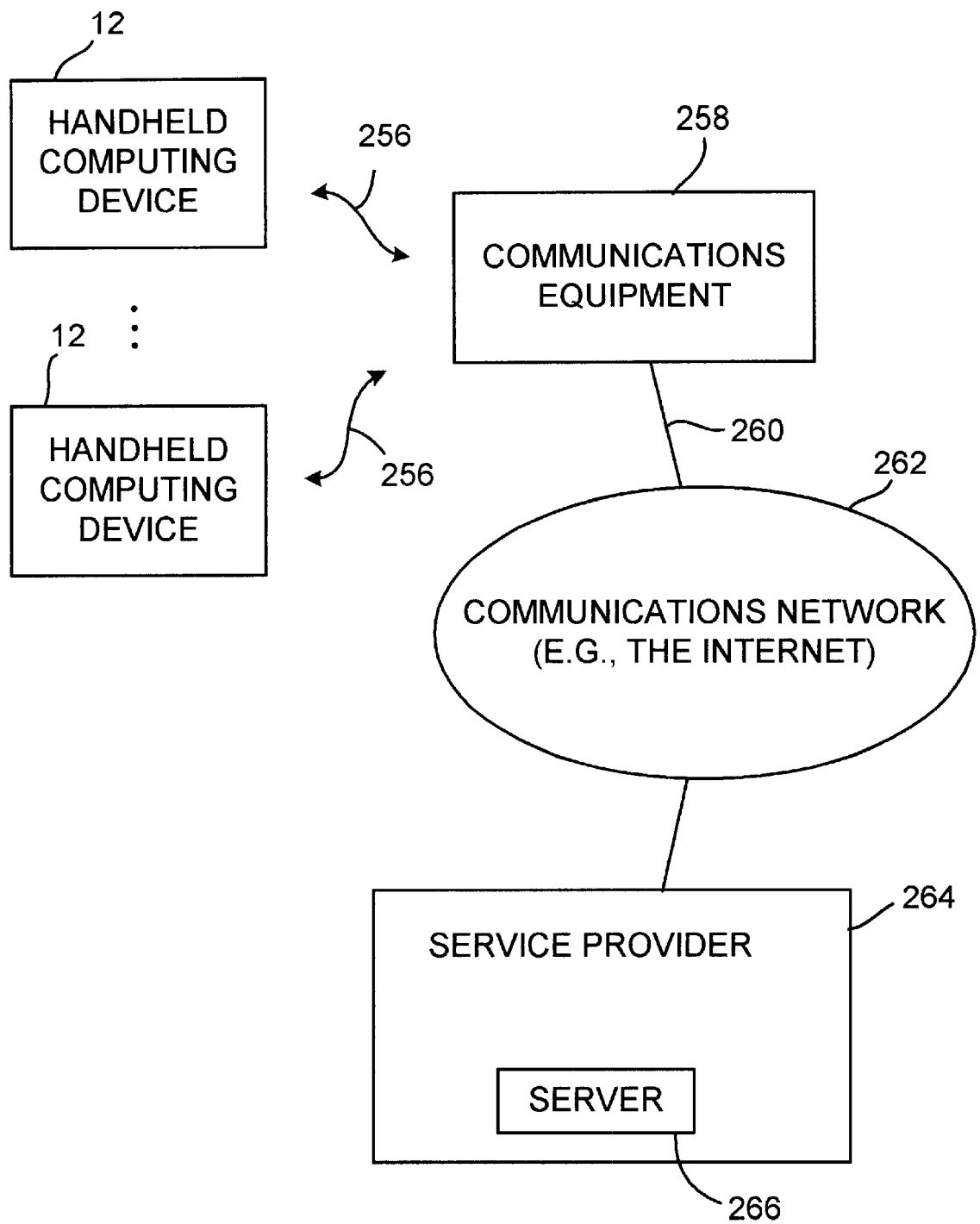
FIG. 19 is a schematic diagram of a system arrangement in which multiple handheld computing devices communicate with a service provider through common wireless communication equipment in accordance with the present invention.

These approaches, a combination of these approaches, or any other suitable location-determination arrangements may be used if desired. In a mall or boat or train or other such environment it may be desirable to provide multiple handheld computing devices with access to the Internet or the like. As shown in FIG. 19, in such an environment, each of multiple handheld computing device 12 may form a separate local wireless communication link with communications equipment 258. For example, each handheld computing device 12 may form a local RF wireless communications link with communications equipment 258. Communications equipment 258 may contain a local wireless transmitter/receiver for receiving such local wireless communications.

Communications equipment 258 may also contain suitable communications circuitry for forming a communications link 260 with a communications network 262 such as the Internet. For example, communications equipment 258 may contain communications circuitry for interfacing with a T1 line or the like. If desired, communications path 260 may be a remote wireless communications path such as a satellite path or a remote terrestrial wireless communications path. Users may access a service provider 264 with a web server 266 or the like via communications network 262.

Figure 20:
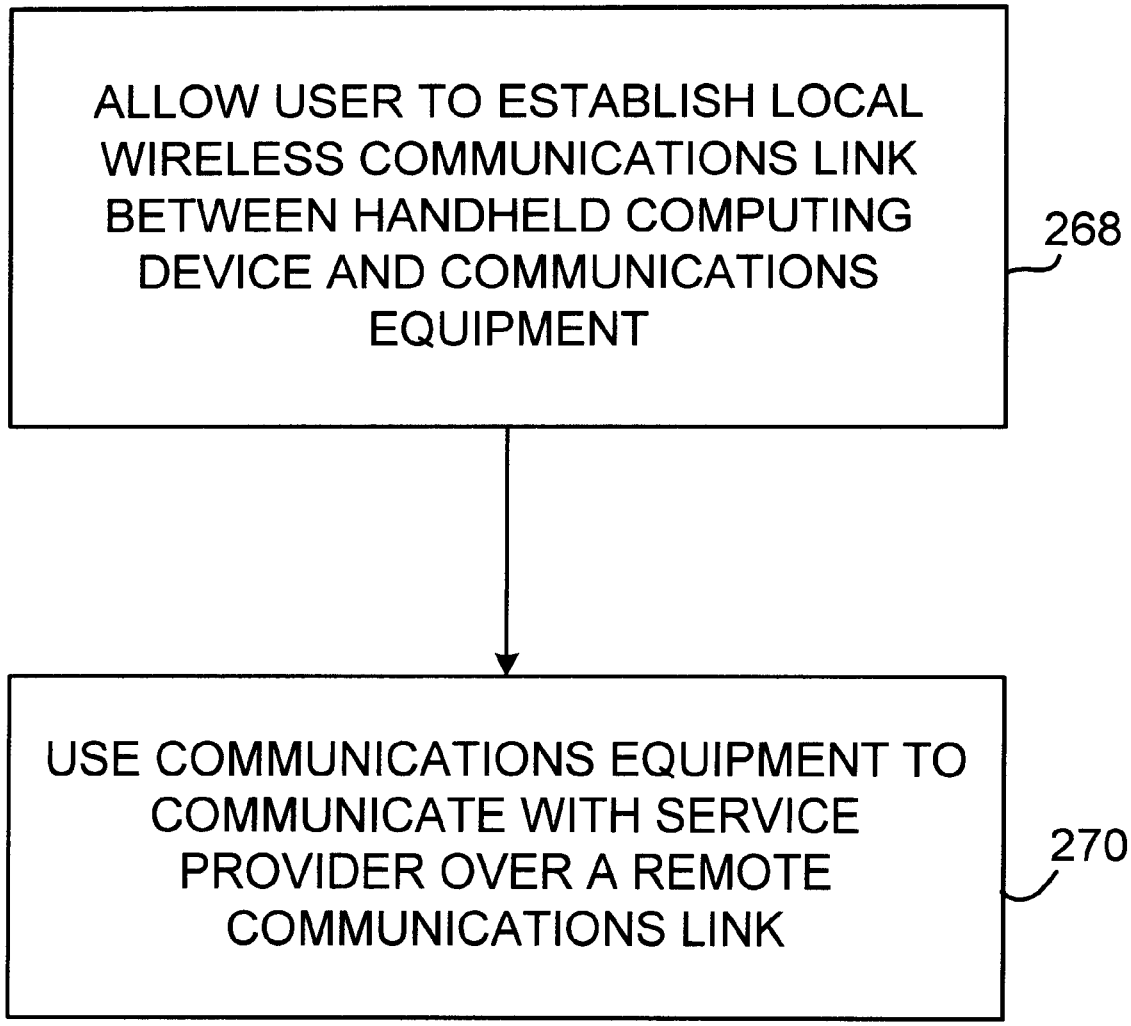
FIG. 20 is a flow chart of illustrative steps involved in using a handheld computing device to communicate with a remote service provider using a local wireless communications link in accordance with the present invention.

Illustrative steps involved in using the arrangement of FIG. 19 to provide access to a remote server or the like through local wireless connections are shown in FIG. 20. At step 268, the user may be allowed to establish a local wireless communications link between handheld computing device 12 and local communications equipment 258. For example, handheld computing device 12 and local communications equipment 258 may be used to form a local RF Bluetooth link. At step 270, communications equipment 258 is used to form a communications link (e.g., a wired or remote wireless communications link) with service provider 264 so that handheld computing device 12 may communicate with service provider 264.

Figure 21:
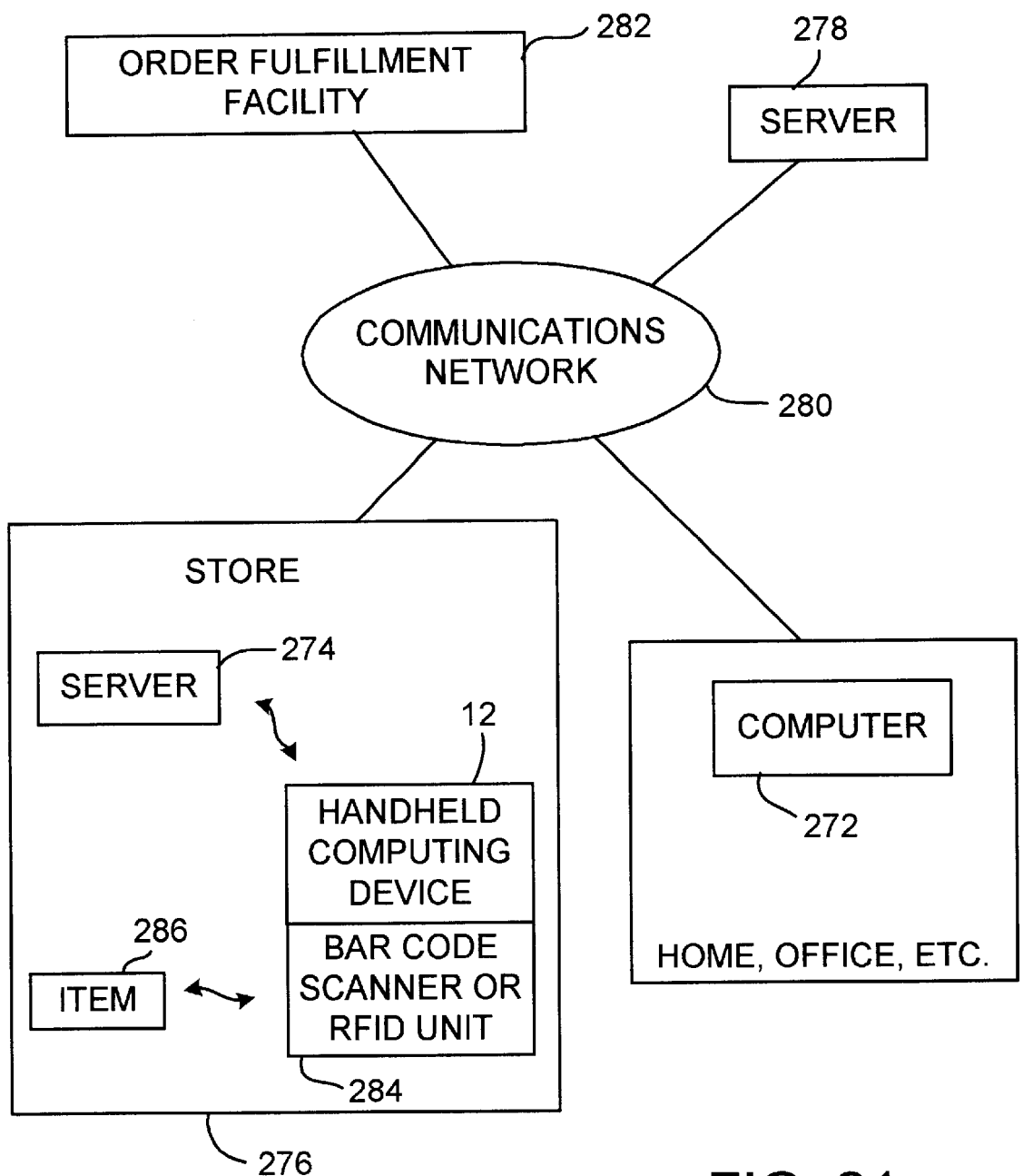
FIG. 21 is a schematic diagram of a system arrangement in which a handheld computing device with a bar code scanner may be used to create shopping lists in accordance with the present invention.

Shopping lists may be created using a home or office computer such as computer 272 of FIG. 21 or other in-home electronic device. The shopping list may be stored locally on computer 272 or may be stored on a remote server such as server 274 at store 276 or server 278 using communications network 280. On-line orders for products and services may be made by interacting with order fulfillment facility 282 (e.g., over an Internet link or the like using a web browser implemented on computer 272).

The shopping list may be accessed in store 276 by handheld computing device 12. For example, if the shopping list is maintained on server 274 or may be obtained from a remote location such as server 278 by server 274, handheld computing device 12 may obtain the shopping list form server 274 over a local wired or wireless link. If the shopping list is maintained at server 278, handheld computing device 12 may also access the list using a remote wireless link.

Handheld computing device 12 may have a bar code scanner or radio-frequency identification (RFID) unit 284. Bar code scanners use light to identify products with bar code labels. RFID units may identify products by wirelessly communicating with integrated circuits embedded in or attached to or otherwise associated with products. The integrated circuits may contain information that uniquely identifies the products. For clarity the present invention may sometimes be described in connection with bar code scanning. However, RFID arrangements may be used instead of bar code scanning or in combination with bar code scanning if desired.

The scanner or unit 284 may be provided as an integral part of handheld computing device 12 or may be provided as an attachment or accessory. For example, the scanner or unit 284 may be an attachment that fits in an expansion slot on handheld computing device 12.

A bar code scanner or RFID unit 284 may be used to wirelessly identify items with bar codes such as item 286. This allows handheld computing device 12 to identify items in stores, in restaurants, in malls, at home, at the office, or at any other suitable location. The user or family members in the user's household or others may use the identification feature of handheld computing device 12 to create wish lists or to add to or modify the shopping list of the user. For example, a child may use handheld computing device 12 to wirelessly identify an item in a clothing store. The identity of the item may be determined by bar code scanner or RFID unit 284. This information may be added to the user's shopping list or may be used to create a wish list for the child.

The updated and modified shopping list information and wish list information that is generated by wirelessly identifying products may be maintained at server 274, server 278, computer 272, or handheld computing device 12, or at any other suitable location. If, for example, the list is maintained at server 278, the child's or other party's addition to the shopping list may be provided to server 278 by using handheld computing device 12 to transmit this information to server 278 via a local wireless link with in-store equipment such as server 274 and communications network 280 or by using handheld computing device 12 to transmit the information to server 278 using a remote wireless link.

If the handheld computing device that is used to transmit the information is owned by the user, information on the location of the user's shopping list service or server may be obtained from handheld computing device 12. If the handheld computing device that is used to transmit the information is owned by the other party, that party may be prompted to input information such as the name of the user and the identity of the user's shopping list service provider, the user's communications address, or other information that may be used to identify the location of the equipment or service that is used to maintain shopping list information for the user.

If the shopping list is stored on a server 274, handheld computing device 12 may communicate the information on the addition or modification to the shopping list that is generated by wirelessly identifying item 286 to server 274 using a local or remote communications link. For example, handheld computing device 12 may allow the user to download the information on the wirelessly identified item to server 274 over an IR link or local wireless RF link in store 276. If the shopping list is stored locally on handheld computing device 12, information on the identified item may be added directly to the shopping list. If the shopping list is stored on computer 272, handheld computing device 12 may be used to download the information on the identified item to computer 272 over an IR link or local or remote wireless RF link. Once the shopping list has been updated, the user may retrieve the shopping list with handheld computing device 12 or other equipment for use during shopping. These are merely illustrative examples, the updated and modified shopping list information gathered by bar code scanner or RFID unit 284 and handheld computing device 12 may be added to the shopping list using any suitable communications paths if desired.

Figure 22:
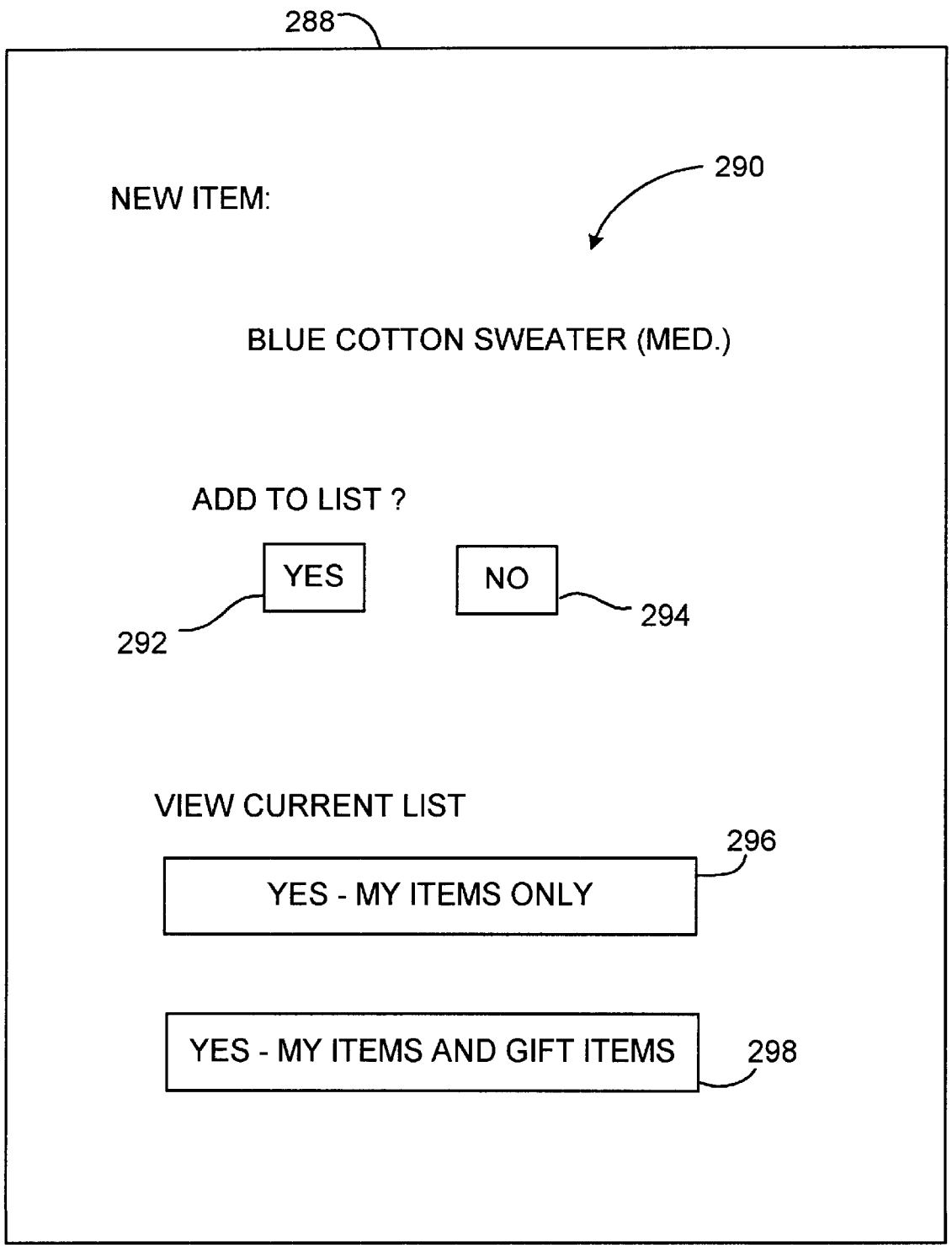
FIG. 22 shows an illustrative screen that may be displayed to provide the user with information on an item that has been scanned in accordance with the present invention.

It may be desirable to provide the scanning party who performs the wireless identification with a description of the item being identified. Such a description may, for example, include information on materials, prices, features, etc. An illustrative screen 288 that handheld computing device 12 may display when bar code scanner or RFID unit 284 has identified an item such as item 286 is shown in FIG. 22. Information on the new item may be displayed in region 290. Handheld computing device 12 may display on-screen options such as options 292 and 294 to provide the user who has identified the item with an opportunity to add the item to a wish list or shopping list. A selectable option may be provided that allows the user to determine which type of list the item is to be added to. Multiple users may be supported by handheld computing device 12. Each user may access a different shopping list or wish list by providing a password or other identifier.

Handheld computing device 12 may also be used to display options such as option 296 and option 298. Option 296 provides the user with an opportunity to display the user's current shopping list. Option 298 provides the user with an opportunity to display the user's current shopping list and gift items (e.g., wish list items included in the shopping list by other users).

Handheld computing device 12 may use a database that correlates bar codes or RFID codes with different items. This allows handheld computing device 12 to display information in region 290 that includes a brief description of the identified item. The database may be maintained at a merchant or service provider or any other suitable establishment or entity. For example, the database may be maintained at server 274 or server 278 of FIG. 21. The database may also be stored on handheld computing device 12.

If, for example, the database is stored at server 278, bar code or RFID information for a identified item may be provided to server 278 by using handheld computing device 12 to transmit this information to server 278 via a local wireless link established with local communications equipment or in-store equipment such as server 274 and communications network 280 or by using handheld computing device 12 to transmit the information to server 278 using a remote wireless link. Server 278 may use the bar code or RFID information to retrieve a corresponding item description. The item description may be passed back to handheld computing device 12 using a remote wireless link or via communications network 280 and local communications equipment or in-store equipment that is in communication with handheld computing device 12 over a local wireless link.

If the database is stored at a closer server such as server 274, handheld computing device 12 may pass the bar code or RFID information to server 274 using a local or remote communications link. For example, handheld computing device 12 may be used to download the bar code or RFID information for the identified item to server 274 over an IR link or local wireless RF link in store 276. Server 274 may use this information to retrieve a corresponding item description. The item description may be passed back to handheld computing device 12 over a local wireless link. If the database is maintained by or accessed by computer 272, handheld computing device 12 may be used to download the bar code or RFID information on the wirelessly identified item to computer 272 over an IR link or a local or remote wireless RF link. Computer 272 may use the information to retrieve a corresponding item description. The item description may be passed back to handheld computing device over a local wireless link or a local wired link. These are merely illustrative examples, the bar code or RFID information may be converted into item description information using any suitable arrangement.

Moreover, the bar code or RFID information or other identifying information may be used to retrieve additional information and to access additional services related to the wirelessly identified item. For example, information identifying the product may be used by handheld computing device 12 to retrieve information such as warranty information, product reviews, video clip descriptions and promotions, advertisements and other promotional information, information on discounts, coupons and other financial benefits, comments from the general public, financing information, etc. Brochures may be requested. The user may also check to determine whether the wirelessly identified item is in stock. The user may access a price comparison service to compare the price of the scanned or otherwise wirelessly identified item to the prices of other such items. Handheld computing device 12 may be used to order the item or other items. These services may be provided using a server such as server 274 that is associated with the merchant whose item has been wirelessly identified or may be provided by a service provider or other entity with a remote server such as server 278. Order fulfillment services may be provided by an order fulfillment facility. Other entities and equipment may be used to provide services and information related to the wirelessly identified item if desired.

Handheld computing device 12 may access additional information and services related to the scanned or otherwise wirelessly identified item using any suitable communications path. For example, a database of information on a server or other computer may be accessed using a wired link, a local IR link, a local RF wireless link, physical media swapping (e.g., by transferring a removable storage media between the handheld computing device and equipment associated with the computer), using a remote wireless link, etc.

With an arrangement such as that of FIG. 2, a handheld computing device 12 that has obtained information on an item in a store or other facility 34 (e.g., by scanning the item with a bar code, by using an RFID unit, by receiving input from the user through a touch screen, or by receiving information over a local wireless link, etc.) may obtain additional information and services related to the item from computer 28 over link 52. Information and services may be obtained from manufacturer 48, service provider 46, order fulfillment facility 30, and other such entities over communications network 32. Handheld computing device 12 may be connected to communications network 32 by either a local wireless link, a remote wireless link, a wired connection (in store 34, the home or office, etc.), by a media swapping arrangement (e.g., by transferring a memory card between handheld computing device 12 and equipment in communication with network 32), etc.

Figure 23:
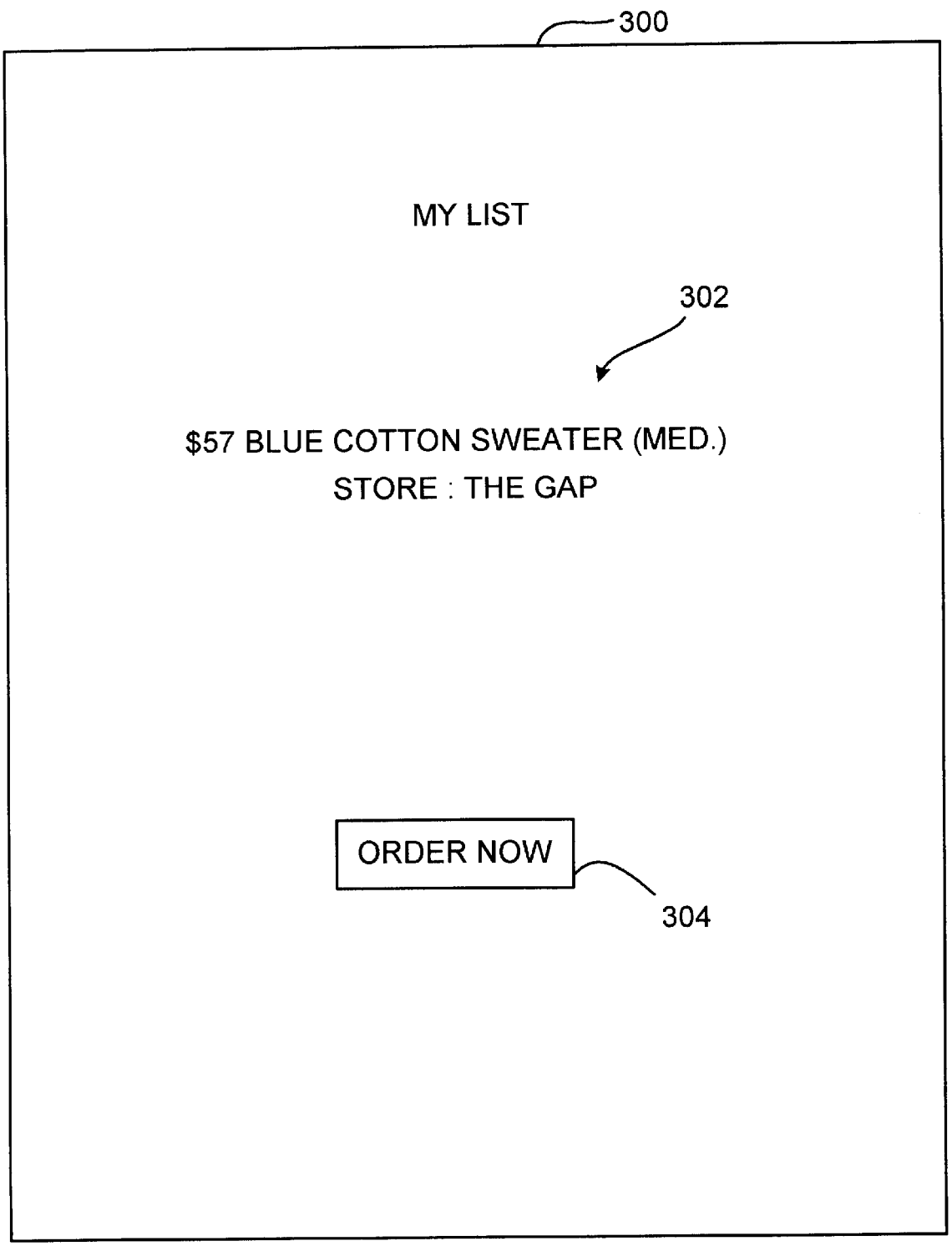
FIG. 23 shows an illustrative screen that may be displayed by a handheld computing device to show information on the user's shopping list in accordance with the present invention.

If the user selects an option such as option 296 of FIG. 22, handheld computing device 12 may display a screen such as screen 300 of FIG. 23. Screen 300 may contain information such as price information, store information, and product description information in information region 302. An on-screen option 304 may be provided that allows the user to use the handheld computing device to place an electronic order for the product. This allows the brick-and-mortar shopper to place on-line products for items of interest (e.g., items that have been identified by bar code scanning or RFID identification techniques in a store. If the user selects option 304, the user may be provided with on-screen options that allow the user to order the product and other products.

For example, if the user is in a Gap clothing store and the user scans or uses RFID to identify a sweater, information on the price of the sweater and description of the sweater may be displayed as shown in FIG. 23. If the user selects order now option 304, the user may be connected to a Gap web site or other such on-line site that allows the user to order the sweater and any other Gap products offered for sale at the site. The on-line site may be a publically accessible web site that may be reached from any computer connected to the Internet or may be a site that is only accessible to users with handheld computing devices.

If desired, the on-line site may only be available to in-store shoppers. As an example, the site may be accessed using a local wireless link. Because it is known that users accessing the site through this communications path are in the immediate vicinity of the store, the site may provide the user with different services (e.g., prices, shipping and service options, product offerings, etc.) than users who access the Gap's regular Internet web site. This type of segregation technique may be used regardless of whether the user accesses the shopping service using a local communications path or a remote communications path. For example, users who access the site using a remote wireless communications link may be identified based on location information (e.g., GPS location information, etc.).

Figure 24:
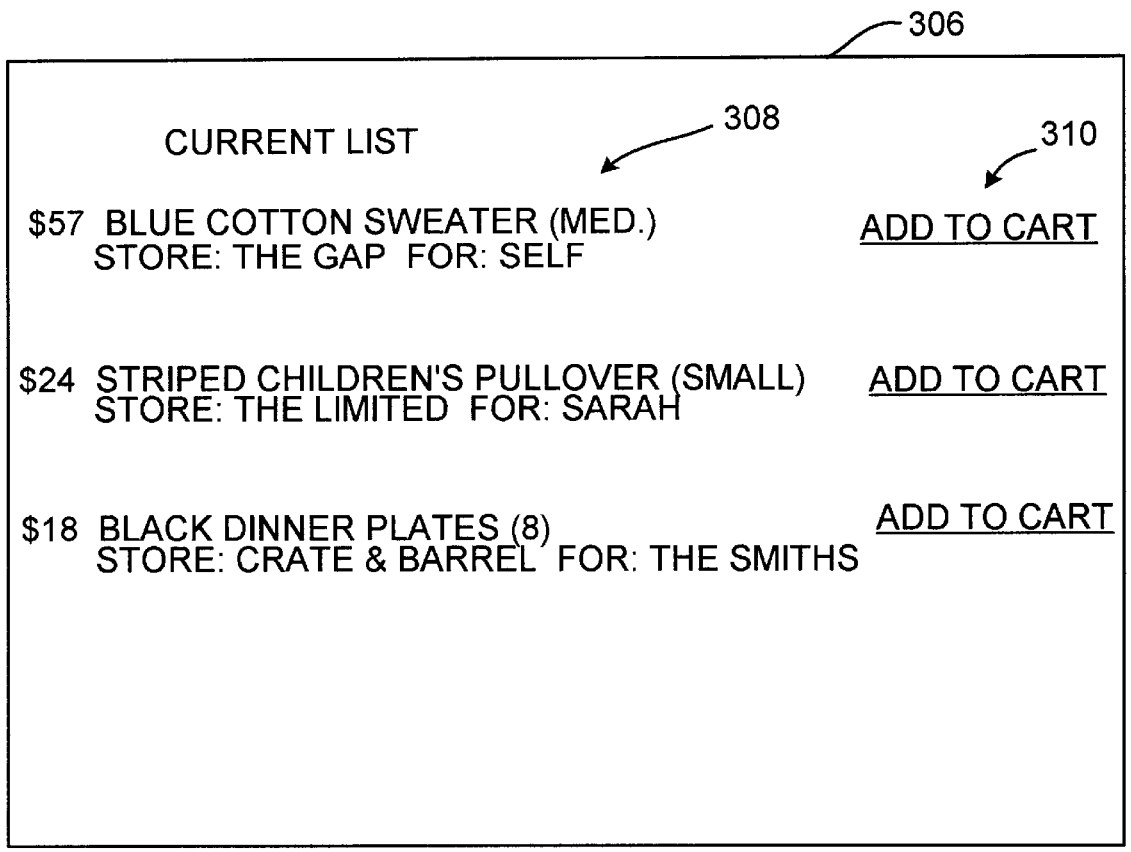
FIG. 24 shows an illustrative screen that shows how information on the user's current shopping list may be displayed with in-home equipment in accordance with the present invention.

When a product has been identified to handheld computing device 12 in a store or other establishment, the user need not order that product immediately. Rather, the user may save the identified information for use during a later purchasing transaction (e.g., through a web site). An illustrative web site ordering arrangement that may be used to provide the user with an opportunity to order items previously identified in a store using handheld computing device 12 (e.g., by scanning or RFID identification) is shown in FIG. 24. Screens such as screen 306 may be displayed using a web browser implemented on the user's home or office personal computer or other suitable device. Screen 306 may contain information 308 on each item that was identified in the store. Some of the items in the list on screen 306 may have been added to the list by the user from the web site or other on-line shopping service, rather than through the handheld computing device 12. If desired, both types of items may be listed on screen 306. Options such as option 310 may be provided to allow the user to add an item of interest to the user's shopping cart. This is only illustrative. Any suitable web-based ordering scheme may be used to order the items shown in screen 306 if desired.

Figure 25:
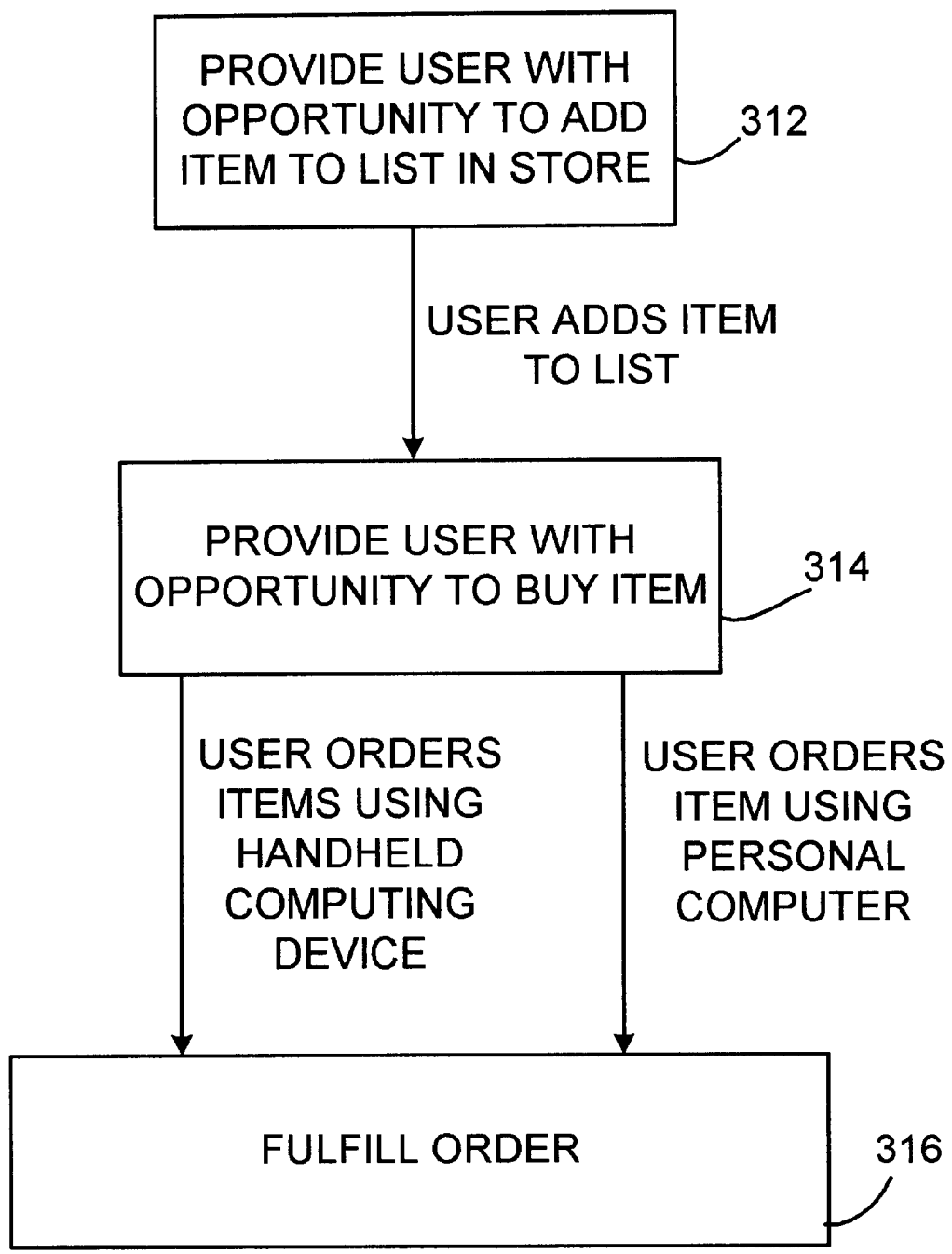
FIG. 25 is a flow chart of illustrative steps involved in ordering products that are identified in a store using a handheld computing device in accordance with the present invention.

Illustrative steps involved in ordering products that are identified in a store using handheld computing device 12 are shown in FIG. 25. At step 312, the user may be provided with an in-store opportunity to add an item to the user's shopping list. The item may be added to the list by bar code scanning, by using RFID identification, by entry of product information into handheld computing device 12 using on-screen options, by receiving product information over an IR link (e.g., from a kiosk or terminal associated with the store or adjacent to the product), by using an memory card to pass information to handheld computing device 12, by a remote wireless link, by a wired link, or using any other suitable technique.

At step 314, the user may be provided with an opportunity to purchase the item and other items. As an example, the user may purchase the item from an electronic service maintained by the merchant and accessed over a local IR or RF wireless link. The user may also purchase the item from a web site or other electronic service. Such a site or service may be accessed by handheld computing device 12 over a remote wireless link (e.g., using a cellular modem link to the Internet). The site or service may also be accessed over the Internet from a personal computer or other electronic device. These are merely examples, any suitable technique may be used to allow the user to use handheld computing device or other equipment to order the item. Regardless of whether the user orders the item using a handheld computing device or whether the user orders the item using a personal computer or other electronic device, the order may be fulfilled at step 316 (e.g., by an order fulfillment facility to which the order has been transmitted over an electronic link). The order fulfillment facility may be associated with a central warehouse that serves customers over a wide geographic region or may be a facility that is associated exclusively or primarily with the store in which the item was identified.

Figure 26:
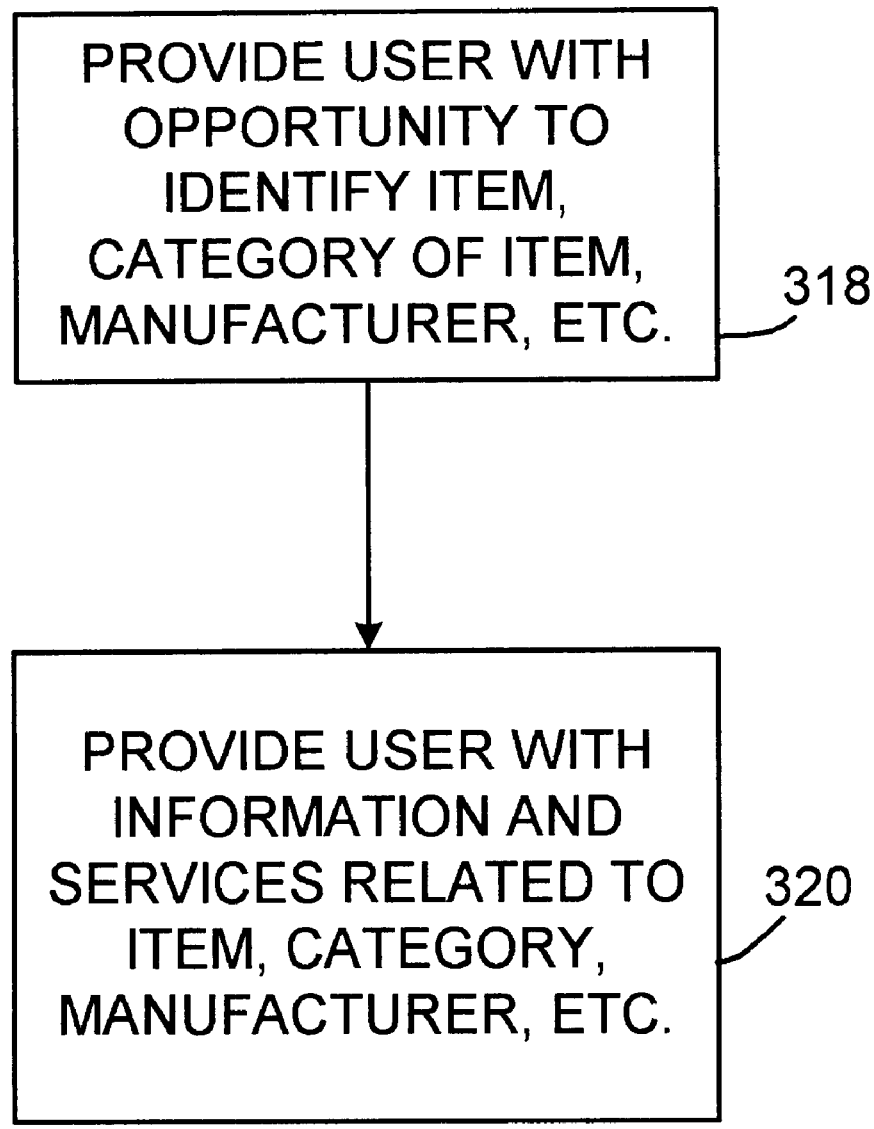
FIG. 26 is a flow chart of illustrative steps involved in using a handheld computing device or other equipment to identify products, categories of products, and manufacturers in accordance with the present invention.

Steps involved in allowing the user to use handheld computing device 12 or other equipment to identify products, categories of products, manufacturers, etc. and in providing the user with related information and services are shown in FIG. 26.

At step 318, the user may be provided with an opportunity to identify an item, category of item, manufacturer in a store or other establishment. An item, category of item, or manufacturer may be identified in a store or other establishment by bar code scanning, by RFID identification techniques, by entry of product information into handheld computing device 12 using on-screen options, by receiving product information over an IR link (e.g., from a kiosk or terminal associated with the store or adjacent to the product), by using an memory card to pass information to handheld computing device 12, by a remote wireless link, by a wired link, by selecting from on-screen options that list products by categories or manufacturers, etc., or by using any other suitable technique. If desired, the item, category of item, manufacturer, etc. may be identified using in-store computer equipment or the like. For example, personnel in the store may provide information identifying an item, category of item, or manufacturer into an in-store computer.

At step 320, the user may be provided with an opportunity to use handheld computing device 12 or other equipment to obtain information and access services related to an item, category of items, manufacturer, etc. For example, handheld computing device 12 may be used to provide the user with information and other services while the user is in the store or establishment or in the vicinity of the store or establishment. Handheld computing device 12 may also be used to provide the user with information and other services after the user has left the store. In-store equipment and home or office equipment or the like may be used to provide the user with information and services related to the item, category of item, manufacturer, etc.

Information and services may be provided to the user from an in-store computer, a server or other computer associated with the store or other establishment, a remote server at a service provider or other entity, or using any other suitable arrangement. Product ordering services may be provided using equipment in the store or using a remote order fulfillment facility (e.g., for orders to be delivered). Any suitable communications paths may be used to provide information and services to handheld computing device 12. For example, while handheld computing device 12 is in a store, a communications link may be established between handheld computing device 12 and the store over a local wireless IR or RF link, a remote wireless link, a wired connection, etc. Information and services may also be provided to the user at handheld computing device 12 using transferable storage media (e.g., memory cards or the like). These are merely illustrative examples. Any of the communications techniques that have been described previously may be used to provide information and services to the user at step 320 if desired.

Figure 27:
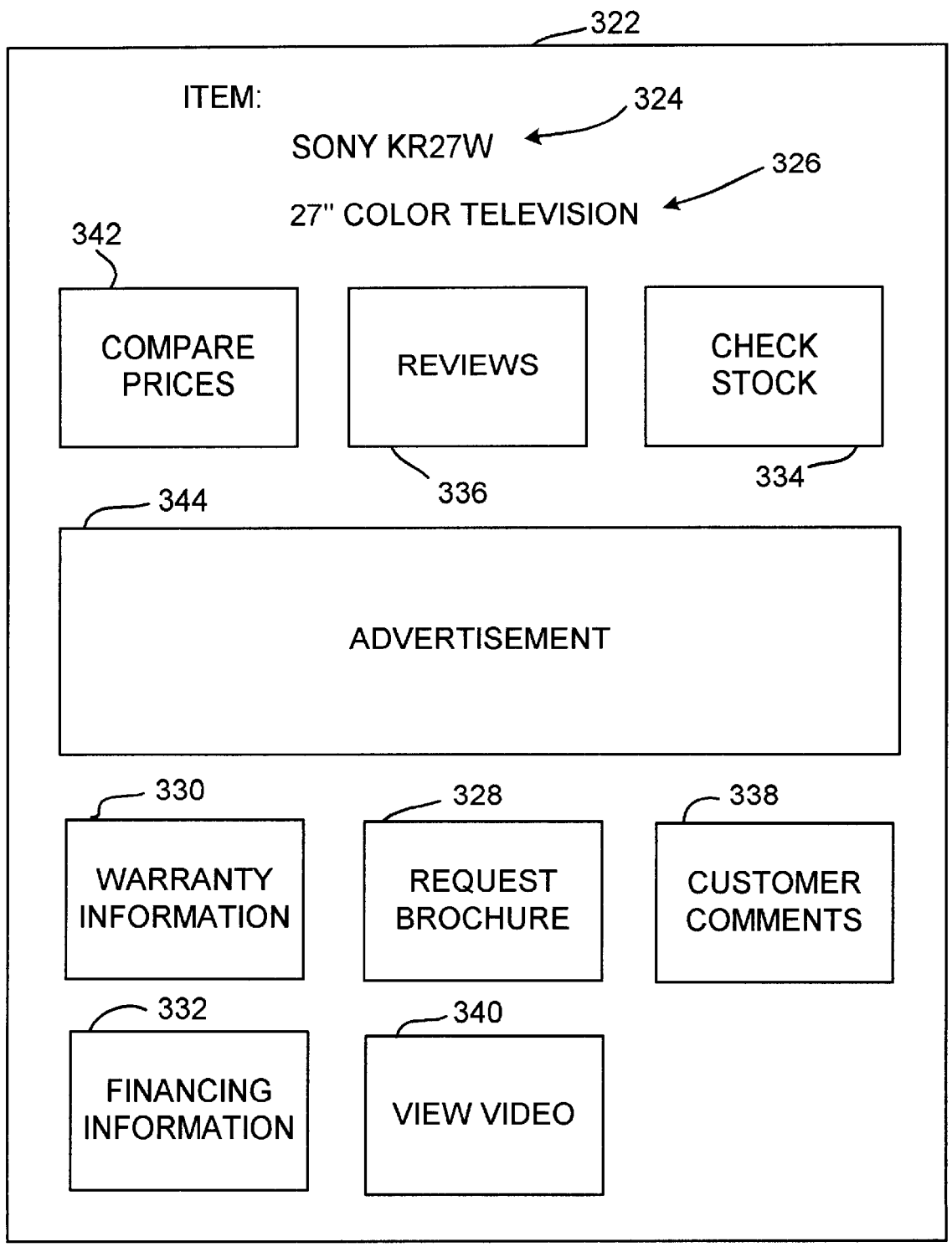
FIG. 27 shows an illustrative screen showing information that may be provided when an in-store product is scanned in accordance with the present invention.

An illustrative screen 322 that may be displayed by handheld computing device 12 when an item in a store has been identified is shown in FIG. 27. Screen 322 may contain information such as model number information 324 and product description information 326. On-screen options may be provided that allow the user to obtain information and to access services.

For example, option 328 may be provided that allows the user to request a brochure on the identified product. If the user selects option 328, the user's brochure request may be passed to an in-store computer or an appropriate service provider. Brochures may be delivered to the user's home in physical form or may be delivered to the user's home or handheld computing device 12 electronically. For example, an electronic brochure may be provided to handheld computing device 12 using a local wireless link in the store.

Option 330 may be used to allows the user to obtain information on warranties. If the user selects option 330, handheld computing device 12 may be used to provide the user with information on the warranties offered by various manufacturers or information on the store warranties offered by the store. This information may be supplied to handheld computing device 12 from a computer associated with the store over a local wireless link or using any other suitable arrangement. If desired, handheld computing equipment 12 may be used to display options that allow the user to electronically purchase an extended warranty from the store or the like.

The user may desire to finance the purchase of the item. Option 223 may be used to allow the user to obtain information on financing (e.g., from a computer associated with the store over a remote or local wireless link or a wired link). If the user selects option 332, handheld computing device 12 may be used to display information for the user on various financing packages available from manufacturers, banks, and the store. If desired, only information on the store's financial packages may be made available to the user.

Option 334 may be used to allow the user to check the store's current stock. If the user selects option 334, the store's computer database may be checked to determine whether the desired item is currently in stock. Information on whether the item is in stock may be provided to handheld computing device 12 over a local or remote wireless link, a wired link, or other suitable path. The information may be displayed for the user by handheld computing device 12.

Option 336 may be used to allow the user to view information on reviews on the desired item. For example, reviews from the press or from the store may be provided to handheld computing device 12 from a computer associated with the store or other suitable equipment (e.g., over a local or remote wireless link, a wired link, or other suitable path) and displayed for the user.

Option 338 may be used to allow the user to view customer comments and the like. The user may also be provided with an opportunity to add comments. The customer comments may be stored on the store's computer or may be stored remotely (e.g., on a remote server associated with a service provider or the like). The customer comments may be provided to handheld computing device 12 from the computer associated with the store or the remote server (e.g., over a local or remote wireless link, a wired link, or other suitable path) and displayed for the user. If the user adds comments, the comments may be transmitted from handheld computing device 12 to the store's computer or the remote server.

Options 340 may be used to allow the user to view video related to the desired item. For example, the store or a manufacturer or a service provider may maintain a library of video clips associated with various products, categories of products, and manufacturers, etc. If a video is available for the desired product or category of product or the manufacturer of the product, the video may be provided to handheld computing device 12 and displayed for the user. The video may be displayed for the user while the user is in the store, to assist the user in determining whether or not to purchase the desired item.

Video may be distributed to handheld computing device 12 using any suitable communications path. For example, video from the store may be distributed from equipment in the store (e.g., a computer) over a local IR or RF wireless link, a remote wireless link, a wired link, or any other suitable link. Video from a remote server may similarly be distributed over a local IR or RF wireless link (e.g., through a local transmitter/receiver associated with the store or other local establishment), a remote wireless link, a wired link, or any other suitable link. The videos may be produced by the store, by independent product reviewers, by the manufacturers, or by any other suitable entities. Videos may be distributed in real time or may be downloaded as video clip files that may be played back by handheld computing device 12 after the file has been downloaded or after a sufficient portion of the downloading process has been completed.

Advertisements and other promotional material may be displayed by handheld computing device 12. In general, advertisements and promotional material may contain text, graphics, and video. Audio may accompany the text and graphics or may be part of the video that is being presented. Promotional material may passive or interactive. Passive promotional material and other content may be provided using a unidirectional communications path or a bidirectional communications path. Interactive promotional material and other content may be provided using a bidirectional communications path. Interactive material may be selected by the user. If, for example, handheld computing device 12 has a touch screen, the user may select a displayed advertisement or other promotional material or content by pressing the screen where the advertisement or other material is being displayed. As shown in FIG. 27, an advertisement 344 may be displayed on the same screen as various user-selectable options.

Figure 28:
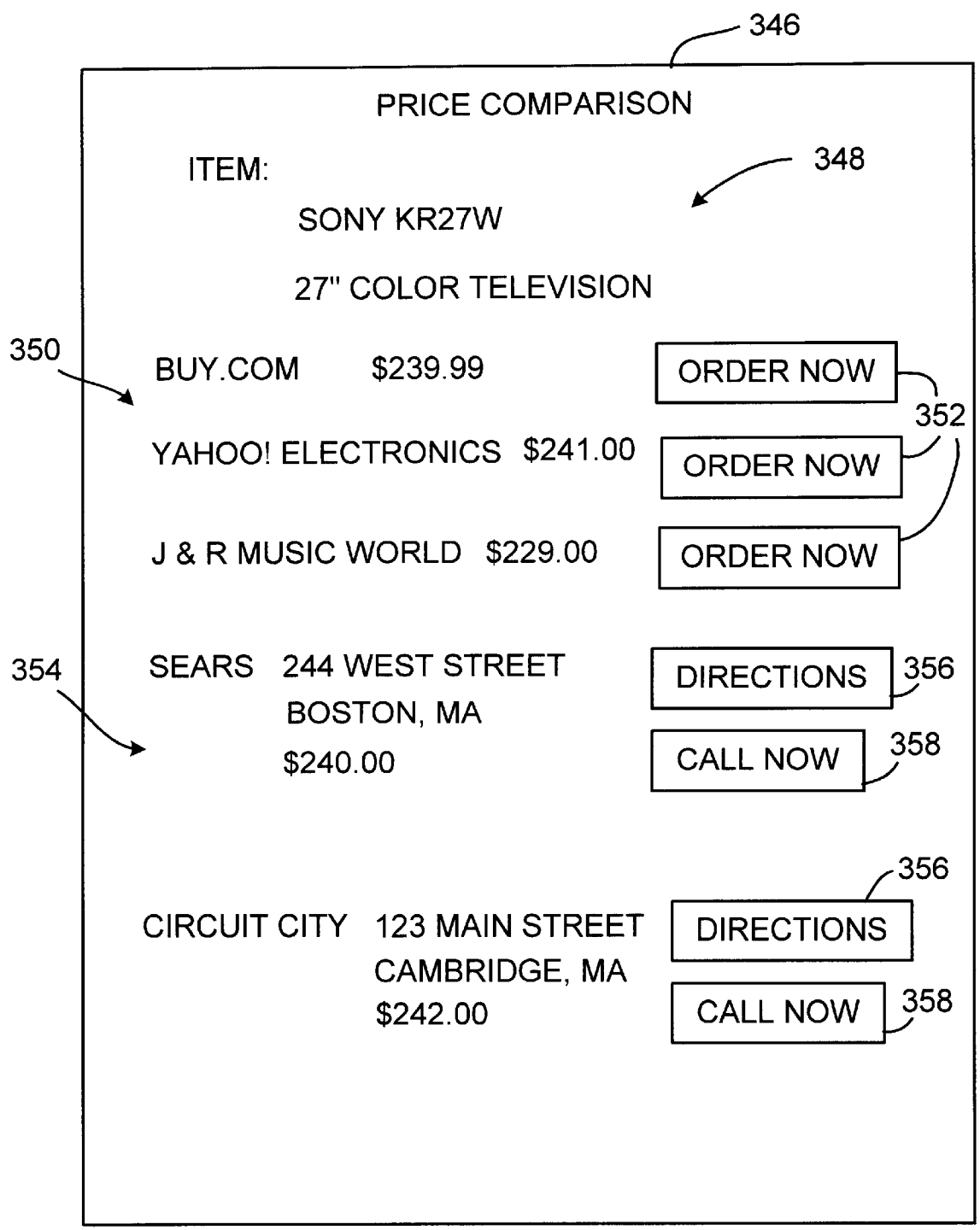
FIG. 28 shows an illustrative screen showing price comparison information that may be provided using a handheld computing device in accordance with the present invention.

Option 342 may be used to allow the user to compare prices for the desired item. If the user selects option 342, handheld computing device 12 may display a screen such as screen 346 of FIG. 28. Screen 346 may contain information 348 on the desired item. Screen 346 may also contain information 350 on the identities of various on-line retailers and the prices of the item at each such retailer. An option such as an order now option 352 may be associated with each retailer. If the user selects one of these options, the handheld computing device 12 may display the retailer's on-line shopping portal to the user. The desired item may be preselected, so that the user does not need to search within the on-line retailer's site.

Screen 346 may also include information 354 on various brick-and-mortar retail establishments. If the user selects one of directions options 356, handheld computing device 12 may obtain directions (e.g., from a remote server) and may display these directions for the user. If the user selects one of the call now options 358, handheld computing device 12 may establish a telephone link with the associated brick-and-mortar store, so that the user may obtain information about that store from personnel at the store who answer the telephone or from an automated telephone answering system.

When the user is in the vicinity of a store, the user may obtain product information and access services related to the products and services of the store and the manufacturers associated with these products and services. Handheld computing device 12 may be used to obtain such product information from a local computer associated with the store or from a remote computer (e.g., a remote server associated with the store, a manufacturer, or service provider, etc.) A local wireless link (e.g., a local wireless link with the computer associated with the store or with a local access point in the vicinity of the store) may be used to provide the requested information wirelessly to handheld computing device 12.

Figure 29:
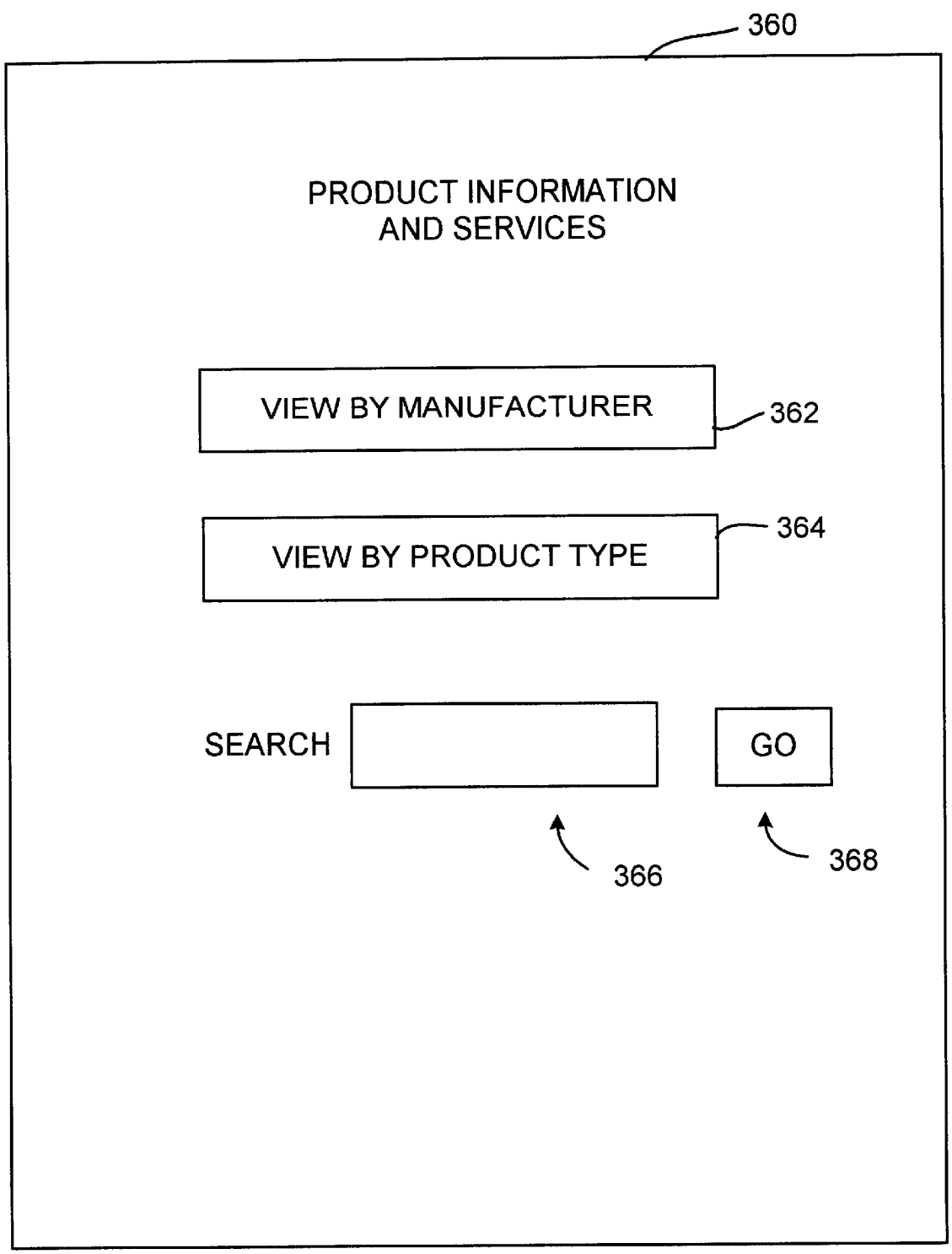
FIG. 29 shows an illustrative screen showing how product information may be accessed using a handheld computing device in accordance with the present invention.

The user may obtain information and access services related to a product, category of product, manufacturer, etc. by interacting with on-screen options displayed by handheld computing device 12 using a shopping assistance application or service. An illustrative screen 360 that may be used by handheld computing device when providing these features to the user is shown in FIG. 29. An option such as view by manufacturer option 362 may be used to access a list of manufacturers who have available services. An option such as view by product type option 364 may be used to access services by product type. An option such as search option 366 may be used to allow the user to search for information and services of interest. After the desired search string has been provided to handheld computing device 12 using option 366, the user may select go option 368 to initiate the search.

Figure 30:
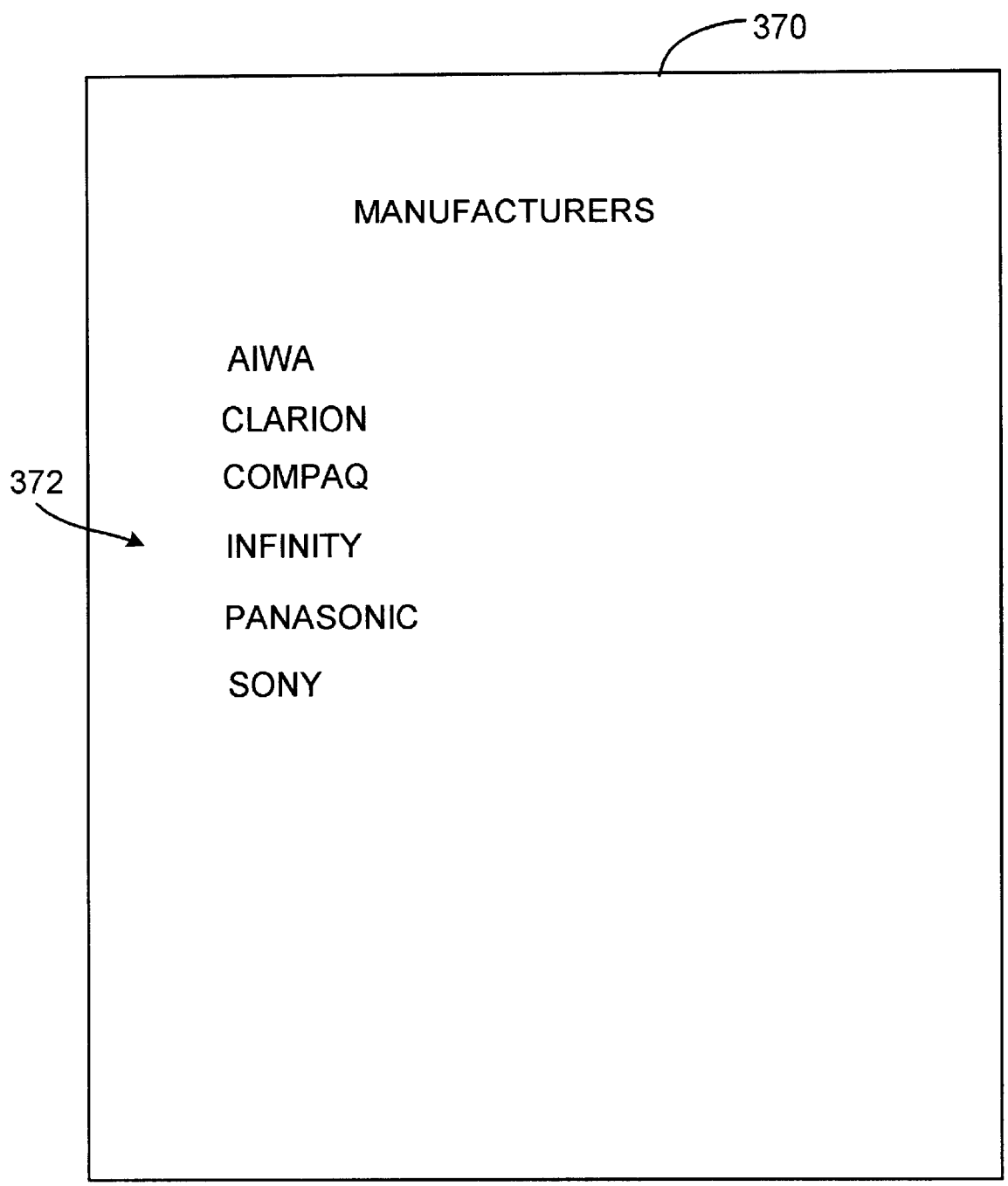
FIG. 30 shows an illustrative screen that may be used to provide access to product information from multiple manufacturers in accordance with the present invention.

An illustrative screen 370 that handheld computing device 12 may display when the user selects option 362 of FIG. 29 is shown in FIG. 30. Screen 370 may contain a list 372 of selectable manufacturer names. When the user selects a desired manufacturer, the information and services that are available that are associated with that manufacturer may be displayed on the screen by handheld computing device 12.

Figure 31:
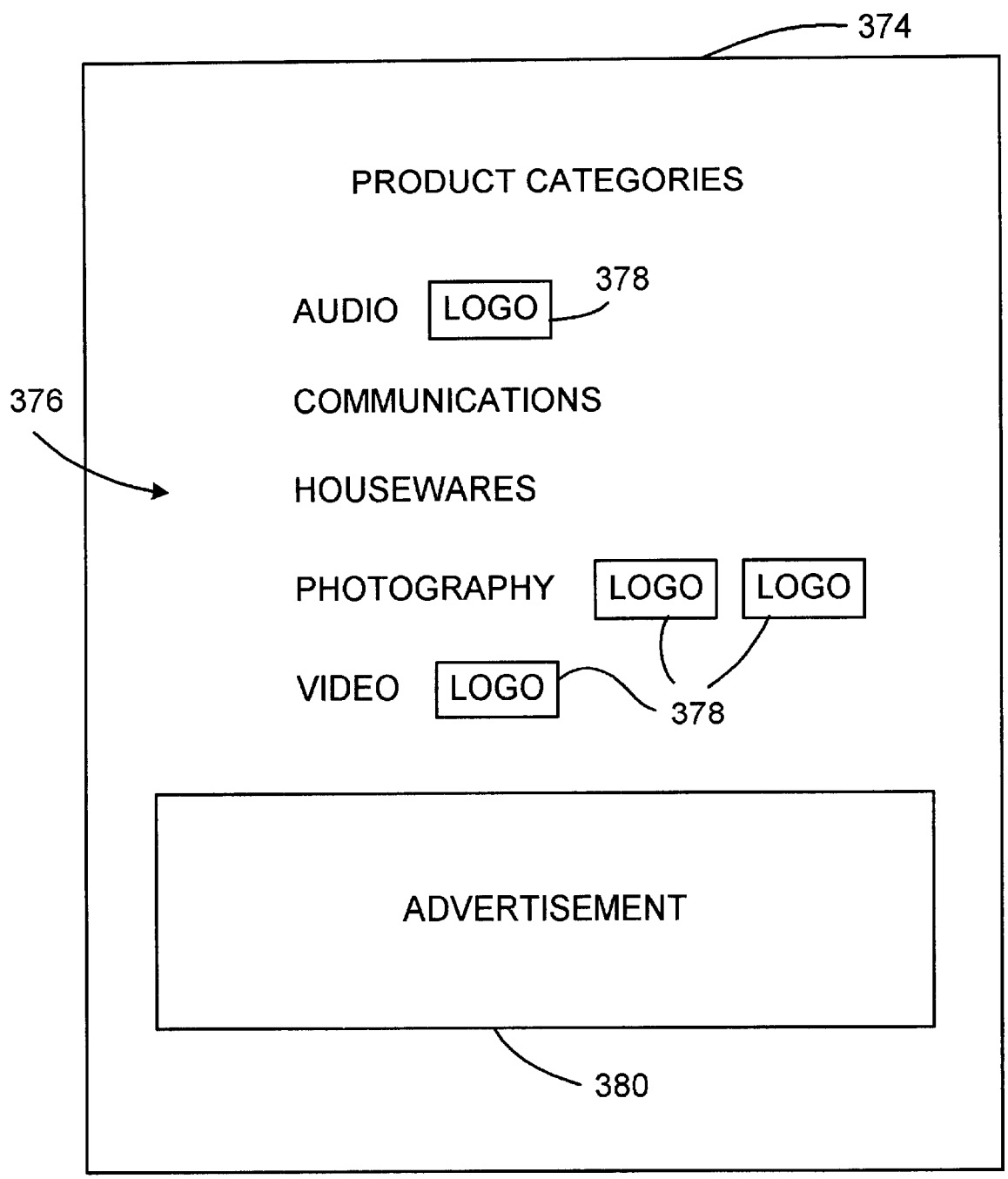
FIG. 31 shows an illustrative screen that may be displayed to provide access to product information organized in various product categories in accordance with the present invention.

An illustrative screen 374 that handheld computing device 12 may display when the user selects option 364 of FIG. 29 is shown in FIG. 31. Screen 374 may contain a list 376 of product categories. Logos 378 or other suitable promotional information may be displayed adjacent to various product categories. Manufacturers or others may sponsor such logos. If a particular logo catches the attention of the user, the user may select the logo. When a logo is selected, handheld computing device 12 may take the user to the manufacturers on-line site, may display information on the manufactures product, may provide the user with an opportunity to purchase the manufacturers products or obtain additional information regarding those products, etc. Promotional materials such as advertisement 380 may also be displayed on screen 374.

Figure 32:
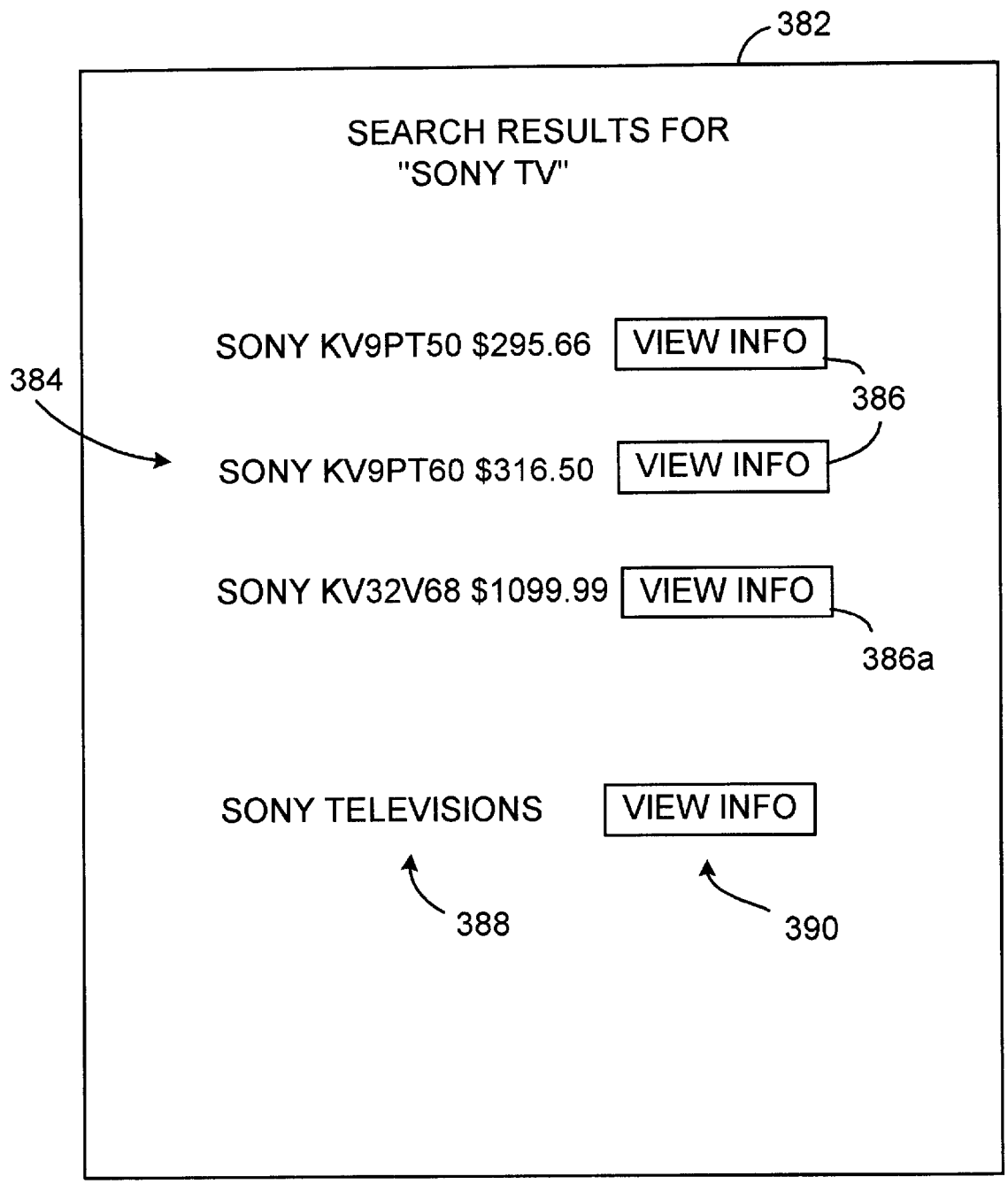
FIG. 32 shows an illustrative product information search results screen that may be displayed in accordance with the present invention.

If the user performs a search using search option 366 of FIG. 29, handheld computing device may display a search results screen such as search results screen 382 of FIG. 32. Screen 382 may contain a list 384 of various products that match the search criteria. The user may view information on a product of interest by selecting the appropriate view information option 386. When the user selects a view information option 386, handheld computing device 382 may access and display information on the product such as text descriptions of the product, images of the product, promotional videos, or any other suitable information related to the product.

Figure 33:
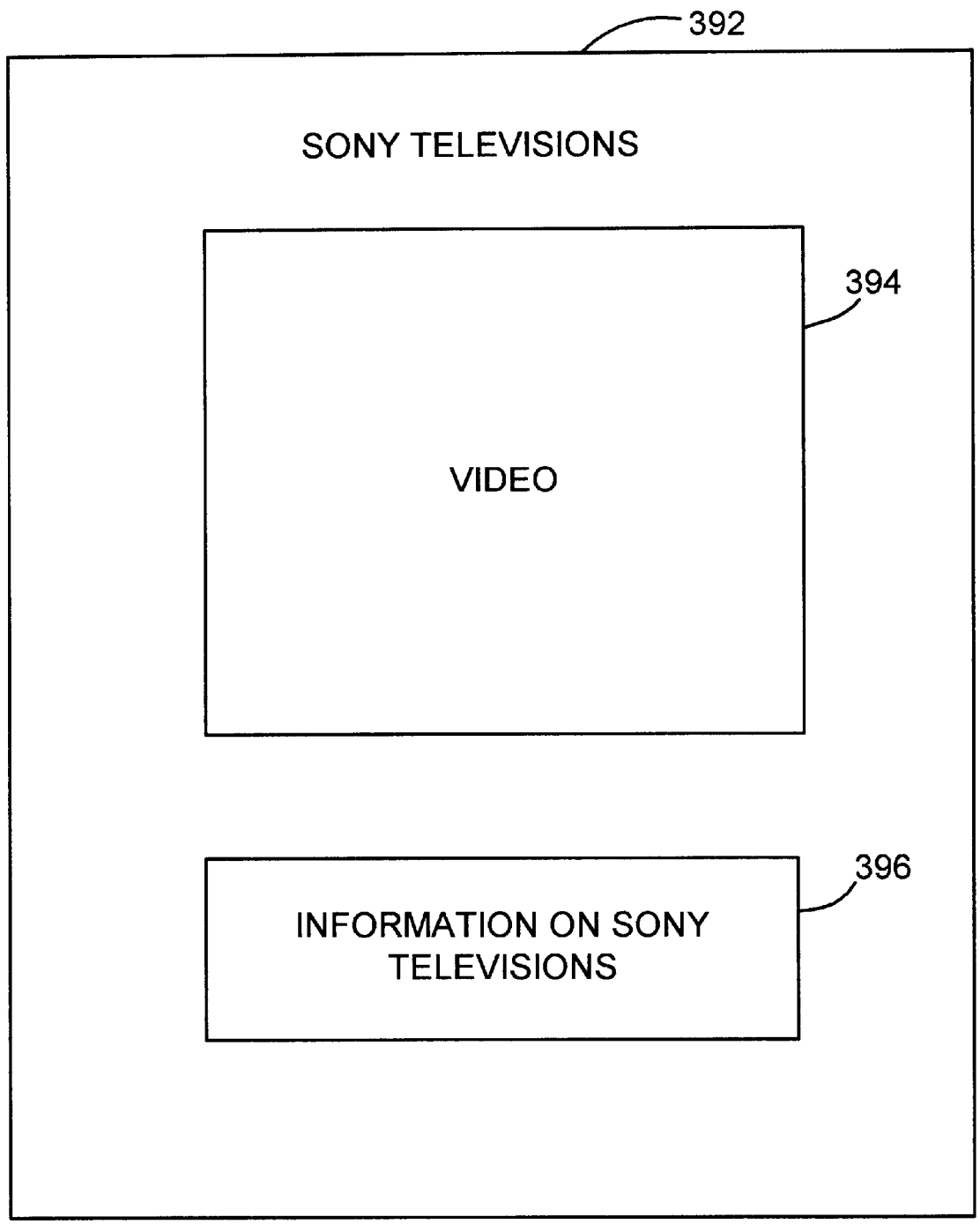
FIG. 33 shows an illustrative product information screen that may be displayed in accordance with the present invention.

In the example of FIG. 32, an entry 388 in the search results corresponds to general promotional information associated with a manufacturer's line of products. If the user selects the associated view info option 390, handheld computing device 12 may display a screen such as screen 392 of FIG. 33. Screen 394 may contain a video region 394 in which a real-time or downloaded video clip may be presented related to the manufacturer's products. Information region 396 may be used to display text and graphics related to the products. For example, information region 396 may be used to display a list of product features, ratings, consumer reviews, test report results, lists of available accessories, information on compatible equipment, etc.

Figure 34:
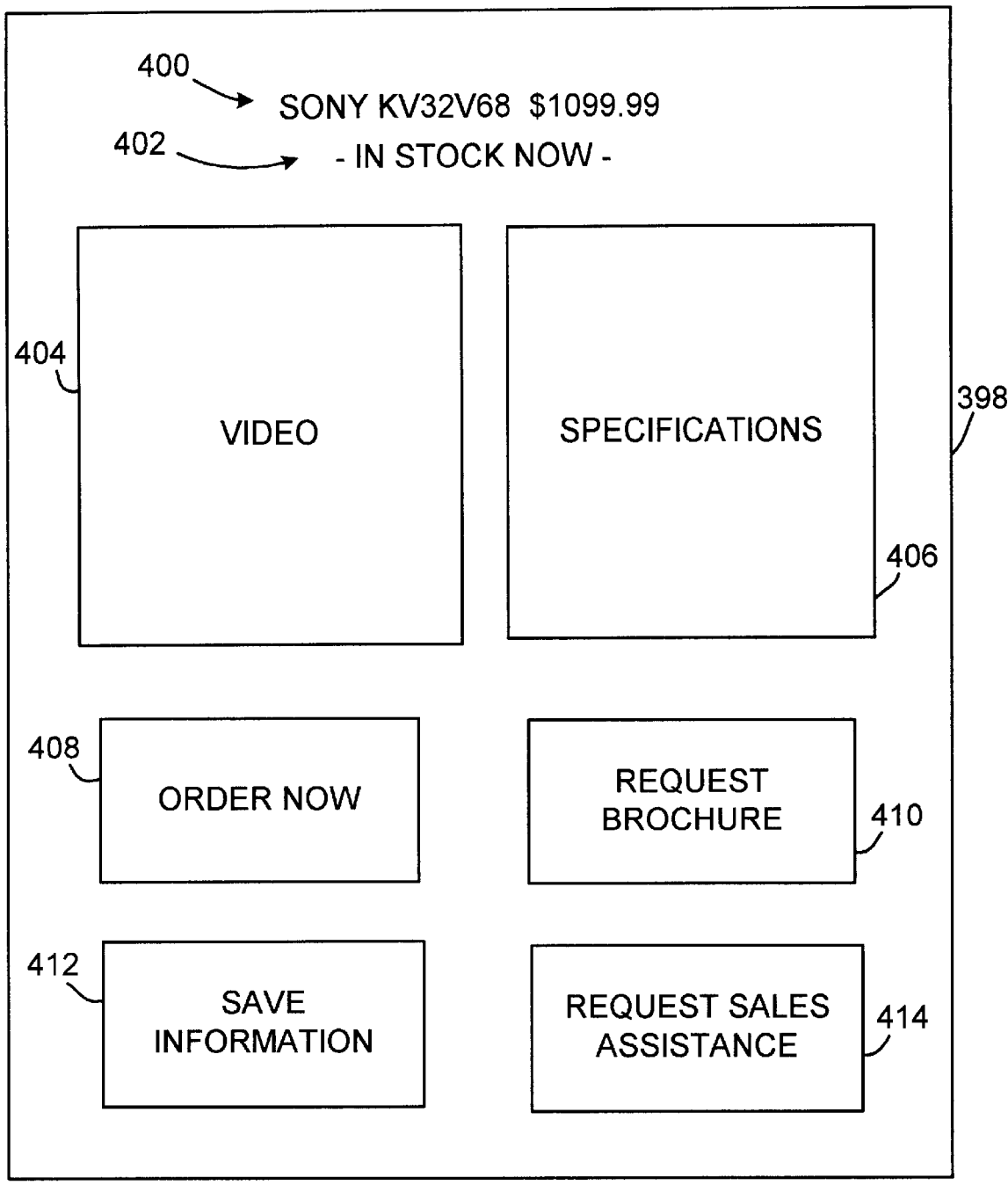
FIG. 34 shows an illustrative product information screen with interactive features that may be displayed in accordance with the present invention.

If the user selects an option such as the view info option 386a of FIG. 32, handheld computing device 12 may display a screen such as screen 398 of FIG. 34. Screen 398 may contain information 400 identifying the product of interest and information 402 indicating whether the store has the product in stock. Information on whether the item is in stock may be obtained from any computer associated with the store that has access to current inventory information. This information may be stored on a local computer or a remote server. Video such as promotional video on the product or the manufacturer's line of products or any other suitable subject may be displayed in video region 404. Product specifications may be displayed in region 406.

Order now option may allow the user to order the product in the store. The product may be ordered from the store or from a service provider. If the product is ordered from the store, the user may be provided with an on-screen option that allows the user to decide whether to take the product home from the store or to have the product delivered. If the product is ordered from a remote service provider or the like, the product may be delivered to the home. If the user selects request brochure option 410, a brochure may be provided to the user.

Handheld computing device 12 may display an option such as save information option 412 that allows the user to retain the promotional information displayed in screen 398 for later retrieval (e.g., for when the user is no longer in communication with the store).

Handheld computing device 12 may also display an option such as request sales assistance option 414. When the user selects option 414, appropriate sales personnel may be notified that a customer needs assistance. For example, an electronic message may be sent to a supervisor or directly to the sales personnel that contains information on which product the user is interested in, the user's present location, etc.

Figure 35:
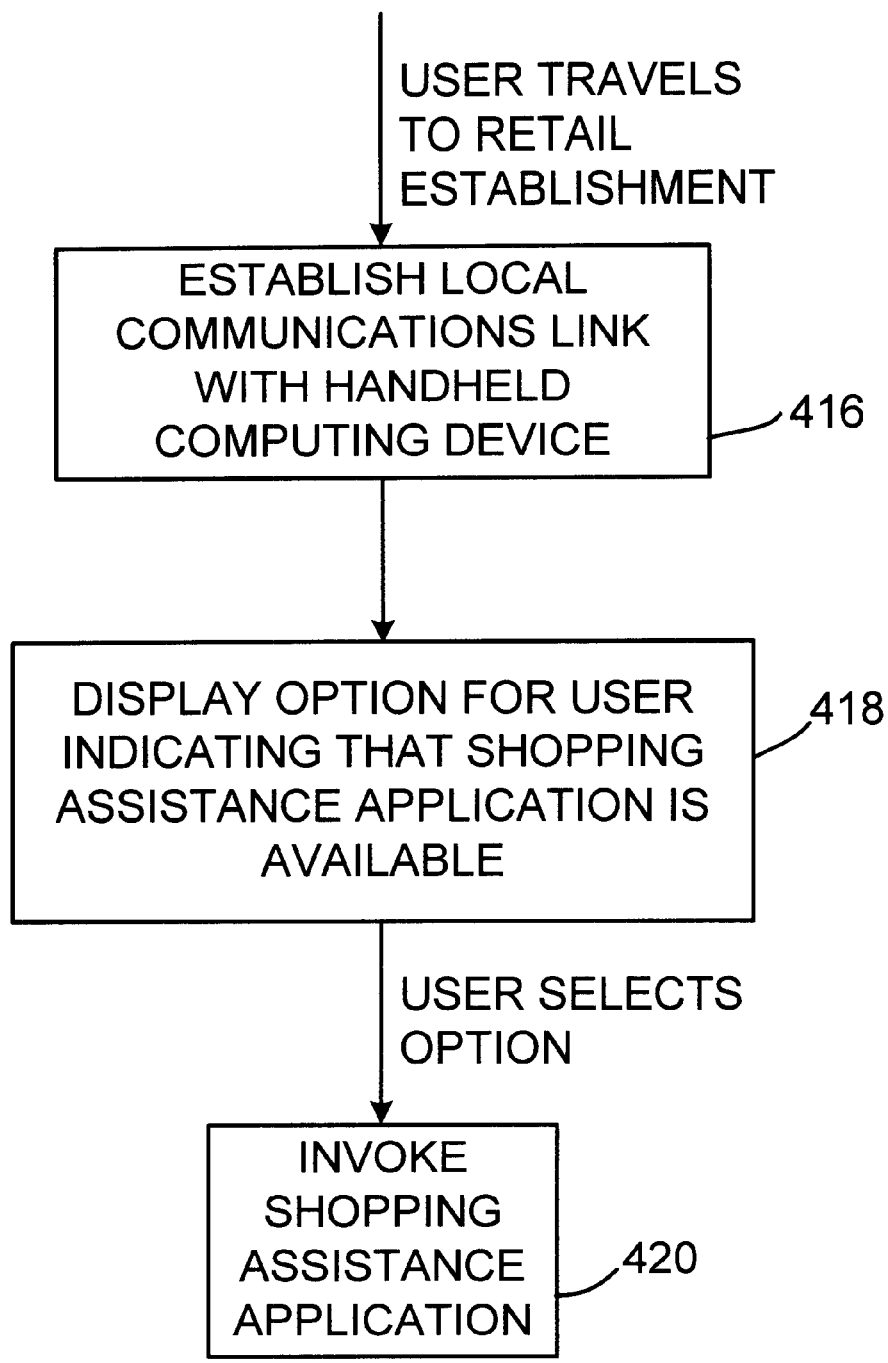
FIG. 35 is a flow chart of illustrative steps involved in alerting a user when a shopping assistance service is available in accordance with the present invention.

It may be desirable to provide the user with easy access to the features of a shopping assistance service. Illustrative steps involved in providing one suitable type of access to a shopping assistance service are shown in FIG. 35. Initially, the user may travel to a store or other retail establishment. At step 416, a local communications link may be automatically established between local communications equipment in the vicinity of the retail establishment and the user's handheld computing device 12. For example, a local wireless connection may be established with a local transmitter/receiver associated with the store or a local transmitter/receiver associated with a local wireless network to which the store is connected, etc. Step 416 may be performed without intervention by the user.

At step 418, handheld computing device 12 may automatically display an on-screen option (e.g., an icon or other indicator) for the user that indicates that a shopping assistance service is available. The icon may, for example, be an icon of the store's name or logo. If the user is interested in using the features of the shopping assistance service (e.g., to obtain information and access services related to the products offered by the store), the user may select the on-screen option. This directs handheld computing device 420 to invoke the shopping assistance application. As an example, invoking the shopping assistance application may direct handheld computing device 12 to display a screen such as screen 360 of FIG. 29.

Figure 36:
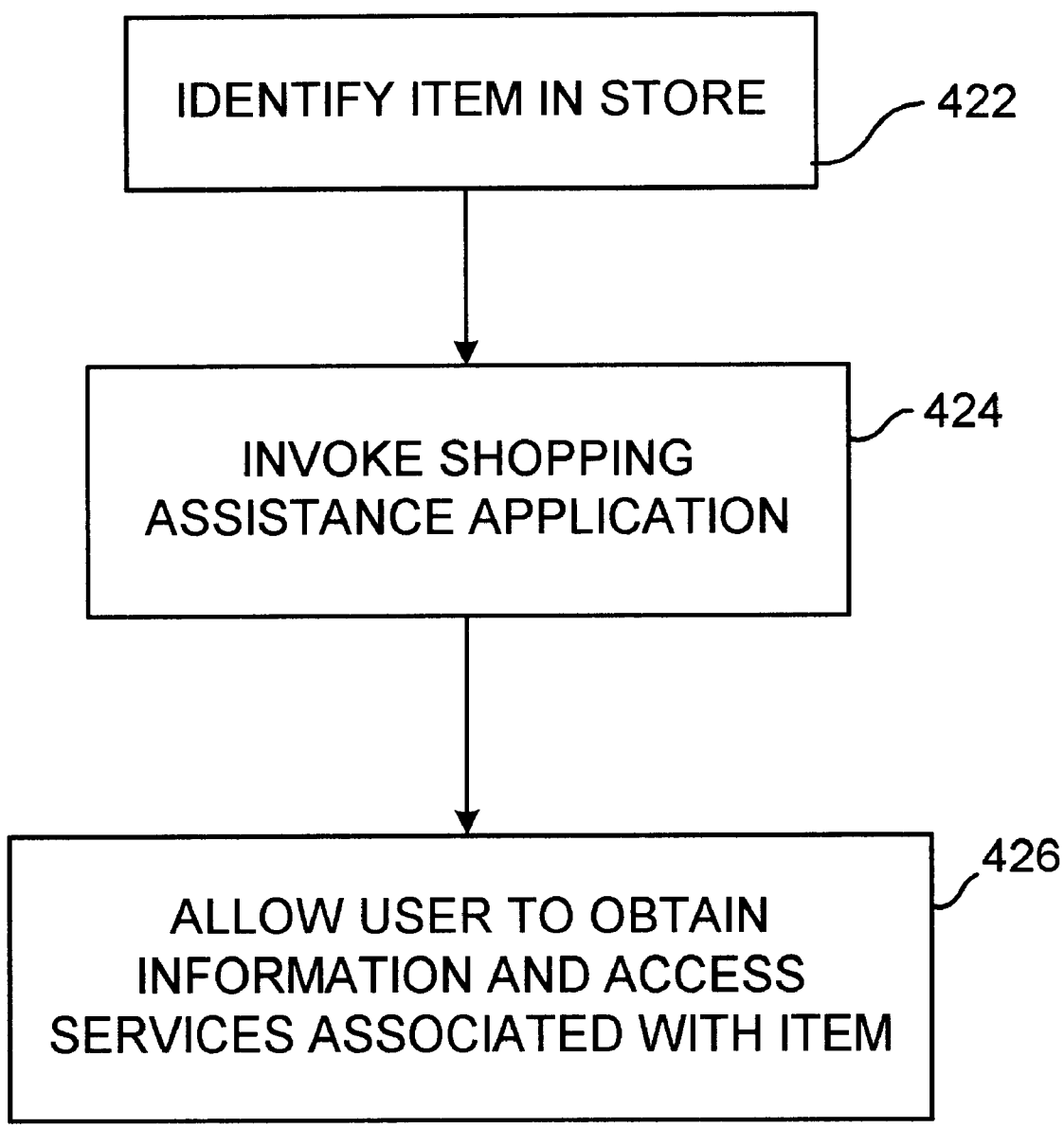
FIG. 36 is a flow chart of illustrative steps involved in using a shopping assistance service to obtain shopping information in accordance with the present invention.

A shopping assistance application may also be invoked when the user uses handheld computing device 12 to identify an item in a store. Illustrative steps involved in arrangements of this type are shown in FIG. 36. At step 422, handheld computing device may be used to identify an item of interest. For example, a user may use handheld computing device 12 to scan the bar code of an item or to identify an item using RFID techniques. At step 424, the handheld computing device 12 may recognize that an item has been wirelessly identified. The shopping assistance application may then be automatically invoked at step 424. At step 426, the user may be provided with an opportunity to obtain information and to access information on the item.

Handheld computing device 12 may be used to provide the user with shopping assistance services in locations such as malls, airports, amusements parks, and other retail establishments and environments. Some shopping assistance features may be provided using material that the user may download onto handheld computing device 12 from a kiosk or other suitable local communications equipment using an IR or RF local wireless link or using a physical approach (e.g., a wired link or a media transfer arrangement). For example, a map of a mall may be downloaded into handheld computing device 12 from a kiosk using an IR link or in the entryway of a mall using a short-range wireless RF link.

Other shopping assistance features may require that the handheld computing device access remote computers. For example, when it is desired to provide the user with an opportunity to order products on-line from remote order fulfillment facilities, a communications link may be established between the handheld computing devices and the remote fulfillment facilities. Other functions, such as checking whether an item is in stock at a store, requesting in-store sales assistance, ordering a product in a store that is to be taken home with the user, and other such functions may involve establishing a communications link with a computer associated with a store. If such a computer is located in the vicinity of the store, the communications link that is established may be a local wireless communications link.

It may be desirable to handle functions such as providing videos to handheld computing device 12 in real time or nearly real time over local wireless communications links because such links may have higher bandwidths than remote communications links.

Services such as maintaining a customer's shopping list or wish list or maintaining information on products, categories of products, and manufacturers, providing directory information, maps, advertisements and other promotional information, etc. may be performed using computers at any suitable locations.

Handheld computing device 12 may access such services by using a local wireless link to access the computer with which the service is provided. Handheld computing device 12 may also access services by using a local wireless link to access a wireless local network access point. A communications network such as the Internet may be used for communications between the wireless local network access point and the service. Services may also be accessed using remote wireless links or wired links, or by transferring data to and from the service using removable storage media or the like.

Figure 37:
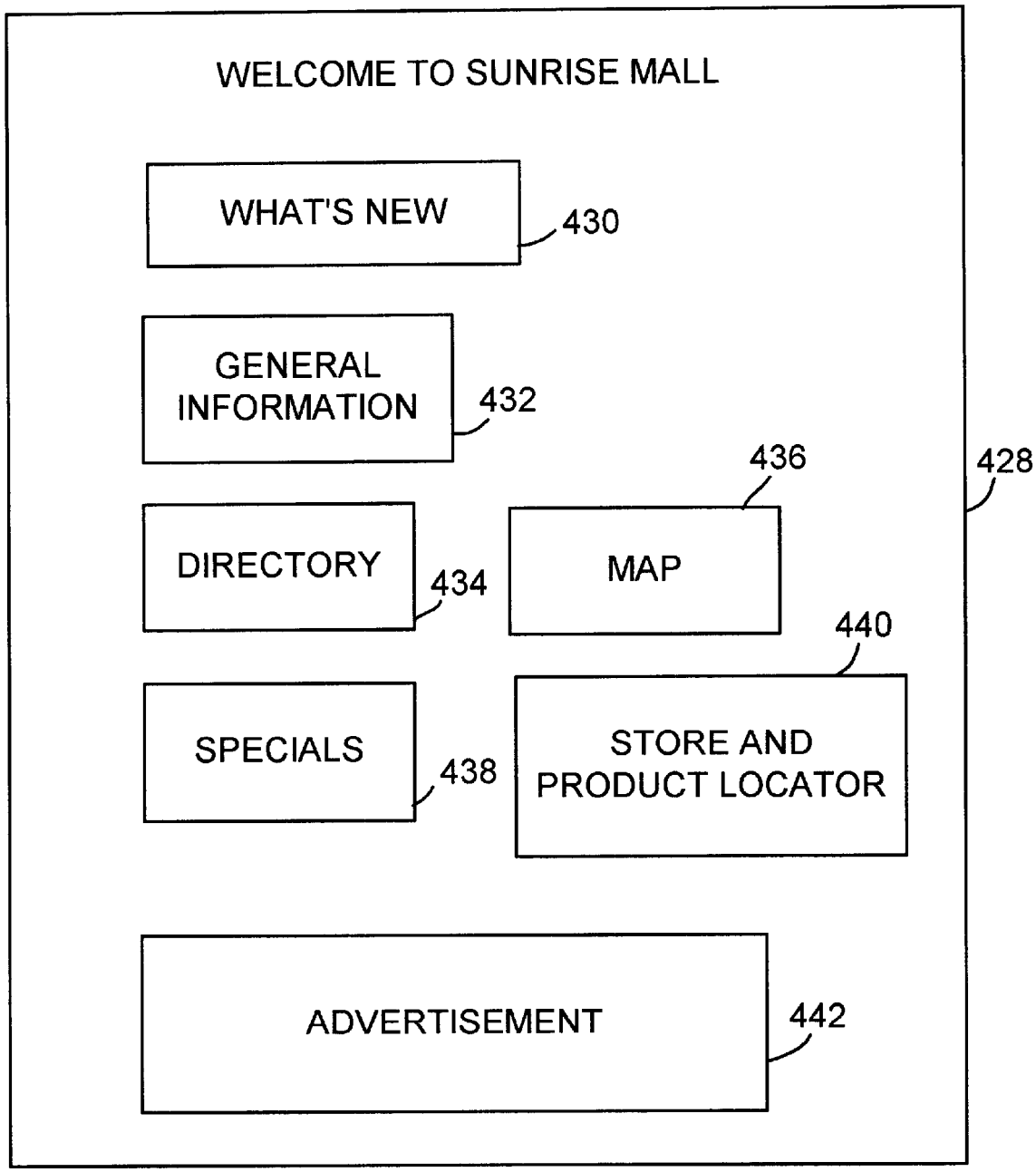
FIG. 37 shows an illustrative main menu screen that a shopping mall shopping assistance service may display in accordance with the present invention.

An illustrative screen 428 that may be provided by handheld computing device 12 when providing a shopping assistance service in a shopping mall environment is shown in FIG. 37. Screen 428 may be displayed after the shopping assistance service is invoked. The service may be invoked by selecting an icon or other on-screen option displayed on handheld computing device 12. The icon or other suitable notification may be automatically displayed by handheld computing device 12 when the user enters the mall. For example, the handheld computing device 12 may detect the presence of local wireless transmissions from equipment in the mall that is advertising the availability of the shopping assistance service and may automatically convey information on the availability of the service to the user by displaying the icon. If desired, the shopping assistance service may be automatically invoked when handheld computing device 12 detects the presence of suitable local wireless transmissions. These are merely illustrative examples. Any suitable technique may be used to invoke the shopping assistance service if desired.

Screen 428 may contain options such as what's new option 430, general information option 432, directory option 434, map option 436, specials option 438, and store and product locator option 440. Screen 428 may also contain promotional material such as advertisement 442.

Figure 38:
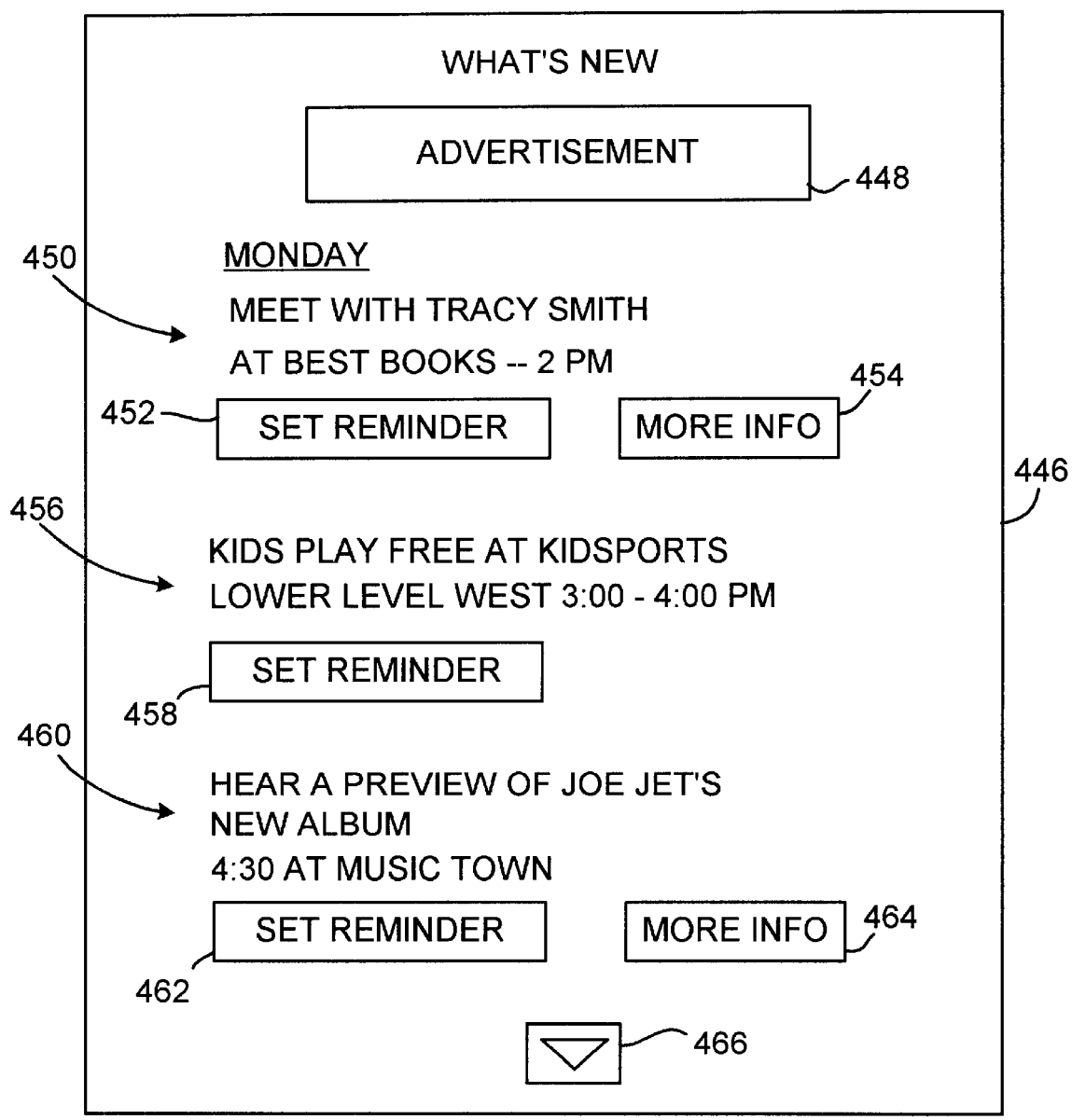
FIG. 38 shows an illustrative screen of current events that a shopping assistance service may display in accordance with the present invention.

If the user selects what's new option 430 of FIG. 37, handheld computing device 12 may display a screen such as what's new screen 446 of FIG. 38. Screen 446 may contain promotional information such as advertisement 448. Advertisement 448 and the other promotional material and advertisements displayed by the shopping assistance service may contain text, graphics, and video.

Screen 446 may contain a calender of upcoming events. For example, information 450 may be provided on an event at a bookstore. If the user is interested in the event, the user may select set reminder option 452. Handheld computing device 12 may store the reminder locally or may store the reminder on a remote server or the like. Just before the event for which the reminder was set, handheld computing device 12 may be used to alert the user to the upcoming event. If the user selects more info option 454, handheld computing device 12 may obtain and display additional information on the event.

Screen 446 may also contain information 456 on a children's event. The user may select option 458 to be reminded of that event.

Information 460 may also be provided on an event associated with a music store. If the user selects set reminder option 462, the user may be reminded of the event just before it is scheduled to begin. More info option 464 may be used to obtain additional information on the music store event.

On-screen navigation option 466 may be used to allow the user to view additional on-screen options. Such on-screen navigation options are generally not shown to avoid over-complicating the drawings.

Figure 39:
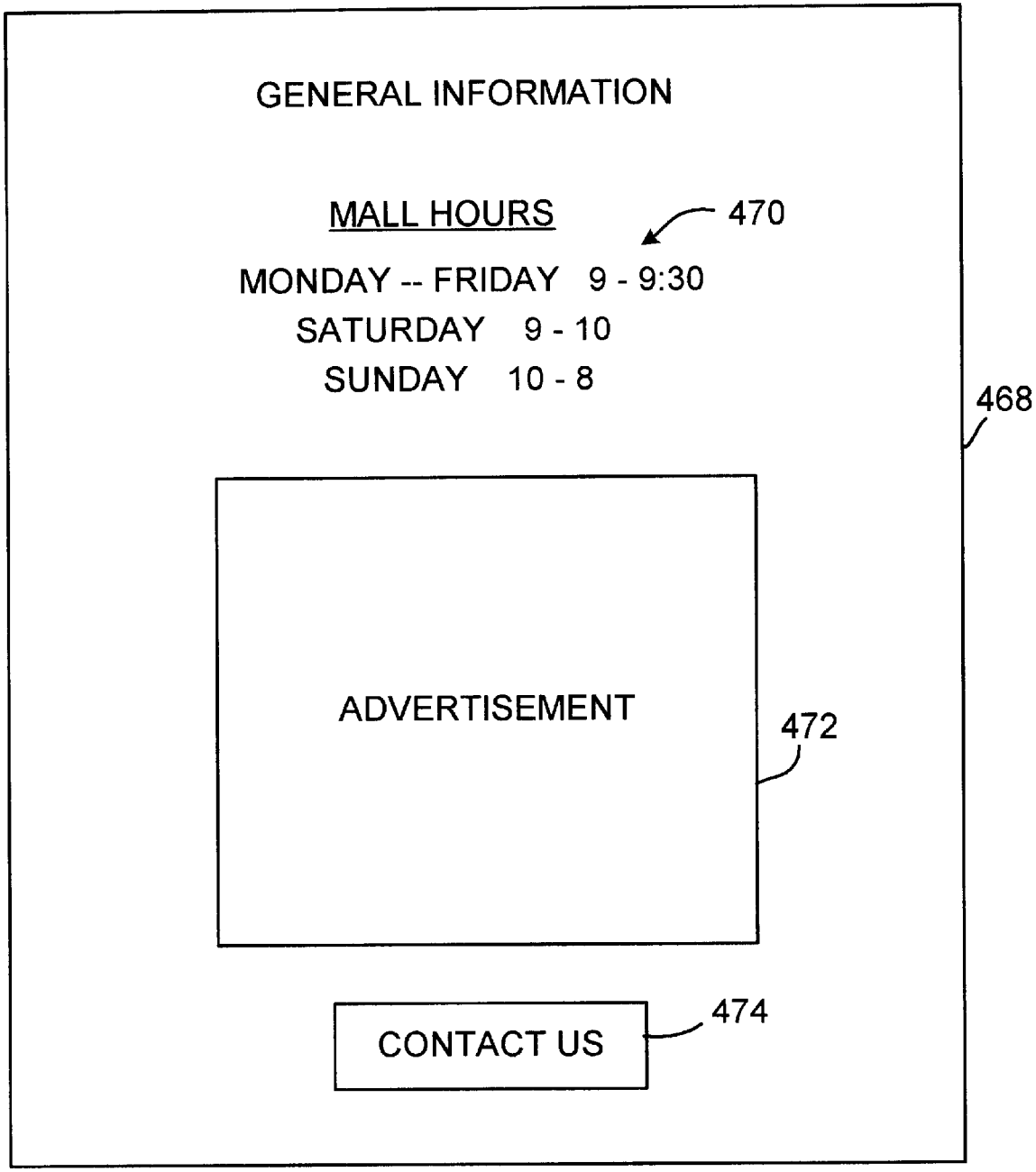
FIG. 39 shows an illustrative general information screen that a shopping assistance service may display in accordance with the present invention.

If the user selects general information option 432 of FIG. 37, the handheld computing device 12 may display a screen such as screen 468 of FIG. 39. Screen 468 may contain information 470 on the mall's hours of operation. Screen 470 may also contain an advertisement 472. If the user selects option 474, handheld computing device 12 may be used to provide the user with an opportunity to e-mail a message to the mall representative or to place a telephone call to the mall representative with handheld computing device 12.

Figure 40:
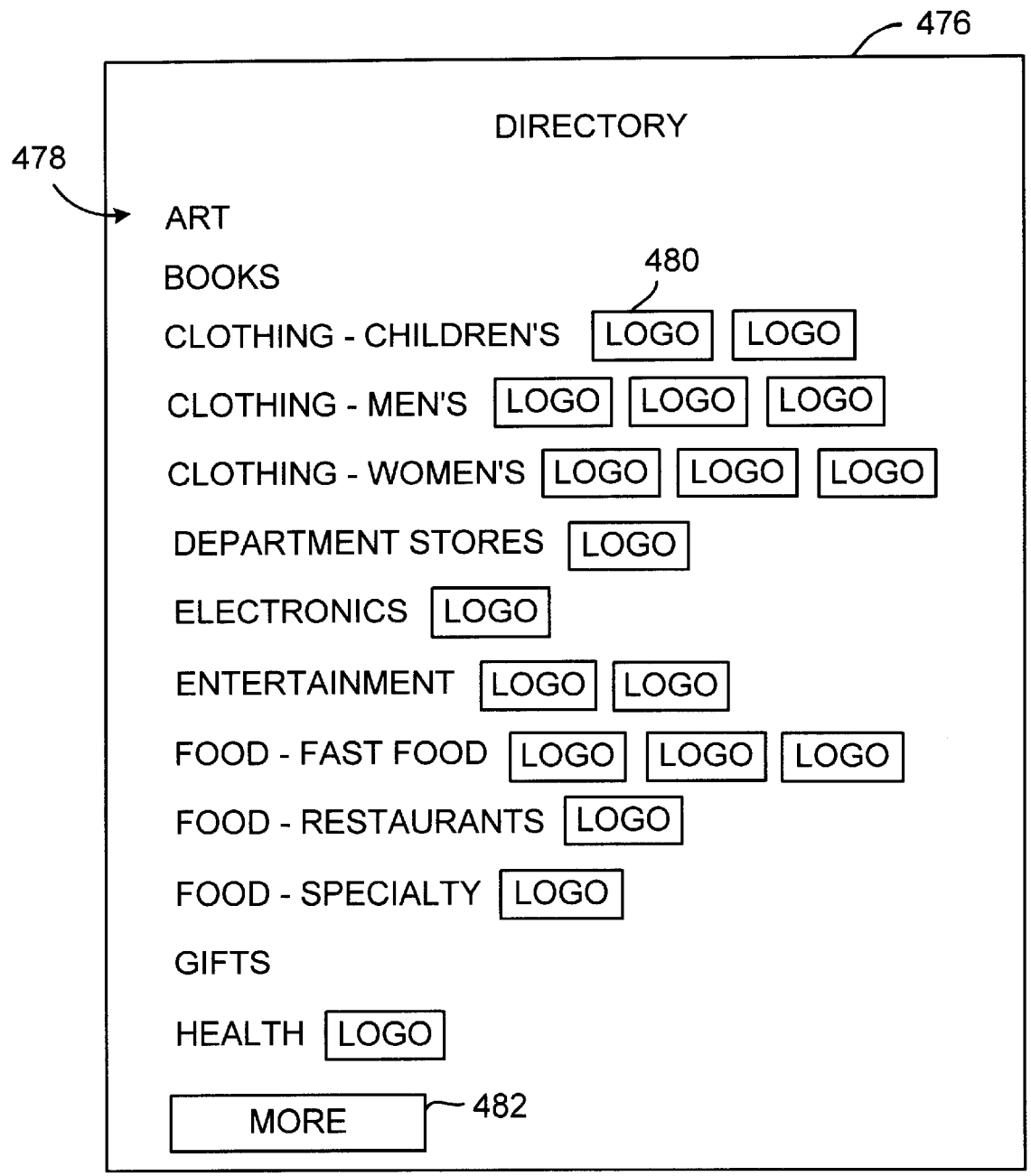
FIG. 40 shows an illustrative directory screen that a shopping assistance service may display in accordance with the present invention.

If the user selects directory option 434 of FIG. 37, handheld computing device 12 may display a screen such as screen 476 of FIG. 40. Screen 476 may contain a list 478 of various types of stores. Some store categories may have associated interactive logos 480 or other suitable indicators or information. The logos may be associated with particular stores in the mall. If the user selects a logo, handheld computing device 12 may present the user with information on the store associated with the logo. This allows the user to bypass screens that the user might otherwise be required to view. Because using logos 480 therefore provides a competitive advantage, merchants may be charged a fee for placing logos 480 on screen 476 or on any other suitable screen provided by the shopping assistance application. If the user selects more option 482, more store listings may be displayed.

Figure 41:
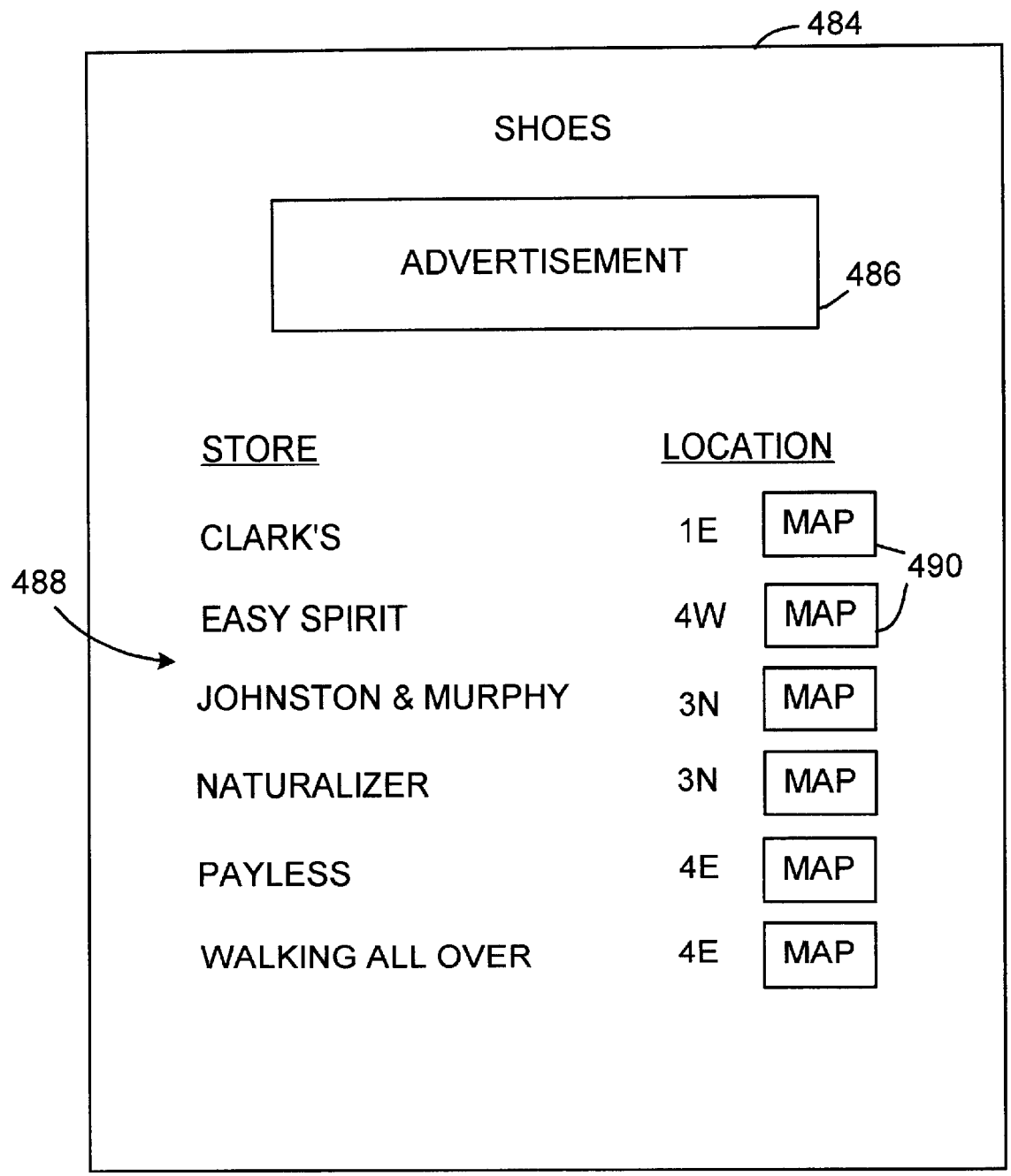
FIG. 41 shows an illustrative screen of directory information that a shopping assistance service may display in accordance with the present invention.

If the user selects a store category such as shoes from directory screen such as screen 476, handheld computing device 12 may display a screen such as screen 484 of FIG. 41. Screen 484 may contain promotional information such as advertisement 486. A list 488 of stores in the selected store category may be displayed. Options such as map options 490 may be displayed adjacent to each store listing. If the user selects a given map option 490, handheld computing device 12 may display a map showing the location of the corresponding store such as map 494 of FIG. 42. Location information 492 may also be displayed directly on screen 484. If desired, additional information such as store hours, specials, etc. may also be displayed on screens such as screen 484.

Figure 42:
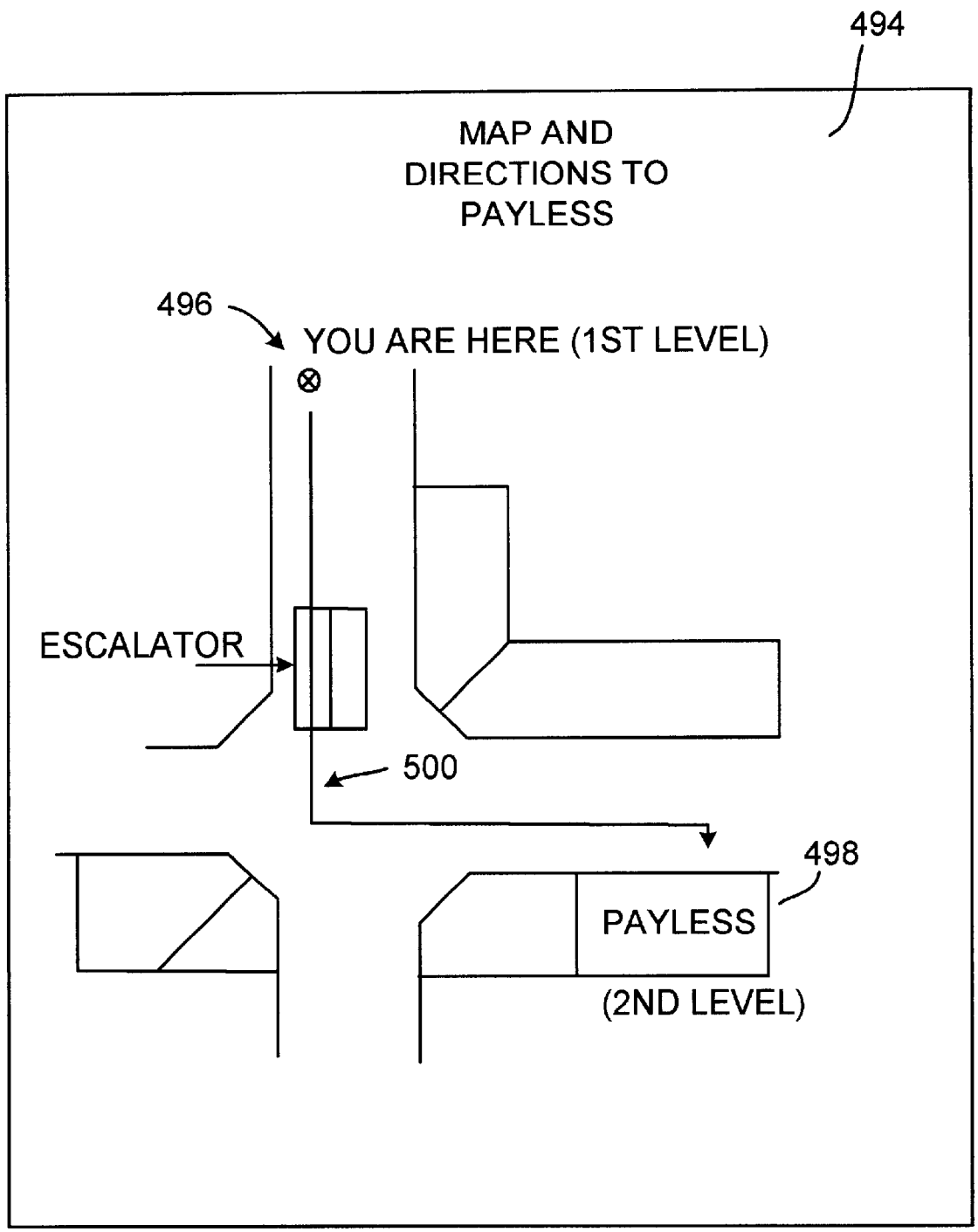
FIG. 42 shows an illustrative map screen that a shopping assistance service may display in accordance with the present invention.

As shown in FIG. 42, map 494 may contain information 496 indicating the user's present location and information 498 indicating the user's destination. Information 500 may also be displayed that shows a recommended route between the user's location and the user's destination.

Another possible arrangement is shown in FIG. 43. In the example of FIG. 43, text directions 502 from the user's present location to the user's destination have been provided.

Information on the user's present location may be determined based on information on which local transmitter/receiver handheld computing device 12 is communicating with using local wireless communications, may be determined based on GPS techniques or cellular-network-based techniques, or may be obtained using a combination of such approaches or any other suitable approach. A map and directions application may be used to generate the map of FIG. 42 and the directions of FIGS. 42 and 43. Such an application may be implemented using a local computer or a remote server or any other suitable arrangement.

Figure 44:
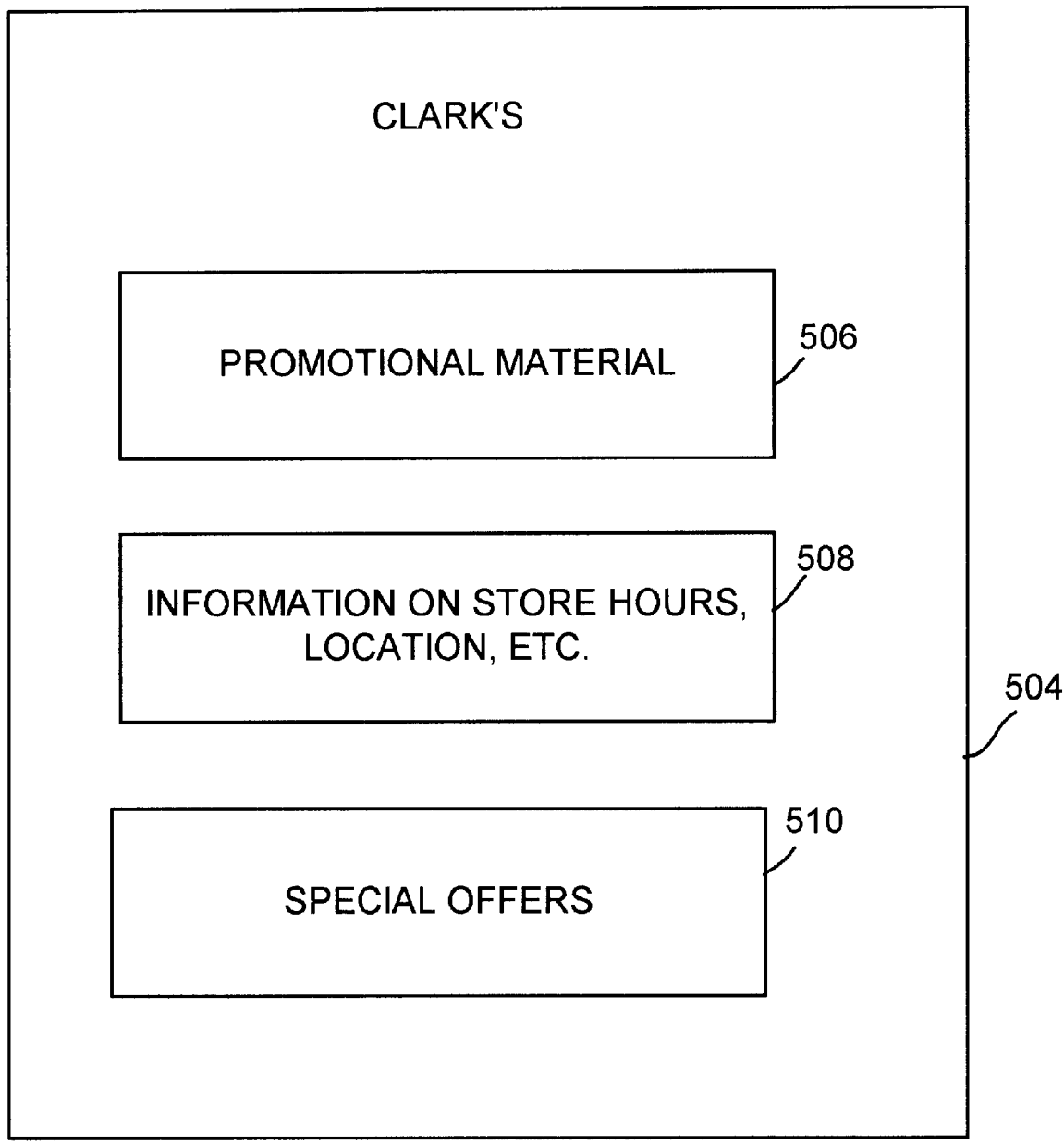
FIG. 44 shows an illustrative information screen for a store in a mall that a shopping assistance service may display in accordance with the present invention.

An illustrative screen of the type that may be displayed by handheld computing device 12 when the user selects a store logo from a screen such as screen 476 of FIG. 40 is shown in FIG. 44. Screen 504 may contain promotional material 506, information 508 on store hours, the location of the store, etc., and information 510 on special offers.

Figure 45:
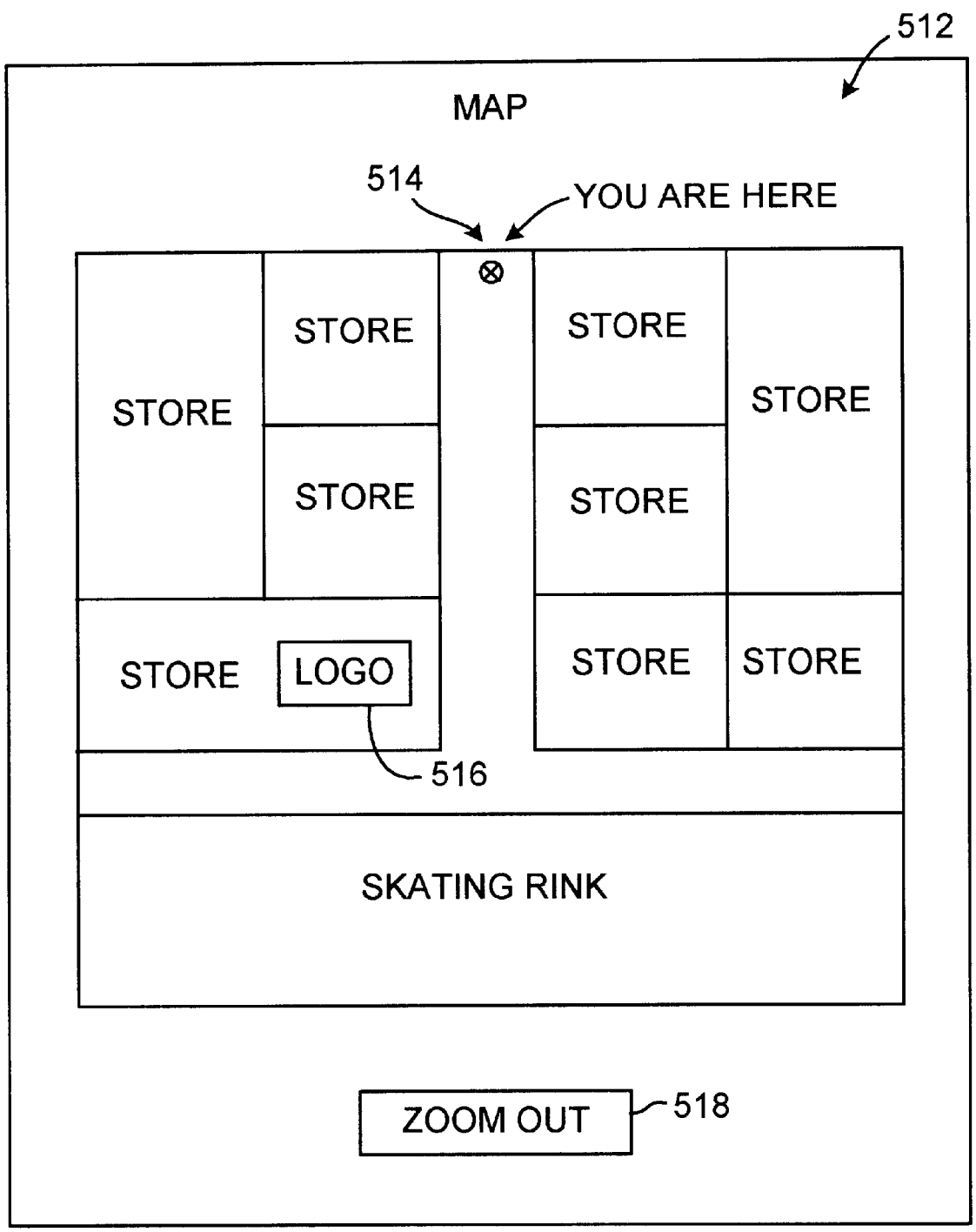
FIG. 45 shows an illustrative map screen with directions that a shopping assistance service may display in accordance with the present invention.

If the user selects an option such as map option 436 of FIG. 37, handheld computing device 12 may display a map such as map 512 of FIG. 45. Map 512 may contain information 514 on the user's present location. Map 512 may also contain a selectable logo 516 that is embedded in the map. Logo 516 is associated with a particular store and is therefore displayed at the map location that corresponds to the store's location. Options such as option 518 may be used to change the scale of the map, to display different portions of the map, etc.

Figure 46:
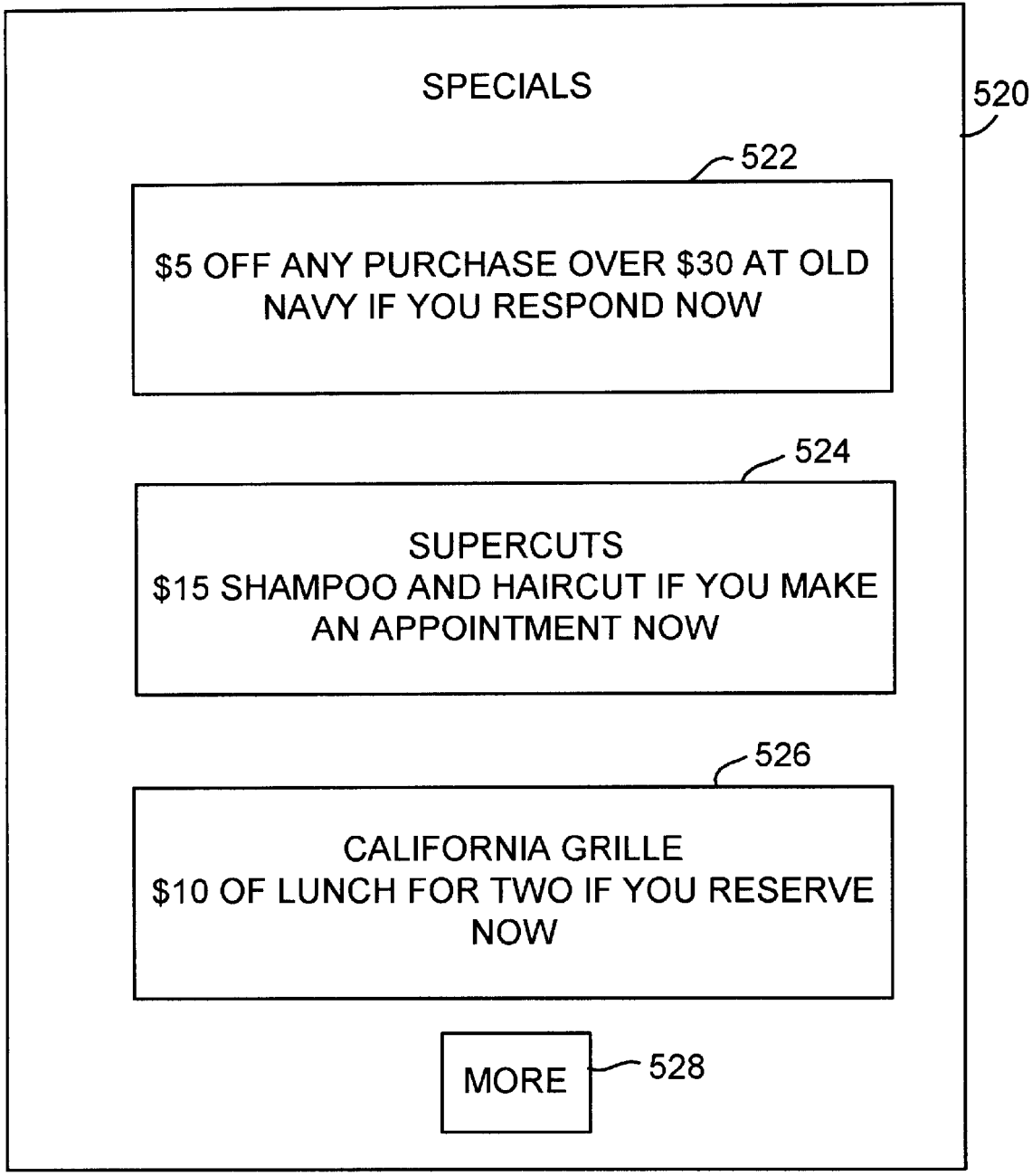
FIG. 46 shows an illustrative screen of specials that a shopping assistance service may display in accordance with the present invention.

If the user selects an option such as specials option 438 of FIG. 37, handheld computing device 12 may display a screen such as screen 520 of FIG. 46. Screen 520 may contain passive and interactive information on specials available at the mall. Specials option 522 may allow the user to obtain a discount at a clothing store. Option 524 may allow the user to obtain a discount on a haircut. Option 526 may allow the user to obtain a discount on a meal at a restaurant. If the user desires to view more options, the user may select more option 528.

The illustrative options of FIG. 46 require that the user respond within a certain time period to obtain the offered discounts. If the user selects one of these options, handheld computing device 12 may be used to display on-screen options that allow the user to accept these offers. For example, if the user selects option 522, handheld computing device 12 may be used to display on-screen options that allow the user to electronically reserve the $5 discount. If the user option 524, handheld computing device 12 may be used to display on-screen options that allow the user to electronically make an appointment for a hair cut. If the user option 526, handheld computing device 12 may be used to display on-screen options that allow the user to electronically make a lunch reservation. The merchants who accept such reservations or appointments may maintain information on which customers have responded to the specials. When the user desires to use one of the discounts offered in FIG. 46, the user's identity may be verified by the merchant.

Figure 47:
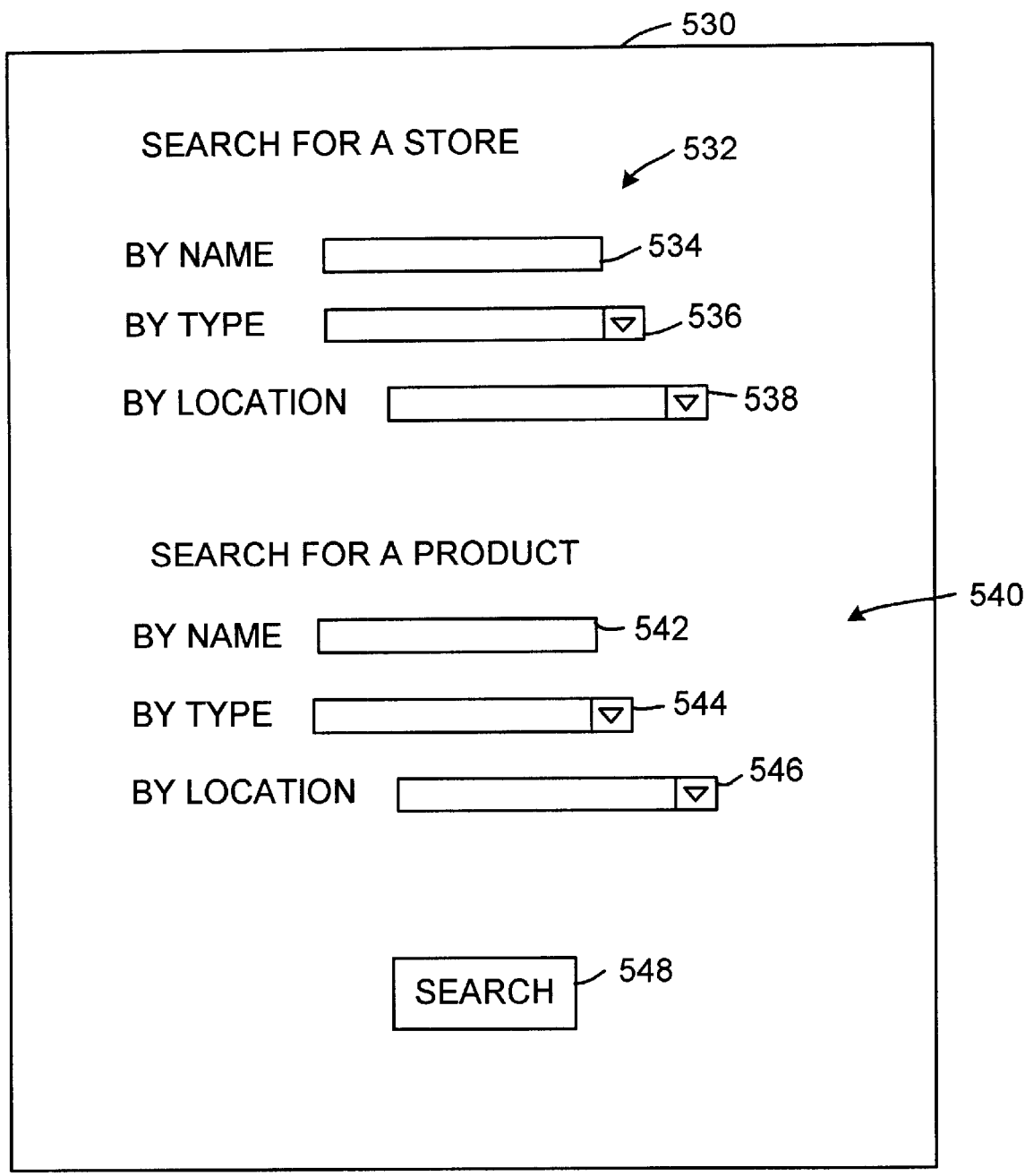
FIG. 47 shows an illustrative search screen that a shopping assistance service may display in accordance with the present invention.

If the user selects an option such as store and product locator option 440 of FIG. 37, handheld computing device 12 may display a screen such as screen 530 of FIG. 47. Search for a store option 532 may be used to locate a desired store. A store may be located by name using option 534, by type using option 536, and by location within the mall using option 538. These search options may be combined if desired. Search by product option 540 may allow a user to locate a desired product from among the products carried by the merchants at the mall. Products may be located by name using option 542, by type using option 544, and by location within the mall using option 546. These search options may be combined if desired. Searches may be initiated by selecting search option 548.

A central database containing store and product information for the merchants in the mall may be provided. Each merchant may provide the central database with database information concerning the products carried by that merchant. If desired, separate databases may be provided by each merchant. The store and product locator function may be implemented by searching each of the individual databases. These are merely illustrative examples. Any suitable approach for implementing the store and product locator function may be used if desired.

Figure 48:
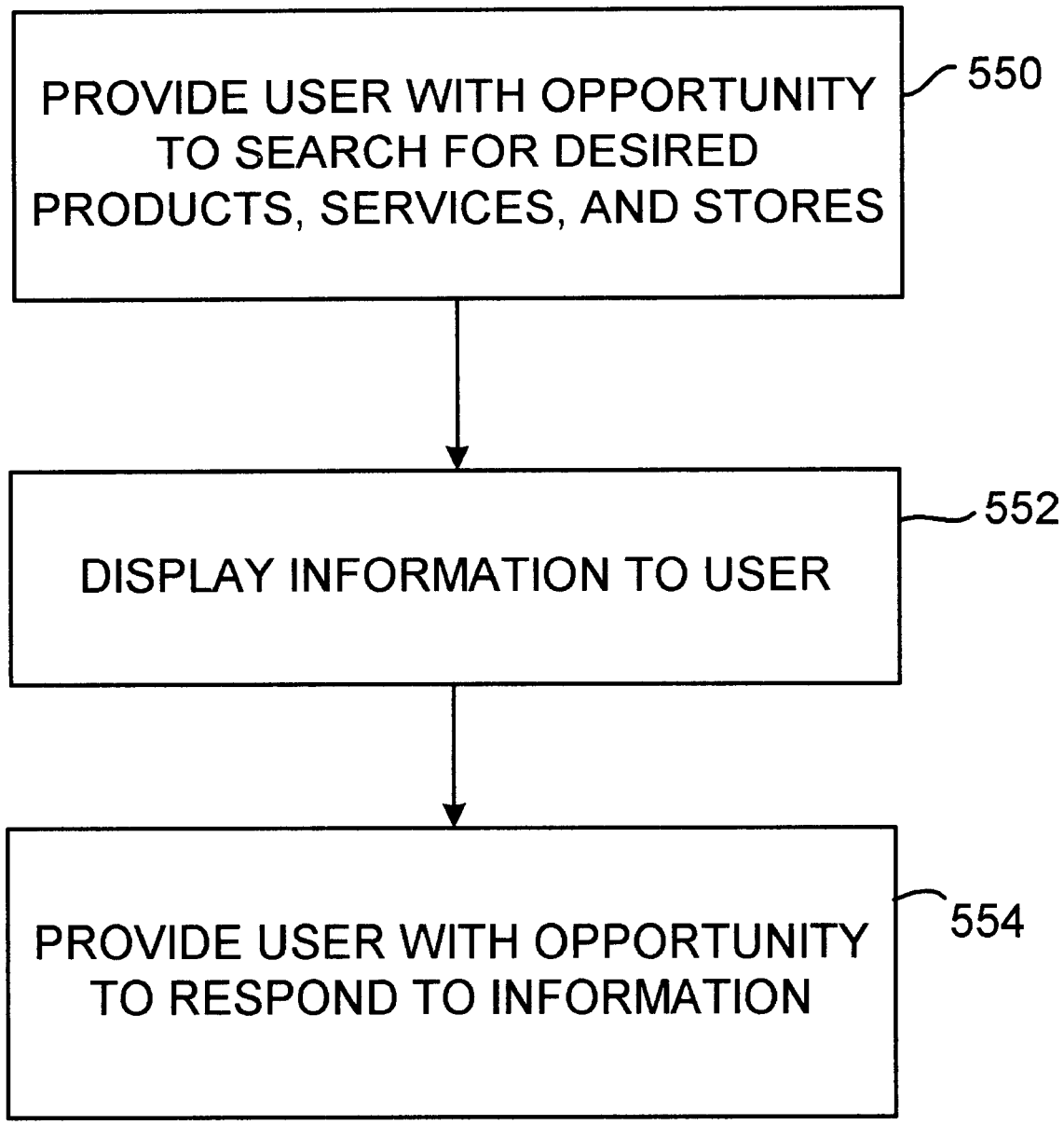
FIG. 48 is a flow chart of illustrative steps involved in using a shopping assistance service to search for desired products, services, and stores in accordance with the present invention.

Illustrative steps involved in providing shopping mall search services are shown in FIG. 48. At step 550, handheld computing device 12 may provide the user with on-screen options that allow the user to search for desired stores and products and services. The relevant databases may then be searched and the search results displayed to the user at step 552. At step 554, the user may be provided with an opportunity to respond to the search results. In particular, the search results may contain interactive entries. When the user selects a desired entry (e.g., a product), the user may be provided with additional information or access to a service related to the selected entry. As an example, if the user locates a particular item using a search, selecting the item from the search results screen may take the user to an on-line product information and ordering site of the mall retailer that carries the item.

Figure 49:
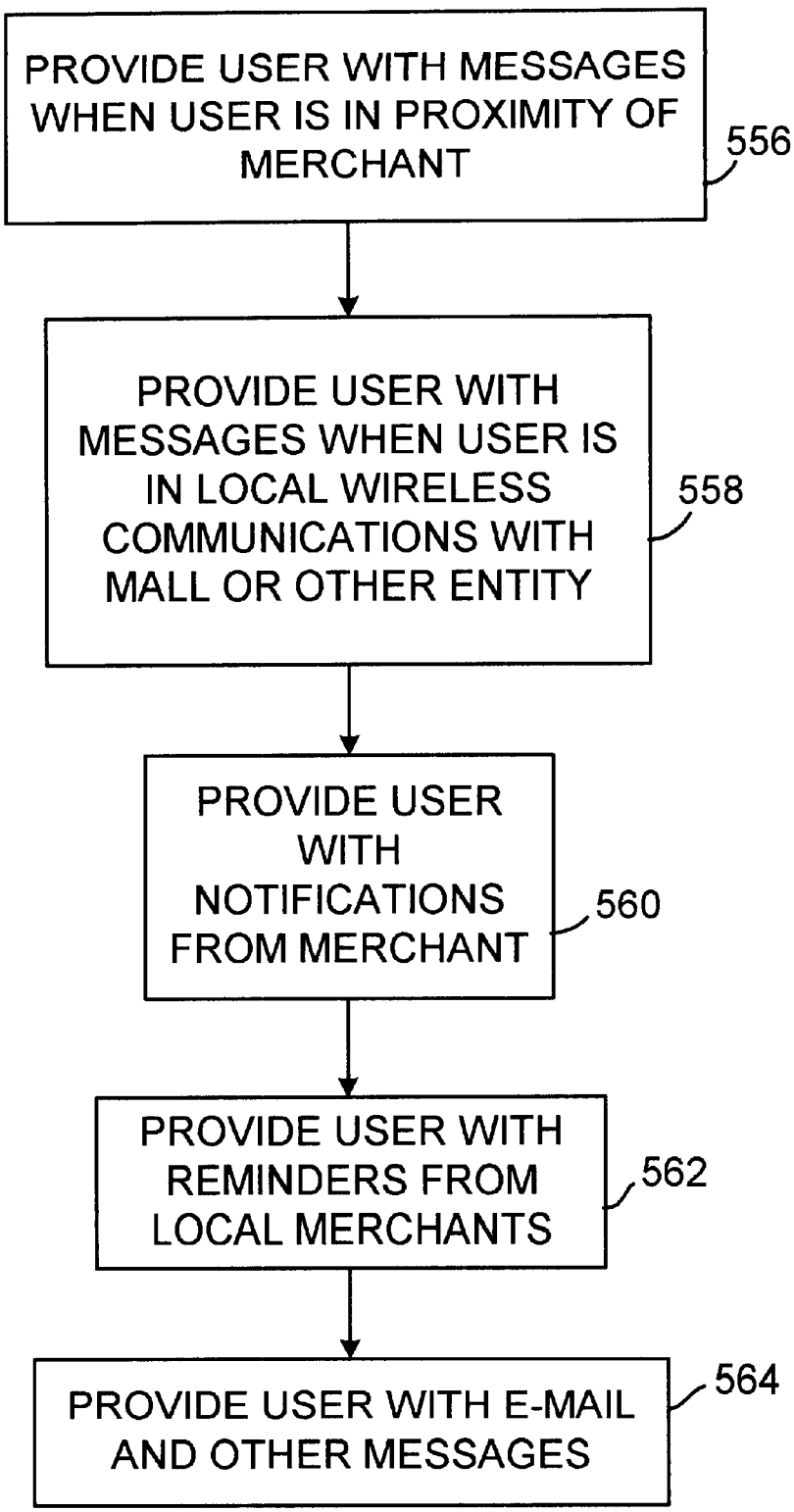
FIG. 49 is a flow chart of illustrative steps involved in providing messages to a handheld computing device in accordance with the present invention.

A user may wish to be provided with messages and other notifications while shopping. For example, a user may desire to be notified when a special offer is available. There are various types of messages that may be provided to the user, including proximity messages, local messages, notifications, reminders, e-mail, etc. Messages that are particular to the user may be addressed to the handheld computing device 12 using an e-mail addressing arrangement or any other suitable addressing scheme. Messages that are directed to all users (e.g., all users who are in communication with the local wireless transmitter/receivers in the mall or other establishment) may be sent without a particular destination address. Illustrative steps involved in providing the user with various types of messages using handheld computing device 12 are shown in FIG. 49.

At step 556, handheld computing device 12 may be used to provide the user with messages when the user is in the proximity of a merchant (i.e., when the user walks by a merchant in the mall). The user's location may be determined by determining which local wireless transmitter/receiver handheld computing device 12 is in communication with or by using GPS techniques or other location-determination techniques. Messages that may be presented in this way include advertisements and the like.

At step 558, handheld computing device 12 may be used to provide the user with messages when the user is in local wireless communications with the mall or other such entity (i.e., when the user is in wireless communications with a wireless transmitter/receiver located in the mall, when the user is in wireless communications with a wireless local area network associated with the mall, etc.). Such messages may include specials being offered to occupants of the mall.

At step 560, handheld computing device 12 may be used to provide the user with notifications from merchants. Such messages may include, for example, notifications that the user's laundry is ready to be picked up, that the user's film has been developed, etc.

At step 562, handheld computing device 12 may be used to provide the user with reminders from merchants. Such messages may include, for example, a reminder for a reservation at a restaurant, a reminder that a movie for which the user has a ticket is about to being, etc.

At step 564, handheld computing device 12 may be used to provide the user with e-mail and paging messages and other such messages. Such messages may or may not be associated with the merchants in the mall.

Figure 50:
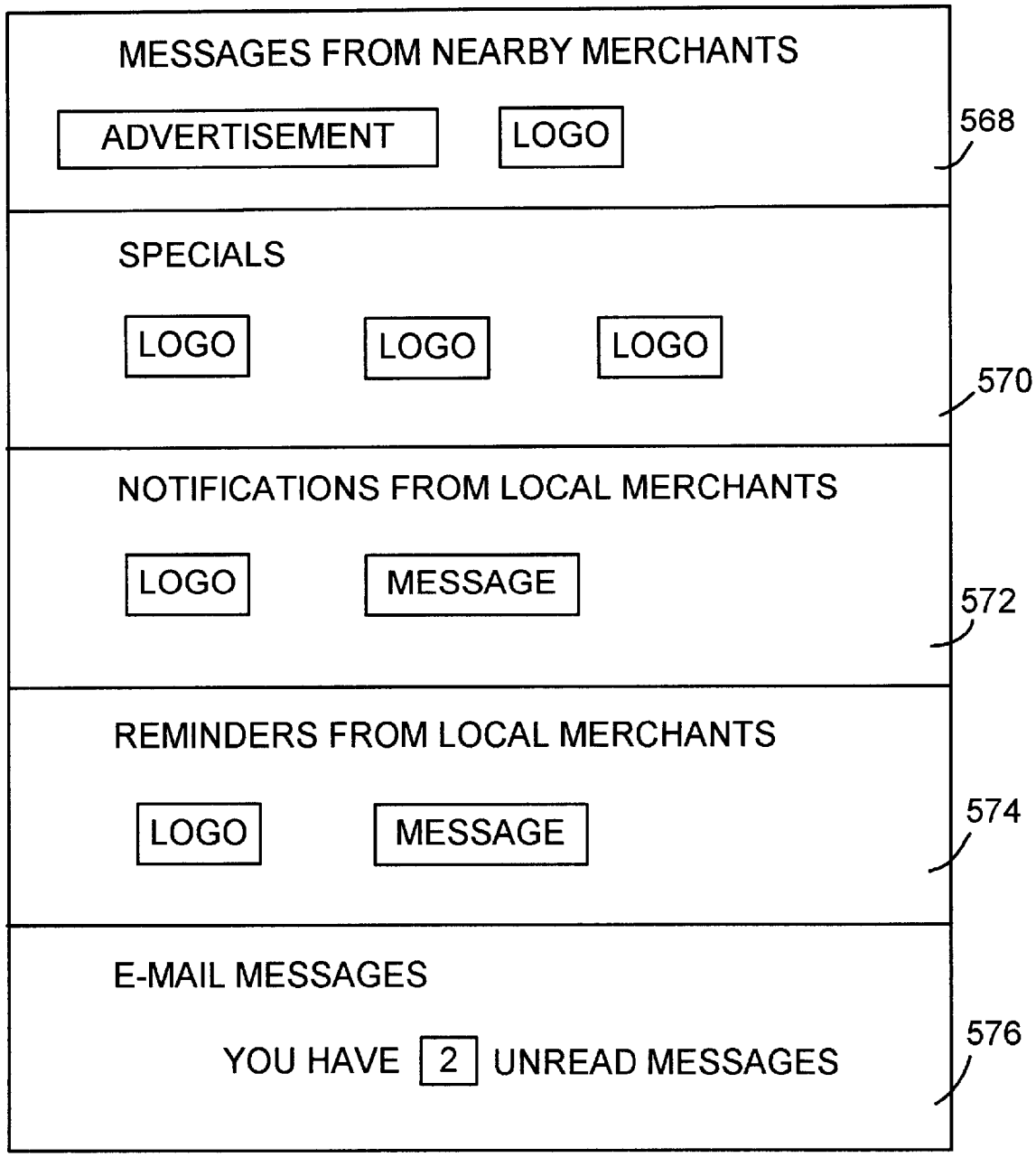
FIG. 50 shows an illustrative screen that may be used to present various different types of message information to the user in accordance with the present invention.

Handheld computing device 12 may alert the user when messages are received. One illustrative arrangement for handling multiple types of messages with handheld computing device 12 is shown in FIG. 50. A screen such as screen 566 may be displayed automatically by handheld computing device 12 (e.g., when messages are received) or may be displayed when requested by the user. Information displayed on screen 566 may be displayed in the form of an advertisement (e.g., text, graphics, and video that promotes a particular merchant or product or service, etc.), in the form of a logo (e.g., a logo of a merchant), in the form of a message (e.g., text), in the form of a status indicator (e.g., an icon or other indicator indicating that messages have been received or that a certain type or number of messages have been received), etc.

Region 568 may be used to display information on messages received from nearby merchants (e.g., proximity messages). Such messages may be provided to the user or made available to the user each time the user walks past a different merchant in the mall.

Region 570 may be used to display information on specials (e.g., local messages and the like). Specials may be provided to all handheld computing devices 12 that are within the mall (e.g., using a wireless local area network formed of transmitter/receivers).

Region 572 may be used to display information on notification form local merchants. For example, a notification may indicate that the user's film has been processed by a photo store.

Region 574 may be used to display information on reminders to the user. For example, information may be displayed on reminders such as reminders regarding restaurant reservations, movie tickets, etc.

Region 576 may be used to display information on e-mail messages, voice-mail messages, paging massages, or any other suitable type of message.

Regions such as regions 568, 570, 572, 574, and 576 may be combined in any suitable way. If desired, only some of the information from regions such as regions 568, 570, 572, 574, and 576 may be displayed. For example, only two such regions may be displayed, one for e-mail messages and one for all other messages. Moreover, the arrangement of screen 566 is merely illustrative. Any suitable arrangement may be used for handling incoming information and messages with handheld computing device 12 if desired.

An illustrative proximity message 578 that may be displayed by handheld computing device 12 is shown in FIG. 51. Message 578 may be an advertisement for a nearby merchant. Message 578 or an icon or other suitable indicator indicating the availability of message 578 may be automatically displayed by handheld computing device 12 when the user comes within range of a local wireless transmitter/receiver in the proximity of the given merchant. For example, this information may be displayed when the handheld computing device 12 detects the presence of local wireless transmissions from the local wireless transmitter/receiver. Such local wireless transmissions may be used by the local wireless transmitter/receiver to announce the availability of the proximity message.

FIG. 52 shows another illustrative proximity message 580 that may be displayed. Message 580 may be automatically displayed by handheld computing device 12 or may be displayed after the user selects an appropriate notification icon.

Figure 53:
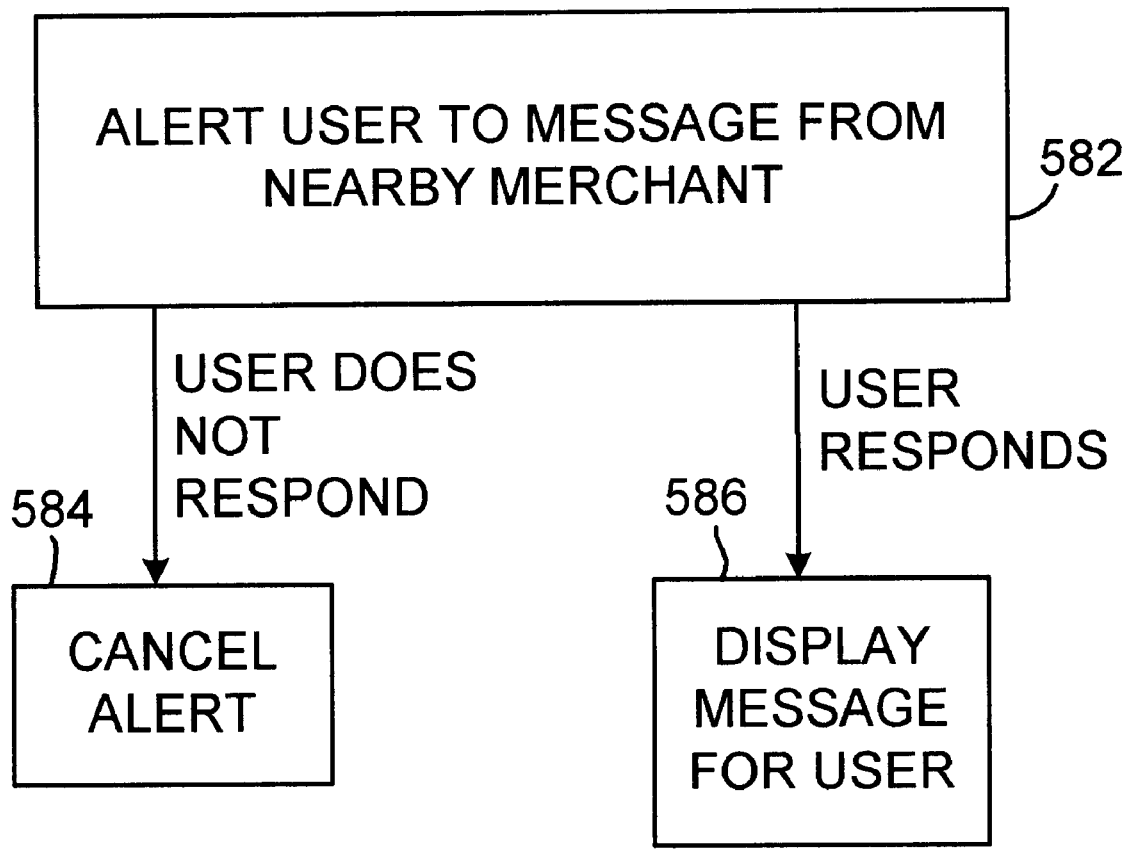
FIG. 53 is a flow chart of illustrative steps involved in alerting a user to a message from a nearby merchant in accordance with the present invention.
Figure 54:
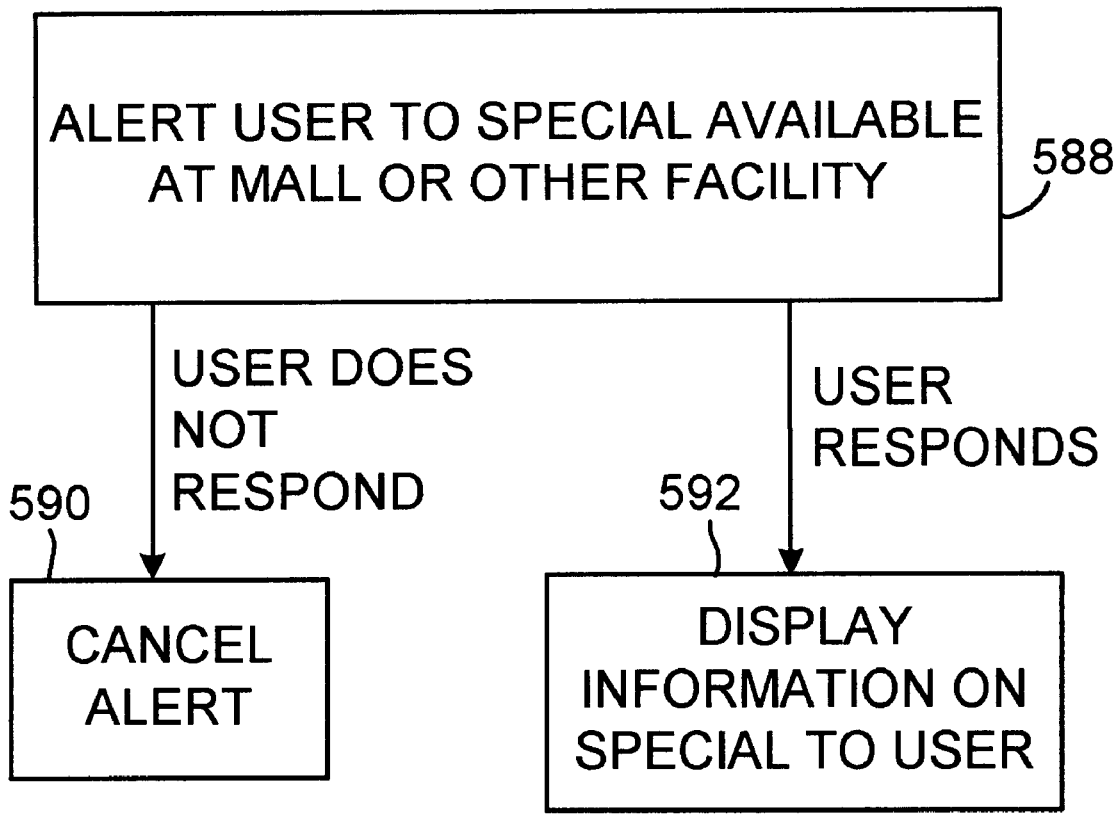
FIG. 54 is a flow chart of illustrative steps involved in alerting a user to a special in accordance with the present invention.

To avoid collecting too many proximity messages, handheld computing device 12 may automatically delete or cancel messages to which the user does not respond. Illustrative steps involved in using handheld computing device 12 to handle proximity messages are shown in FIG. 53. At step 582, handheld computing device 12 may alert the user to the receipt or availability of a proximity message from a nearby merchant. The user may be alerted using any suitable approach. For example, handheld computing device 12 may generate an audio tone, may vibrate, may display an on-screen logo or other indicator, may present the message on the full display screen of handheld computing device 12, etc. If the user responds to the alert, the contents of the message may be displayed at step 586. If the user does not respond within a certain time period (e.g., 5 minutes, 1 hour, 1 day, or any other suitable time period), handheld computing device 12 may delete or cancel the alert at step 584. For example, if the alert is an on-screen icon, the icon may be removed from the screen at step 584.

Messages regarding specials are an illustrative example of a type of message that may be distributed to all handheld computing devices in the mall. Messages may be distributed in this way by sending messages to all handheld computing devices that are in local RF wireless communications with the local wireless transmitter/receivers in the mall. For example, if the local wireless transmitter/receivers from a wireless local area network, all handheld computing devices that are in communication with the network may receive such messages.

To avoid collecting too many specials or other such messages that are distributed on a mall-wide basis, handheld computing device 12 may automatically delete or cancel messages of this type to which the user does not respond. Illustrative steps involved in using handheld computing device 12 to handle messages such as messages regarding specials are shown in FIG. 55. At step 588, handheld computing device 12 may alert the user to the receipt or availability of a message for a special. The user may be alerted using any suitable approach. For example, handheld computing device 12 may generate an audio tone, may vibrate, may display an on-screen logo or other indicator, may present the message on the full display screen of handheld computing device 12, etc. If the user responds to the alert, the contents of the message may be displayed at step 592. If the user does not respond within a certain time period (e.g., 5 minutes, 1 hour, 1 day, or any other suitable time period), handheld computing device 12 may delete or cancel the alert at step 590. For example, if the alert is an on-screen icon, the icon may be removed from the screen at step 590.

An illustrative message 594 that handheld computing device 12 may display for a special is shown in FIG. 55. Special message 594 is passive.

An illustrative interactive message 596 that handheld computing device 12 may display for a special is shown in FIG. 56. Message 596 contains on-screen options 598 and 600. The user may select option 598 if the user desires to accept the discount offer contained in message 596. If the user is not certain about accepting the offer, the user may select remind me later option 600 to request a reminder message at a later time.

Figure 57:
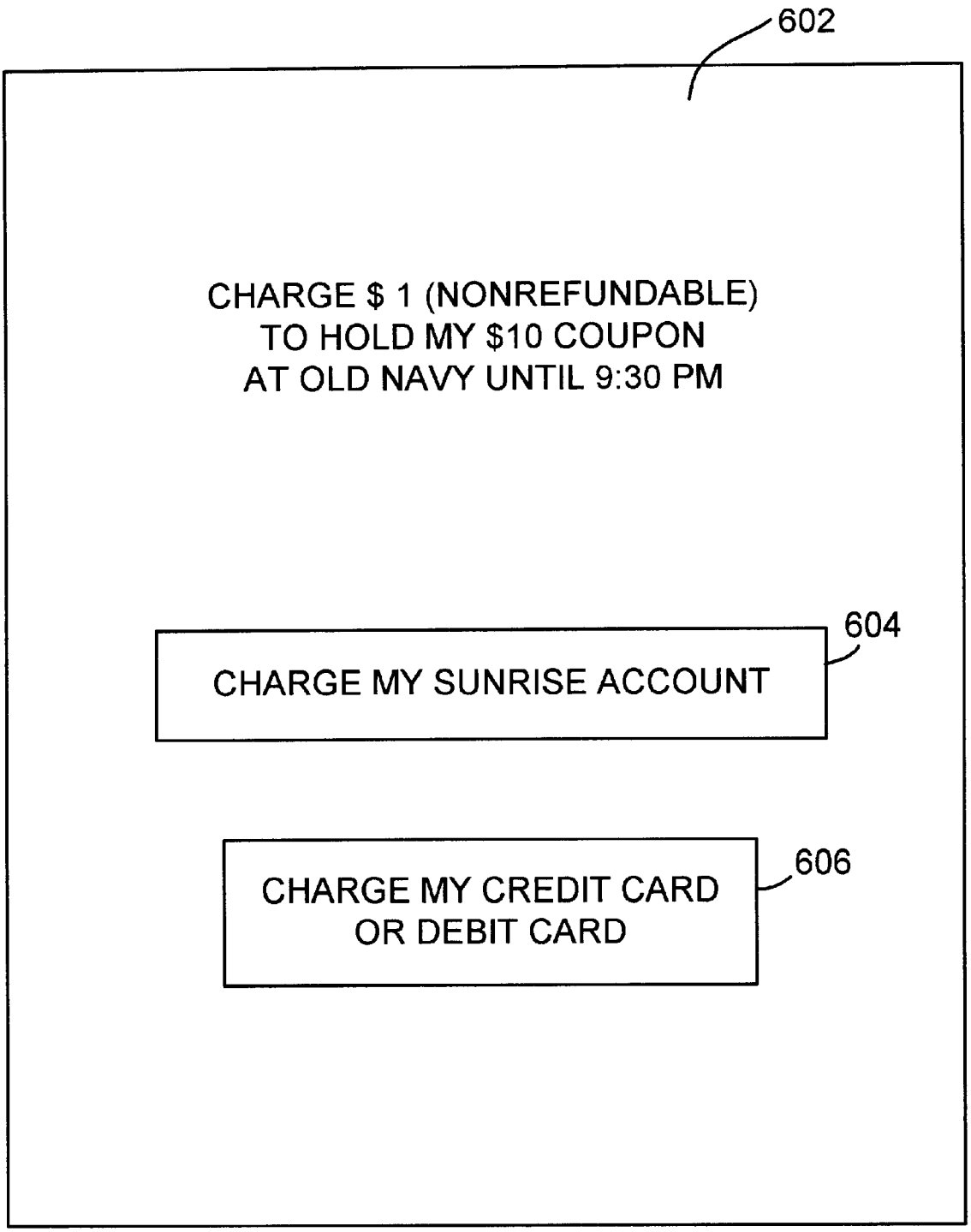
FIG. 57 shows a screen that may be displayed when a user responds to an interactive special of the type shown in FIG. 56.

If the user selects an option such as option 598 of FIG. 56, handheld computing device 12 may display a screen such as screen 602 of FIG. 57. In the example of FIG. 56, the user must make a financial commitment to reserve the discount being offered. An option such as option 604 may be used to charge the user's mall account or other such account. An option such as option 606 may be used to charge the user's credit card or debit card account. If information for financial transactions has been provided to handheld computing device 12, handheld computing device 12 may use this information responding to the request of screen 602. If handheld computing device 12 does not have access to the user's financial information, handheld computing device 12 may display on-screen options that allow the user to supply this information.

Figure 58:
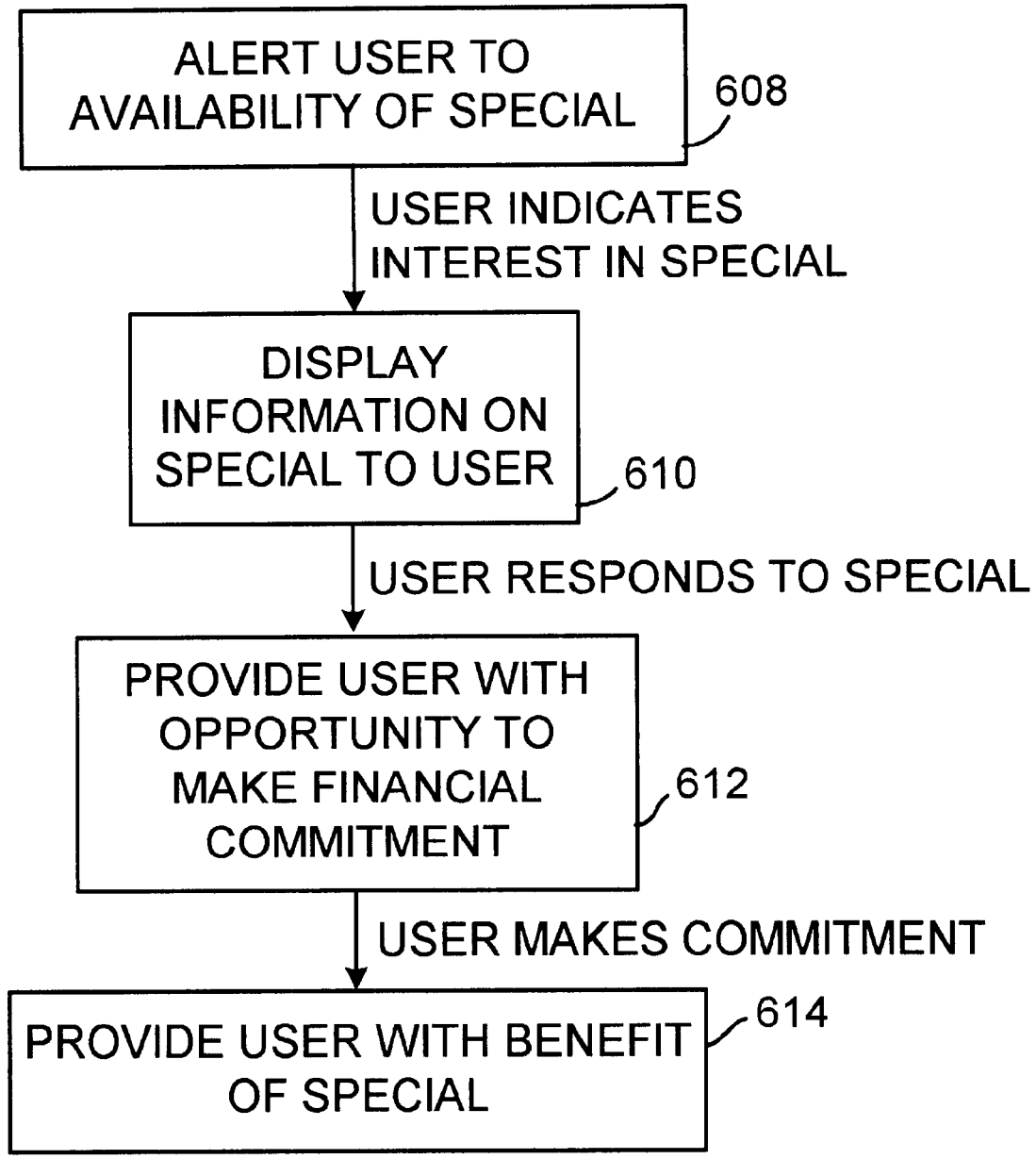
FIG. 58 is a flow chart of illustrative steps involved in providing specials in accordance with the present invention.

Illustrative steps involved in using handheld computing device 12 to handle specials and other such messages are shown in FIG. 58. At step 608, handheld computing device 12 may alert the user to the availability of a special. Any suitable alert may be used. If the user indicates an interest in the special, handheld computing device 12 may display information on the special to the user at step 610. If the user responds to the special, handheld computing device 12 may provide the user with on-screen options that allow the user to make a financial commitment to reserve the discount or other benefit offered in the special, if such a financial commitment was sought in the special. If desired, a reminder may be set regarding the special. The reminder may be made at the same time the financial commitment is made or separately.

If the user makes the commitment or if no commitment was required, handheld computing device 12 may provide the user with the benefit of the special at step 614. For example, if the user is to make a purchase, handheld computing device 12 may be used to facilitate the redemption of the offer. If handheld computing device 12 is used to consummate the purchase transaction (e.g., over a local wireless link), handheld computing device 12 may both pay for the purchase and provide the merchant with information that helps to verify the user's eligibility for the discount or other offer.

If the user is paying by credit card or cash, handheld computing device may be used to display information to the merchant that verifies the user's eligibility for the discount. For example, handheld computing device 12 may be used to display a code to the merchant or may be used to display a code to the user that the user provides to the merchant.

Figure 59:
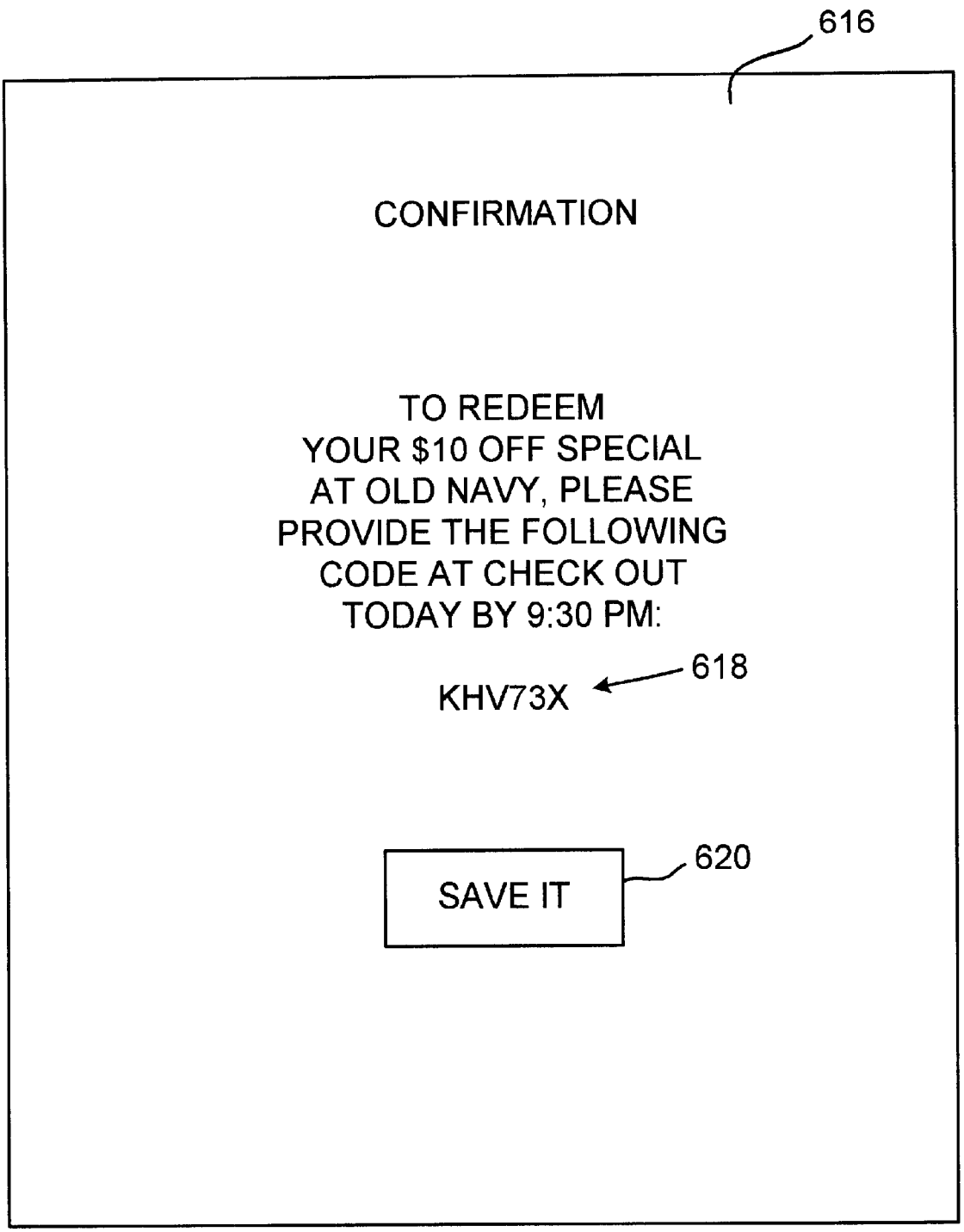
FIG. 59 shows an illustrative confirmation screen for a special that may be displayed in accordance with the present invention.

As shown by the illustrative confirmation screen 616 of FIG. 59, the user may be provided with information 618 on such a code at the time of committing to the special. An option 620 may be provided that allows the user to save the code in handheld computing device 12 until needed during a purchase transaction. These are merely illustrative examples, any suitable way for ensuring that the user obtains the benefit of the special may be used if desired.

Figure 60:
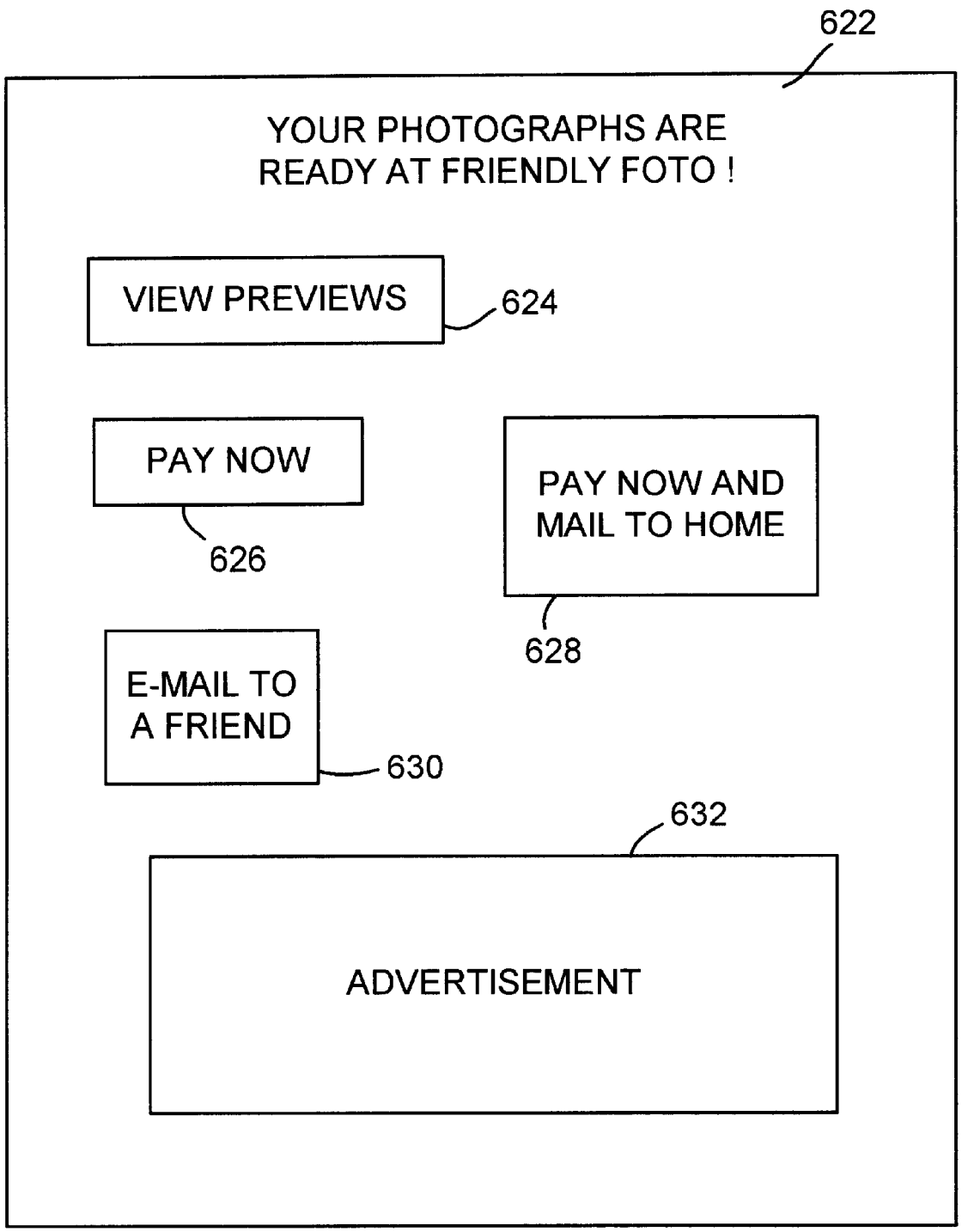
FIG. 60 shows a screen containing an illustrative notification that may be displayed in accordance with the present invention.

Notification messages may be sent to occupants of the mall over local wireless communications links or remote wireless communications links. An illustrative notification message 622 that may be displayed for a user by handheld computing device 12 is shown in FIG. 60. Message 622 may be generated manually or automatically using equipment at a photo lab. Automatic notifications may be triggered by the photo processing equipment used to process the user's photographs. Such equipment may send the notification to the user or may direct a computer at the photo lab to send the notification to the user.

The content of message 622 may inform the user that the user's photographs are ready. The photo lab may digitize the user's photographs and place them on a server. If the user selects view previews option 624, handheld computing device 12 may access the server and may display the images.

Option 626 may be selected if the user wants to pay for the services of the photo lab in advance. This may allow a family member or friend to pick up the user's photographs.

When option 626 is selected, handheld computing device may provide on-screen options that allow the user to electronically convey appropriate financial information (e.g., credit card information or the like) to the photo lab over a local or remote wireless link.

If the user selects option 628, handheld computing device 12 may display options that allow the user to pay for the photographs and arrange for their shipment to the user's home. If the user selects e-mail to a friend option 630, handheld computing device 12 may display on-screen options that allow the user to e-mail the photographs to a friend. If desired, the photographs may be e-mailed directly from the photo lab to the friend.

Message 622 may contain promotional material such as advertisement 632.

Another example of a notification that may be sent to handheld computing device 12 in a mall is a message relating to a child in child care. Such a message may be sent to handheld computing device 12 over a remote or local wireless communications link. An illustrative notification message of this type is shown in FIG. 61. As shown, the message may contain an advertisement. The advertisement may be added automatically by the equipment at the child care center that is used to send the notification.

Figure 62:
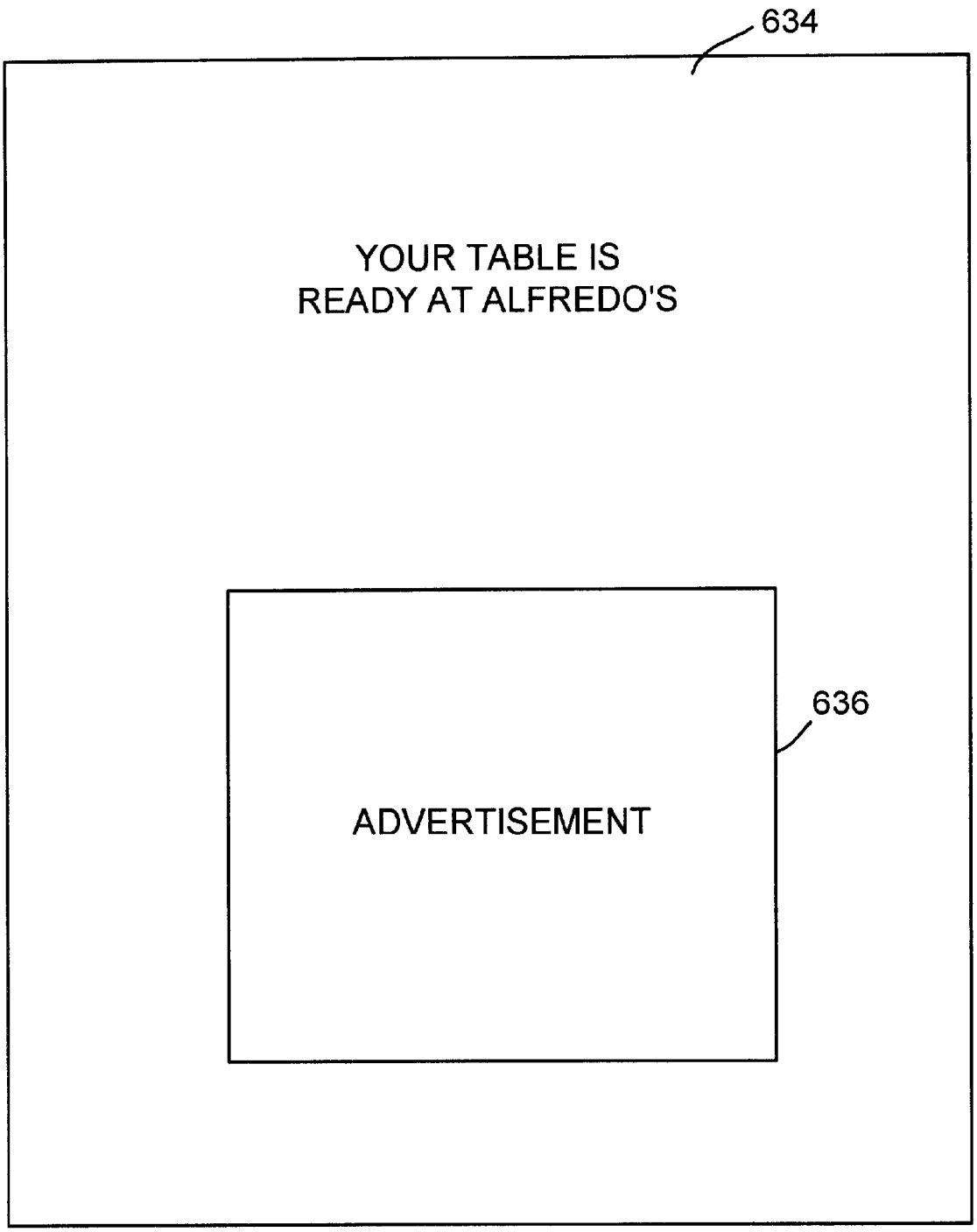
FIG. 62 shows a screen containing another illustrative notification that may be displayed in accordance with the present invention.

If desired, a notification message such as notification message 634 of FIG. 62 may be sent to the user to inform the user that the user's table is ready at a restaurant. This allows users with handheld computing devices to leave the immediate area of a restaurant while waiting to be seated. Such notification messages may be sent manually by personnel operating a computer at the restaurant or may be sent by a computer at the restaurant automatically when, for example, a predetermined time limit has passed (e.g., 15 minutes). Notification messages such as notification message 634 may contain a menu or other such information or may contain an advertisement such as advertisement 636. The advertisement may be automatically added to the notification message by the computer at the restaurant that is used to sent message 634. Message 634 may be transmitted to handheld computing device 12 using a remote wireless link or a local wireless link.

Figure 63:
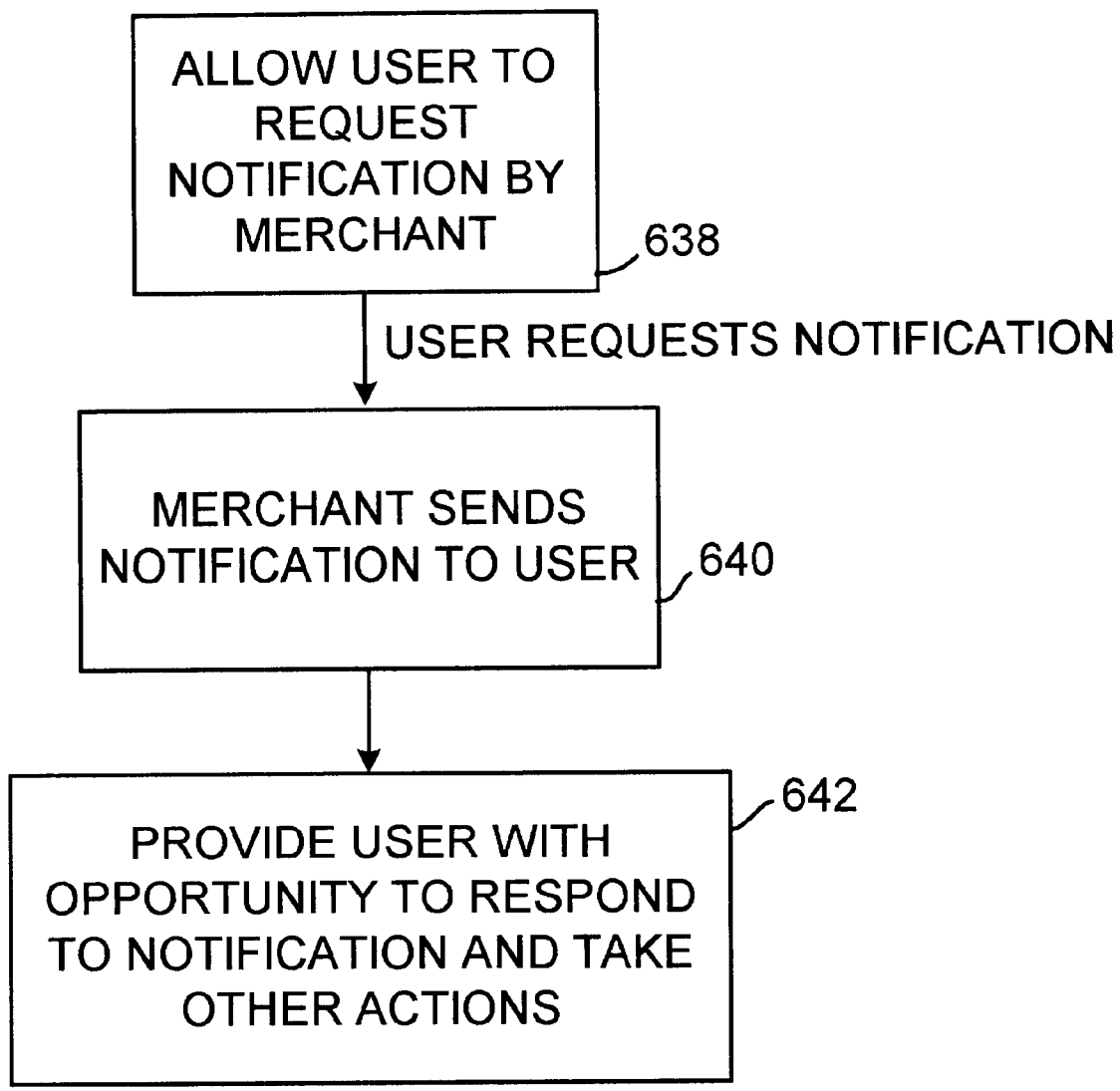
FIG. 63 is a flow chart of illustrative steps involved in providing notifications in accordance with the present invention.

Illustrative steps involved in sending notification messages to handheld computing devices in a mall or other such establishment are shown in FIG. 63. At step 638, the user is allowed to request a notification from the merchant. If the user requests notification, a computer at the merchant or the like may send the notification to handheld computing equipment 12 over a local or remote wireless link at step 640. Notifications may be sent when clothes are ready at the cleaner, when the user's car is ready (e.g., if the oil was being changed), when prepared-to-order food is ready, when film is ready to be picked up, etc. Such notifications may be sent automatically by tying the transmission of the notifications to the state of certain equipment at the merchant. For example, a photo processor may electronically indicate when it is finished processing the user's film. At the cleaners, an order may be processed using an electronic tracking system. A notification may be sent to the user when the tracking system indicates that the user's clothes are ready. These are merely illustrative examples. Notifications may be sent to the user based on any suitable criteria.

The notification may contain interactive material such as interactive advertisements or the like. The interactive material may be automatically incorporated into the notification messages by the computer at the merchant that is used to send the messages. At step 642, the notification message may be displayed for the user by handheld computing device 12. The user may respond to the interactive material (e.g., by selecting an on-screen option displayed by handheld computing device 12) or may take other appropriate action at step 642.

Reminder messages may be sent to the user at handheld computing device 12. An illustrative reminder 644 is shown in FIG. 64. Reminder 664 may have been sent because the user responded affirmatively to an option such as option 598 of FIG. 56. This may direct a computer at the merchant to automatically generate a reminder message for the user such as reminder 664. Reminder messages may be sent to handheld computing device 12 using a local or remote wireless link.

Figure 65:
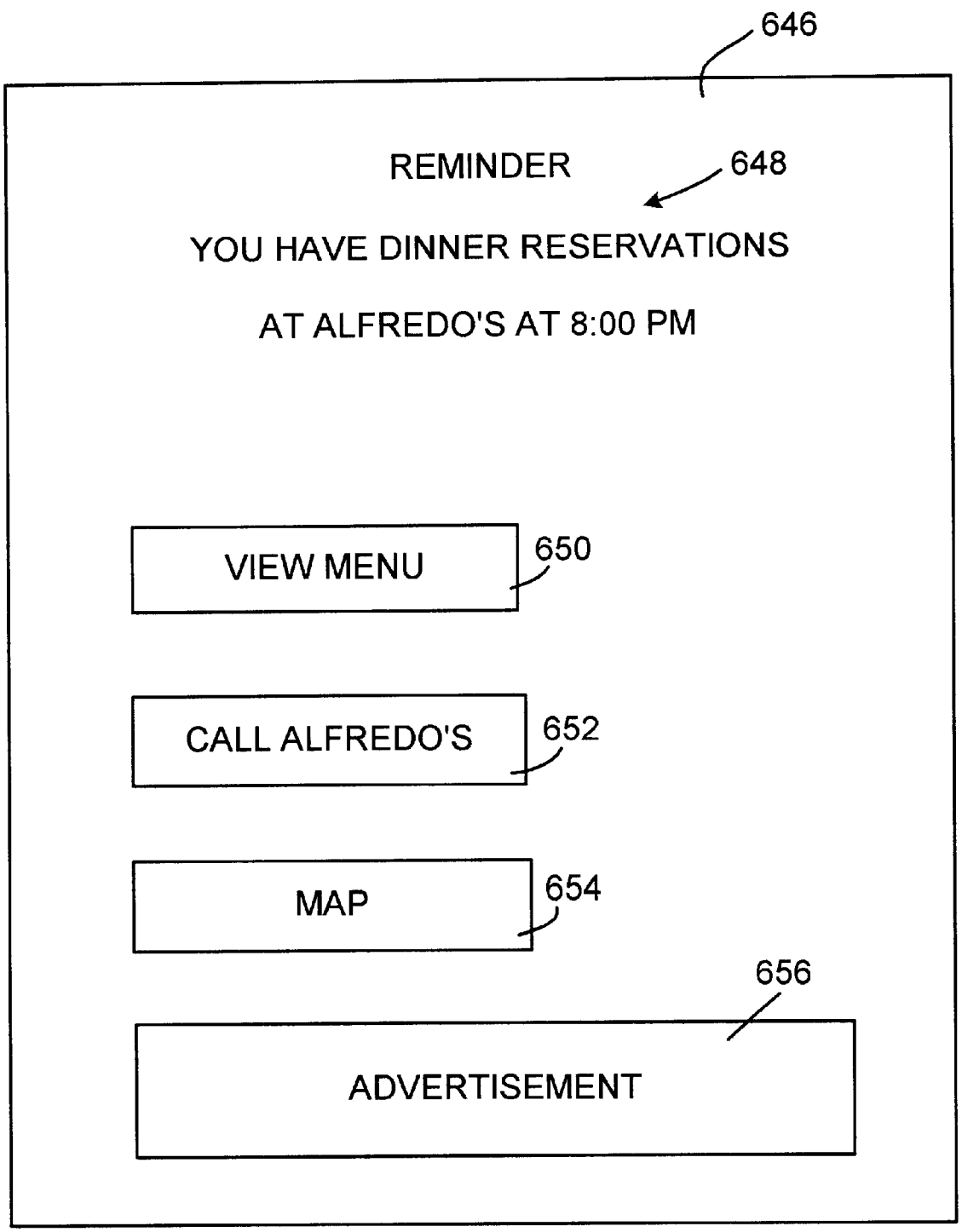
FIG. 65 shows a screen containing another illustrative reminder that may be displayed in accordance with the present invention.

Another illustrative reminder message is shown in FIG. 65. Reminder 646 may contain information 648 informing the user that the user has dinner reservations at a restaurant. View menu option 650 may provide the user with an opportunity to view a menu with handheld computing device 12. Option 652 may allow the user to automatically place a telephone call to the restaurant using handheld computing device 12. If the user selects option 654, a mall map and directions to the restaurant may be provided. Reminder message 646 may also contain advertisements such as advertisement 656.

Figure 66:
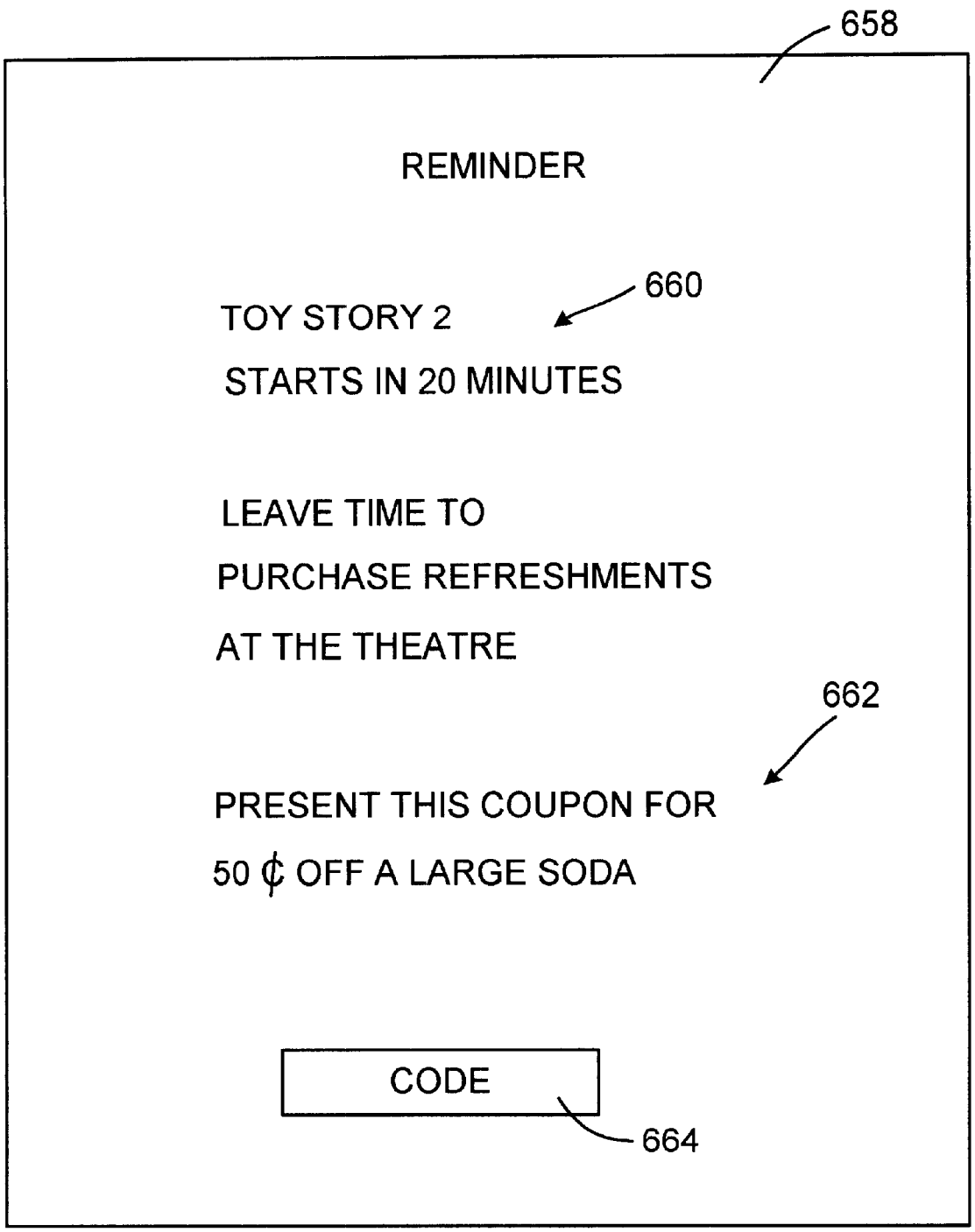
FIG. 66 shows a screen containing another illustrative reminder that may be displayed in accordance with the present invention.

FIG. 66 shows how a reminder message 658 may be displayed for a movie. Reminder 658 may contain information 660 on the scheduled show time of a movie for which the user purchased a ticket. The movie theater may have a computer that automatically sends reminder messages to all users who purchase tickets electronically using handheld computing devices. Reminder messages may be sent, for example, 20 minutes before the time at which the movie is to be shown. During the purchase transaction, the addresses of these users may be collected by the computer. Users may also supply information on the communications addresses of handheld computing devices 12 manually. These are merely illustrative examples. Information on the communications addresses of the users who have purchased tickets for a given movie and who wish to be reminded of the movie may be gathered using any suitable approach.

Reminder message 658 may contain promotional material such as coupon 662. The user may redeem coupon 662 by presenting code 664 to personnel or equipment at the theater. Handheld computing device 12 can also verify the user's authorization to receive the discount by transmitting a signal wirelessly (e.g., over a local wireless link). If desired, this may be done when handheld computing device 12 is used to make a purchase. Reminder messages 658 and other such messages may also contain promotional material that is unrelated to the merchant sending the reminder. For example, a reminder for a movie may contain an advertisement for an automobile.

Figure 67:
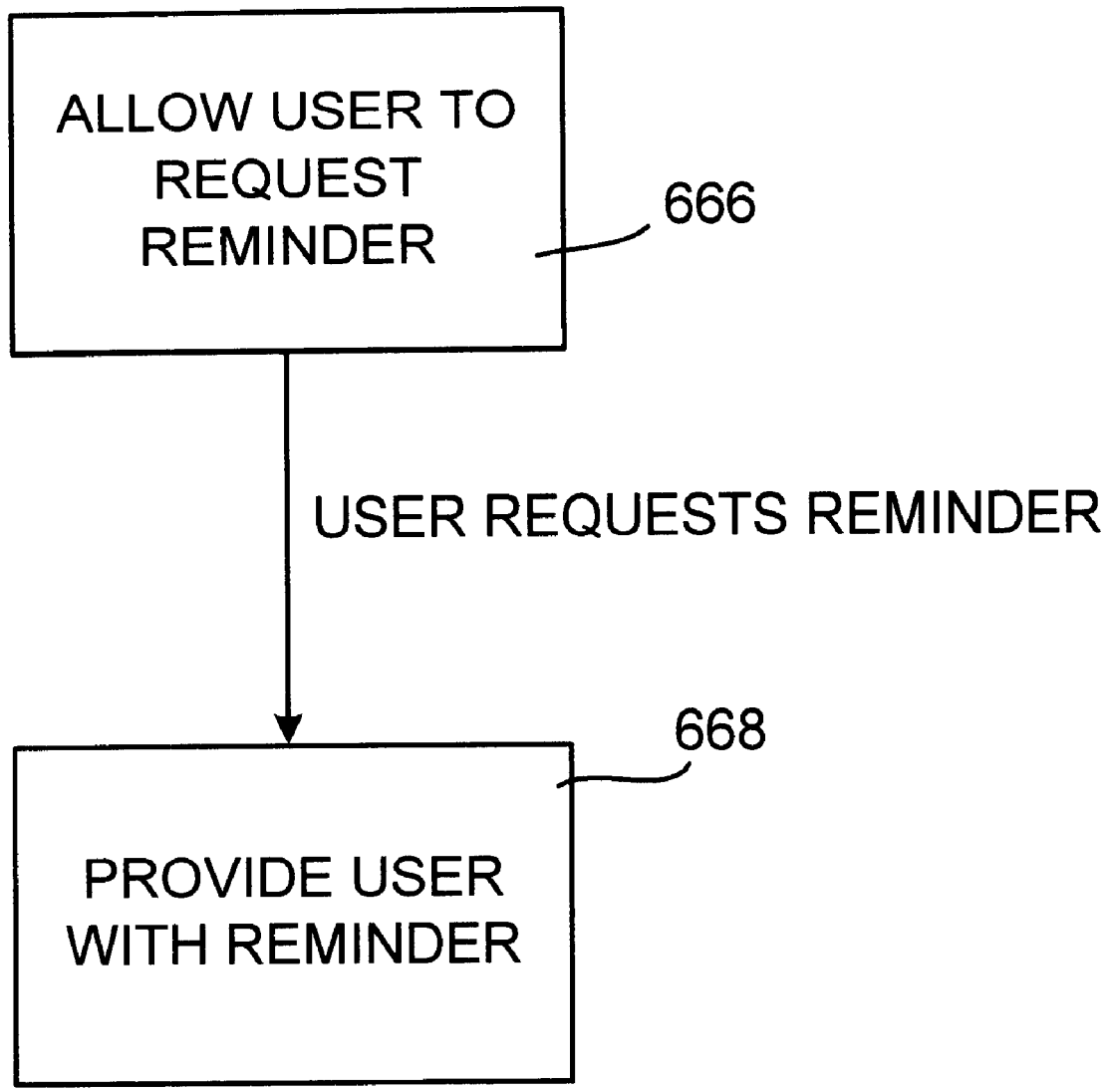
FIG. 67 is a flow chart of illustrative steps involved in providing reminders in accordance with the present invention.

Illustrative steps involved in providing users at handheld computing devices with reminders are shown in FIG. 67. At step 666, the user may request a reminder or a reminder may be automatically set. At step 668, a computer at the merchant or a computer at a third-party service or any other suitable entity may be used to send the reminder to handheld computing equipment 12. The reminder may be sent over a local or remote wireless link.

Figure 68:
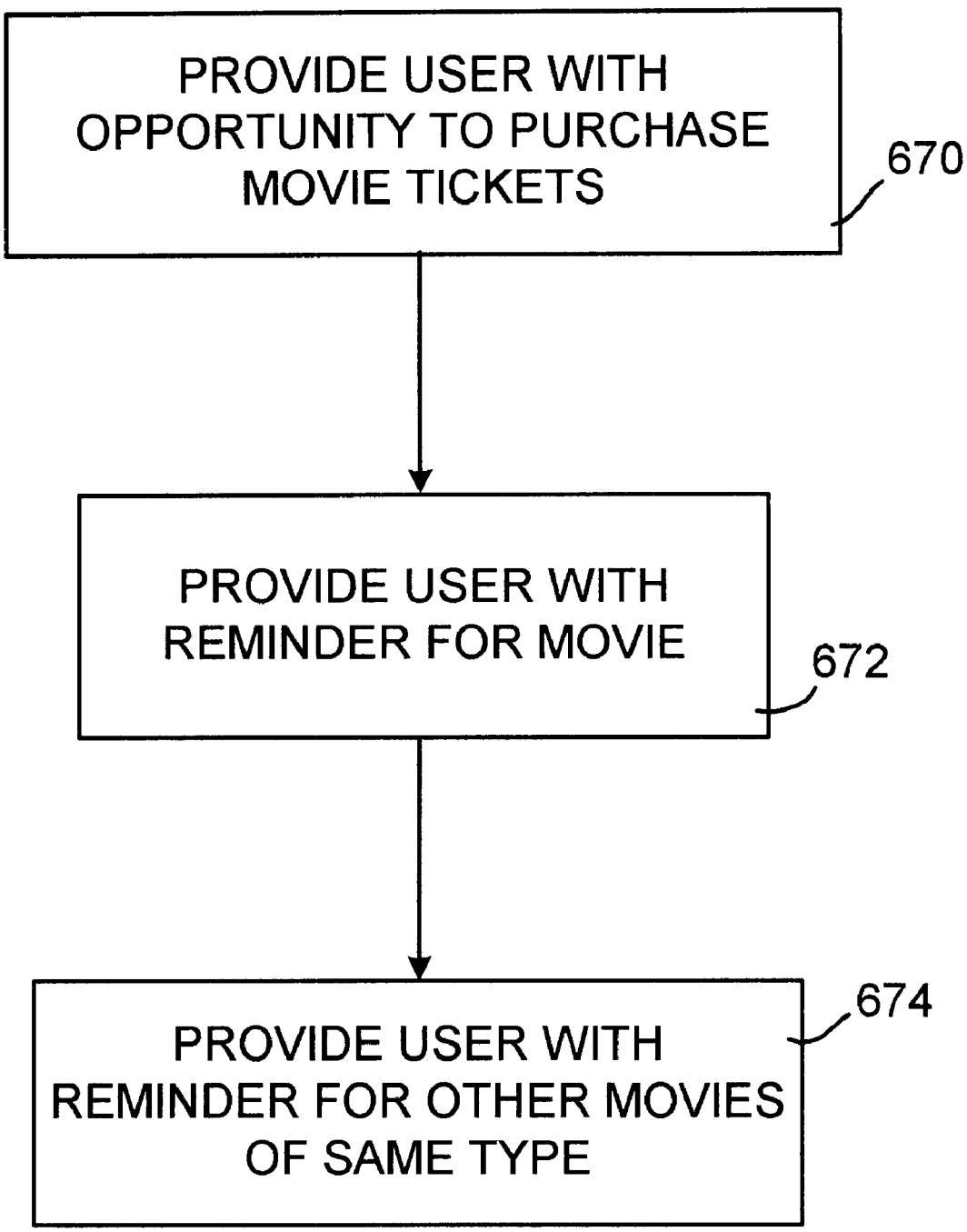
FIG. 68 is a flow chart of illustrative steps involved in providing reminders using local and remote communications paths in accordance with the present invention.

Illustrative steps in providing the user with a movie reminder are shown in FIG. 68. At step 670, the user is provided with an opportunity to purchase movie tickets. The tickets may be purchased with cash or may be purchased using an account card or membership card. If desired, the tickets may be purchased wirelessly using handheld computing device 12. The communications address of the handheld computing device may be collected manually or automatically (e.g., from handheld computing device 12). These addresses may be provided to a computer associated with the movie theater.

At step 672, the computer at the movie theater may provide the user with a reminder for the movie over a local wireless or remote wireless communications path.

At step 674, the movie theater computer may be used to provide the user with a reminder for movies of the same type. The reminder of step 674 may be provided to the same communications address that was used for the reminder of step 672 or may use a home e-mail address if available. The reminder of step 674 may be provided using a local or remote wireless link.

Handheld computing device 12 may allow the user to filter out incoming messages based on various criteria. Different types of messages may be assigned different criteria if desired. For example, the user may establish one set of filtering criteria for e-mail messages and another set of filtering criteria for proximity messages or advertisements. The user may also be allowed to establish the types of actions that are to be taken when messages of different types are received.

An illustrative screen 676 that handheld computing device 12 may display for the user when the user is adjusting such settings is shown in FIG. 69. As shown in FIG. 69, the user has configured handheld computing device 12 to alert the user by vibrations when a proximity message is received. Such messages are only to be retained for five minutes unless the user saves them. Local messages, notifications, reminders, and e-mail have different alert and retention time settings.

If desired, messages may be filtered by content. For example, the user may direct handheld computing device 12 to only present proximity advertisements when they do not relate to food. An illustrative screen 678 that handheld computing device 12 may display when the user has selected certain blocking criteria is shown in FIG. 70.

Figure 71:
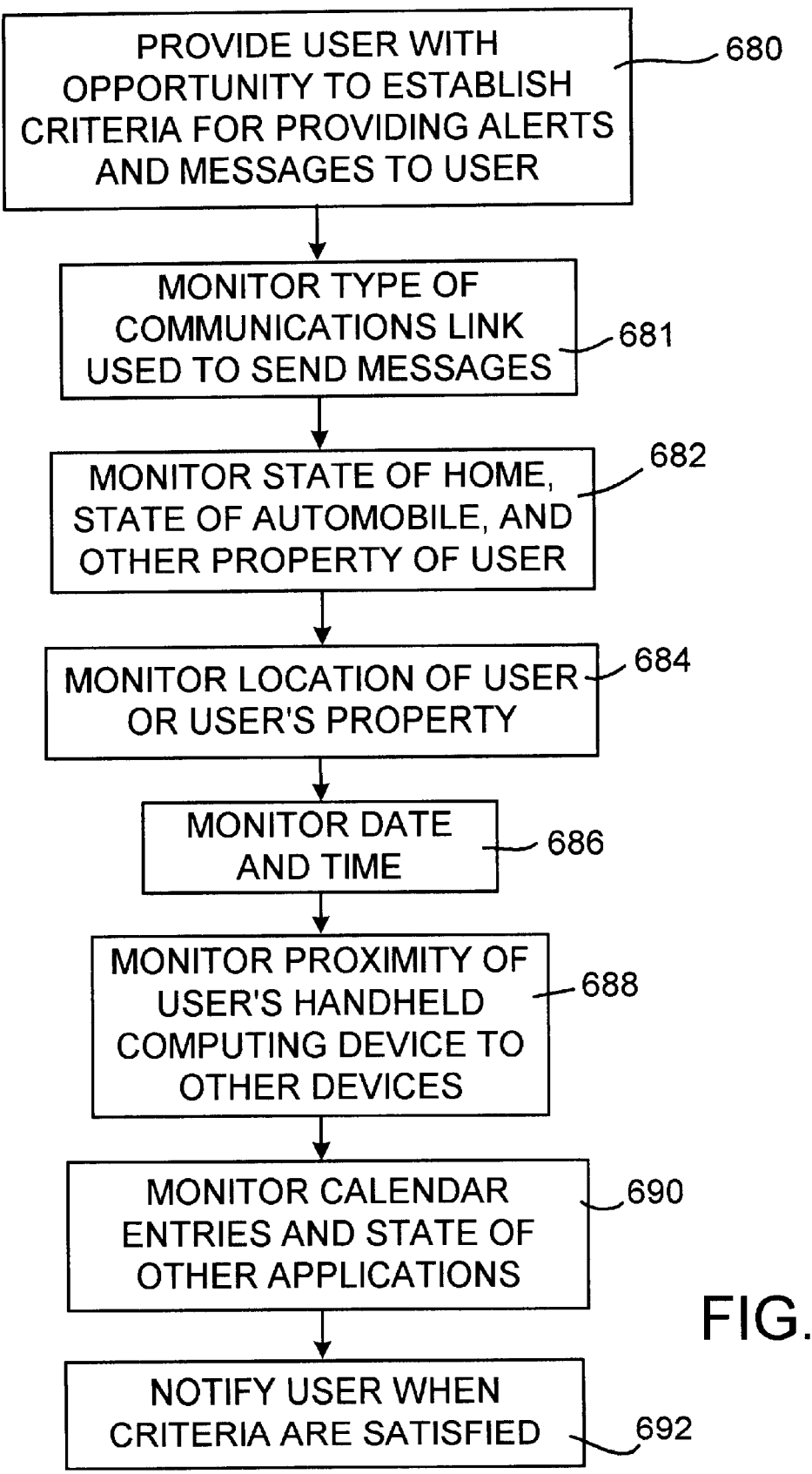
FIG. 71 is a flow chart of illustrative steps involved in providing notifications to the user based on various events in accordance with the present invention.

Messages may be sent to handheld computing device 12 and alerts or notifications presented to the user with handheld computing device 12 based on many different criteria. Illustrative steps involved in providing such information to the user with handheld computing device 12 are shown in FIG. 71.

At step 680, the user may be provided with an opportunity to establish the criteria for reminders and other notifications. For example, the user may select the desired criteria using a web site, using handheld computing device 12, or using any other suitable technique.

At step 681, handheld computing device may be used to monitor the type of communications link that is used to send messages to the user. For example, the handheld computing device may determine which incoming messages are received over a local wireless link (e.g., a link with a wireless local area network or the like) and may determine which incoming messages are received over a remote wireless link. This may allow the user to block all local messages (for example), or to be reminded when each remote messages is received, etc.

At step 682, the state of the user's home may be monitored using a security system or other in-home appliances and devices. The state of the user's automobile and other property of the user may also be monitored. An automobile personal computer or other in-vehicle electronics may be used to monitor the user's automobile. The user may be provided with notifications if the user's house is broken into or if the temperature of the house is too low. The user's stove may be monitored to ensure that is has been turned off.

At step 684, the location of the user or the user's property may be monitored. Location may be monitored, for example, using GPS techniques or any other suitable techniques. This may allow the user to set a reminder with handheld computing device 12 that is presented to the user when the user arrives in particular city or when the user arrives in a particular train station or an airport, etc.

The time and date may be monitored at step 686 using, for example, handheld computing device 12. A reminder for a meeting may be set based on a particular time and date. Criteria may be combined. For example, the user may set up a reminder that is triggered when the user is in Philadelphia and it is a Saturday.

At step 688, the proximity of the user's handheld computing device 12 with respect to other handheld computing devices may be monitored. This allows reminders to be set based on criteria such as "remind me about X when I meet with Mr. Smith." When handheld computing device 12 determines that Mr. Smith's handheld computing device has come into range, the user may be provided with the reminder. Handheld computing device 12 may monitor for other handheld computing devices in the vicinity using local wireless communications.

Handheld computing device 12 may support a calendar application. At step 690, the content of entries in the calendar application may be monitored. This allows the user to be reminded when, for example, Mr. Smith and Mr. Jones and the user are scheduled for the same meeting. The state of applications running on handheld computing device 12 other than the calendar application may also be monitored by handheld computing device 12 if desired.

At step 692, the user may be notified when the criteria established in step 680 have been met. Any suitable combination of these criteria may be used to trigger an alert or a presentation of a message, etc. Moreover, any other suitable criteria may be used to determine when to notify the user of an incoming message and when to filter out such a message. As an example, messages may be filtered based on whether they are commercial or non-commercial, whether they are personal or public, whether or not they contain a financial offer or discount or the like, etc. Handheld computing device 12 may use any of these techniques in determining what information to present to the user.

Restrictions may be imposed on the use of handheld computing device 12 for financial transactions such as transactions involving the wireless purchase of products or services. This may allow, for example, a parent to control or monitor the shopping behavior of a child who is using handheld computing device 12. As an example, information on the location of handheld computing device 12 and information on each financial transaction made using handheld computing device 12 may be supplied to a service provider over a local or remote wireless link. The parent may access the service provider using a web interface or the like to view a report on the status of handheld computing device 12.

Figure 72:
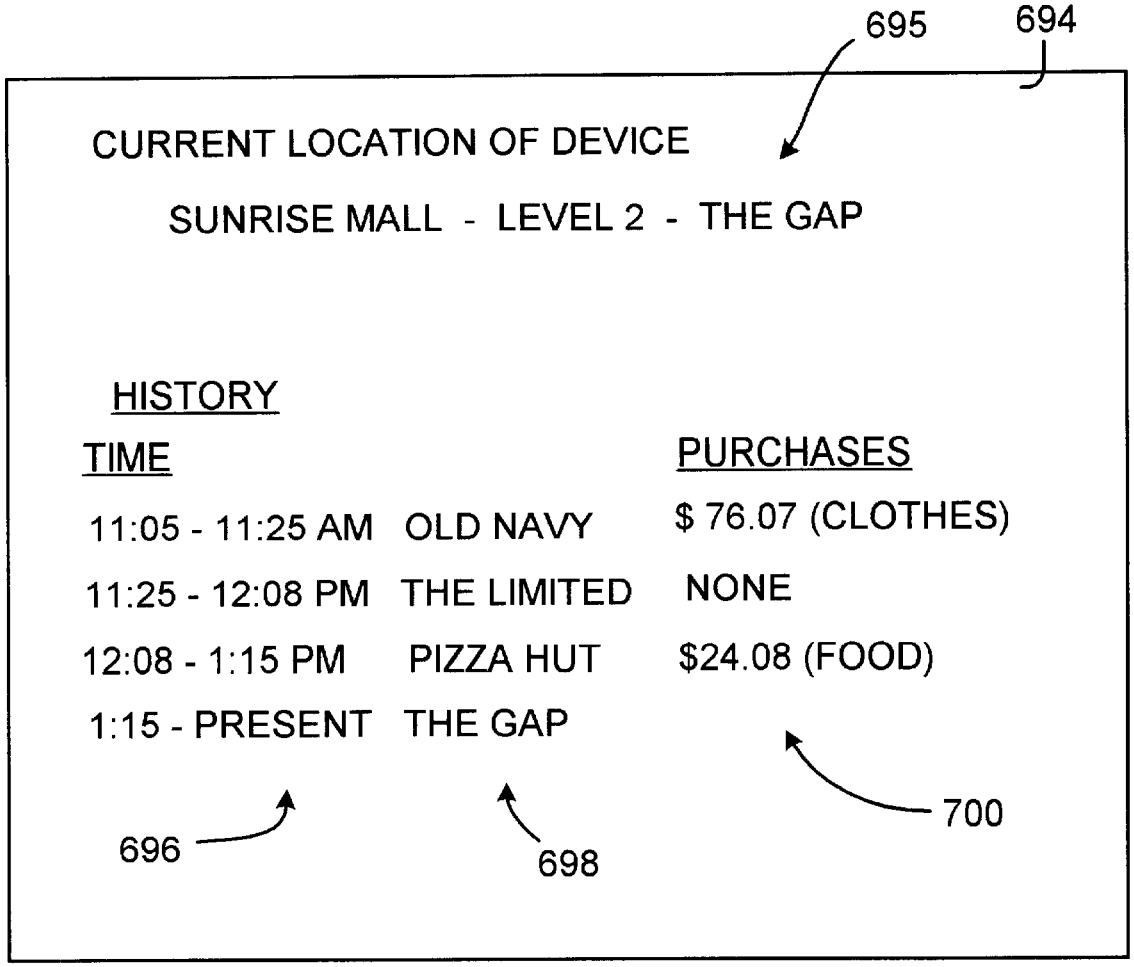
FIG. 72 shows an illustrative screen that may be displayed for the user when the user desires to track the location and use of a handheld computing device in accordance with the present invention.

An illustrative status report screen that may be provided to the parent over the Internet or the like is shown in FIG. 72. Screen 694 may contain information 695 on the current location of handheld computing device 12. Location information may be obtained, for example, from a wireless local area network in a mall by determining which local wireless transmitter/receivers in the network are being used to communicate with handheld computing device 12. Location information may also be determined using GPS information or information from cellular telephone terrestrial base stations or the like.

Screen 694 may also contain information on the historical locations 698 of handheld computing device 12 at various times 696. For each time and location entry on screen 694, information 700 may be provided on the amount and nature of each corresponding financial transaction. Information on the amount of the transaction may be provided to the service provider by the handheld computing device 12 or by the merchant with which the handheld computing device interacted during the financial transaction. The nature of the transaction (e.g., food, cloths, etc.) may be determined from information provided by the merchant during the transaction or may be determined from a database that correlates various store locations with corresponding product categories. Such a database may be maintained by the service provider or other suitable entity.

Figure 73:
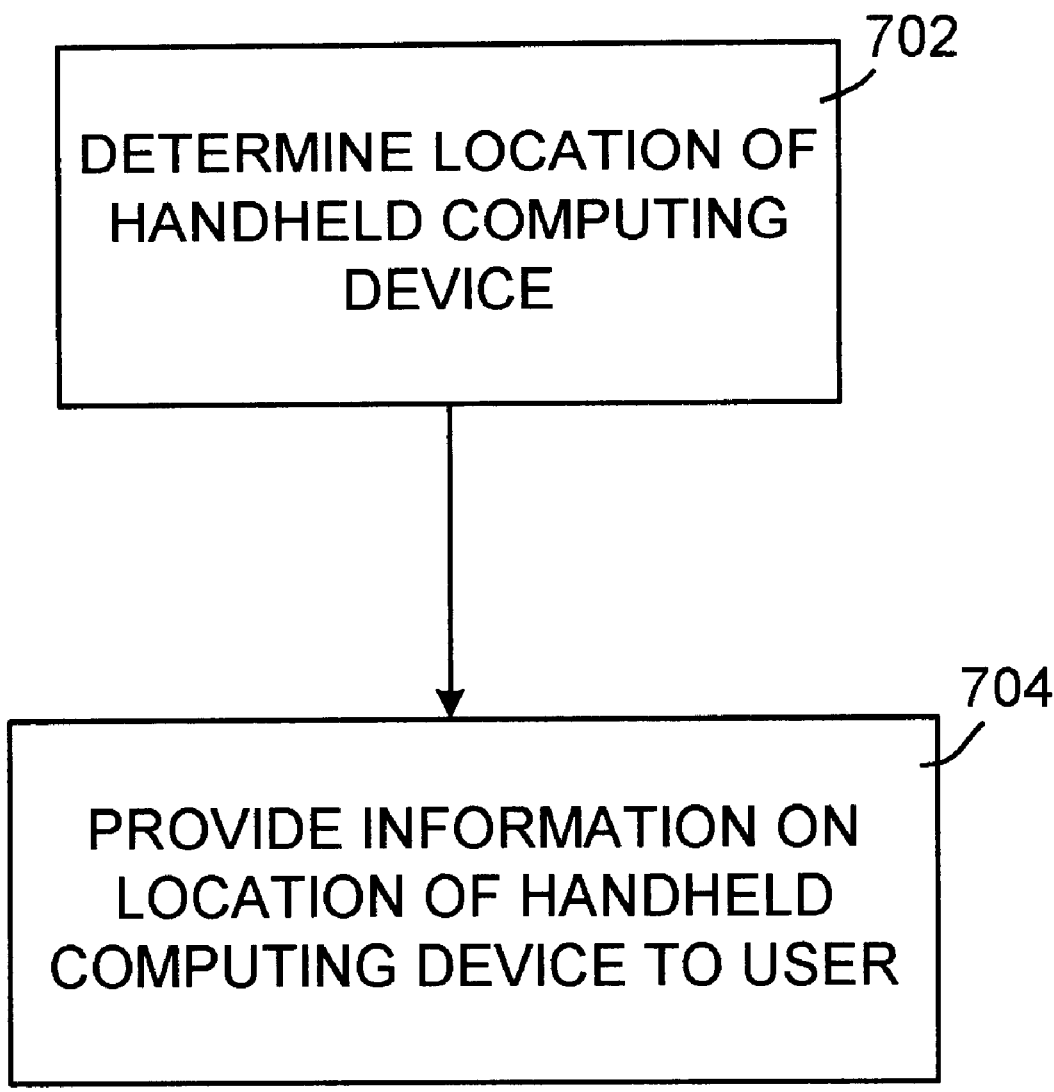
FIG. 73 is a flow chart of illustrative steps involved in monitoring the location of a handheld computing device in accordance with the present invention.

Illustrative steps involved in monitoring the location of handheld computing device 12 are shown in FIG. 73. At step 702, the location of handheld computing device 12 may be monitored using, for example, information on which local transmitter/receivers are in use in local wireless communications between the mall or other establishment and the handheld computing device, GPS information, etc.

At step 704, information on the location of handheld computing device 12 may be provided to the user or may be otherwise used to provide services to the user.

Figure 74:
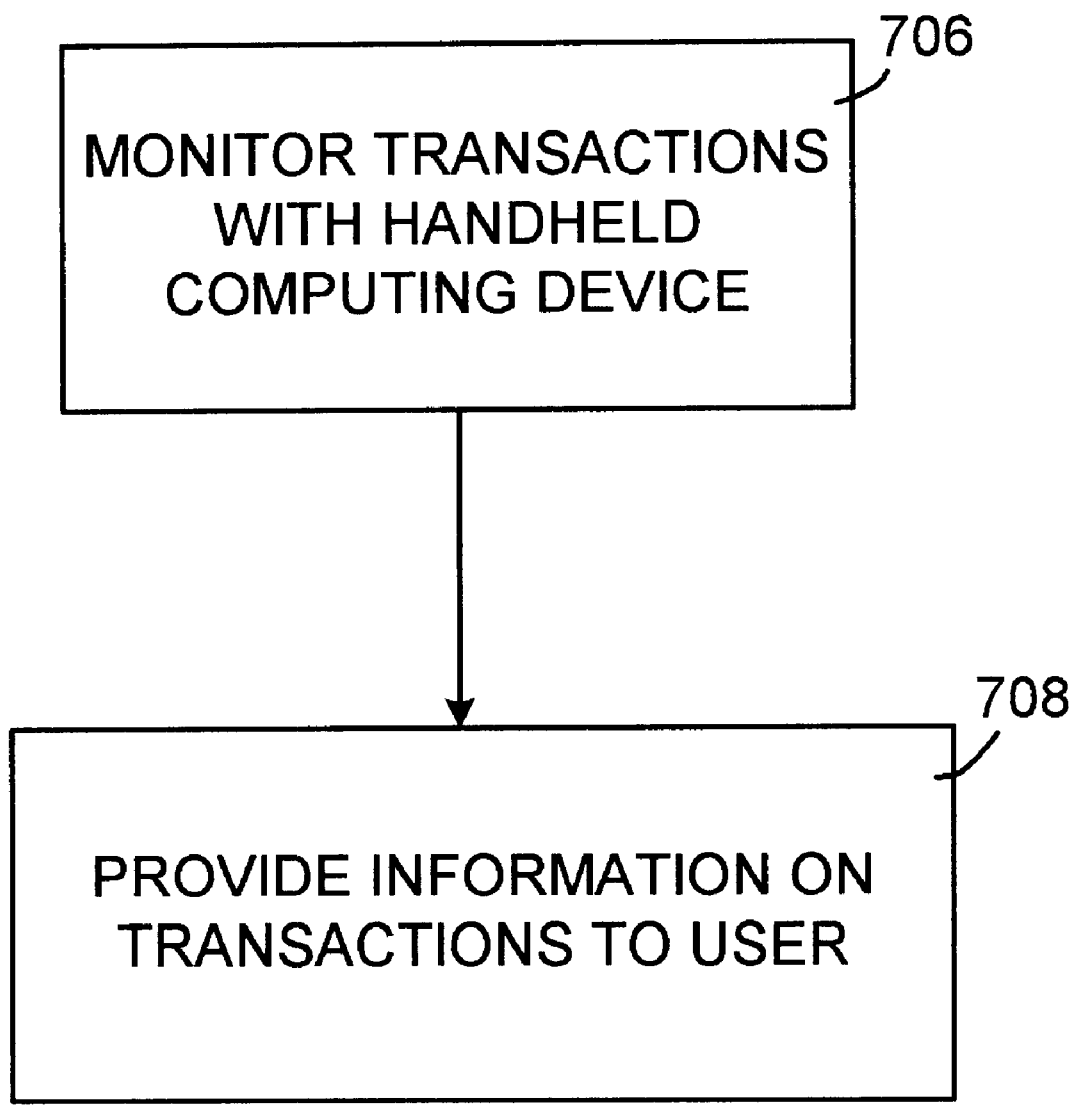
FIG. 74 is a flow chart of illustrative steps involved in monitoring financial transactions made with a handheld computing device in accordance with the present invention.

Illustrative steps involved in monitoring financial transactions with handheld computing device 12 are shown in FIG. 74.

At step 706, handheld computing device 12 may be used to monitor which financial transactions are made. For example, wireless purchase transactions over local wireless links may be monitored. At step 708, information on the transactions may be provided to the user.

The user may use handheld computing device 12 or a personal computer or any other suitable device to establish spending limits for financial transactions involving handheld computing device 12. An illustrative screen 710 (e.g., on a computer screen, a handheld computing device, in-home electronic device, etc.) that may be displayed for the user when the user is establishing financial limits for handheld computing device 12 is shown in FIG. 75. Screen 710 may contain information 712 on the type of transaction for which a limit is being set and information 714 on the corresponding limit. If desired, certain types of transactions may be prohibited entirely (e.g., toy purchases in the example of FIG. 75) and other types of transactions may have monetary limits. Another type of limit that may be established involves the dates 716 on which the handheld computing device 12 may be used for financial transactions. The user may be provided with on-screen options that allow the user to establish particular times and dates when handheld computing device 12 may and may not be used.

Figure 76:
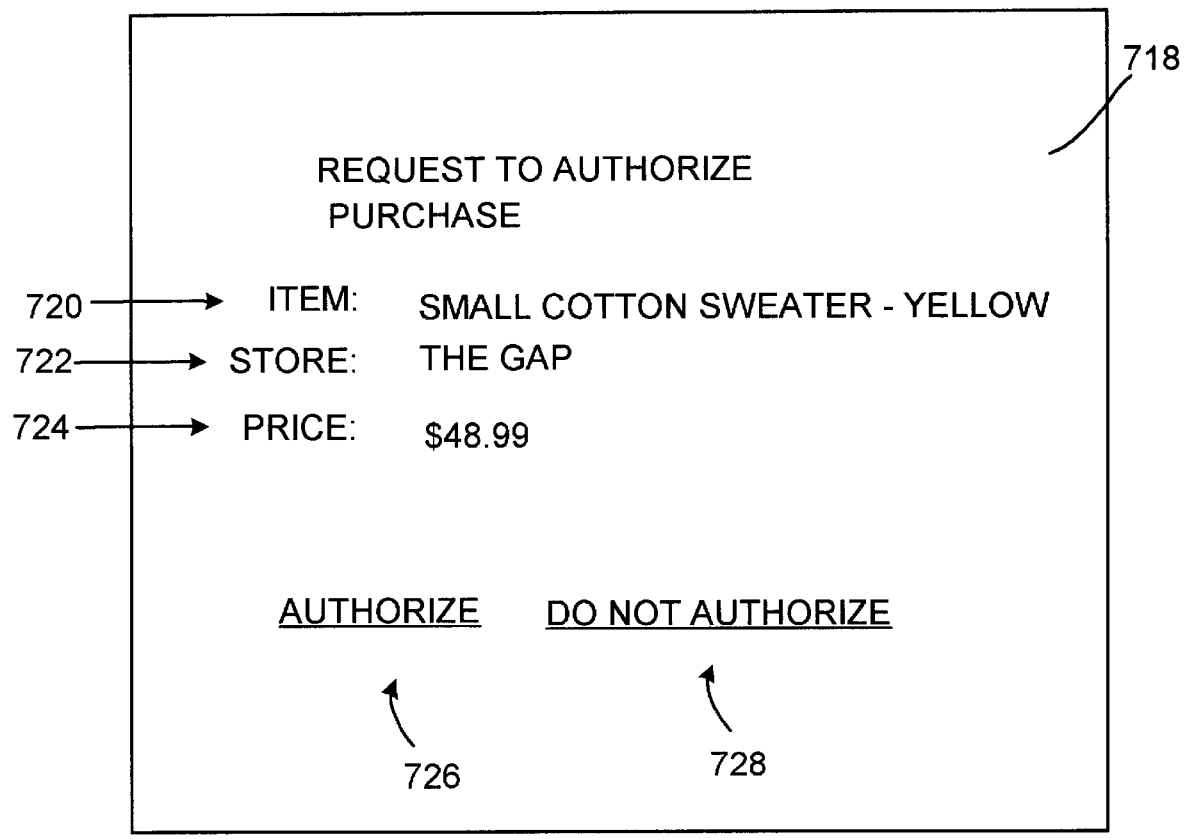
FIG. 76 shows an illustrative screen that may be displayed for the user when the user is controlling the financial transactions of a handheld computing device in accordance with the present invention.

Purchase transactions being made with handheld computing device 12 may be authorized remotely. An illustrative screen 718 that may be presented to the user (e.g., at a personal computer, handheld computing device, in-home electronic device, etc.) when a request is being made by a child or other individual who wishes to have a purchase transaction authorized is shown in FIG. 76. Screen 718 may contain information 720 on the item that is to be purchase, information 722 on the store at which the item is to be purchased, and information 724 on the price of the purchase. This information may be gathered, for example, by a cash register computer or other financial transaction equipment in the store in which the child is attempting to purchase the product. The information may be provided to the service provider and communicated to the user over a communications network (e.g., the Internet).

Screen 718 may contain options such as options 726 and 728 that allow the parent or other user to authorize or decline to authorize the purchase. Information on whether or not the purchase has been authorized may be transmitted to the service provider and merchant over any suitable communications link.

Figure 77:
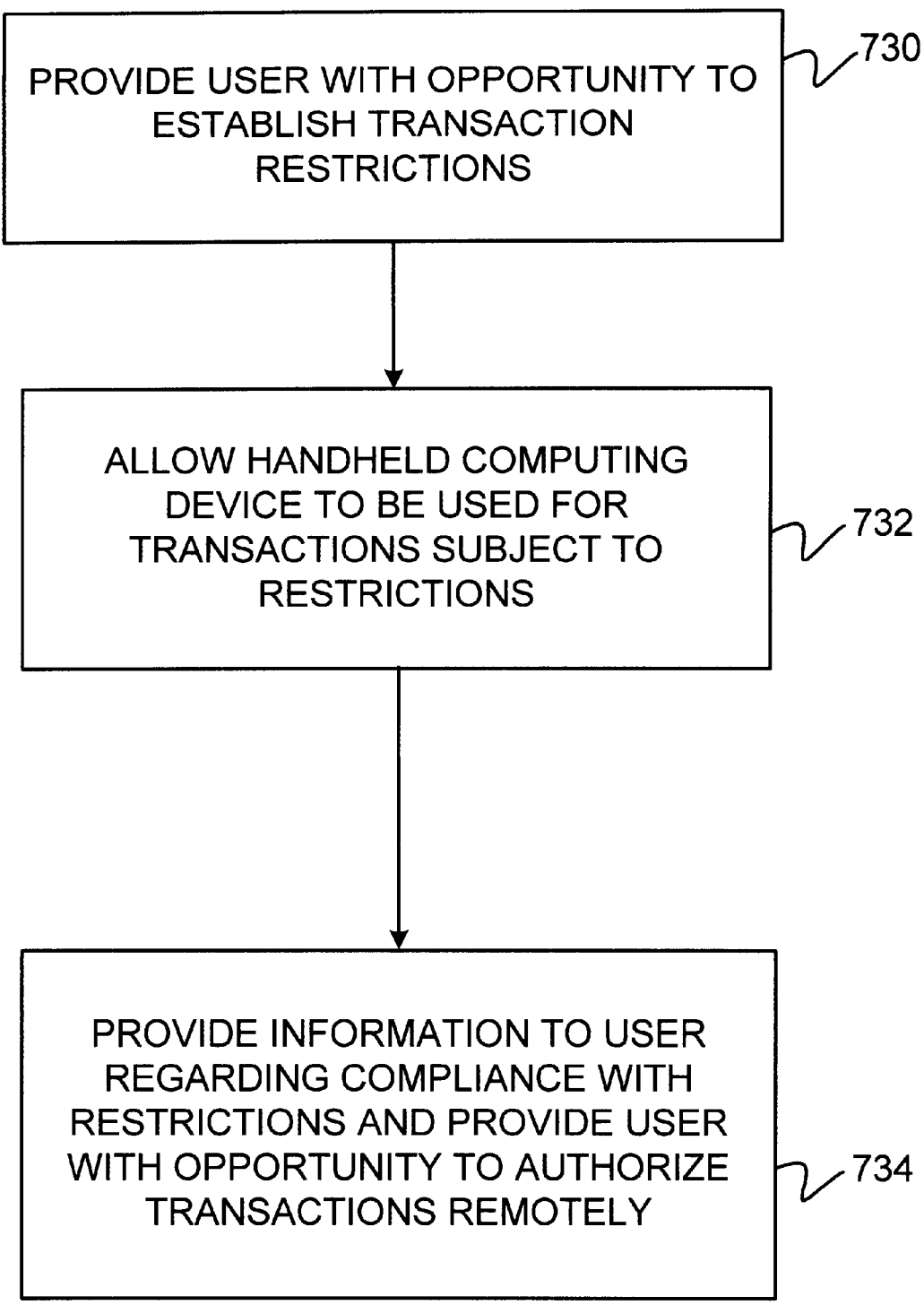
FIG. 77 is a flow chart of illustrative steps involved in restricting financial transactions made with a handheld computing device in accordance with the present invention.

Illustrative steps involved in the remote authorization of purchasing transactions involving handheld computing device 12 are shown in FIG. 77.

At step 730, the user may be provided with on-screen options that allow the user to establish transaction restrictions. At step 732, handheld computing device 12 may be used for financial transactions subject to the transaction restrictions. At step 734, information may be provided to the user (e.g., over the Internet or the like) regarding compliance with the transaction restrictions. The user may also be provided with on-screen options or other opportunities to authorize transactions remotely.

The user's actions may be monitored to determine the user's interests. For example, if the user frequently responds to clothing advertisements displayed by handheld computing device 12, it may be concluded that the user is interested in clothing. This information may be used to present additional clothing advertisements to the user with handheld computing device 12.

Figure 78:
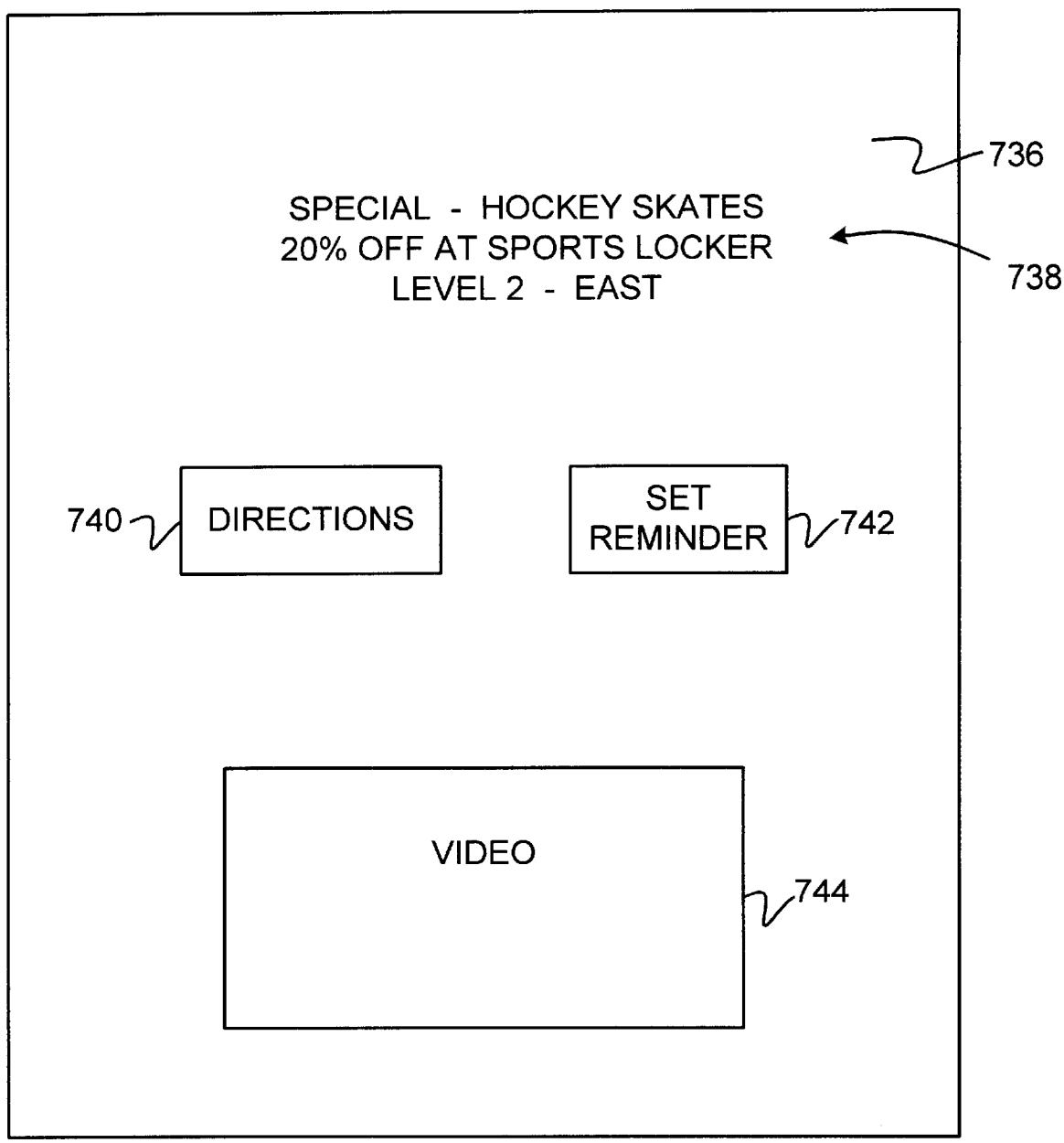
FIG. 78 shows an illustrative screen containing a targeted special in accordance with the present invention.

As another example, the user may have recently used handheld computing device 12 to view directory information on sports stores in a mall. This information may be used to present sports-related advertisements to the user with handheld computing device 12. An illustrative advertisement 736 that may be presented to a user who is interested in sports is shown in FIG. 78. Advertisement 736 may contain information 738 on a special offer at a sports store. If the user selects option 740, handheld computing device 12 may display directions to the sports store for the user. If the user selects set reminder option 742, a reminder may be set. The reminder may, for example, be presented to the user once every hour to remind the user that the sports store is having a sale. Advertisement 736 may contain video 744. Advertisement 736 may be provided to handheld computing device 12 using a remote or local wireless link or a wired link or other suitable communications path.

Figure 79:
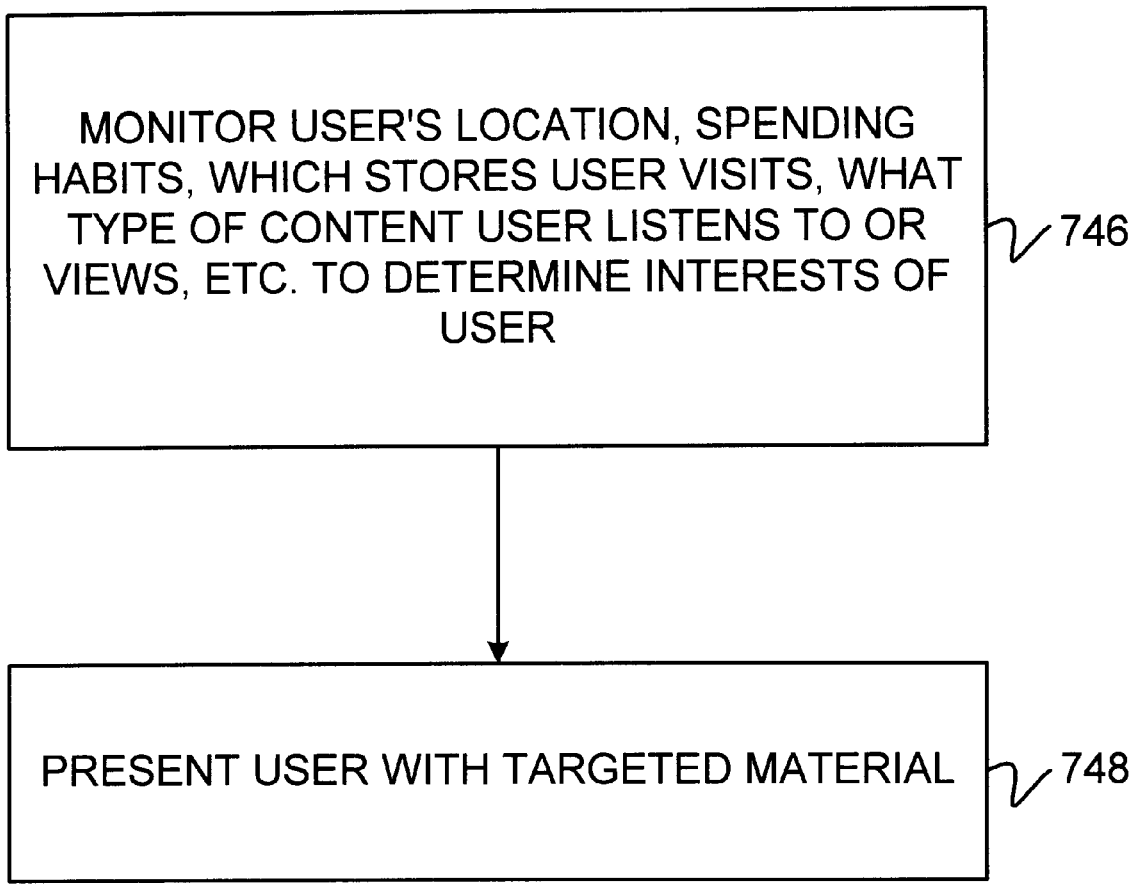
FIG. 79 is a flow chart of illustrative steps involved in displaying targeted advertising with a handheld computing device in accordance with the present invention.

Illustrative steps involved in monitoring a user's actions and in presenting targeted material to the user are shown in FIG. 79. At step 746, the user's activities may be monitored. For example, the user's shopping activities such as purchase transactions and other financial transactions may be monitored. Purchase and financial transactions that involve on-line purchasing and purchasing over local wireless links may be monitored. Information may be collected on which products the user scans with a bar code scanner or identifies with RFID techniques and what types of product literature the user requests. If the user interacts with interactive advertisements, information may be gathered on which types of advertisements the user interacts with most frequently. The user's location may be monitored. For example, if the user is frequently inside a particular store, it may be determined that the user is interested in the products of that store. If the user is often on the skating rink in a mall, it may be concluded that the user is interested in skating or sports. The user's interests may also be determined by analyzing which types of audio and video content the user accesses. These are merely illustrative examples. Any information that may be gathered using handheld computing device 12 or the Internet or any other source may be used if desired.

The user may be provided with an on-screen option on handheld computing device 12 that allows the user to block all or some of these information gathering functions.

At step 748, handheld computing device 12 may be used to present the user with targeted material. For example, targeted advertisements may be displayed. The targeted advertisements may be presented in proximity messages, messages concerning specials, notification messages, reminder messages, e-mail, or any other suitable types of messages that are provided to handheld computing device 12. Alerts that are presented to the user to indicate the availability of a message or other event may be targeted.

Information that is provided to the user over the Internet or other communications paths may also be targeted. Handheld computing device 12 may allow the user to browse the Internet over a wireless communications link. While browsing the Internet, advertisements may be presented to the user with handheld computing device 12. The advertisements may be targeted to the user based on the information gathered at step 746. The information gathered at step 746 may be provided to the server or other equipment that supplies the advertisements for the Internet content that the user is browsing for use in targeting Internet material to the user.

Information on the advertisements that the user has viewed and interacted with using handheld computing device 12 may be collected. This information may be used to promote products or services that compete with previously displayed advertisements. For example, if the user has interacted with advertisements for a particular clothing store, a competing clothing store may target advertisements to the user.

Figure 80:
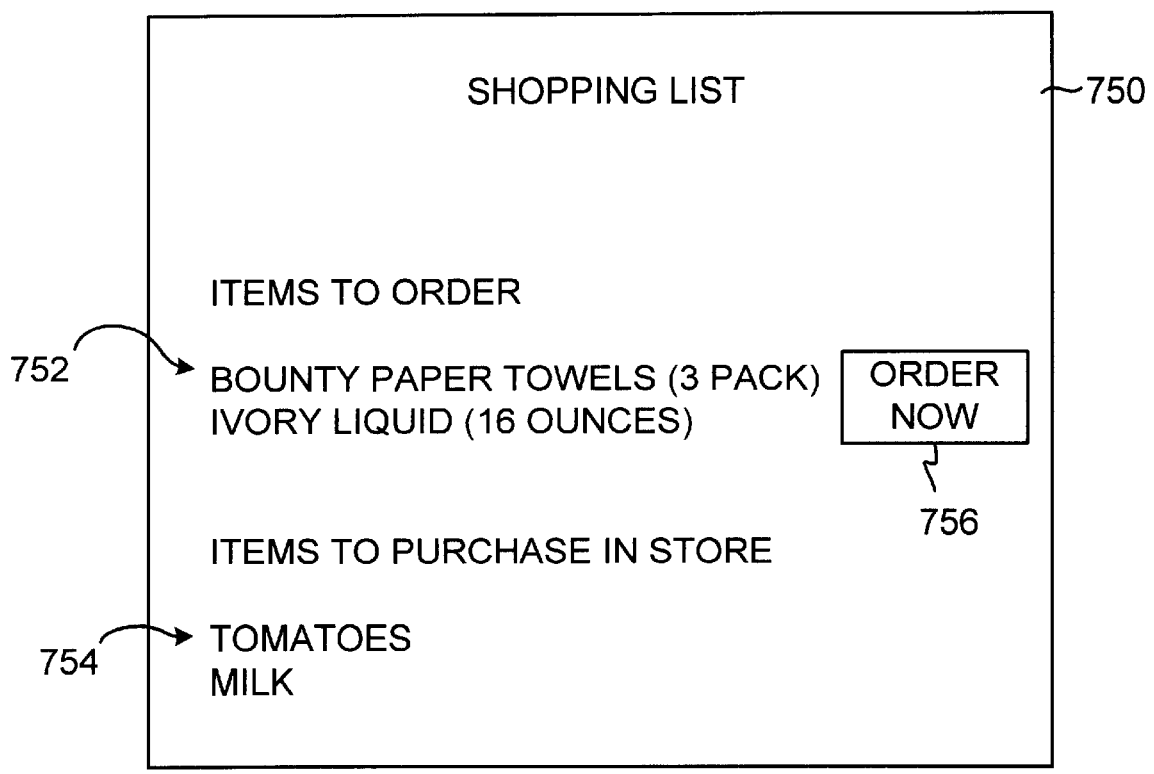
FIG. 80 shows an illustrative screen containing a shopping list in accordance with the present invention.

The user and other parties may create shopping lists and wish lists using a personal computer, an in-home electronic device (e.g., a refrigerator-mounted electronic device or countertop electronic device), a handheld computing device, an automobile personal computer, etc. Shopping list information may be stored locally at the device that was used to create the shopping list, on a remote computer (e.g., a remote server that may be accessed over the Internet), using any other suitable approach, or a combination of such approaches. An illustrative shopping list 750 that may be displayed on a personal computer or an in-home electronic device or the like is shown in FIG. 80. Shopping list 750 may include information 752 on items that may be ordered over an on-line connection (e.g., over the Internet). If the user selects order now option 756, for example, the personal computer or in-home electronic device may display on-screen options that allow the user to provide credit card information or account information and to complete the on-line order.

Shopping list 750 may also include information 754 on items that the user intends to pick up or purchase in a grocery store. This information may be stored locally, on a remote server, on a computer associated with or located at the store, etc. The user may access information 752 and information 754 when shopping in the store. If desired, handheld computing device 12 may only display in-store shopping list information such as information 754 when the user is in the store.

Figure 81:
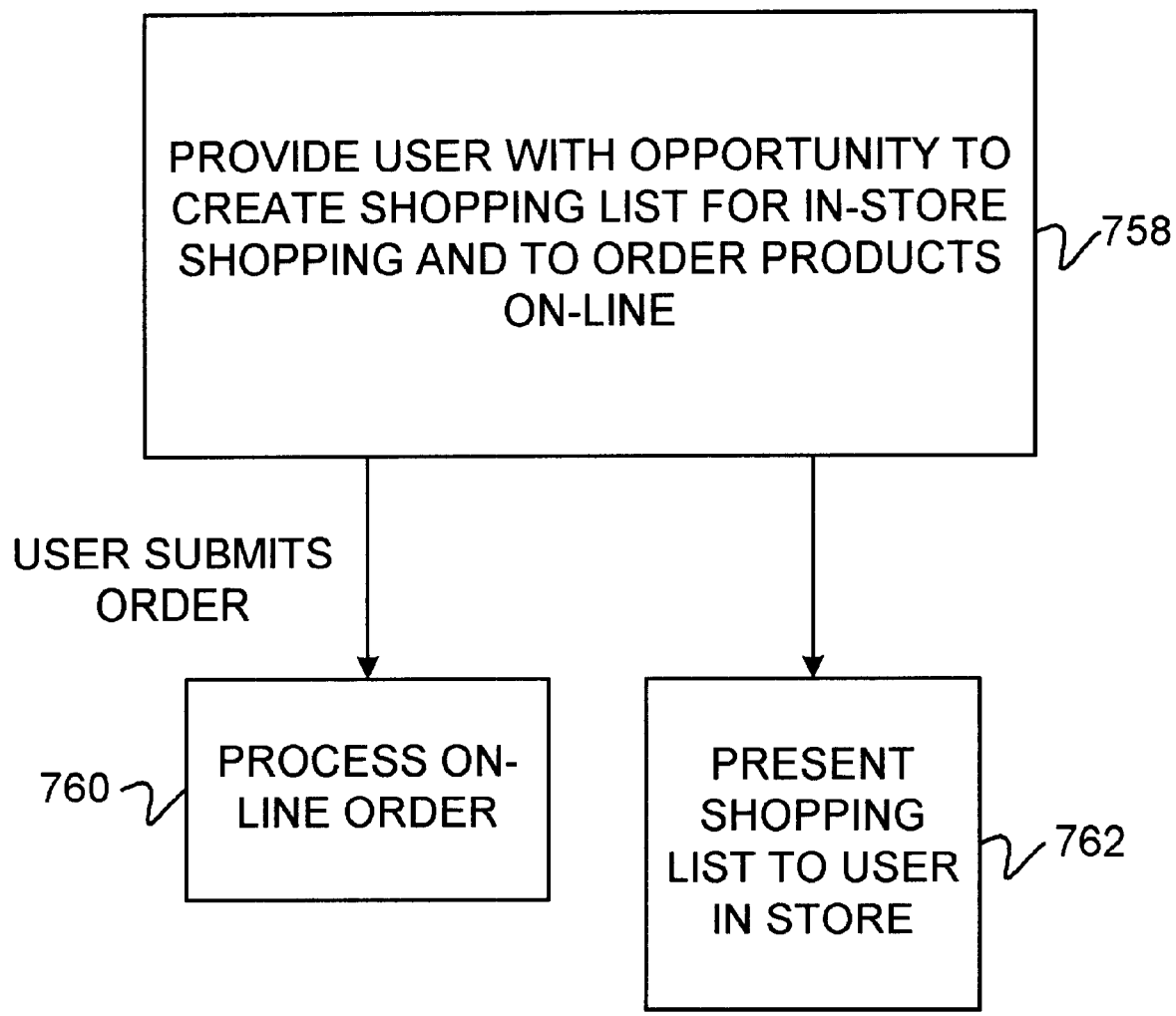
FIG. 81 is a flow chart of illustrative steps involved in creating a shopping list in accordance with the present invention.

Illustrative steps involved in using shopping lists such as shopping list 750 are shown in FIG. 81. At step 758, on-screen options may be displayed on the user's electronic device to provide the user with an opportunity to create a shopping list. The user may create a shopping list for in-store shopping and a shopping list for on-line shopping. The lists may be combined if desired. At step 760, after the user submits the on-line order, the user's on-line order may be processed. For example, the order may be processed at an order fulfillment facility. At step 762, handheld computing device 12 or other in-store equipment such as an in-store kiosk, cart-mounted computer, etc. may be used to present the shopping list to the user. For example, handheld computing device 12 may display a list of the shopping list items that the user intended to pick up or purchase in the store.

When the user arrives at the store, the user may access a shopping assistance service using handheld computing device 12. The user may access the service by downloading information from a kiosk at the store (e.g., over a local IR or RF wireless link or a physical link) or from a local wireless transmitter/receiver (e.g., a local RF wireless transmitter that has wireless coverage in the vicinity of the entrance of the store). The user may also access the service in real time over a local wireless link.

The user may be alerted to the availability of the local wireless link or the shopping assistance service. For example, handheld computing device 12 may display an icon, may sound a tone, may vibrate, may place an e-mail message in the user's e-mail in-box, may display a pop-up message on the display as an overlay or a full screen message, or may use any other suitable approach for alerting the user to the availability of the shopping assistance service. The user may invoke the shopping assistance service by selecting a displayed icon, by selecting various on-screen options, or by otherwise directing handheld computing device 12 to access the shopping assistance service.

If desired, the shopping assistance service may be invoked automatically, when handheld computing device 12 detects the availability of the service or detects the presence of local wireless content. The user may access the shopping assistance service or portions of such a service using a remote wireless link. A browser that is implemented using handheld computing device 12 may be used to access the shopping assistance service over a local or remote wireless link or a physical link.

Accessing the shopping assistance service locally may ensure that the service is specific to the user's location (e.g., the store or other establishment in which the user is located or interested). If the service is accessed remotely, the user may select on-screen options that ensure that the service is specific to the user's location. If desired, information on the location of handheld computing device 12 may be used to ensure that the service that is provided to the user is specific to the user's location.

Figure 82:
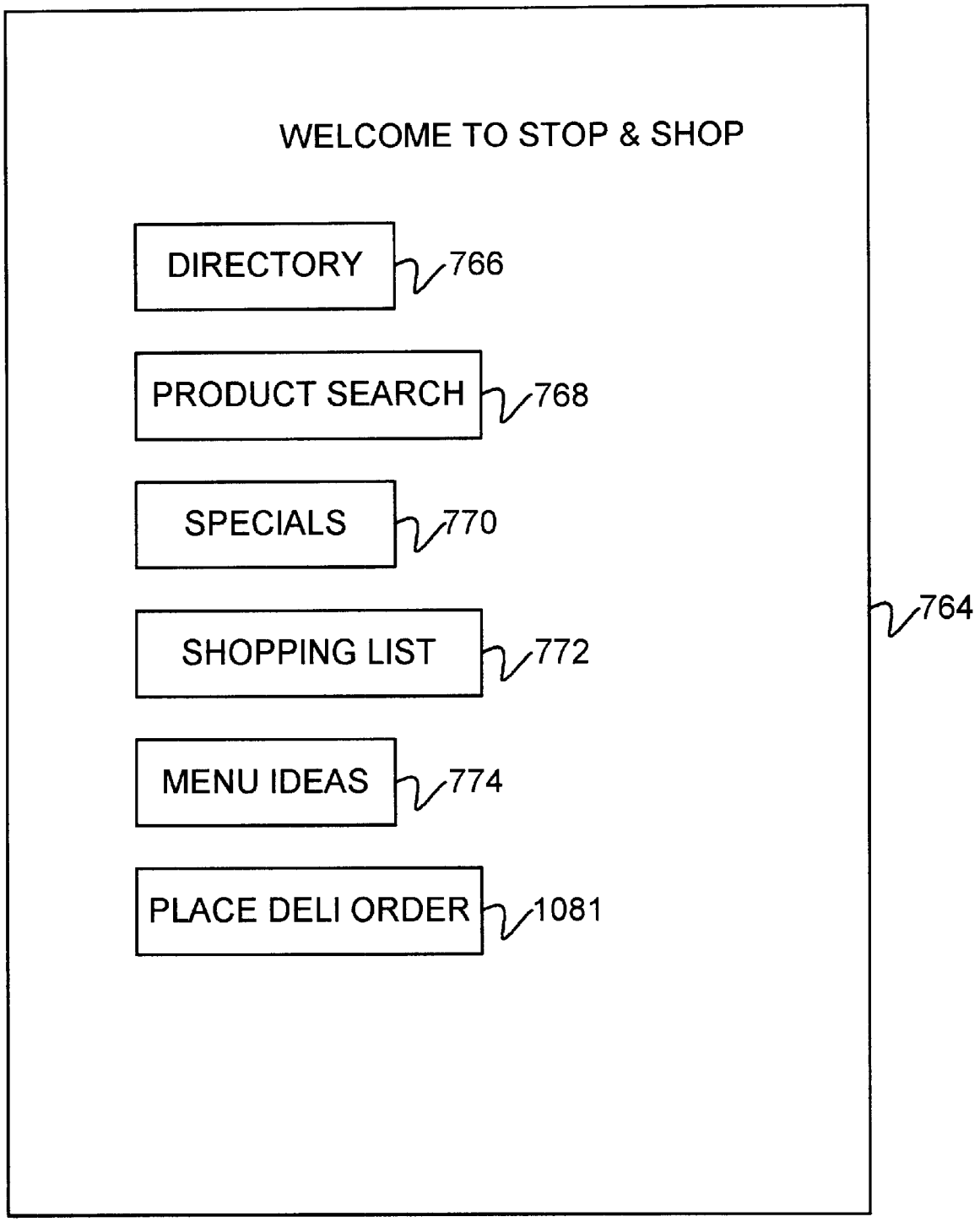
FIG. 82 shows an illustrative screen containing a main menu for a supermarket shopping assistance service in accordance with the present invention.

An illustrative screen 764 that handheld computing device 12 may display to the user for the shopping assistance service associated with a store or other establishment is shown in FIG. 82. Screen 764 may serve as a main menu or welcome screen for the shopping assistance service. In the example of FIG. 82, the shopping assistance service is directed toward a supermarket. This is merely illustrative. The shopping assistance service may be associated with any suitable entity if desired.

If the shopping assistance service is used in a store that has shopping carts, receptacles may be attached to the shopping carts into which users may temporarily place handheld computing devices. Such receptacles may be simply holders for the handheld computing device or may be electrically active cradles. Cradles or attachments or accessories may be provided to assist the user in using the shopping assistance service. For example, such physical connections may be used to provide the shopping assistance service application to the user or may be used to enhance the wireless communications capabilities of handheld computing device 12.

Shopping assistance service screens such as screen 764 of FIG. 82 may contain a directory option 766, a product search option 768, a specials option 770, a shopping list option 772, and a menu or recipe ideas option 774. These options are merely illustrative. Any suitable on-screen options may be provided if desired.

Figure 83:
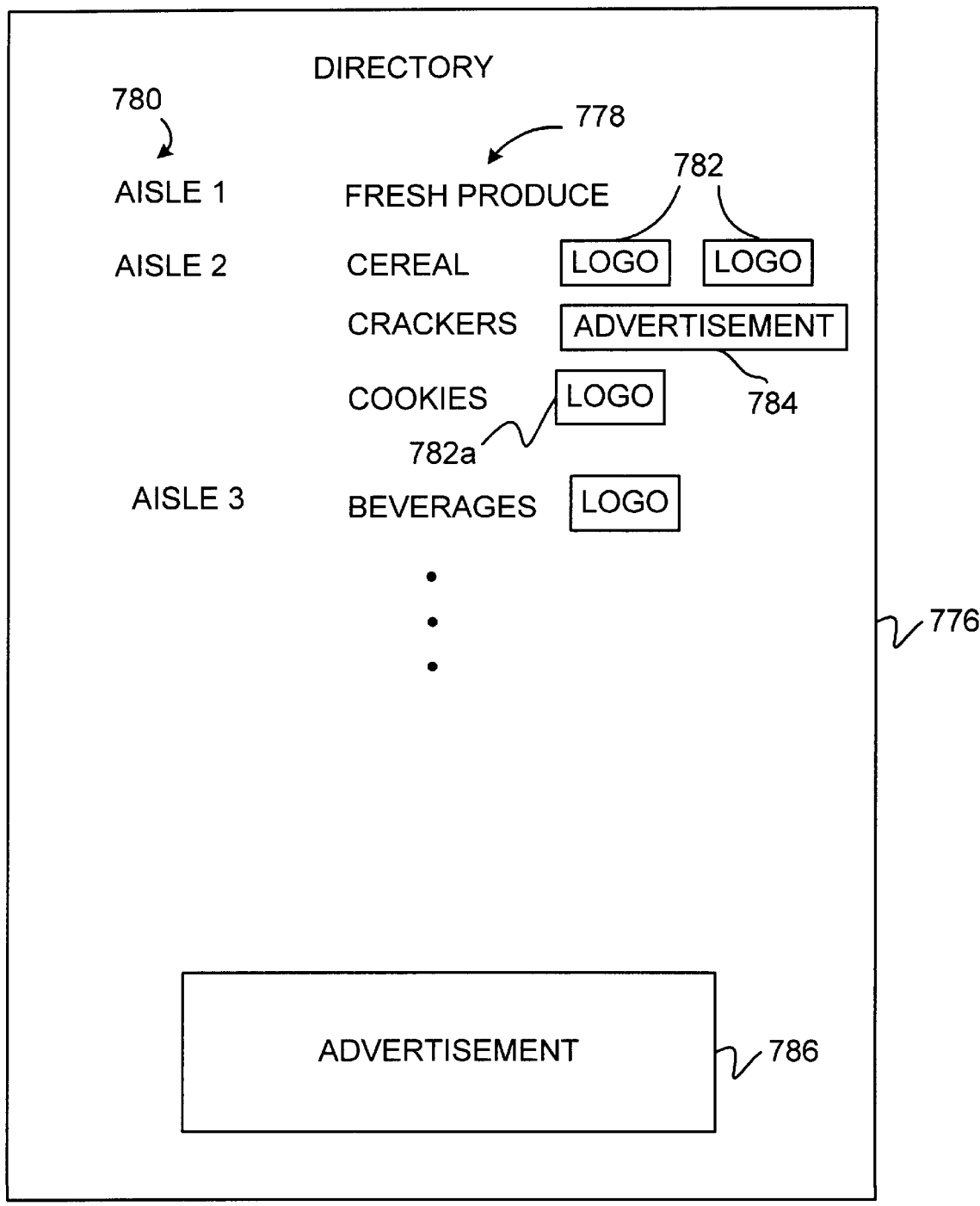
FIG. 83 shows an illustrative directory screen for a shopping assistance service in accordance with the present invention.

If the user selects directory option 766, handheld computing device 12 may display a screen such as screen 766 of FIG. 83. Screen 766 may contain information 778 on items on the user's shopping list. The shopping list items may be arranged by location. For example, location information 780 may be provided that identifies which aisle each item is in or that otherwise provides information on the location of the items in the store. Logos 782, advertisements 784 and 786, and other interactive and promotional content may be provided on screen 766. Logos may contain an graphic representation of a manufacturer's logo, a product or service logo, a brand logo, a store logo, or a logo of any other suitable entity. A logo may serve as a type of promotion or advertisement. Other advertisements may be larger and may contain additional information. For example, an advertisement may contain information on a product, information on a manufacturer, a logo, a special offer such as a discount, coupon or other financial incentive, promotional ad copy, etc.

Advertisements and logos and other promotional material may be targeted to the user based on the items in the user's shopping list. For example, if the item cereal is on the user's list, logos for cereal manufacturers or cereal products may be displayed on screen 776. If desired, these logos may be displayed immediately adjacent to the relevant shopping list items. For example, the logos placed adjacent to the cereal entry in the list may all relate to cereal manufacturers and products.

The store's computing system may charge manufacturers and others for placing promotional material on the various screens displayed by the shopping assistance service. Manufacturer's and others may transmit logos and promotional offers to this computer system electronically (e.g., over a communications network such as the Internet).

Figure 84:
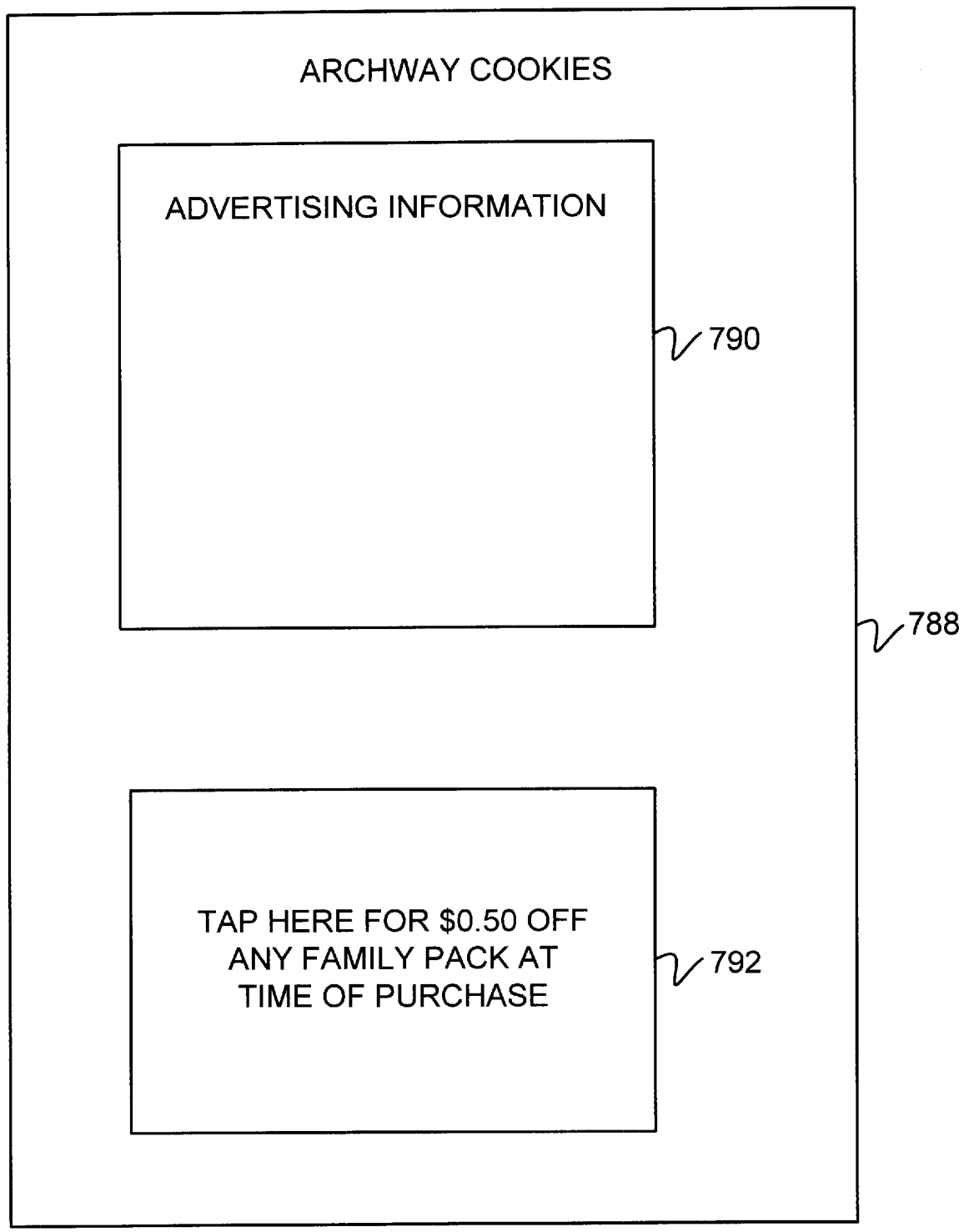
FIG. 84 shows an illustrative screen containing promotional information for a product that may be displayed by a shopping assistance service in accordance with the present invention.

An illustrative screen 788 that may be displayed by handheld computing device 12 when the user selects a logo is shown in FIG. 84. In the example of FIG. 84, the user has selected the logo 782*a* of FIG. 83, which was displayed adjacent to the cookies entry in the user's shopping list. Logo 782*a* was a logo for a cookie brand. Screen 788 may therefore contain promotional material directed to that brand of cookies. Advertising information 790 may include text, graphics, and video.

It may be possible to provide relatively more video to users in the store if a local wireless link is used to deliver the video than if a remote wireless link is used, because local wireless links need not necessarily be subject to the same bandwidth restrictions that remote wireless links such as cellular telephone links are subject to. Moreover, it may be more feasible for local wireless links to be provided in an "always on" condition than remote links. In an always on configuration, users may maintain a communications link for data or the like even if there is little or no present use for the link. Certain remote communications path resources (e.g., cellular telephone system resources) may be too scarce to provide a practical data communications link with handheld computing device 12 that is always on. These considerations may often favor using local communications links to communicate with handheld computing device 12.

Regardless of which type of wireless link is used to deliver video to handheld computing device 12, bandwidth may be conserved by using a digital compression scheme. Illustrative compression schemes that may be used include the MPEG-2 and MPEG-4 standards, although these are merely examples.

Advertising information 790 may contain any suitable promotional information, such as an images of the product being promoted, testimonials of satisfied customers, reviews of critics, serving suggestions, promotional ad copy lauding the benefits of the product, etc. The information may be passive or interactive. Passive promotional material may include, for example, an advertisement promoting a particular special or discount that shoppers will automatically receive during checkout.

Promotional information such as promotional information option 792 may be displayed that presents an interactive coupon, discount, or other offer or financial benefit or other benefit. In the example of FIG. 83, the user may be presented with an on-screen option 792 to receive a discount on the purchase of particular type of cookie. If the user selects option 792, the user may receive the discount or may be provided with additional on-screen options that allow the user to be provided with the discount. The user may receive the discount by crediting the user's credit card, debit card, or other account or by deducting an appropriate amount from the user's purchase price during checkout. If desired, the user's acceptance of an offer may be communicated from handheld computing device 12 to the store's cash register system wirelessly from handheld computing device 12 (e.g., when the user responds to an option such as option 792).

Figure 85:
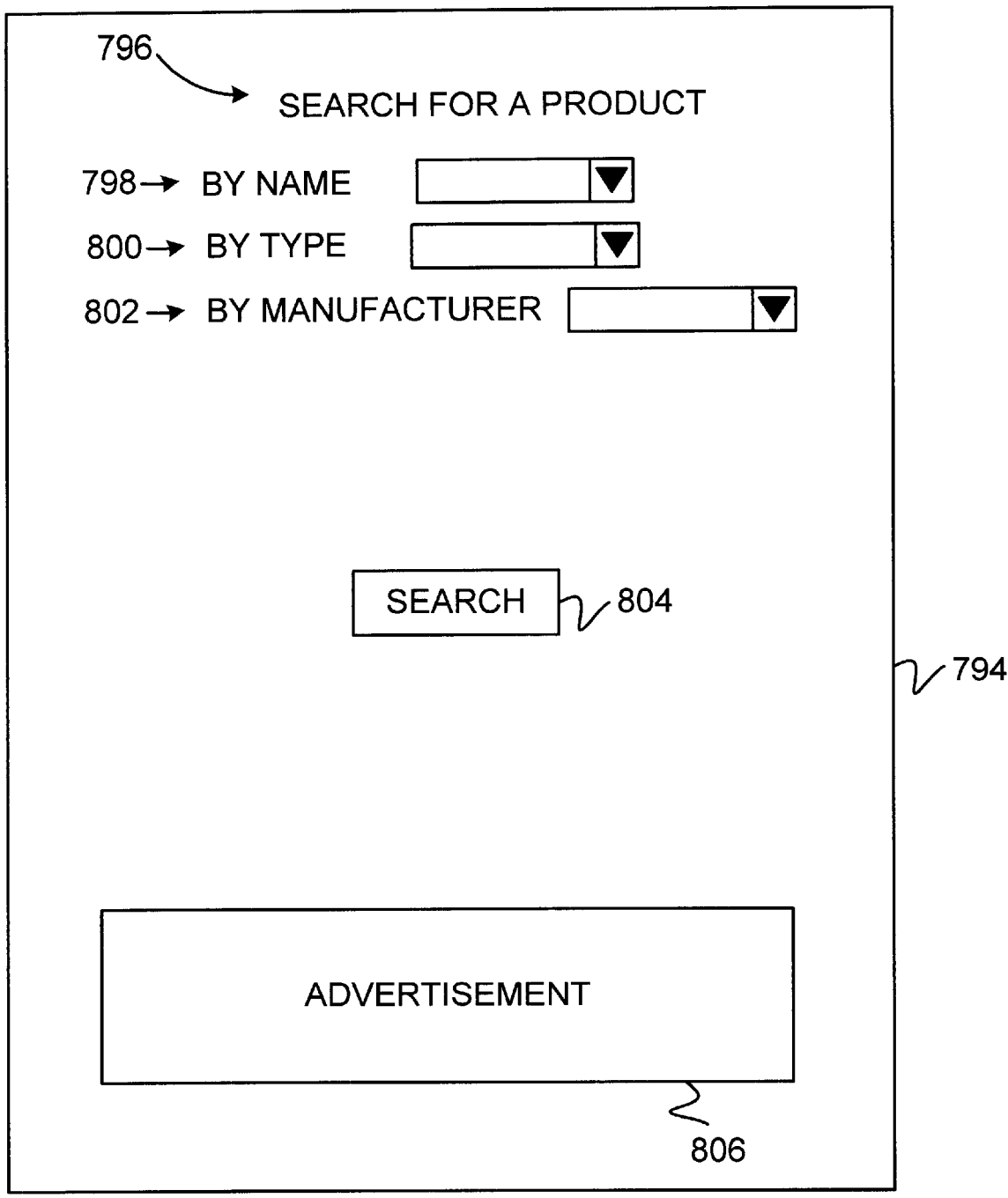
FIG. 85 shows an illustrative search screen for a shopping assistance service in accordance with the present invention.

An illustrative screen 794 that handheld computing device 12 may display when the user selects an option such as product search option 768 is shown in FIG. 85. Screen 794 may contain a search option 796. Option 798 may provide the user with an opportunity to search for a product by name. Option 800 may be used to provide the user with an opportunity to search for a product by category. Option 802 may be used to provide the user with an opportunity to search for a product by manufacturer or brand. When the user has entered the desired search terms into option 796, the user may select search option 804. If desired, screen 794 may contain promotional material, such as advertisement 806.

When search option 804 is selected, handheld computing device 12 may initiate a database search for information on the product. If desired, the database search may be performed locally on a product database stored in handheld computing device 12. The database search may also be performed by accessing a product database in the store or associated with the store. If desired, the product database may be maintained on a remote server or the like. If handheld computing device 12 does not have a product database, the product database may be accessed using a local or remote wireless link.

Figure 86:
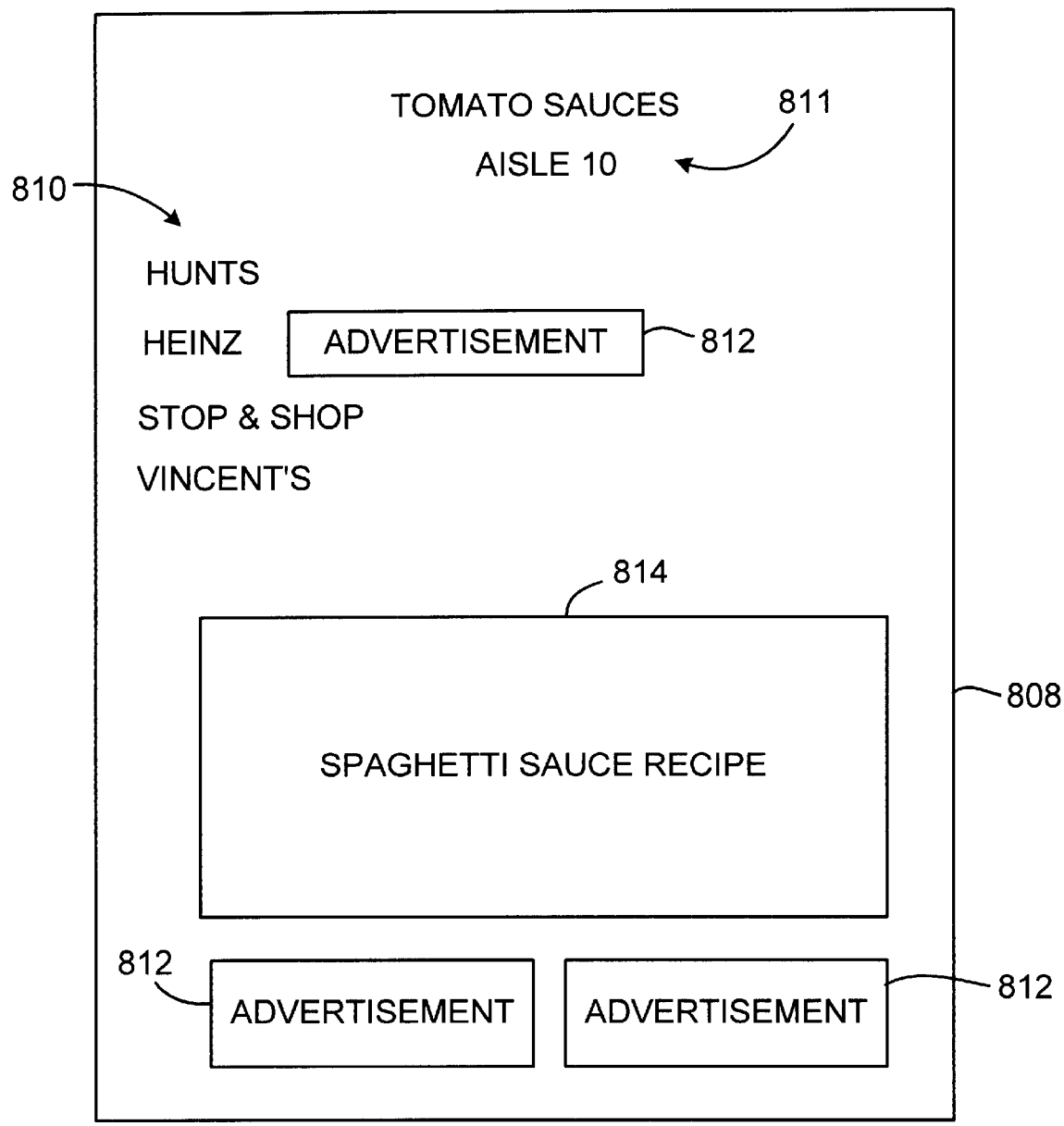
FIG. 86 shows an illustrative search results screen for a shopping assistance service in accordance with the present invention.

The results from the database query may be displayed by handheld computing device 12 using any suitable display format. An illustrative search results screen 808 that may be displayed by handheld computing device 12 is shown in FIG. 86. Information 810 may be provided on products carried by the store that match the search criteria. In the example of FIG. 86, a search was performed for tomato sauces, so the products that are displayed are various brands of tomato sauce.

Information 811 may be provided on the location of the products. Such location information may be maintained in the product database with the product information.

Advertisements 812 may be displayed. Promotional material such as logos, advertisements, and other material may be displayed adjacent to relevant products.

If desired, a recipe 814 that is related to the product search criteria or to the search results may be displayed. In the example of FIG. 86, a spaghetti sauce recipe is displayed, because tomato sauce is an ingredient used in spaghetti sauce. Presenting recipes with the shopping assistance service such as recipe 814 may encourage the user to purchase additional products. If desired, promotional information related to the ingredients of the recipe may be embedded within the recipe.

Figure 87:
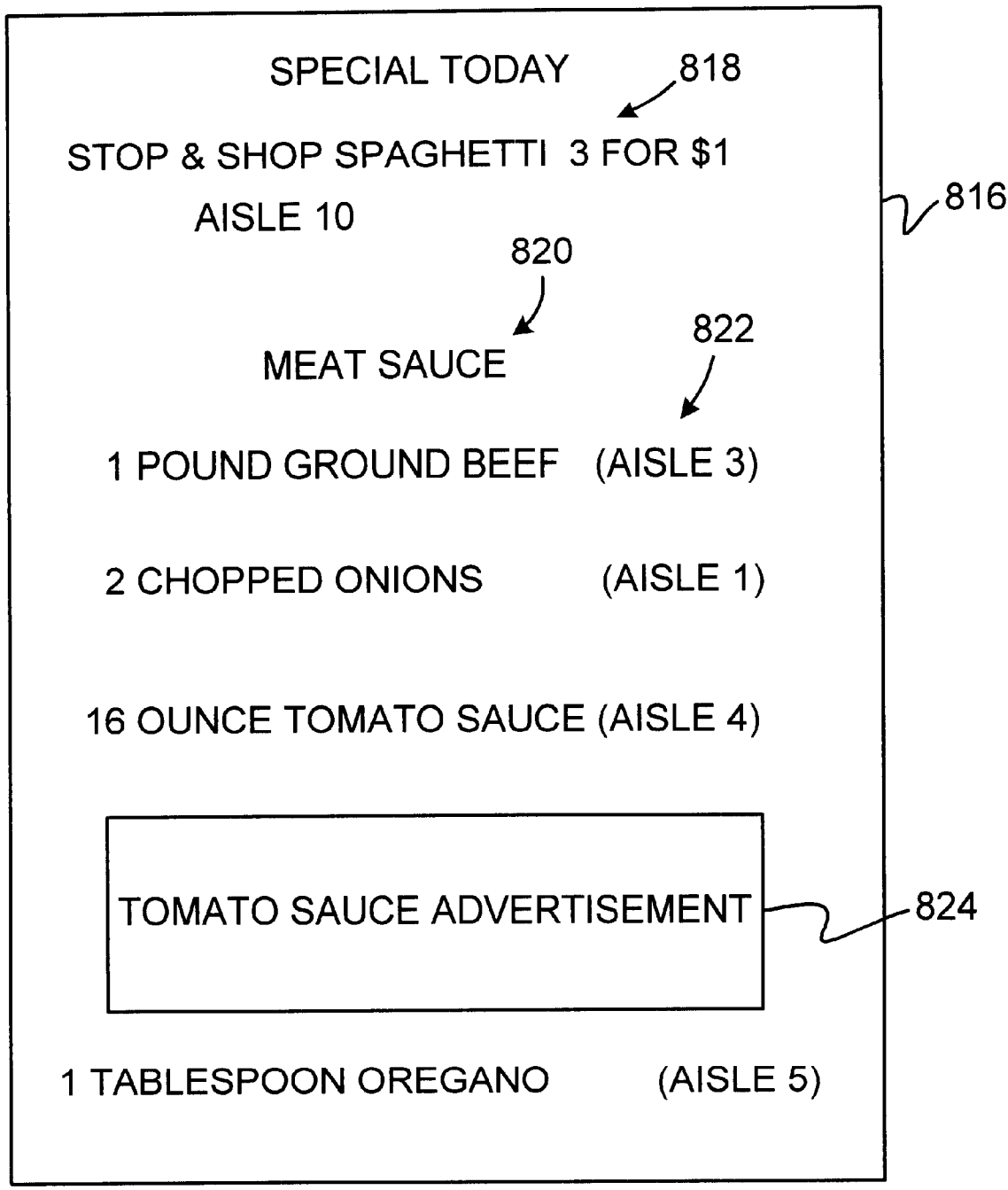
FIG. 87 shows an illustrative screen for a special that a shopping assistance service may display in accordance with the present invention.

If the user selects specials option 770 of FIG. 82, handheld computing device 12 may display a screen such as screen 816 of FIG. 87. Screen 816 may contain information 818 on a special discount that is available to shoppers. Recipe information 820 may also be displayed. The recipe may be related to the item being promoted in the special. Information 822 on the aisle in which the subject of the special and the ingredients of the recipe may be found may be displayed. If desired, an advertisement 824 for an ingredient may be embedded in the recipe adjacent to the ingredient. Advertisements related to recipe ingredients may also be displayed on other suitable portions of screen 816.

Figure 88:
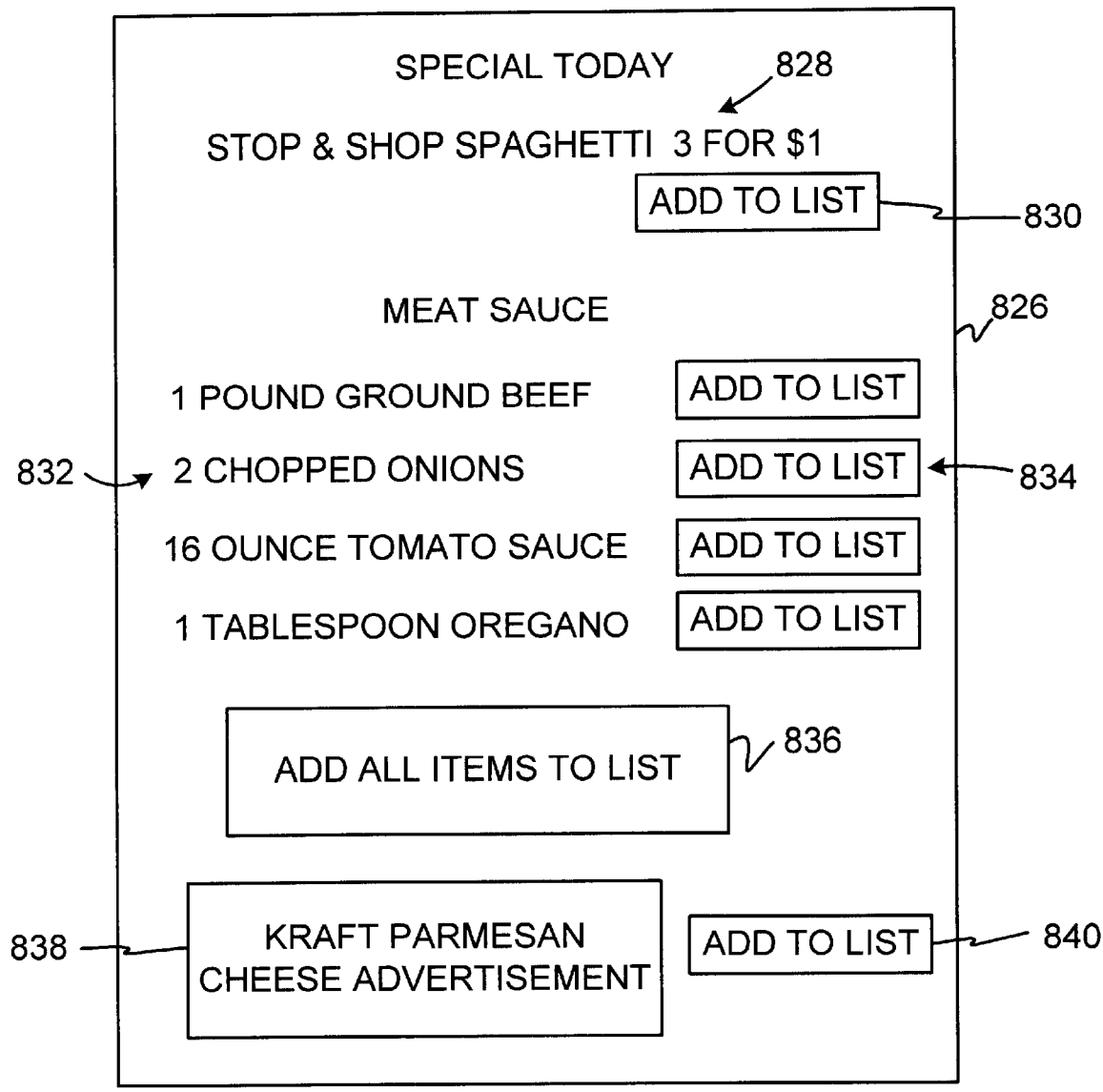
FIG. 88 shows another illustrative screen for a special that a shopping assistance service may display in accordance with the present invention.

Another example of a screen that may be displayed by handheld computing device 12 when the user selects an option such as specials option 770 of FIG. 82 is shown in FIG. 88. Screen 826 of FIG. 88 may contain information 828 on a product that is being promoted in the special. An option 830 may be provided that allows the user to add the special item to the user's shopping list. A recipe 832 that is related to the special item may also be displayed. Options 834 may be provided adjacent to the ingredients in the recipe that allow the user to selectively add individual ingredients to the shopping list. Option 836 allows the user to add all of the ingredients and the special item to the shopping list. An advertisement 838 may be displayed. Advertisement 838 may promote a product related to the item featured in the special or the recipe ingredients. An option such as option 840 may be provided that allows the user to add the advertised item to the user's shopping list.

Figure 89:
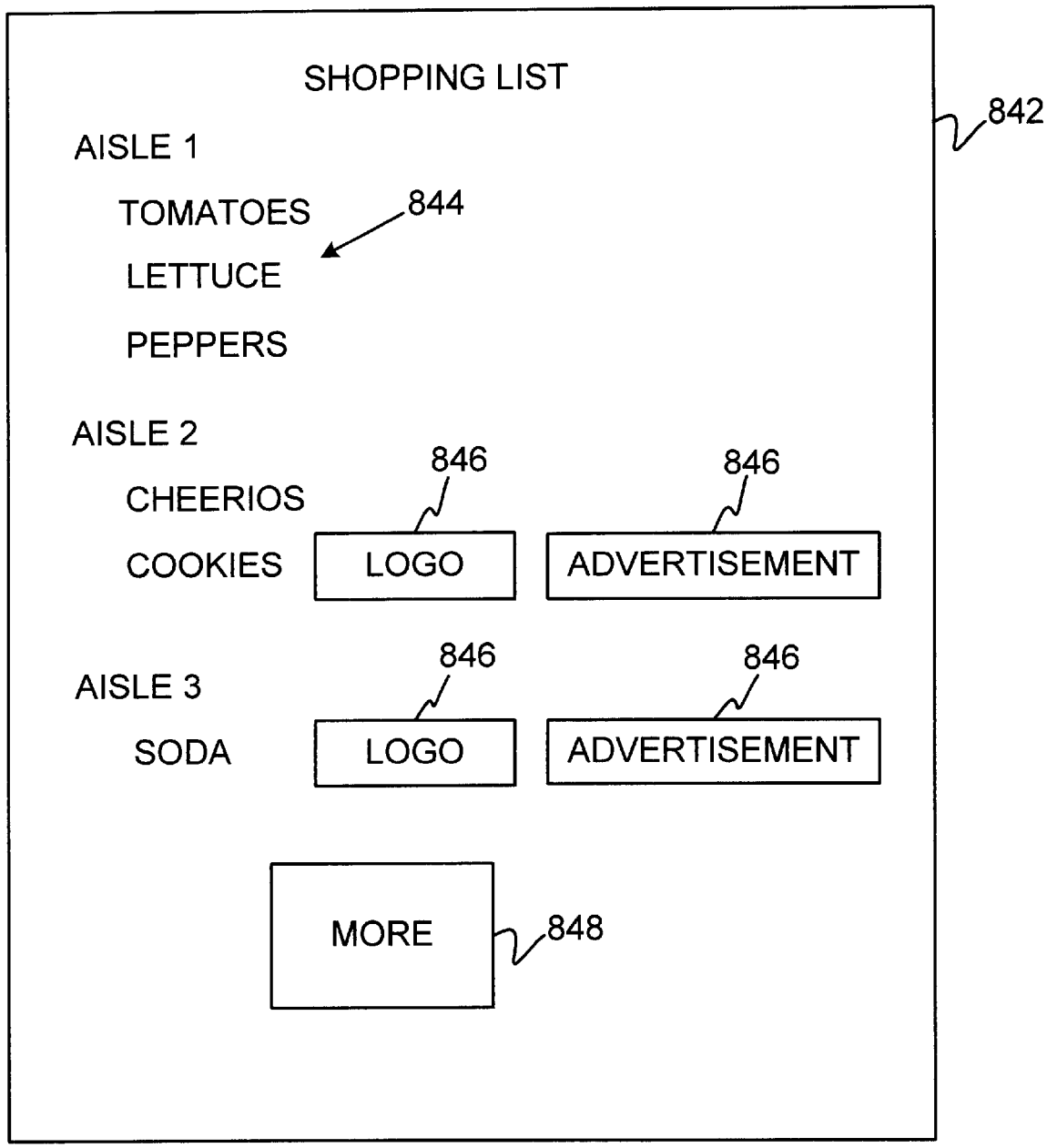
FIG. 89 shows a screen containing an illustrative shopping list in accordance with the present invention.

If the user selects option 772 of FIG. 82, handheld computing device 12 may display the user's shopping list. An illustrative shopping list screen 842 that may be displayed by handheld computing device 12 is shown in FIG. 89. In the example of FIG. 89, shopping list items 844 may be arranged by location (e.g., by the aisle in the store in which the items are located). Logos and advertisements 846 may be displayed. The logos and advertisements 846 may be interactive and may be related to the entries in the shopping list. Logos and advertisements 846 may be displayed adjacent to related entries in the list. Logos and advertisements and other such promotional materials may be displayed when an item on the list matches the product or type of product being promoted by the materials. An advertisement that is for the same product or type of product as an entry in the list may be displayed immediately adjacent to the entry. More option 848 may be provided to allow the user to view additional shopping list items.

Using a screen arrangement such as the arrangement of FIG. 89, the user may systematically shop for the items on the shopping list by proceeding through each of the aisles of the store.

Figure 90:
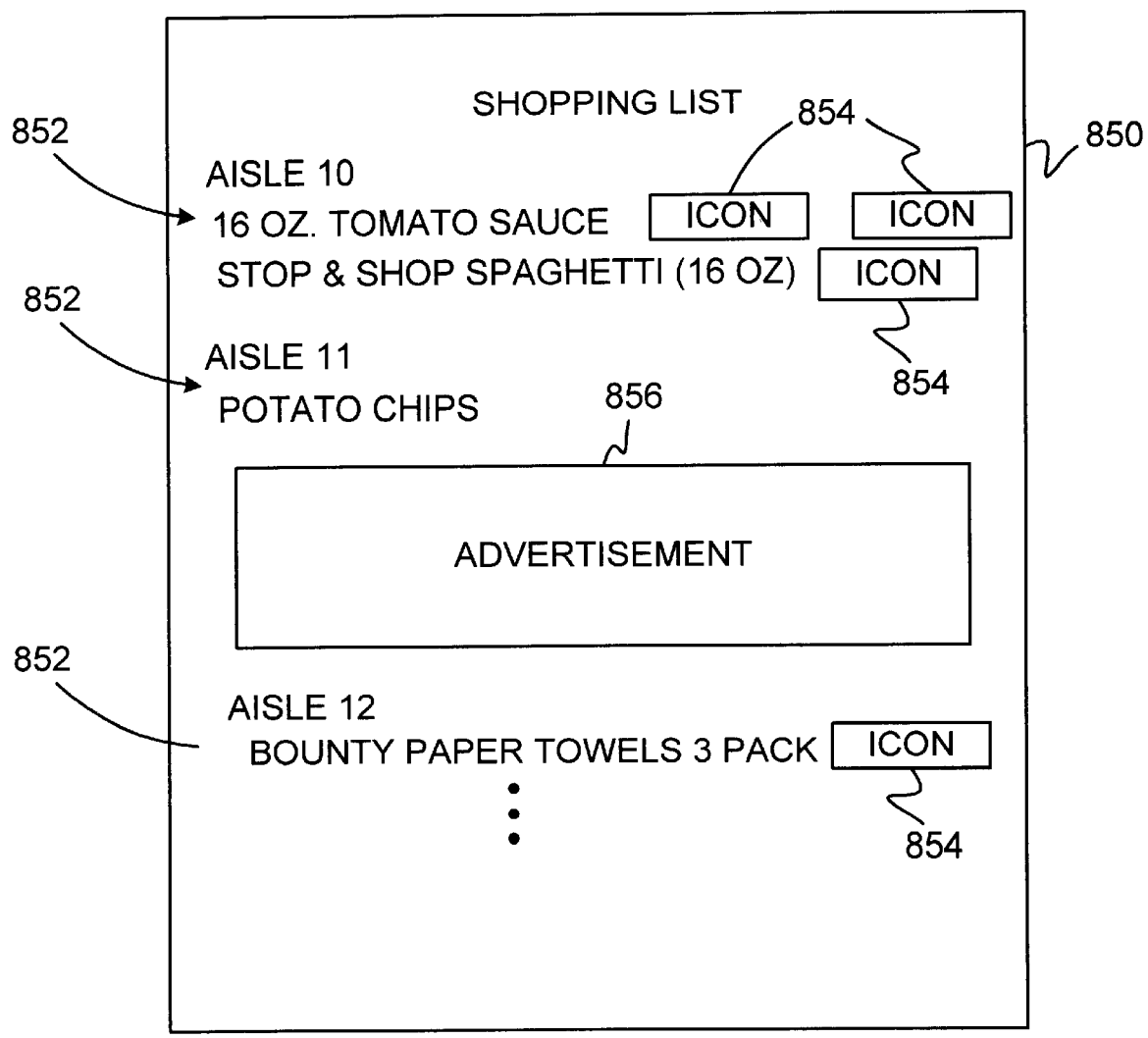
FIG. 90 shows a screen containing another illustrative shopping list in accordance with the present invention.

Another illustrative shopping list screen that may be displayed by handheld computing device 12 when the user selects an option such as option 772 of FIG. 82 is shown in FIG. 90. Screen 850 may contain shopping list items 852 that are arranged by their location in the store. Icons 854 may be associated with the items in the list. Icons 854 may be used to indicate whether the items have any associated specials. Icons 854 may also be used to indicate whether items are discounted or are the subject of a special to which the user has responded or an offer that the user has accepted.

If desired, icons 854 may be used to indicate when items on the list have been added by the user or have been added by another party such as another member of the user's family. Icons may be used to indicate which items were added to the list from in-home electronic devices or other such devices and which items have been added in the store (e.g., by selecting an option such as one of options 834, 836, or 840 of FIG. 88).

Icons may also be used to indicate whether items have been added to the list as a result of using an Internet service in which the user receives discounted prices on grocery items by making commitments (e.g., financial commitments, agreements to purchase certain products, etc.) prior to ordering the products. Icons may be used to indicate whether an on-line ordering service was used during the process of creating the shopping list. Icons may also be used to bring any other suitable characteristics of the shopping list items to the user's attention.

Figure 91:
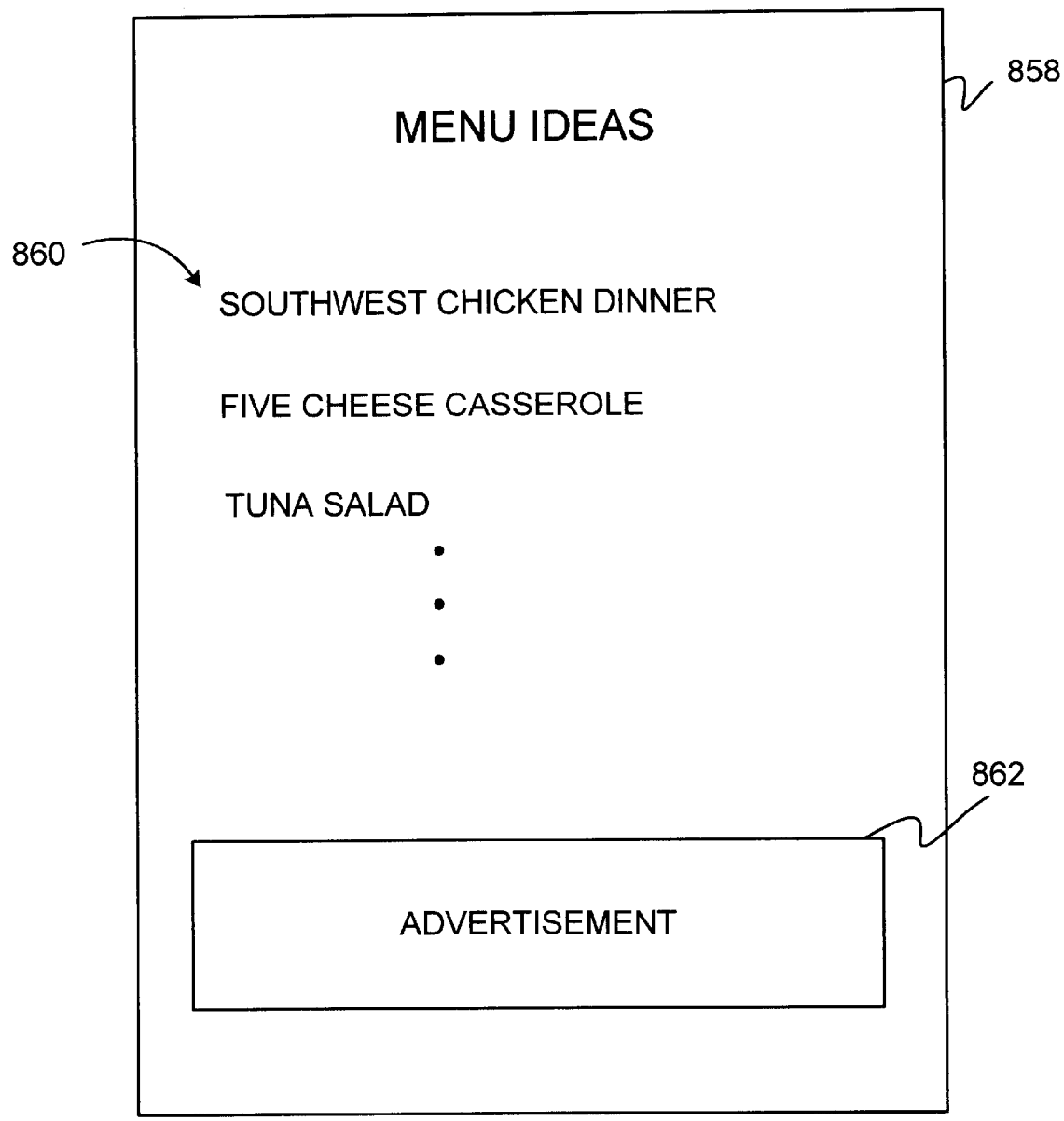
FIG. 91 shows an illustrative screen of menu ideas that may be displayed in accordance with the present invention.

If the user selects an option such as option 774 of FIG. 82, handheld computing device 12 may display a screen such as screen 858 of FIG. 91. Screen 858 may contain a list 860 of menu suggestions. The menu suggestions may be for main courses, lunches, appetizers, complete dinner menus, desserts, etc. Screen 858 may also contain promotional material such as advertisement 862.

Figure 92:
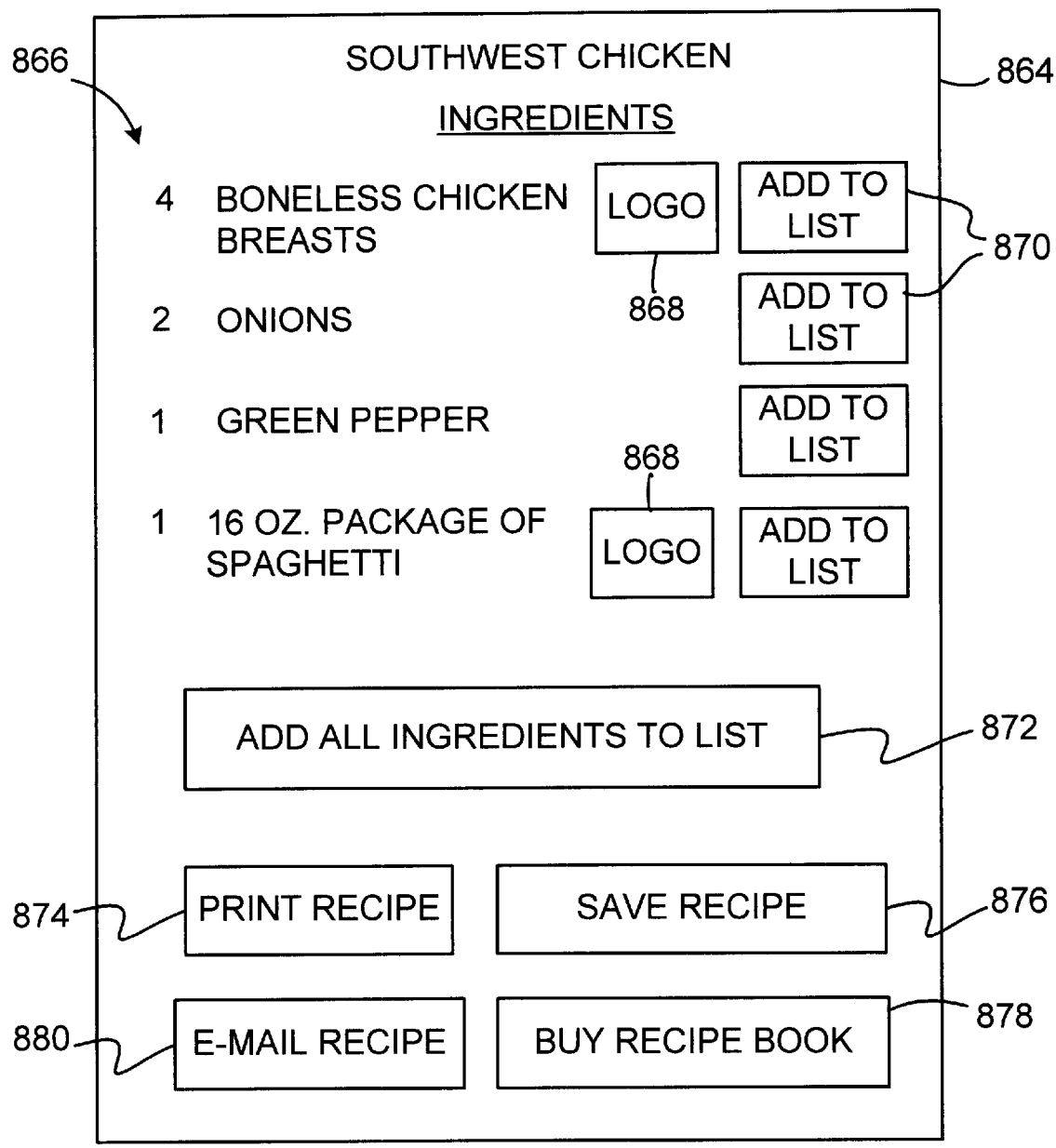
FIG. 92 shows an illustrative screen containing a list of ingredients for a recipe in accordance with the present invention.

If the user selects an entry from a list such as list 860 of FIG. 91, handheld computing device 12 may display a screen such as screen 864 of FIG. 92. Screen 864 may contain information 866 on the ingredients required by the menu. Interactive logos 868 may be displayed adjacent to relevant ingredients. Add to list options 870 may be provided adjacent to each ingredient. The user may add a desired ingredient to the user's shopping list by selecting one of options 870. All ingredients may be added to the shopping list by selecting option 872.

An option 874 may be displayed that allows the user to print the recipe. The recipe may be printed using a kiosk in the store, using a printer located in an aisle, using a printer attached to a shopping cart, using a printer attachment associated with handheld computing device 12, or using any other suitable printer arrangement.

The recipe of FIG. 92 may be saved by selecting option 876. The recipe may, for example, be saved on handheld computing device 12 or on a remote server. If desired, the recipe may be provided to a personal computer or in-home electronic device (e.g., a refrigerator-mounted computing device or appliance, a wall-mounted electronic device, a counter-top electronic appliance, a web-enabled stove, etc.

If the user selects e-mail recipe 880, the user may be provided with on-screen options that allow the user to supply a desired destination e-mail address or other communications address and that allow the user to transmit the recipe to the destination by e-mail.

If the user selects option 878, handheld computing device 12 may display on-screen options that provide the user with an opportunity to purchase a recipe book. For example, the user may purchase an electronic book that may be downloaded to handheld computing device 12 or an in-home electronic device or other computing device. The user may also purchase a physical book. A physical book may be delivered to the user's home (e.g., using an order fulfillment facility). Orders may be processed using the store's computer equipment, using a service provider (e.g., at a remote server), or using any other suitable entity.

If desired, the recipe that may be saved using option 876 or e-mailed using option 880 or the electronic book that may be purchased using option 878 may contain text, graphics, audio, or video. Text, graphics, audio, and video content related to other screens displayed by handheld computing device 12 may also be provided to the user if desired.

Figure 93:
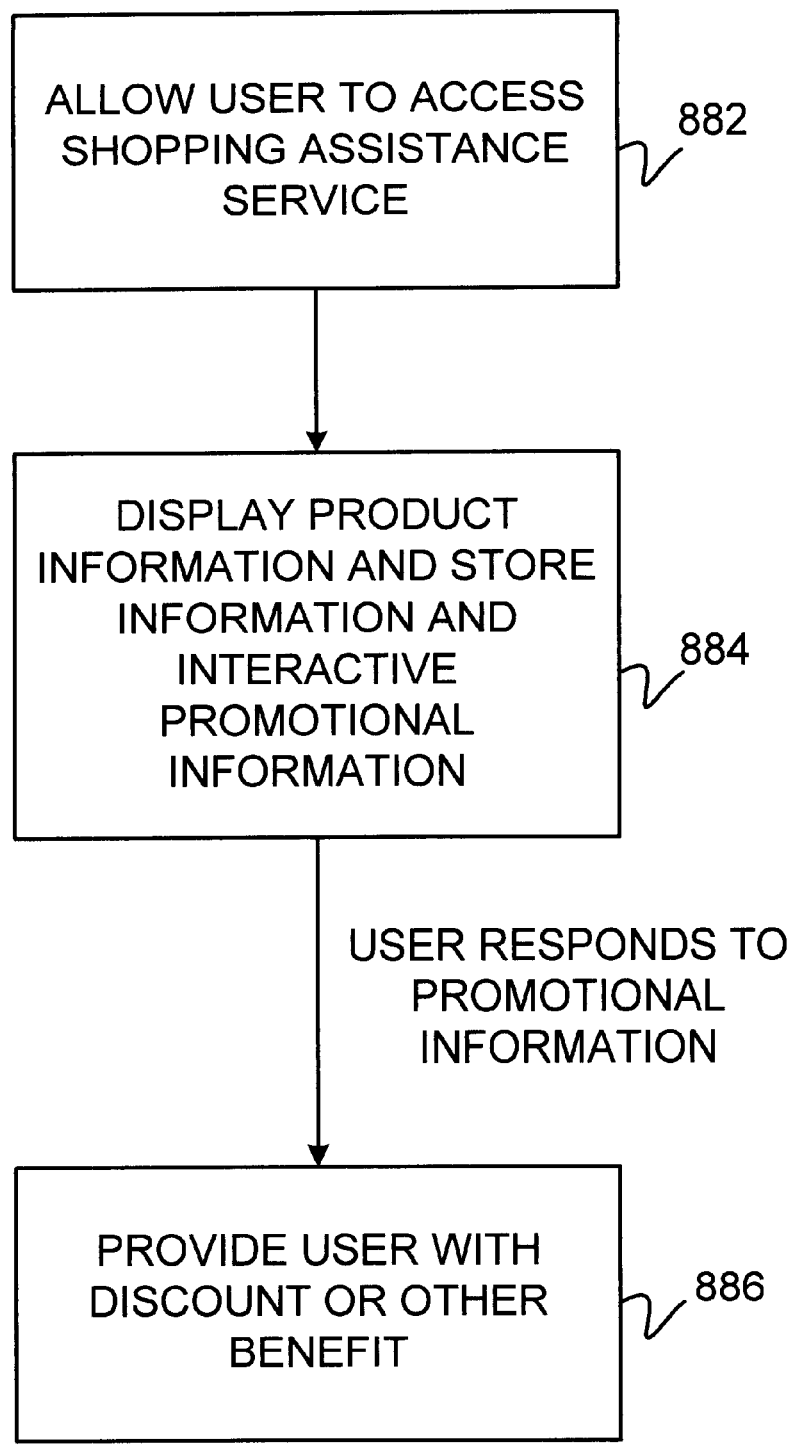
FIG. 93 is a flow chart of illustrative steps involved in displaying information with a shopping assistance service in accordance with the present invention.

Illustrative steps involved in providing a shopping assistance service with promotional material to the user are shown in FIG. 93. At step 882, handheld computing device 12 may be used to provide the user with access to the shopping assistance service.

At step 884, the shopping assistance service may use handheld computing device 12 to display product information, store information, and other suitable interactive promotional information for the user. The information may be displayed on any screen provided by the shopping assistance service or on any other suitable screen. The information may be targeted based on the interests of the user. For example, the information may be targeted based on the shopping list information of the user, may be targeted based on which advertisements the user responds to in the shopping assistance service, etc.

The promotional material that is displayed to the user need not be related to the items sold in the store in which the user is located. Any suitable information or products or services may be promoted. For example, when the user is using the handheld computing device to access a shopping assistance service in a supermarket, the shopping assistance service may display an advertisement for a lawn care service. If the user responds to the advertisement, handheld computing device 12 may provide on-screen options that allow the user to sign up for the lawn care service. For example, a communications link (e.g., an Internet link) may be established between handheld computing device 12 and the lawn care service.

As another example, the user may order audio recordings (e.g., MP3 files or the like) and these may be delivered to the user's handheld computing device 12, the user's automobile personal computer, the user's in-home electronic device, etc. As yet another example, advertisements may be provided for books, whether or not the books are related to the products sold in the store.

If desired, advertisements may be passive. For example, a video advertisement for an automobile may be displayed using handheld computing device 12. These are merely illustrative examples. Any suitable advertisements or promotional materials may be provided for the user.

At step 886, after the user has responded to the promotional information, the user may be provided with a corresponding discount or other benefit. For example, if the user responds to an in-store special or if the special is available to all shoppers, the user's purchase price may be reduced at checkout.

Shopping list information and other information that is presented to the user by handheld computing device 12 may be displayed based on the user's location within the store. The user's location in the store may be determined, for example, by determining which local wireless transmitter/receiver the user is in communications with. If an arrangement such as that of FIG. 17 is used, for example, the aisle in which the user is located may be determined. The user's location may also be determined using techniques such as GPS techniques or network techniques in cellular telephone networks or the like. Regardless of the arrangement that is used to determine the user's location, the user's in-store location may be used assist in the presentation of material to the user by the shopping assistance service. The shopping assistance service may process the location information using handheld computing device 12, a computer that is located in the store or that is associated with the store, a remote server, or using any other suitable equipment.

Figure 94:
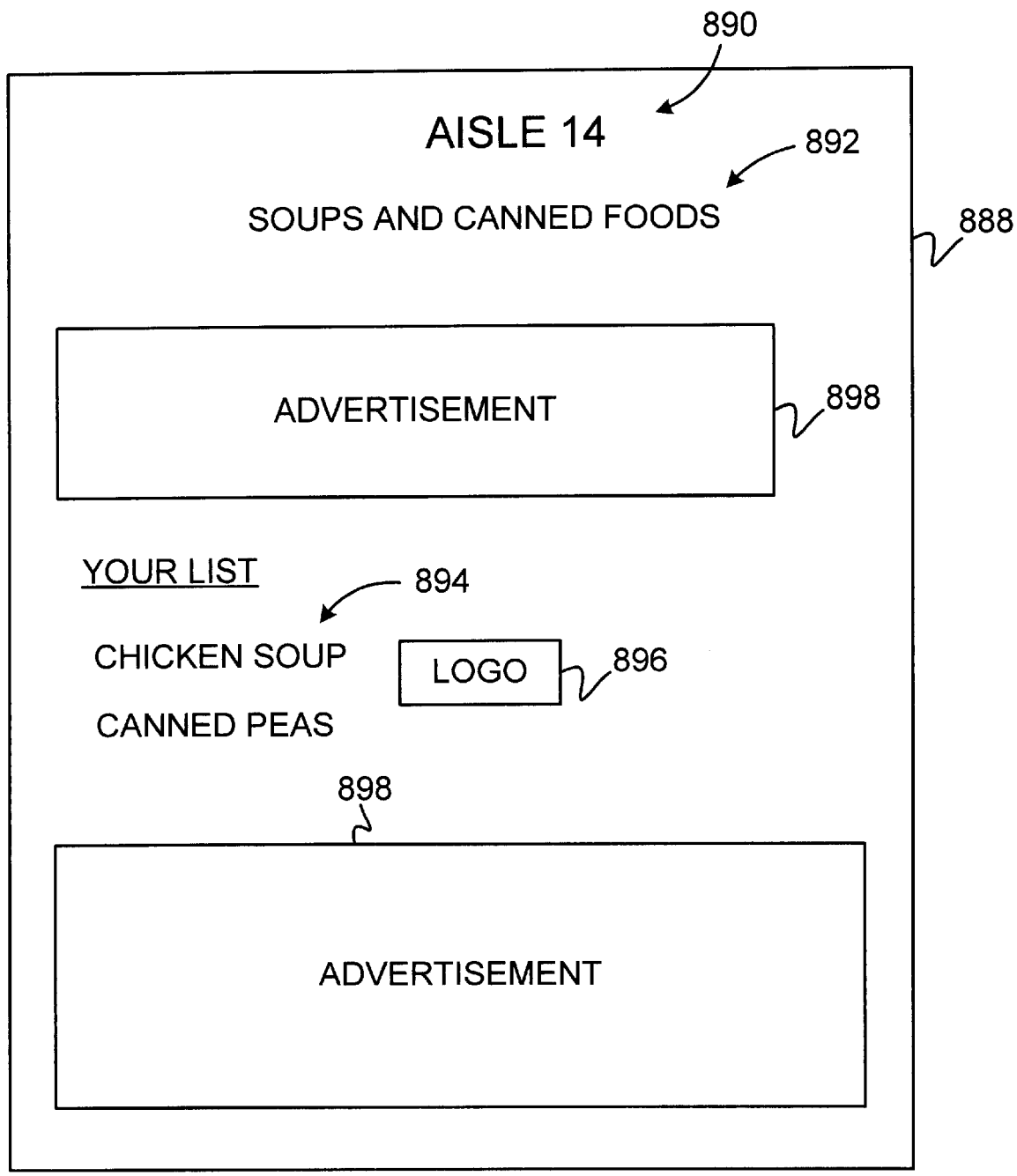
FIG. 94 shows a screen containing an illustrative location-based shopping list in accordance with the present invention.

An illustrative screen 888 that handheld computing device 12 may display to the user based on the location of the user is shown in FIG. 94. Screen 888 may contain information 890 on the current aisle in which the user is located. Screen 888 may also contain information 892 on the types of products that are located in that aisle. The user's shopping list 894 may be displayed. Logos such as logo 896 may be displayed adjacent to relevant items on the list.

Promotional material such as advertisements 898 may also be displayed. The promotional material may be targeted based on the user's preferences and interests and based on the user's location in the supermarket. For example, if the user has expressed an interest in ice cream by searching for ice cream with product search option 768, an advertisement for ice cream may be displayed by handheld computing device 12 when the user is in the aisle containing ice cream. If pasta is on the user's shopping list, handheld computing device 12 may display an advertisement for spaghetti sauce when the user is in the aisle containing spaghetti sauce.

As the user moves throughout the supermarket, handheld computing device 12 may automatically update screen 888 to reflect the user's current location. For example, as the user travels from aisle 14 to aisle 15, the information on screen 888 such as the aisle description, the shopping list items, and the promotional material may be updated to reflect the user's position in aisle 15.

Figure 95:
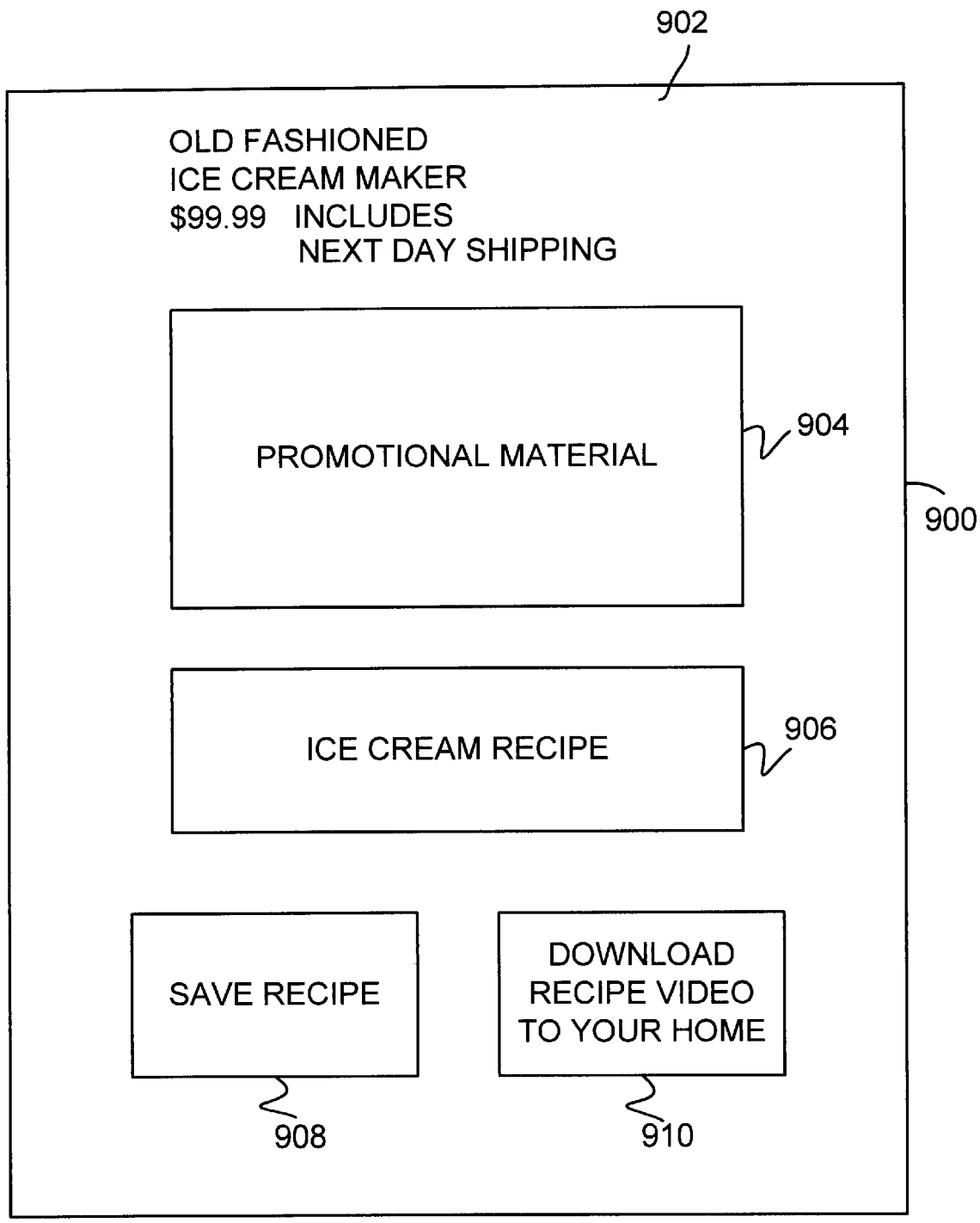
FIG. 95 shows a screen containing an illustrative advertisement in accordance with the present invention.

An illustrative advertisement that may be displayed by handheld computing device 12 is shown in FIG. 95. Advertisement 900 may be displayed as a full screen advertisement after the user selects a smaller icon or logo or advertisement or may be displayed as a full screen advertisement with little or no intervention by the user. Advertisement 900 may be displayed to all users or may be displayed to users who have been determined to be interested in ice cream. Advertisement 900 may be displayed at any location in the store or may be displayed by handheld computing device 12 when the user is in the proximity of dairy products or ice cream.

Advertisement 900 is an example of an in-store advertisement for a product that may be supplied by an order fulfillment facility or the like that is not located at the store. Advertisement 900 may contain information 902 on the advertised product or service, including price and shipping information. Advertisement 900 may also include promotional information 904. Promotional information 904 may include text (e.g. a description of the ice cream maker's specifications), graphics (e.g., a drawing or a digital image of the ice cream maker), audio (e.g., an audio sound track with music or a promotional verbal message), and video (e.g., a video clip demonstration of the ice cream maker). Video clips may contain audio. An ice cream recipe 906 may also be displayed.

Handheld computing device 12 may display options such as options 908 and 910. Option 908 may provide the user with an opportunity to save recipe 906. The user may, for example, be provided with on-screen options that allow the user to save the recipe in handheld computing device 12 or that allow the user to electronically send the recipe to a desired location.

Option 910 may allow the user to download a recipe video. For example, if the user selects option 910, handheld computing device 12 may display on-screen options that provide the user with an opportunity to specify a communications address for the equipment in the user's home such as a personal computer, multimedia equipment, an in-home electronic device such as a refrigerator-mounted or countertop electronic device, or any other suitable equipment. Similar options may be provided to allow the user to direct that the video or other suitable content be provided to other equipment. The recipe video may be delivered to the user's home equipment from a remote server, from a computer associated with or located at the supermarket, or from any other suitable location.

Figure 96:
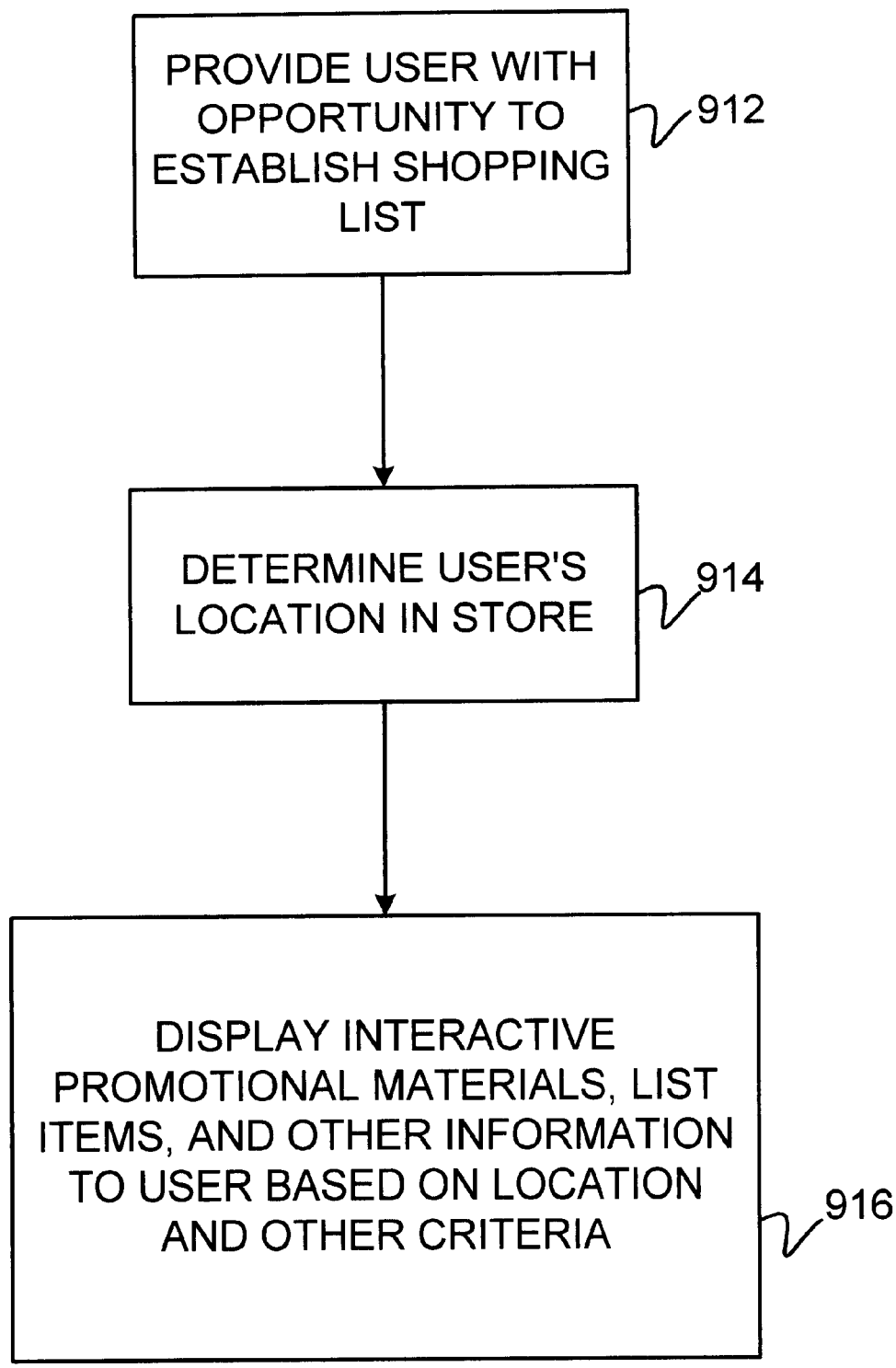
FIG. 96 is a flow chart of illustrative steps involved in displaying location-based advertisements in accordance with the present invention.

Illustrative steps involved in displaying information to handheld computing equipment 12 in a store based on the user's location or based on shopping list information or the like are shown in FIG. 96. At step 912, the user may be provided with an opportunity to establish a shopping list. For example, the user may create a shopping list using handheld computing device 12, an in-home electronic device, a personal computer, an automobile personal computer, etc.

At step 914, the user's location in a store may be determined. The user's location in the store may be determined, for example, by determining which local wireless transmitter/receiver the user is in communications with. If an arrangement such as that of FIG. 17 is used, for example, the aisle in which the user is located may be determined. The user's location may also be determined using techniques such as GPS techniques or network techniques in cellular telephone networks or the like.

At step 916, handheld computing device 12 may display information to the user such as interactive promotional materials, shopping list items, and other information. The information that is displayed for the user may be based on location information and other criteria (e.g., the user's interests as determined by monitoring the user's activities).

Figure 97:
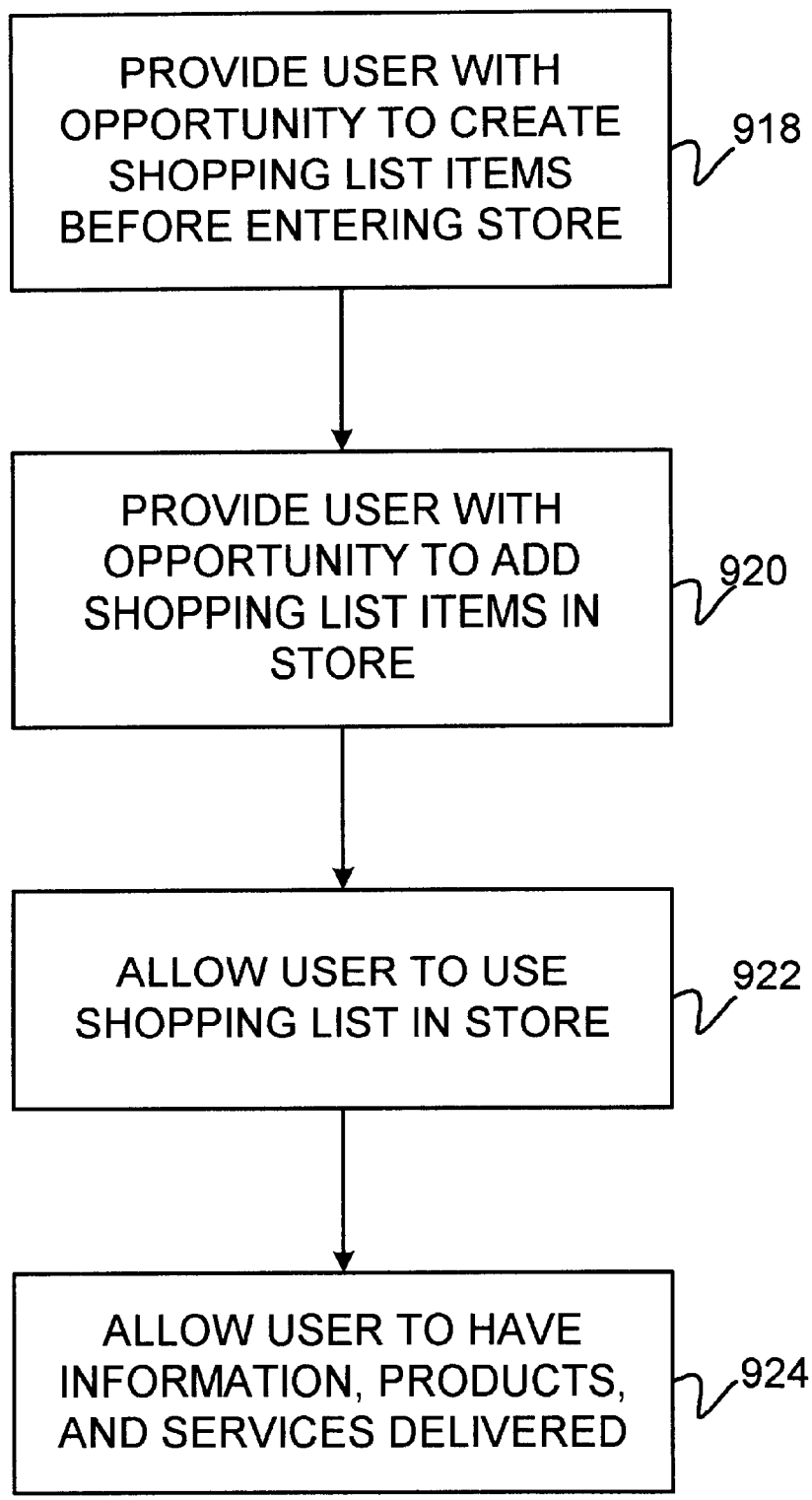
FIG. 97 is a flow chart of illustrative steps involved in using a shopping list in accordance with the present invention.

The user may use handheld computing device 12 to add shopping list items to the shopping list when the user is in the store. Illustrative steps involved in this process are shown in FIG. 97. At step 918, the user may be provided with an opportunity to create a shopping list before entering a store. For example, the user may be allowed to generate a shopping list before entering the store using equipment such as handheld computing device 12, an in-home electronic device, a personal computer, an automobile personal computer, etc.

At step 920, handheld computing device 12 may be used to provide the user with on-screen options that allow the user to add items to the shopping list while the user is in the store. For example, on-screen options such as options 830, 834, and 836 of FIG. 88 and options such as options 870 and 872 of FIG. 92 may be displayed.

At step 922, handheld computing device 12 allows the user to display the shopping list for use in the store.

At step 924, handheld computing device 12 may be used to arrange for the delivery of information, products or services. For example, the user may be provided with on-screen options that allow the user to request that information be delivered to handheld computing device 12, an in-home electronic device, a personal computer, an automobile personal computer, etc. The information may or may not be delivered in real time. The information may be supplied from a computer located in the store or associated with the store or may be supplied from a remote server or the like.

The user may also be provided with on-screen options that allow the user to purchase products and to request that products be delivered to the user's home or other suitable location. The user may also be provided with on-screen options that allow the user to purchase services and to request that services be provided to the user (e.g., at the user's home or other suitable location)

Figure 98:
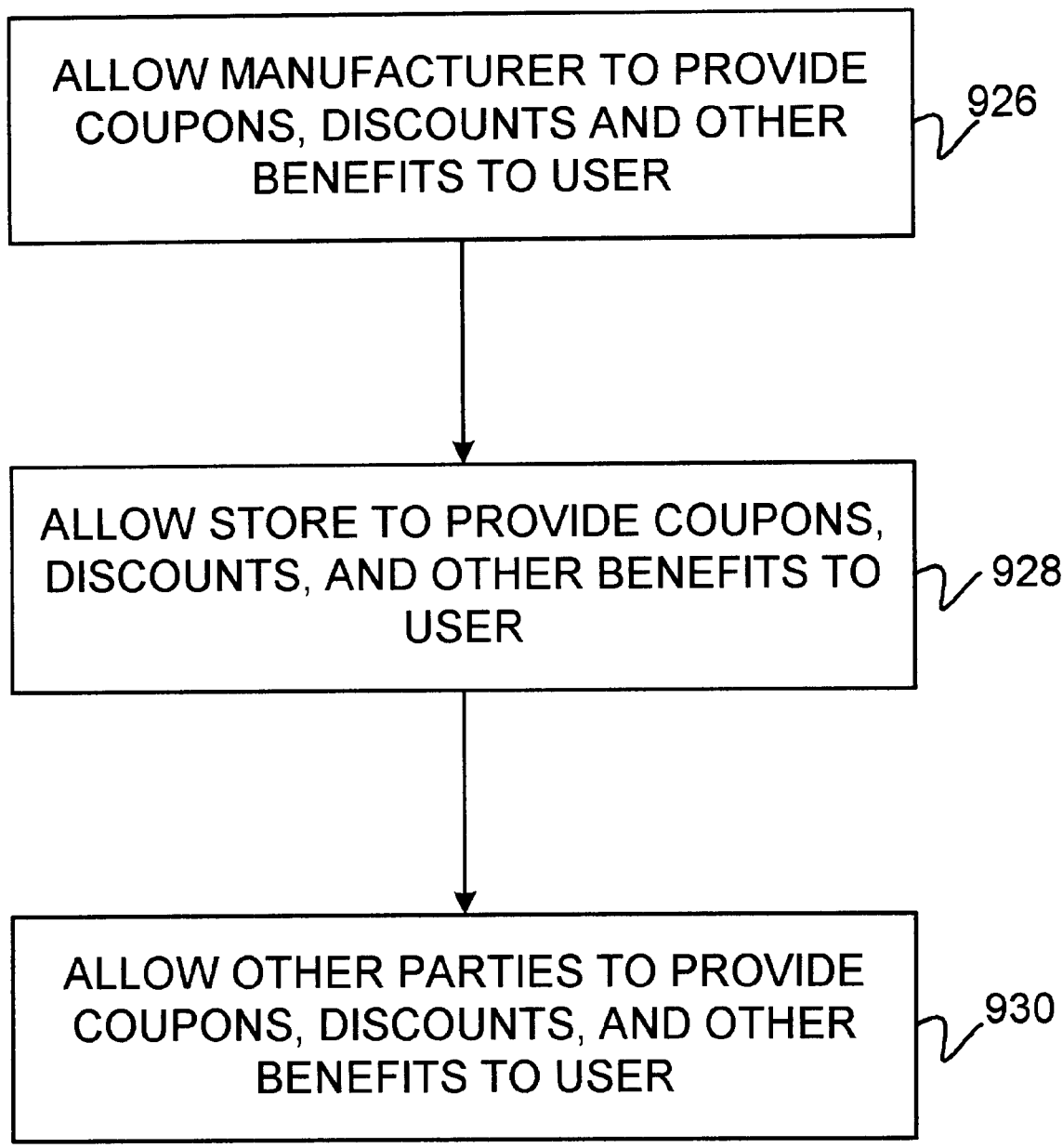
FIG. 98 is a flow chart of illustrative steps involved in allowing manufacturers to provide financial benefits in accordance with the present invention.

Manufactures and other such parties may provide benefits to the user such as coupons, discounts, and other offers and financial benefits. Illustrative steps involved in providing such benefits to the user are shown in FIG. 98. At step 926, a manufacturer may be provided with an opportunity to provide coupons, discounts, and other benefits to the user. For example, a store's computer system or other equipment may be configured to electronically receive information from manufacturers on the types and amounts of discounts and the like that the manufacturer wishes to provide to shoppers. The manufacturers may provide such benefits to all shoppers or to certain shoppers with whom the manufacturers or third-party services have interacted over the Internet or the like.

At step 928, the store's computer system or other equipment may be used to allow the store to pass the manufacturers' coupons, discounts, and other offers and benefits to the store's customers. For example, the store's computer system may be accessed by handheld computing device 12 when displaying information on specials for the user. The store's computer system may also be used to ensure that eligible users receive the appropriate discounts at checkout.

At step 930, other parties may be allowed to provide coupons discounts, and other benefits to the user. For example, a service provider or other third-party entity may provide the user with special offers by displaying such offers with handheld computing device 12.

Figure 99:
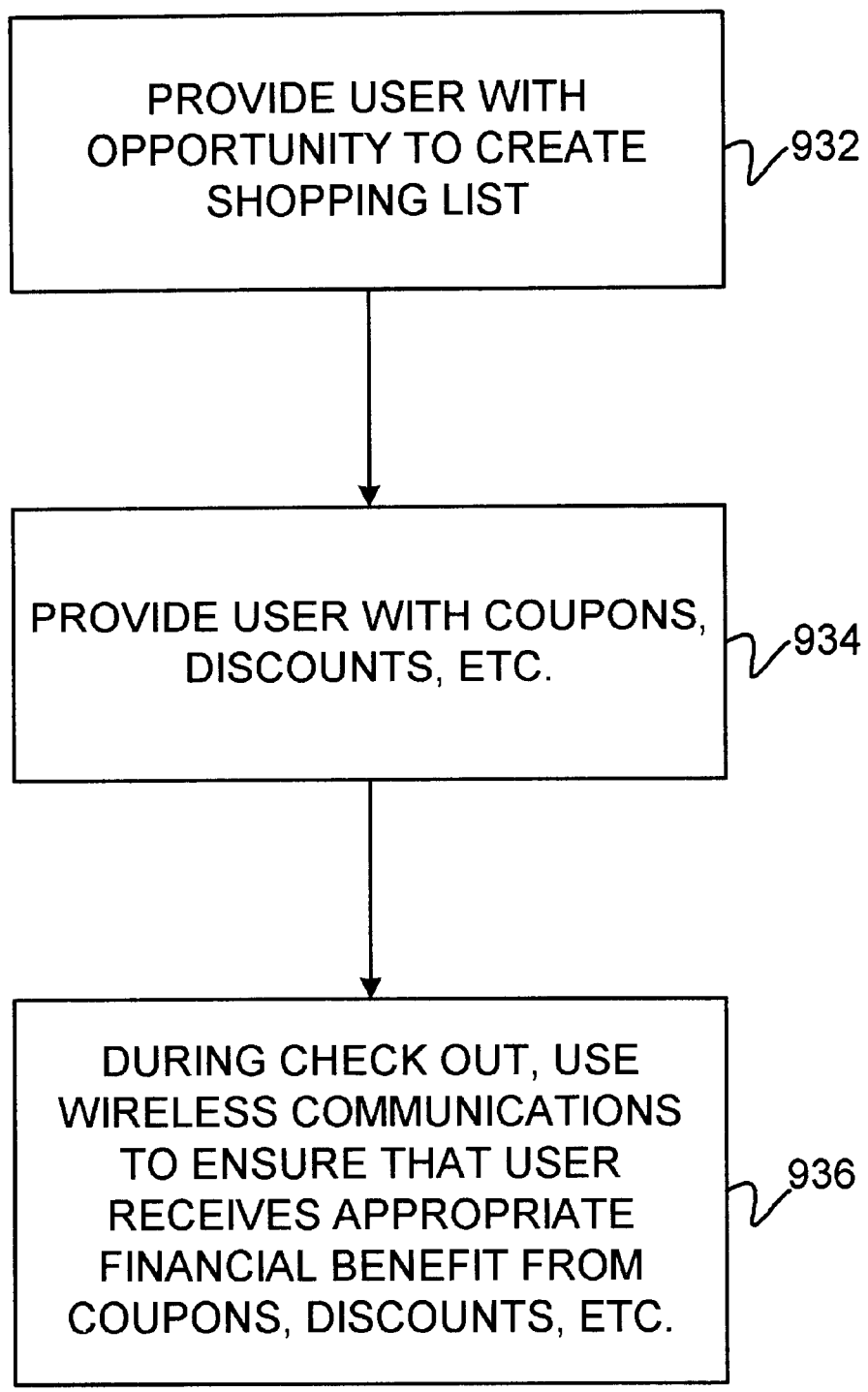
FIG. 99 is a flow chart of illustrative steps involved in ensuring that entitled customers receive discounts in accordance with the present invention.

Illustrative steps involved in ensuring that customers receive appropriate discounts at checkout are shown in FIG. 99. At step 932, the user may be provided with an opportunity to create a shopping list using equipment such as handheld computing device 12, an in-home electronic device, a personal computer, an automobile personal computer, etc.

At step 934, the user may be provided with coupons, discounts, etc. For example, handheld computing device 12 may be used to display on-screen options that the user may interact with to obtain discounts and the like.

At step 936, the store's computer system or other suitable equipment may be used to ensure that eligible users receive discounts at checkout. Various techniques may be used to ensure that users who accept offers or are otherwise entitled to a discount or the like receive the appropriate financial benefit at checkout. For example, the user may have a loyalty card (e.g., a bar-coded or plastic credit-card-sized or key-chain-sized card) that has an associated account number. The user may use this loyalty card during checkout to receive discounts on certain products. The store's cash register system can verify that a user's loyalty card account is valid during the checkout process by scanning the bar code, by reading a magnetic strip on the loyalty card, by allowing a store employee to type in the number of the loyalty card, etc. Because the customer's identity may be ascertained during checkout based on the loyalty card account information, this account or any type of account may be used by handheld computing device 12 to inform the store of the identity of the user when the user is responding to an on-screen offer displayed by handheld computing device 12.

As another example, each time the shopping assistance service provides an interactive offer to the user, the user may be asked to provide identifying information to the handheld computing device 12 such as the user's name. The shopping assistance service may provide this identifying information and information on the offers to which the user responded to the store's cash register system for use during checkout. The user may be asked to provide the identifying information to the store's cash register system during checkout, so that the user's entitlement to the offers may be verified and the offers applied to the user's purchases.

If handheld computing device 12 is used for wireless purchase transaction during checkout, handheld computing device 12 may wirelessly provide the store's cash register system with information that identifies the user or that directly identifies which offers the user is entitled to.

These are merely illustrative examples. Any suitable technique may be used to allow different offers to be offered to different shoppers. If desired, all shoppers may be entitled to receive the same offers. The passive and interactive promotional information that is provided to users may still be targeted to various users, regardless of whether all users or only a responding or otherwise qualified subset of users are entitled to receive a given benefit.

Figure 100:
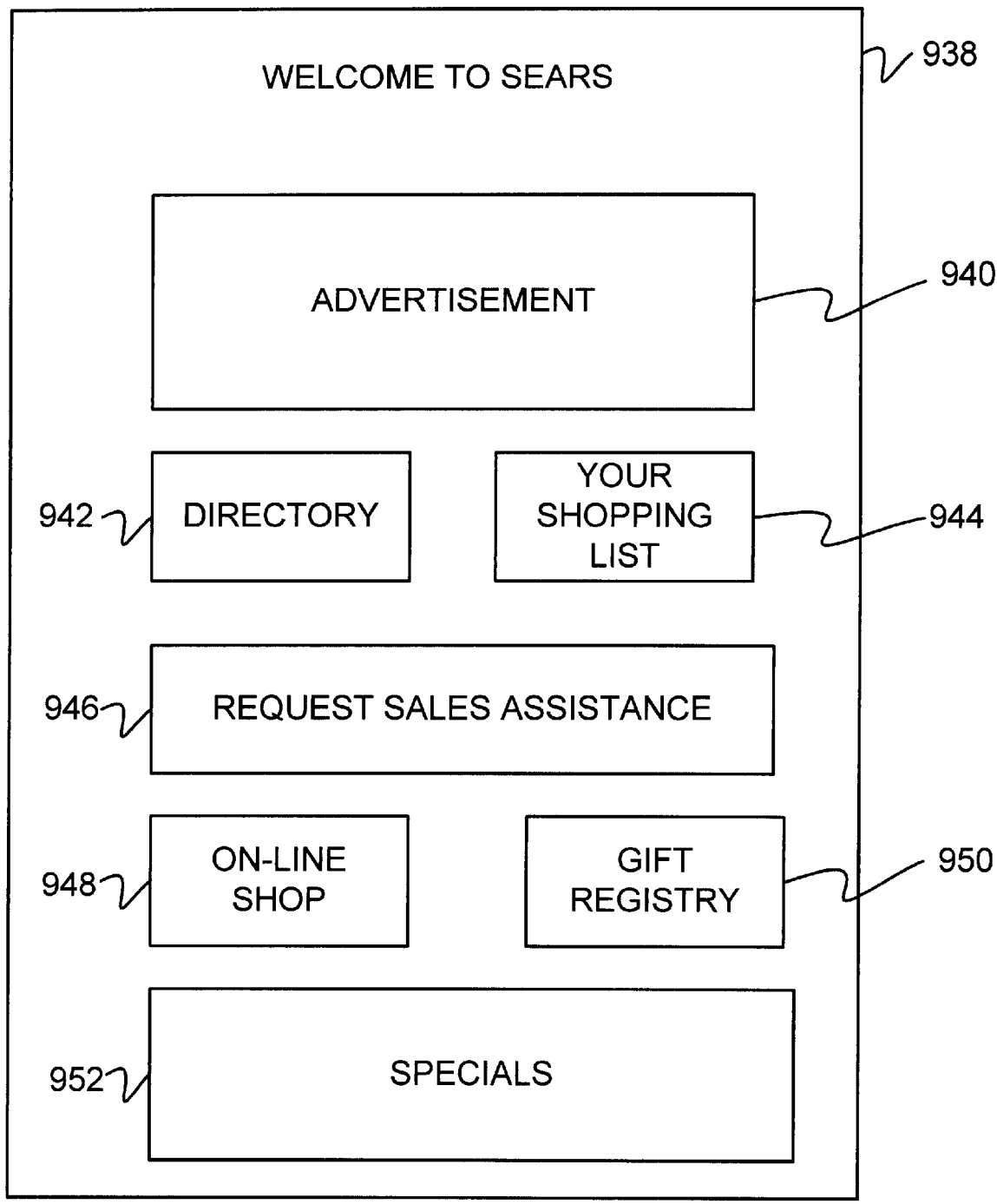
FIG. 100 shows a screen containing an illustrative main menu that may be displayed by a department store shopping assistance service in accordance with the present invention.

Handheld computing device 12 may be used to provide the user with access to a shopping assistance service in a department store or other such establishment. An illustrative screen 938 that may be provided by a shopping assistance service for a department store is shown in FIG. 100. Screen 938 may contain promotional information such as advertisement 940. Screen 938 may also include on-screen options such as directory option 942, your shopping list option 944, request sales assistance option 946, on-line shop option 948, gift registry option 950, and specials option 952.

Figure 101:
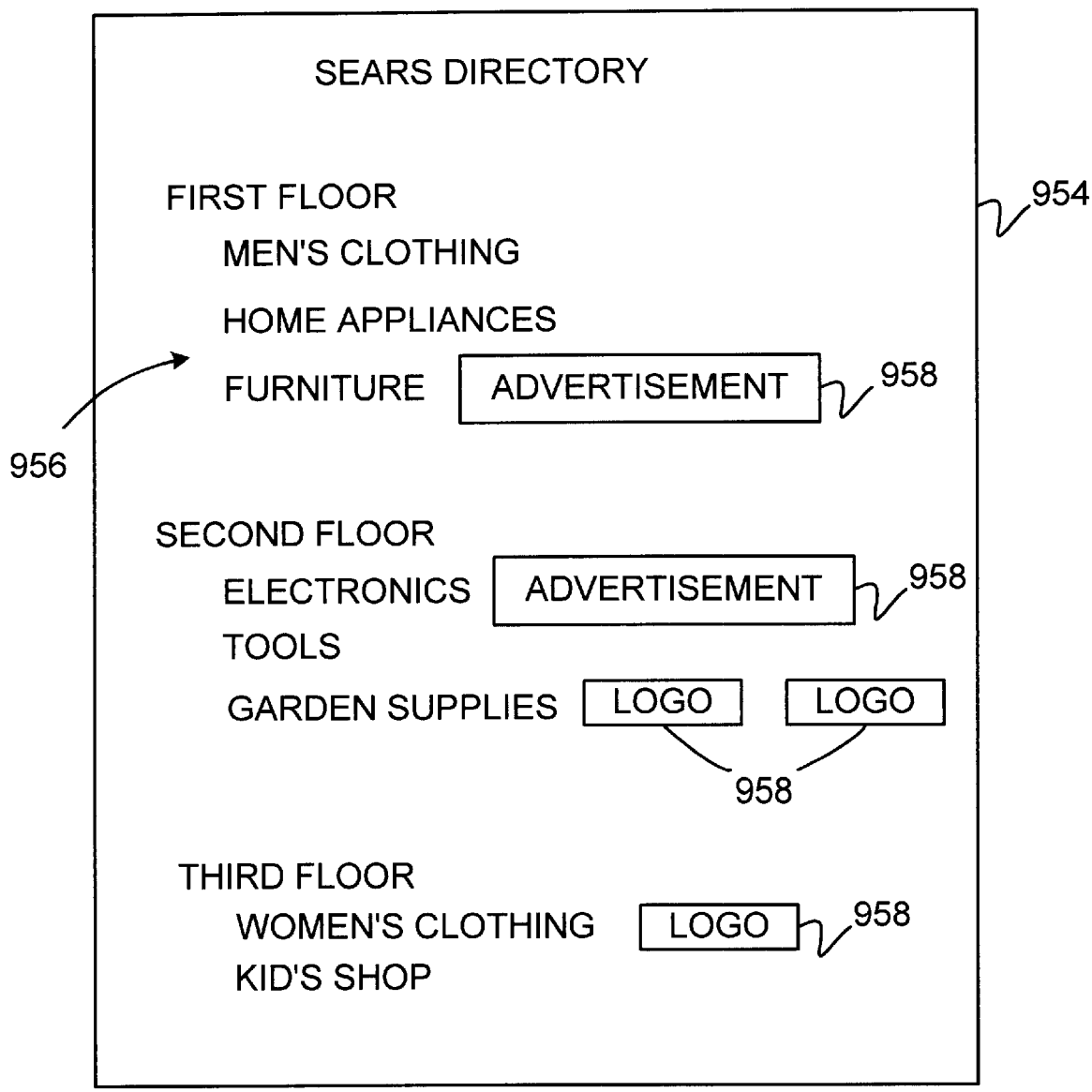
FIG. 101 shows an illustrative directory screen that may be displayed by a shopping assistance service in accordance with the present invention.

If the user selects directory option 942 of FIG. 100, handheld computing device 12 may display a screen such as screen 954 of FIG. 101. Screen 954 may contain a list 956 of the various departments of the store. For example, departments such as men's clothing, home appliances, and furniture may be listed. The departments may be grouped together based on location, may be organized alphabetically, etc.

Advertisements and logos 958 may be displayed adjacent to department names. For example, a particular brand of television may be promoted by displaying an advertisement or a logo for that brand immediately adjacent to the directory entry for the electronics department.

If the user selects your shopping list option 944 of FIG. 100, handheld computing device 12 may display the user's shopping list. The shopping list may have been generated using, for example, a personal computer, an in-home electronic device, an automobile personal computer, or handheld computing device 12. The shopping list information may be stored on any suitable computer such as a computer located at the store, a computer associated with the store, a remote server (e.g., a remote server accessible over the Internet), etc.

Figure 102:
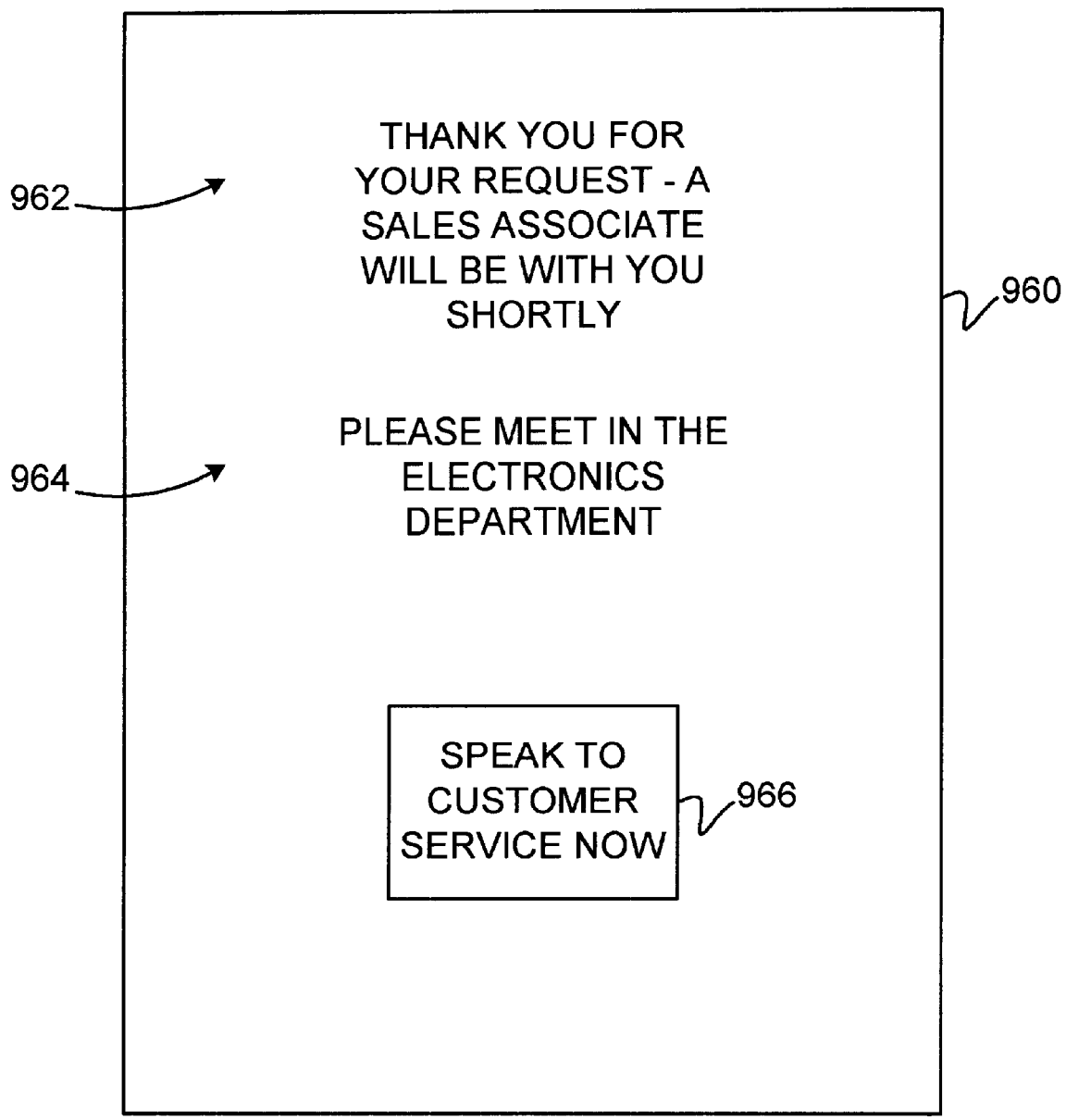
FIG. 102 shows an illustrative confirmation screen that may be displayed by a shopping assistance service when the user requests sales assistance in accordance with the present invention.

The user may use handheld computing device 12 to request sales assistance. The user may, for example, select an option such as request sales assistance option 946 of FIG. 100. If the user selects option 946, handheld computing device 12 may display a screen such as screen 960 of FIG. 102. Screen 960 may contain a confirmation message 962 and information 964 on the location at which the user should meet the store's sales assistant. If desired, information 964 may be based on the user's current location. The user's current location may be determined using any suitable technique such as by determining which local wireless transmitter/receiver handheld computing device 12 is in communication with or by using GPS techniques or other location-determination techniques. Information 964 may also be based on the user's request for sales assistance. For example, if the user was viewing a screen related to the electronics department when the user selected an on-screen option requesting sales assistance, the user may be provided with sales assistance in the electronics department.

If desired, screen 960 may contain an option such as option 966 that uses handheld computing device 12 to automatically place a telephone call to one of the store's customer service representatives or other store personnel.

The department store may provide customers with a gift registry feature. Customers may sign up with the registry over the web or using equipment in the store. A customer may provide name and address information and a list of gifts (e.g., wedding gifts) that the user wishes to receive. The registry information may be stored in a database on a computer located in the store, a computer associated with the store, a remote server, etc.

Figure 103:
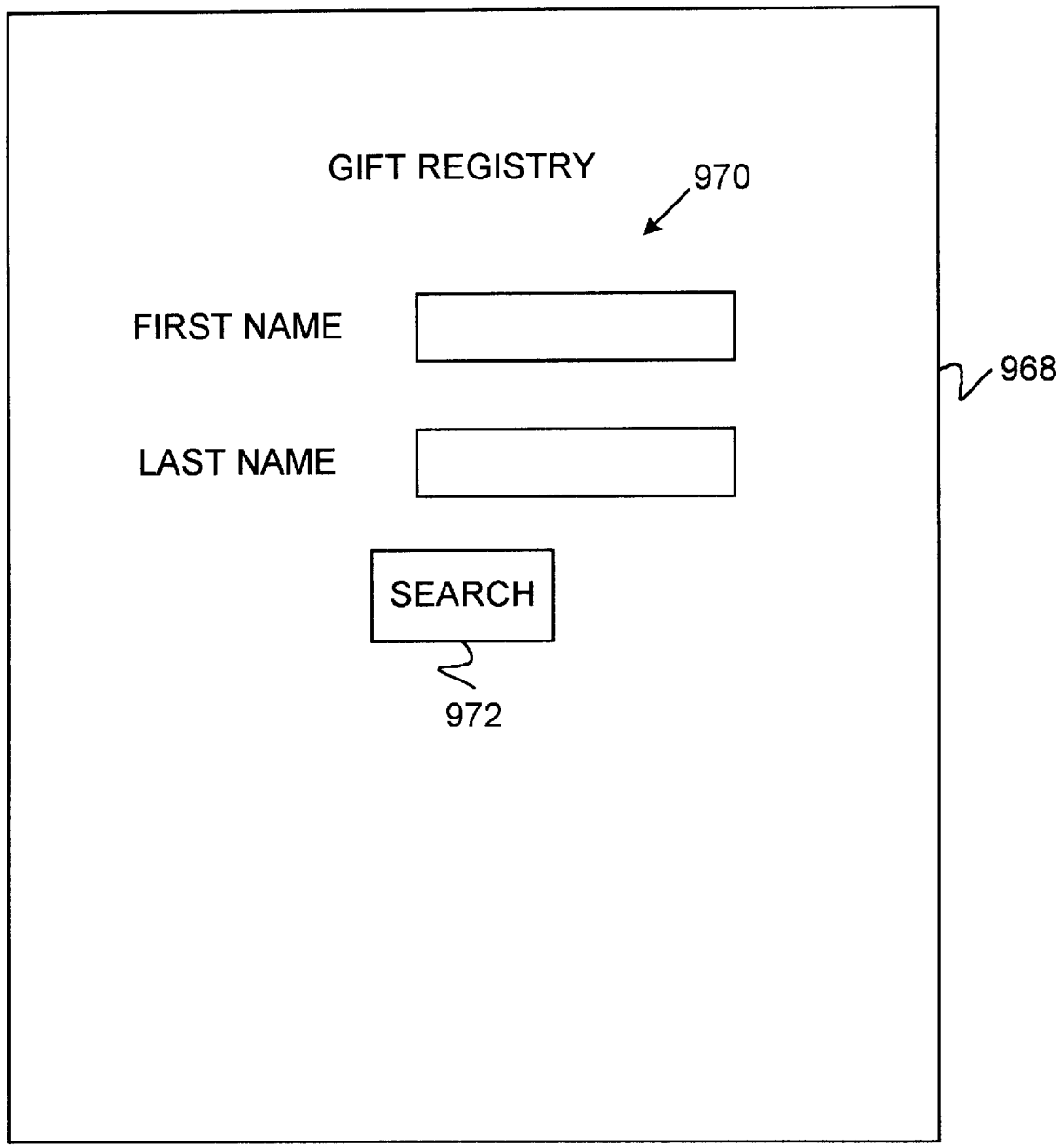
FIG. 103 shows an illustrative gift registry search screen that may be displayed by a shopping assistance service in accordance with the present invention.

The user may access the gift registry database with handheld computing device 12. For example, the user may select option 950 of FIG. 100. If the user selects option 950, handheld computing device 12 may be used to display a screen such as screen 968 of FIG. 103. Screen 968 may contain a data entry region 970 in which the user may supply information sufficient to uniquely identify the customer of interest. When the user selects search option 972, handheld computing device 12 may access and display the customer's gift information from the registry database.

Figure 104:
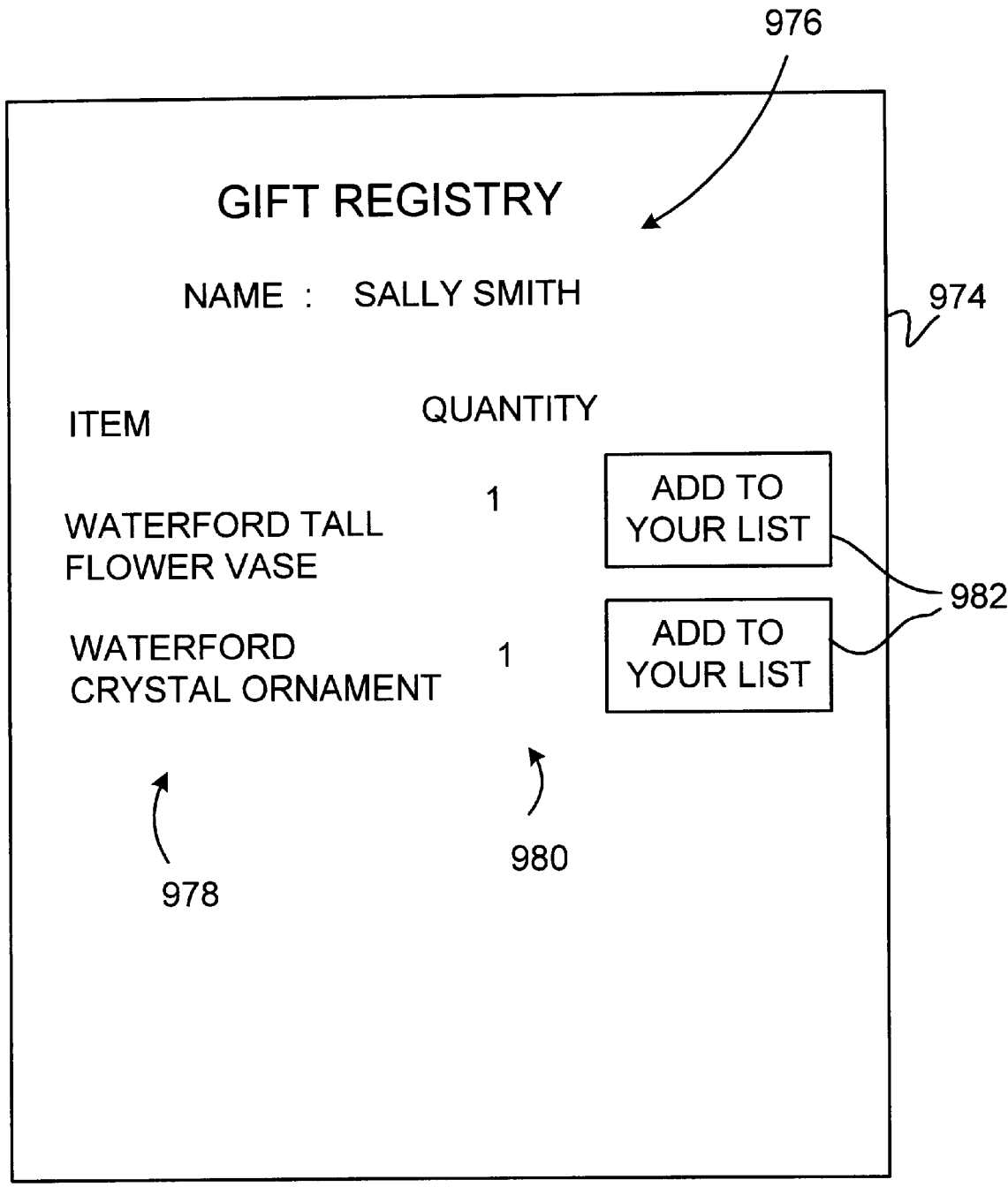
FIG. 104 shows an illustrative gift registry search results screen that may be displayed by a shopping assistance service in accordance with the present invention.

An illustrative screen 974 that handheld computing device 12 may display when search option 972 has been selected is shown in FIG. 104. Screen 974 may contain the name 976 of the customer who has registered for gifts. A list 978 of the gifts that have been requested by the customer may be displayed. Screen 974 may also contain information 980 on the quantity of each item that has been requested by the customer.

Options such as options 982 may be provided to allow the user to transfer the listed items from the gift registry list onto the user's shopping list. Once options 982 have been used, a gift will appear on the user's shopping list. The user's shopping list may be displayed on handheld computing device 12 by, for example, selecting option 944 of FIG. 100.

Figure 105:
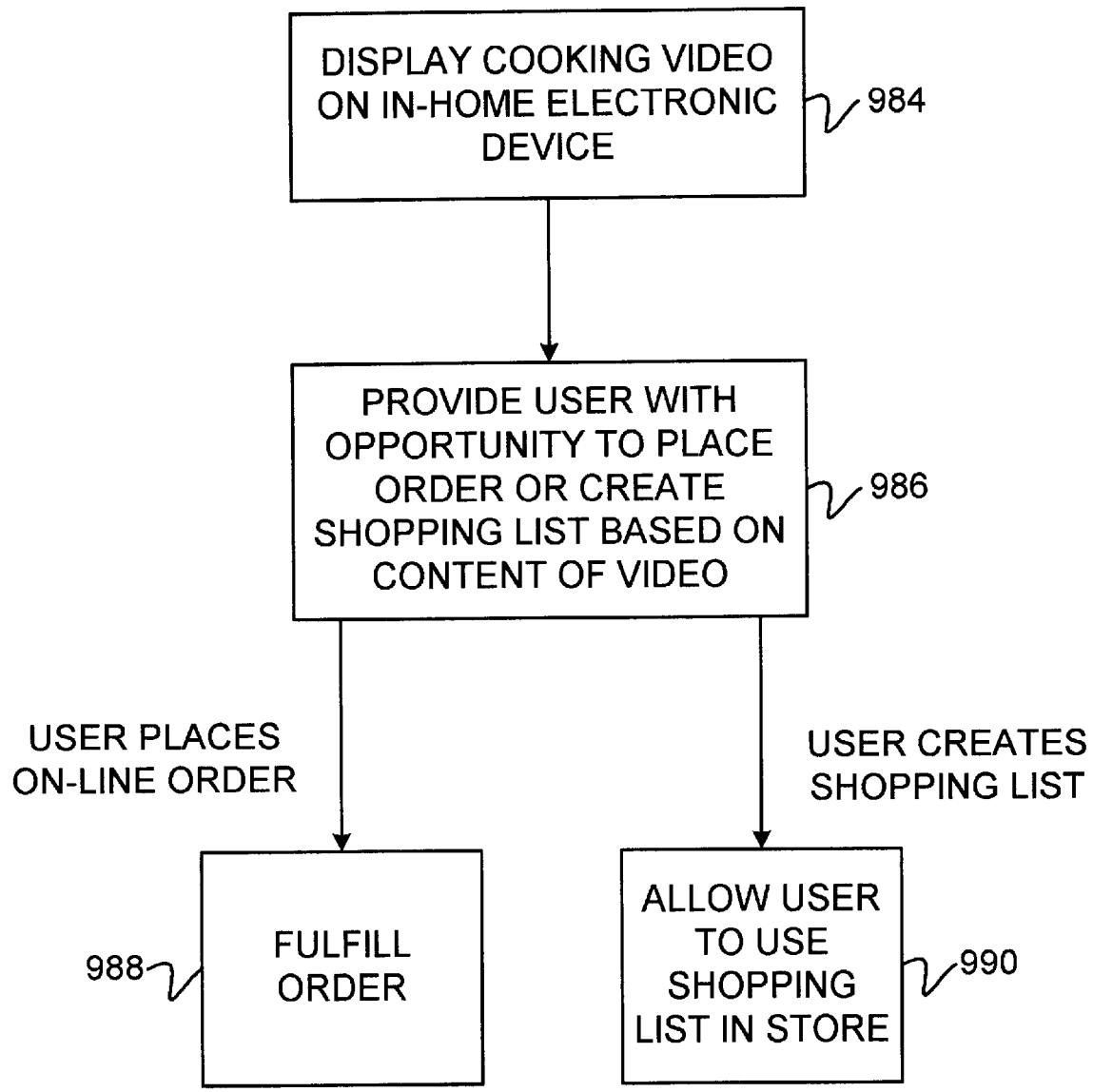
FIG. 105 is a flow chart of illustrative steps involved in creating a shopping list based on video content in accordance with the present invention.

If desired, the user may create a shopping list based on a video displayed in the user's home or other suitable location or based on video (e.g., a promotional video) displayed on handheld computing device. Illustrative steps involved in creating a shopping list based on a video are shown in FIG. 105. In the example of FIG. 105, the video is related to cooking. This is merely illustrative. The video may be related to any suitable topic.

At step 984, a cooking video may be displayed. The video may be displayed in the user's home. For example, a cooking video may be displayed on an in-home electronic device such as a personal computer, a refrigerator-mounted electronic device, a countertop electronic device, or any other suitable electronic equipment capable of displaying video. The cooking video may also be displayed on handheld computing device 12 when the user is in the supermarket. Such a video may be displayed, for example, when the user selects appropriate on-screen options provided by a supermarket shopping assistance service.

Figure 106:
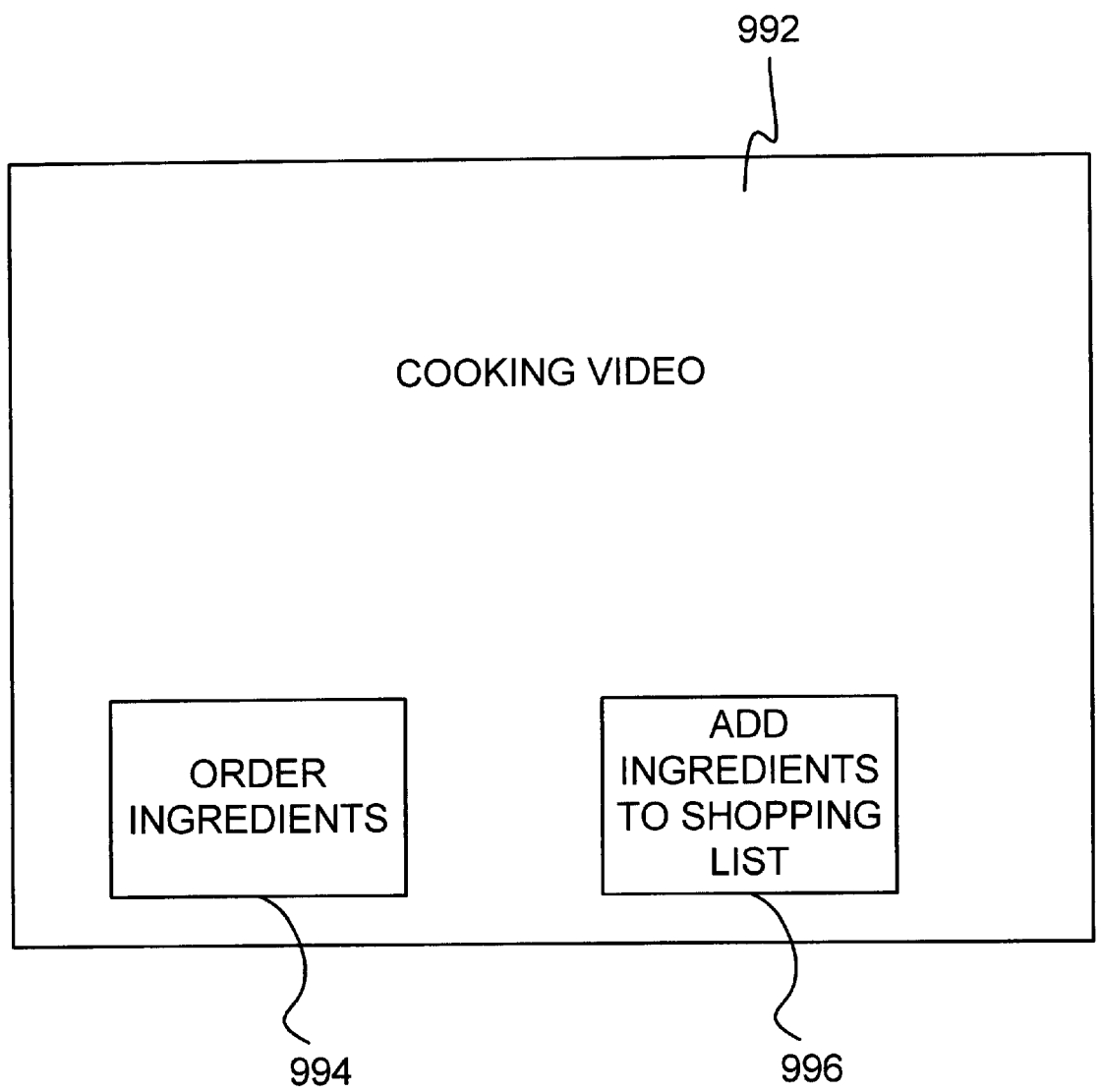
FIG. 106 shows an illustrative screen containing video and on-screen options that allow the user to order ingredients associated with the video or to add ingredients associated with the video to the user's shopping list in accordance with the present invention.

At step 986, the user may be provided with on-screen options or the like on the in-home device or handheld computing device that allow the user to place an order or create a shopping list based on the content of the video. The on-screen options may be displayed on the screen of the in-home electronic device or the screen of the handheld computing device. An illustrative screen 992 for an in-home electronic device is shown in FIG. 106. The options of this screen may also be provided with a handheld computing device.

The user may select an option such as option 994 of FIG. 106 to order the ingredients associated with a recipe being discussed on the cooking video. The order may be placed independently or may be combined with an existing on-line order. Information on which ingredients are associated with the cooking video may be provided using any suitable technique. For example, this information may be provided to the in-home device or handheld computing device over the Internet or a suitable wireless communications link. If the video is being played back from a storage medium, information on the ingredients may be obtained from the storage medium. If the user places an on-line order, the order may be fulfilled by an order fulfillment facility or the like at step 988 of FIG. 105.

The in-home device or handheld computing device may provide the user with an opportunity to create a shopping list based on the content of the video by, for example, displaying on-screen options for the user such as on-screen option 996 of FIG. 106. The user may select an appropriate option such as option 996 to direct the in-home device or handheld computing device to add the ingredients being discussed in the video to the user's shopping list. Information on which ingredients are associated with the cooking video may be provided using any suitable technique. As just one example, this information may be provided to the in-home device over the Internet or may be provided to the handheld computing device over a local or remote wireless link. If the video is being played back from a storage medium, information on the ingredients may be obtained from the storage medium. If the user adds the ingredients to the user's shopping list, the shopping list may be used during in-store shopping at step 990. For example, the shopping list may be displayed a mobile electronic device such as a handheld computing device 12 or a shopping cart-mounted electronic device during in-store shopping.

Figure 107:
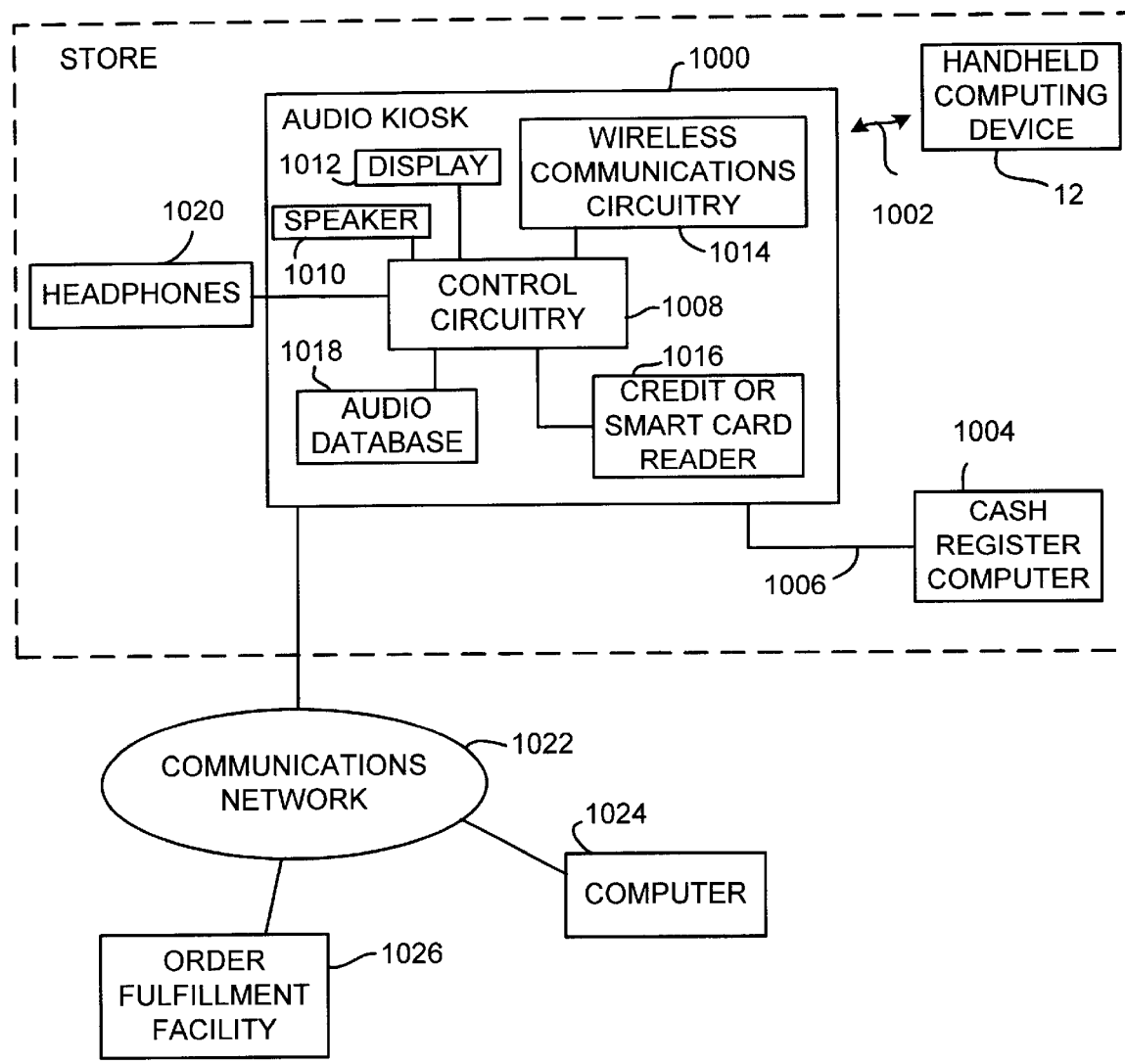
FIG. 107 is a schematic diagram of an illustrative kiosk system in accordance with the present invention.

Kiosks may be used to deliver content to handheld computing device 12. An illustrative audio kiosk system is shown in FIG. 107. System 998 may have an audio kiosk 1000 from which a user at handheld computing device 12 may download audio content over a wireless or wired link 1002 (e.g., a local IR or RF wireless link). The handheld computing device of FIG. 107 may be a handheld computer or a handheld MP3 player or the like. Handheld computing device 12 may be used to pay for the products and service of store 1004 by wirelessly interacting with cash register computer 1004. The user may also pay for products by wirelessly interacting with audio kiosk 1000 (either through wireless communications circuitry 1014 or smart card reader 1016. If desired, audio kiosk 1000 and the store's cash register computer 1004 may be connected by communications path 1006. This may facilitate transactions in which the user pays for the services of audio kiosk 1000 at cash register 1004.

Audio kiosk 1000 may include control circuitry 1008. Control circuitry 1008 may be based, for example, on a microprocessor or microcontroller or the like. Memory circuitry in control circuitry 1008 may be used to store instructions for applications that are executed by control circuitry.

Speaker 1010 may be used to play audio to the user such as sample audio clips. The user may also listen to audio using speakers such as headphones 1020. A display 1012 may be used to provide the user with on-screen options and information. Handheld computing device 12 may communicate with audio kiosk 1000 using wireless communications circuitry 1014. Wireless communications circuitry 1014 may support local wireless communications such as IR communications and local wireless RF communications. Wireless communications circuitry 1014 may support infrared communications using any suitable protocol.

Audio files may be stored in audio database 1018. If desired, audio database 1018 may be implemented on a remote server or media jukebox or the like. Any suitable format may be used to store audio files in audio database 1018. As just one example, audio files may be stored in the MP3 format.

Credit card or smart card reader 1016 may be used to process the user's credit card or smart card.

If desired, audio files may be downloaded from audio database 1018 to computer 1024 over a communications network 1022 such as the Internet.

Orders for products may be fulfilled by order fulfillment facility 1026. Such orders may be placed by the user electronically from audio kiosk 1000 and delivered to the user's home.

Figure 108:
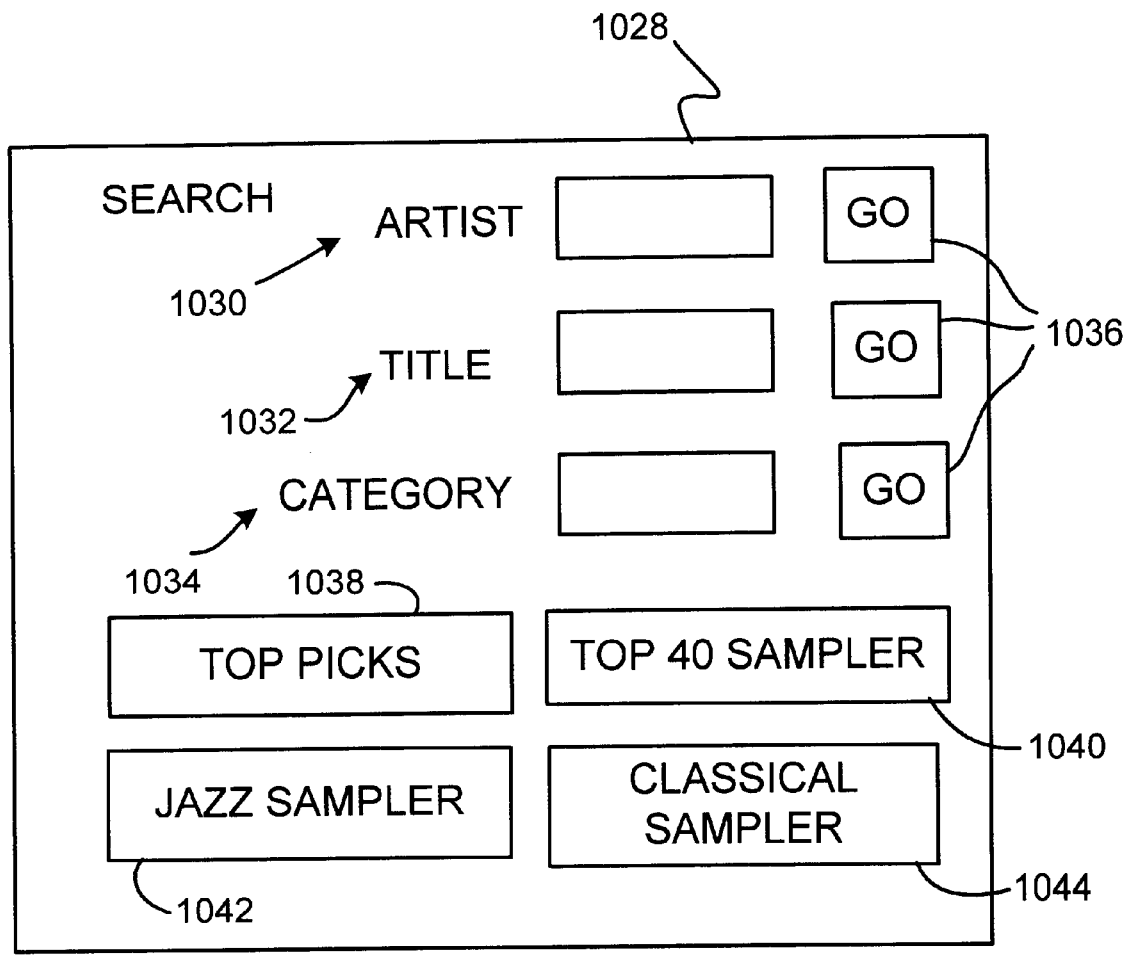
FIG. 108 shows an illustrative screen that an audio kiosk may display in accordance with the present invention.

An illustrative screen 1028 that may be displayed by audio kiosk 1000 on display 1012 is shown in FIG. 108.

Screen 1028 may include search options for locating audio files of interest. For example, option 1030 may allow the user to specify an artist of interest. A keyboard, keypad, on-screen keyboard, or any other suitable user input interface may be used by the user to supply a desired artist search string for option 1030. Option 1032 may be used to search for a desired audio file by its title. Option 1034 may be used to search for audio content by category, option 1036 may be used to initiate a search based on a search string entered using one of options 1030, 1032, 1034, etc.

Screen 1028 may also contain a top picks option 1038 for locating audio files that are categorized as being top picks. Top 40 sampler option 1040 may be selected if the user desires to listen to a sample of recent top 40 releases. Jazz sampler option 1042 may provide the user with an opportunity to listen to jazz samples. Classical sampler 1044 may provide the user with an opportunity to listen to classical audio samples.

The options of screen 1028 are merely illustrative. Any suitable options or combination of options may be used to provide the user with access to samples and copies of the audio files of audio database 1018 if desired.

Figure 109:
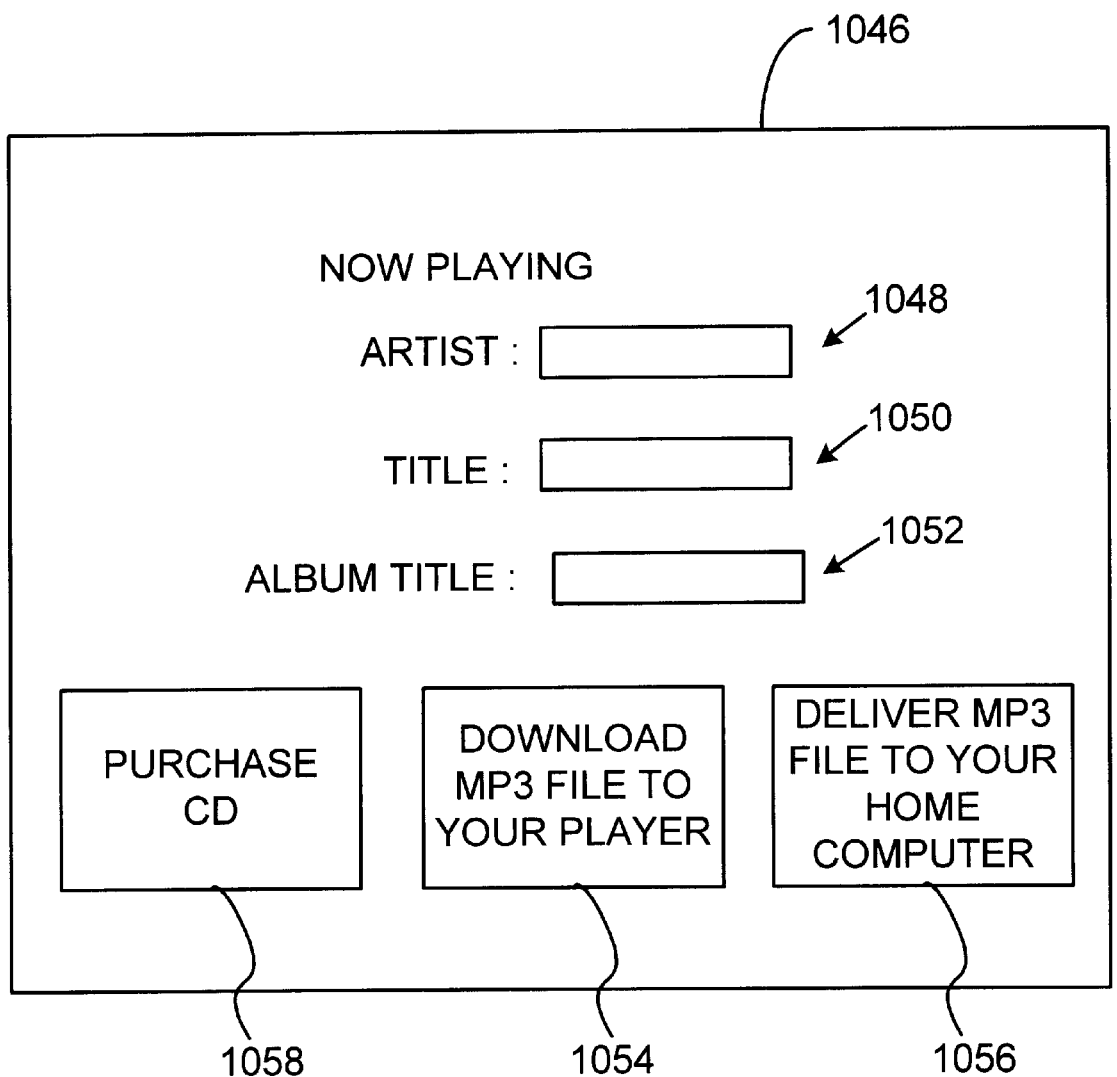
FIG. 109 shows another illustrative screen that an audio kiosk may display in accordance with the present invention.

When the user locates an audio file of interest, audio kiosk 1000 may play a sample of the audio file and may display a screen such as screen 1046 of FIG. 109. Screen 1046 may include information 1048 on the artist associated with the currently playing track, screen 1046 may also include information 1050 on the title of the currently playing track.

Album title information 1052 for the currently playing track may also be displayed.

If the user likes the sample, the user may select option 1054 to download the audio file to handheld computing device 12. The audio file may be downloaded in any suitable format such as the digital MP3 format. The audio file may be downloaded over a wired link (e.g., using a cable or a cradle or the like), may be provided on a memory medium (e.g., flash card or other suitable solid state memory or the like), may be downloaded over a remote wireless link, or may be downloaded over a local IR or RF wireless link.

Audio files may be sent to the user's computer 1024 of FIG. 107 from audio database 1018 by selecting option 1056.

The user may order a CD or DVD or other hard media version of the tracks contained on the audio files if desired. For example, the user may select option 1058. If the user selects option 1058, audio kiosk 1000 may provide on-screen options that allow the user to provide delivery information such the user's home address and the like. This information may be transmitted to order fulfillment facility 1026. The product order may then be fulfilled by order fulfillment facility 1026.

Figure 110:
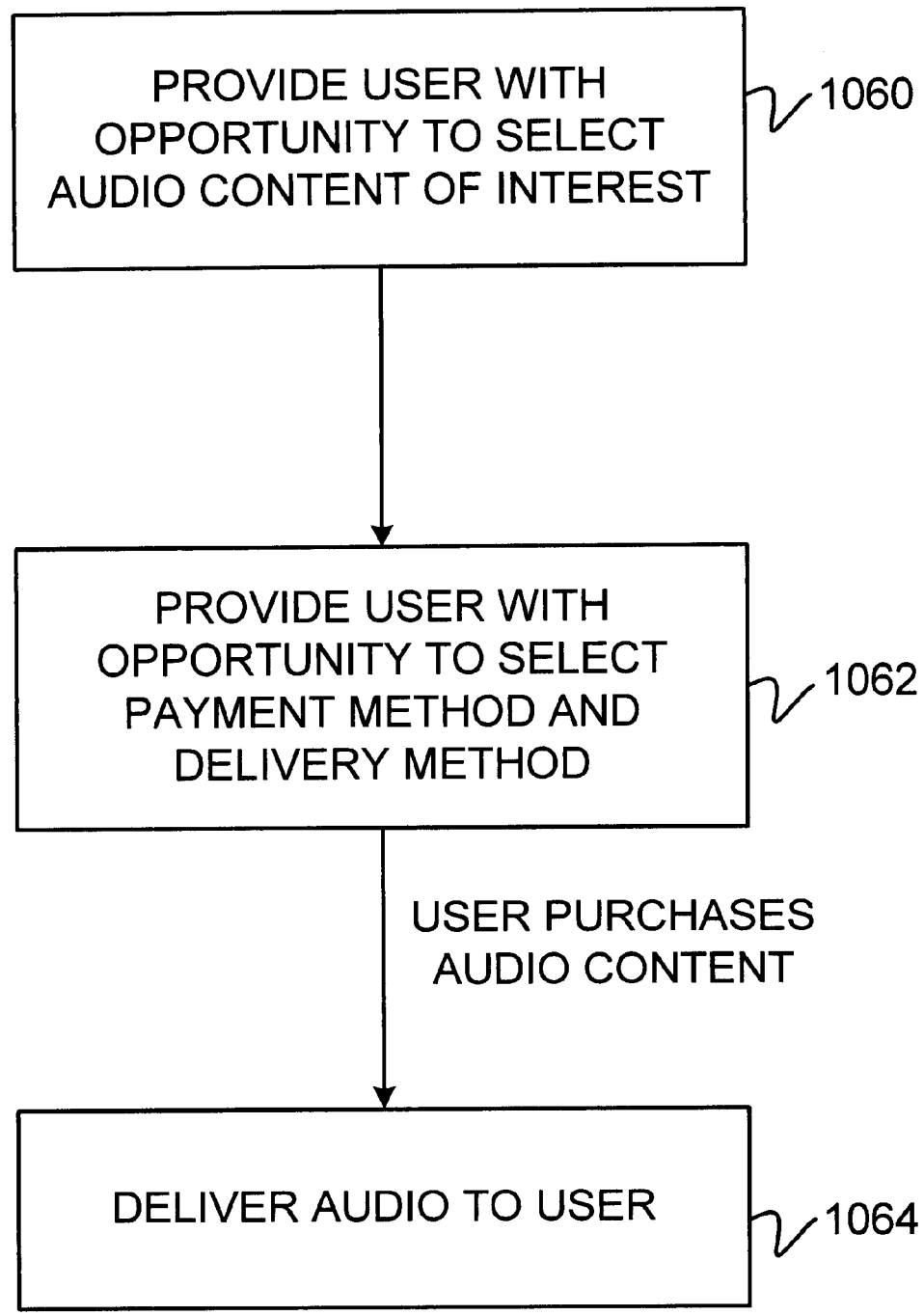
FIG. 110 is a flow chart of illustrative steps involved in using an audio kiosk in accordance with the present invention.

Illustrative steps involved in using system 998 of FIG. 107 to provide the user with audio files are shown in FIG. 110. At step 1060, the audio kiosk may display on-screen options and the like that provide the user with an opportunity to select audio content of interest. The options may allow the user to listen to a sample of the audio content.

At step 1062, the audio kiosk displays on-screen options and the like that provide the user with an opportunity to select a desired payment method. A delivery method may also be selected if the user is ordering a product for delivery.

The audio content may be purchased by providing the audio kiosk with a credit card or smart card, by providing cash to the kiosk (e.g., using a bill reader), by using handheld computing device 12 to wirelessly provide financial information to audio kiosk 998, or using any other suitable technique. After the user purchases audio content, audio kiosk 998 may be used to deliver audio to the user. For example, MP3 files or other suitable digital audio files may be downloaded to handheld computing device 12 over a local wireless link or other suitable communications path. MP3 files or other suitable digital audio files may also be downloaded to the user's home computer 1024 (FIG. 107). A CD or other such hard copy of the purchased audio content may be delivered to the user's home.

Figure 111:
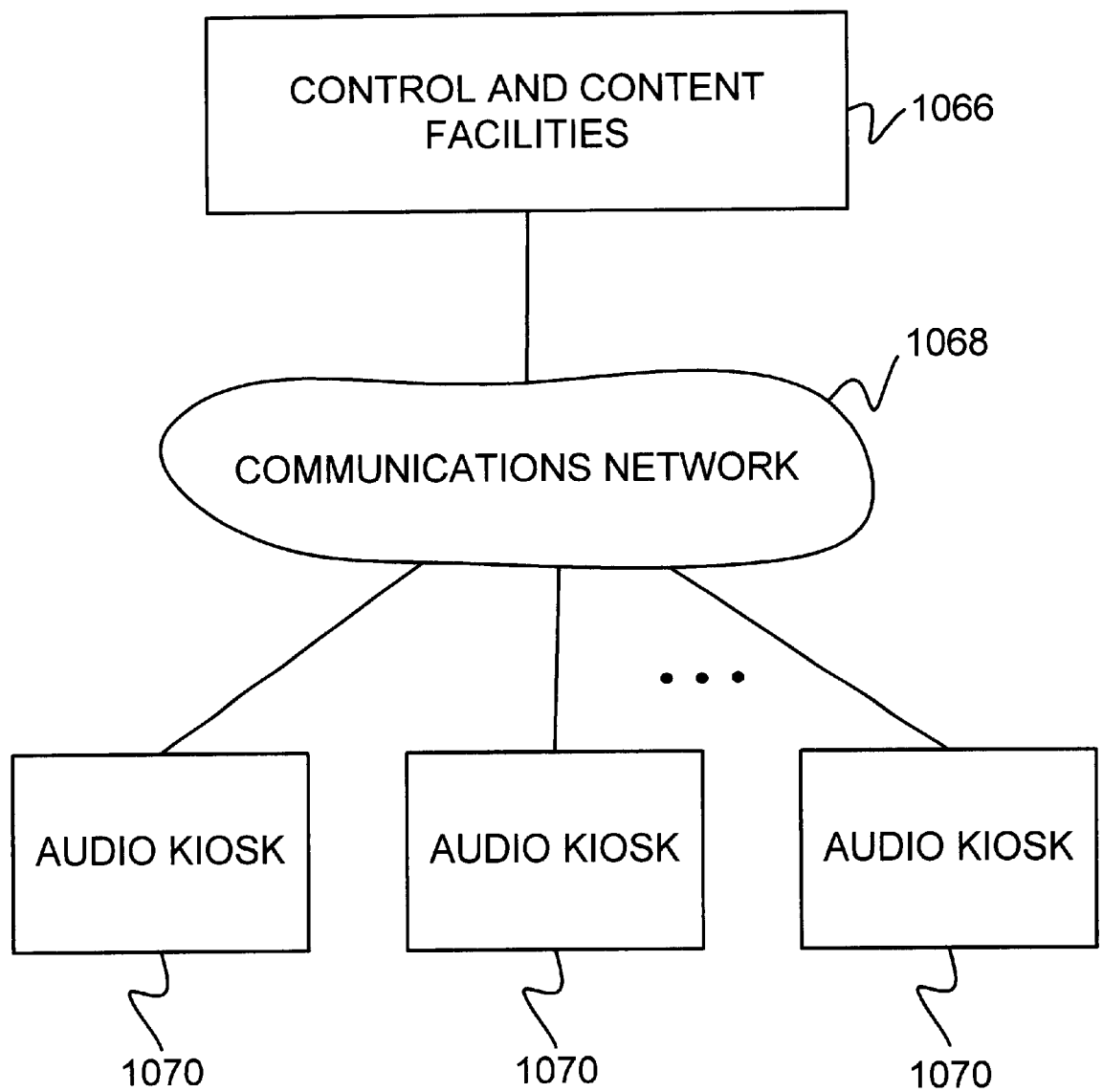
FIG. 111 is a schematic diagram of an illustrative kiosk system having control and content facilities in accordance with the present invention.
Figure 112:
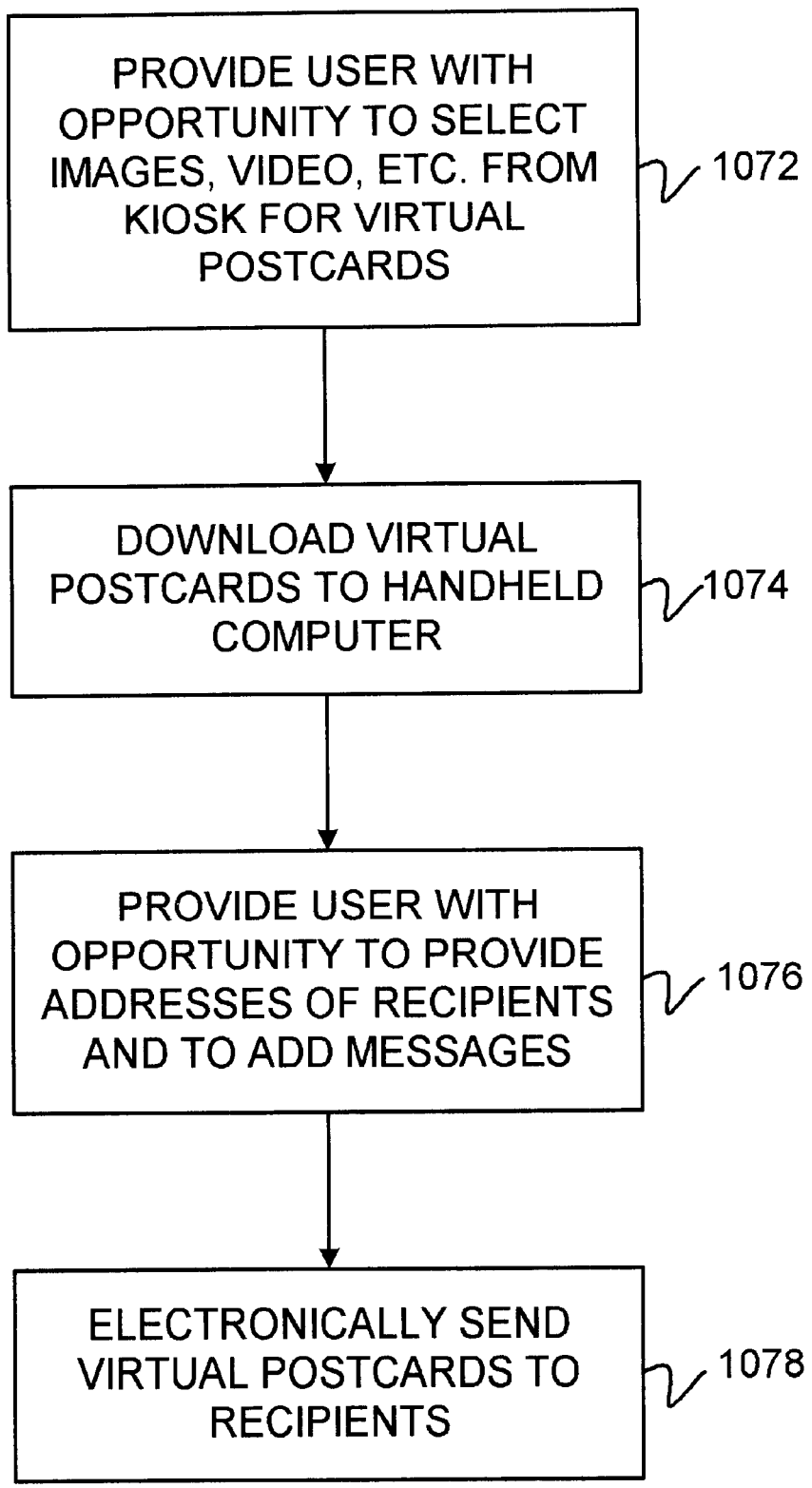
FIG. 112 is a flow chart of illustrative steps involved in using a kiosk to provide virtual postcards to a handheld computing device in accordance with the present invention.

Content may be distributed to audio kiosks such as audio kiosk 998 using any suitable arrangement. For example, as shown in FIG. 111, control and content facilities 1066 may be connected to multiple audio kiosks 1070 over a communications network 1068. Control and content facilities may be used to update the audio files stored in audio database 1018. If desired, one or more master audio databases may be maintained at facilities 1066 and audio content from such databases distributed to audio kiosks 1070 over communications network 1068.

If desired, audio kiosks such as kiosk 998 may be located in airports, outdoors, in public places, etc. In restaurants and other establishments with multiple seating locations or the like, each seating location may be provided with a separate terminal. The separate terminals may be connected to a central kiosk platform if desired.

Kiosks may be used to provide handheld computing device 12 with digital images and video. Illustrative steps involved in using a kiosk to provide a user with digital images and video are shown in 112. A kiosk such as kiosk 998 (FIG. 107) may be provided with a video and image database in addition to or in place of an audio database. At step 1072, the user may be provided with an opportunity to select images, video, and other content from the kiosk. For example, the kiosk may display on-screen options that allow the user to browse through various images and video clips by title, artist, subject. The options may be used to allow the user to view samples of the images and video clips.

One example of a suitable type of image that may be provided by the kiosk is a virtual postcard. A virtual postcard is an image like a postcard image that is available in electronic form. At step 1074, the kiosk may display on-screen options that allow the user to request that the virtual postcard or other suitable digital images and video be downloaded to handheld computing device 12 (e.g., over a local or remote wireless link or a physical link).

At step 1076, the handheld computing device 12 may be used to provide the user with an opportunity to provide communications addresses for the desired recipients. For example, handheld computing device 12 may display on-screen options that allow the user to input the communications addresses. The communications addresses may be e-mail addresses. The user may also use handheld computing device 12 to add text or audio or video clip messages to the virtual postcards. Because the virtual postcards need not be sent to the recipients directly from the kiosk, the user may have ample time to add personalized messages.

At step 1078, handheld computing device 12 may be used to electronically send the selected virtual postcards to recipients. For example, handheld computing device 12 may send the virtual postcards to the recipients over the Internet using a remote or local wireless link or a physical link.

If desired, the virtual postcards may be composed and sent directly from the kiosk, rather than through handheld computing device 12.

Handheld computing device 12 may be used to order products that are to be picked up in a store. For example, a user in a supermarket may use handheld computing device 12 to place an order at the deli section of the supermarket. The user need not make a financial commitment to purchase the product at the time the order is placed. In particular, the user may place the order without providing any financial information to the deli.

Figure 113:
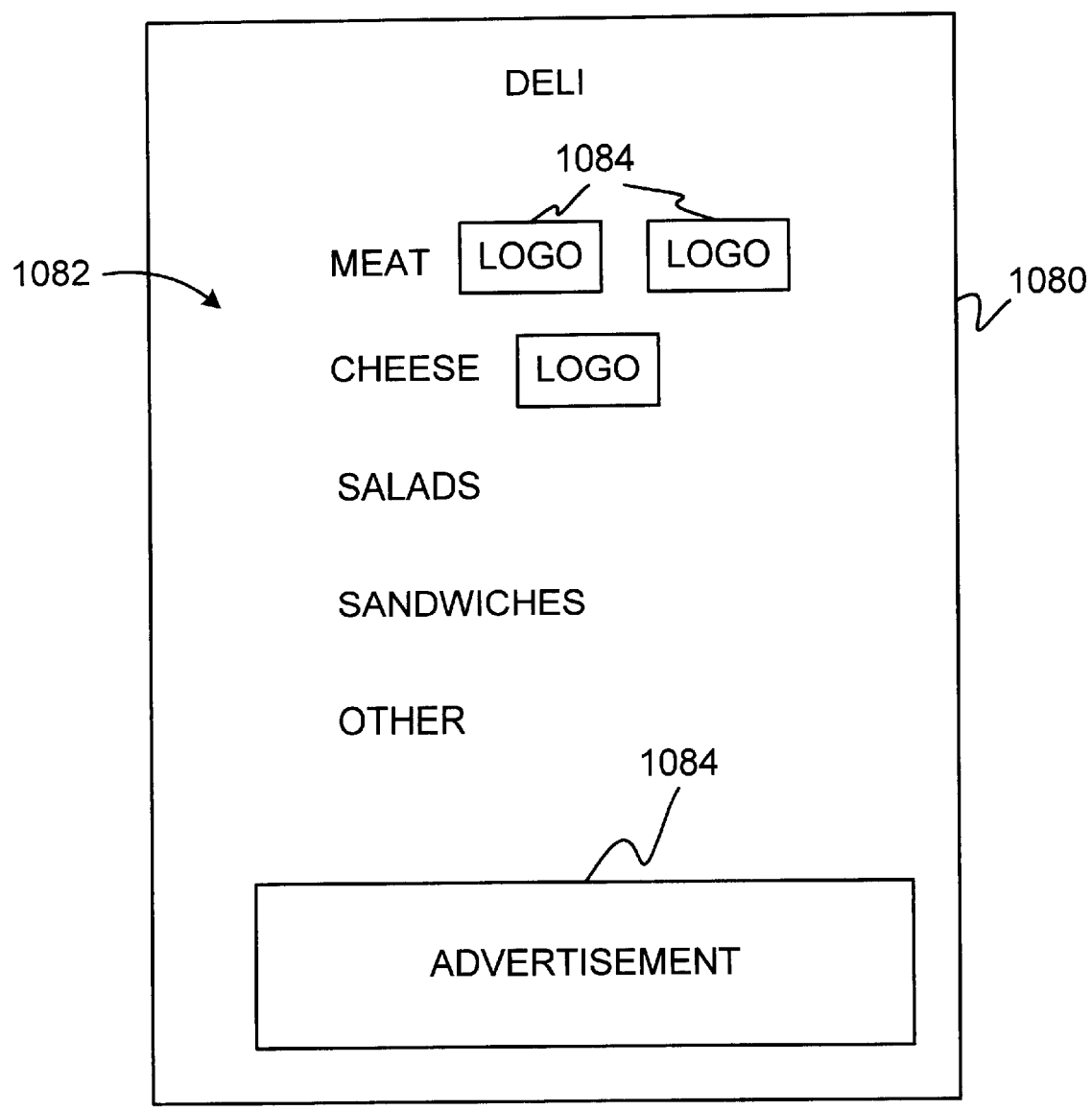
FIG. 113 shows an illustrative screen that may be displayed to provide the user with an opportunity to place an order at a supermarket deli using the handheld computing device in accordance with the present invention.

An illustrative screen 1080 that may be displayed by handheld computing device 12 to provide the user with an opportunity to place a deli order is shown in FIG. 113. Screen 1080 may be displayed when, for example, the user selects an option such as option 1081 of FIG. 82. Screen 1080 may contain on-screen options 1082 that the user may select to place an order for different deli items. The user may, for example, select the meat option. In response, handheld computing device 12 may display on-screen options that allow the user to select a desired type of meat, a desired quantity, etc. The on-screen options may also allow the user to supply a name or other identification to be used when the user picks up the item. If desired, the user may be automatically assigned a number to be used to identify the order. These approaches are merely illustrative. Any suitable techniques may be used to allow the user to select the items to be picked up and to identify the order. The user may be charged for the order when it is placed or the order may be paid for during checkout.

Screen 1080 may include promotional information such as logos and advertisements 1084. Such promotional information may, for example, be associated with certain brands of deli products. If desired, promotional material may be placed adjacent to relevant on-screen options. For example, a logo for a particular brand of meat may be place adjacent the meat category.

The promotional material may be interactive. For example, the user may select a particular logo. If the user selects a given logo, the user may be provided with on-screen ordering options that primarily or exclusively feature that brand.

The order may be placed using a remote or local wireless link to connect the handheld computing device to a computer located in the store, a computer associated with the store, a remote server that is in communication with the store's computer system, or using any other suitable approach. As an example, the order may be placed to the store's computer system (e.g., a computer system such as one based on a computer such as computer 38 of FIG. 2, one of the computers 184 of FIGS. 13 and 14, one of the computers 208 of FIG. 15, etc.) over a local RF wireless link while the user is in the store.

Information on the user's location may be provided with the order or used to process the order. For example, orders of this type may be allowed only from in-store customers or customers in the vicinity of the store or orders from in-store customers may be given priority over other orders. The store's computer system may determine that the user is located in the store by monitoring a GPS location or using network-based location techniques or by determining that the user is in communication with the store's computer system using a local wireless transmitter/receiver (e.g., a local wireless transmitter/receiver that is located in the store or that is associated with the store).

The deli ordering feature may be provided by a supermarket shopping assistance service. The shopping assistance service may obtain information on which deli items are available and information on specials and other promotional material using any suitable arrangement. For example, this information may be stored on the store's computer system or may be stored on a remote server, etc.

The user's order may be handled at the deli counter using any suitable arrangement. As an example, a monitor connected to the store's computer system or otherwise in communication with the shopping assistance service may be used to display the user's order to deli personnel. The order may also be printed out with a printer if desired.

Figure 114:
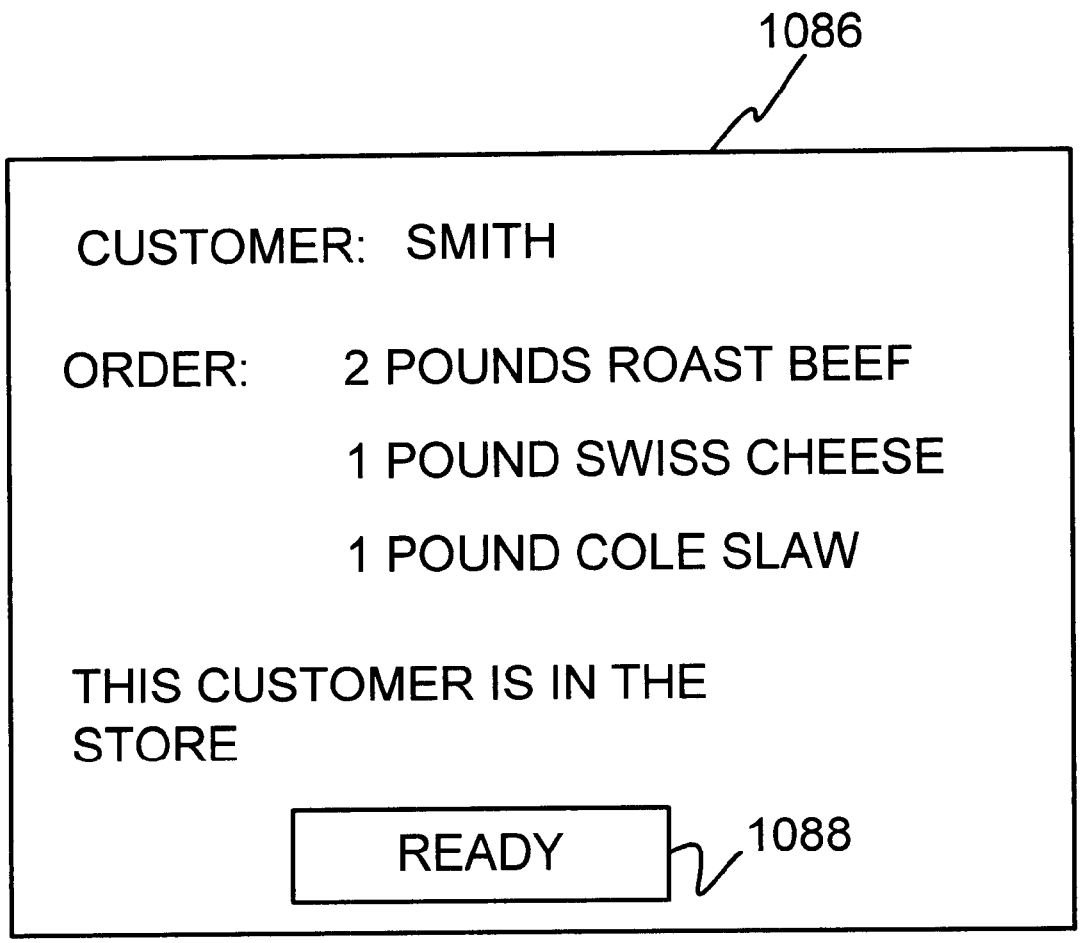
FIG. 114 shows an illustrative screen that may be displayed by a computer at a deli counter to convey the user's order to deli personnel in accordance with the present invention.

An illustrative order screen 1086 that may be displayed for deli personnel is shown in FIG. 114. Screen 1086 may contain information on the items ordered by the user, the user's name or order number, information on whether the user is currently located in the store, the time and date of the order, special handling or preparation instructions (e.g., slicing instructions), brand preferences, etc. Deli personnel may use the information on screen 1086 to prepare the user's order. The user's order may then be held for pickup.

When the order is ready, the deli personnel may select an option such as on-screen option 1088. In response, the store's computer system may generate a notification message for the user to inform the user that the user's order is ready to be picked up. The notification may be sent to the user using any suitable communications path such as a remote or local wireless link. If, for example, the user is in local wireless communications with the store, the notification may be sent to the handheld computing device over a local RF wireless link using a local transmitter/receiver associated with or located in the store.

Handheld computing device 12 may be used to order products for in-store pickup other than deli products. For example, this approach may be used to order products from an in-store butcher, an in-store florist, and in-store pharmacist, etc. Moreover, this type of arrangement is not limited to supermarket ordering. Products may be ordered in this way in shopping malls, in department stores or other stores, in restaurants, etc.

Figure 115:
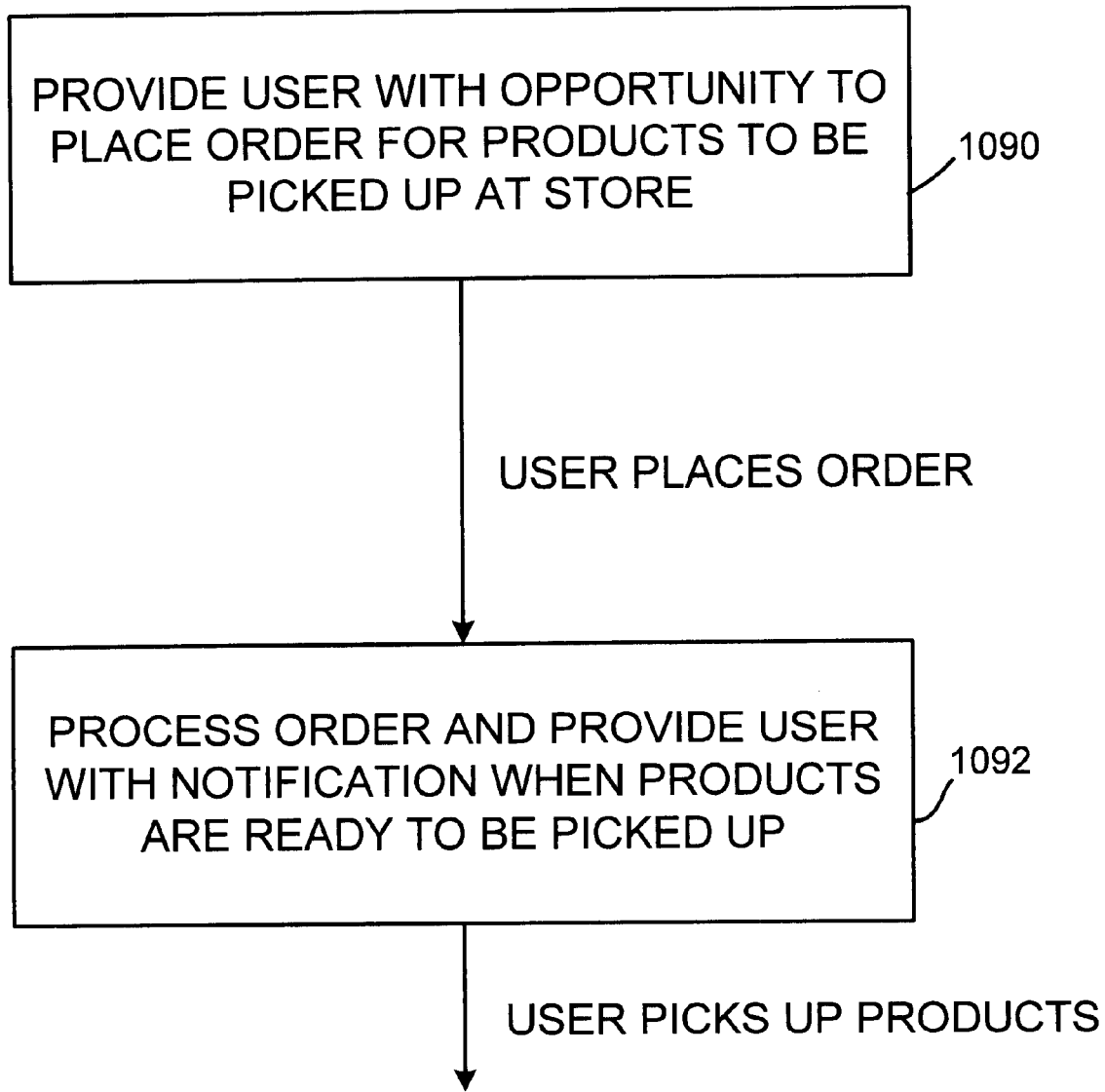
FIG. 115 is a flow chart of illustrative steps involved in allowing users to use handheld computing devices to place orders at stores that are to be picked up in accordance with the present invention.

Illustrative steps involved in using handheld computing device 12 to placed product orders for in-store pickup are shown in FIG. 115. At step 1090, handheld computing device 12 or other suitable electronic device such as a shopping-cart-mounted electronic device in the store may be used to provide the user with an opportunity to place an order. For example, on-screen options may be provided for the user that allow the user to specify the items to be picked up. Information such as the user's name or an order number may be used to identify the order.

Financial information may or may not be required to place the order. If financial information is required, the user may be provided with an opportunity to supply credit card or debit card or account information using handheld computing device 12. Such information may be supplied by handheld computing device 12 based on previously stored financial information or may be supplied using on-screen options that are displayed for the user when the information is required.

Promotional material may be displayed for the user. For example, the on-screen options that are provided that allow the user to select items to order may be provided with associated logos and advertisements. The promotional material may be interactive.

The order may be placed using a remote or local wireless link between the handheld computing device or other equipment and the store's computer system.

At step 1092, after the user has placed the order, the order may be processed by the store. For example, the store's computer equipment may display a screen containing the user's order. When the order is ready for pickup, the store personnel may direct the store's equipment to send a notification message to the handheld computing device. The notification may be transmitted to the handheld computing device over a remote or local wireless link.

Figure 116:
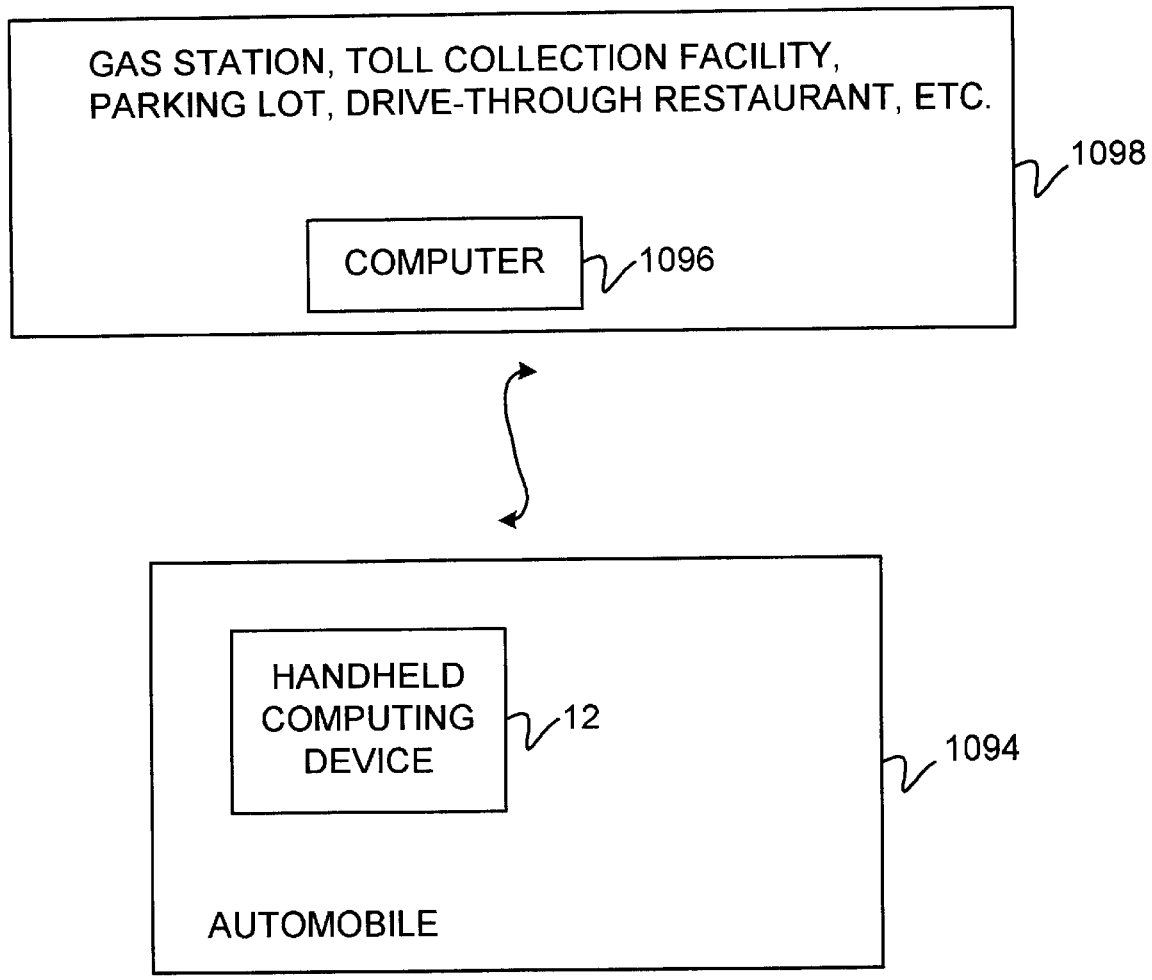
FIG. 116 is a schematic diagram showing how the handheld computing device may be used in an automobile for wireless purchase transactions in accordance with the present invention.

Handheld computing device 12 may be used in an automobile for wireless financial transactions such as purchasing gasoline from a gas station, paying tolls on highways, paying for parking in parking garages and parking lots, paying for food at drive-through restaurants, etc. As shown in FIG. 116, handheld computing device 12 in automobile 1094 may communicate with a computer 1096 that is located in or associated with a facility 1098 such as a gas station, toll collection facility, parking facility, drive-through restaurant, etc. Handheld computing device 12 may communicate with computer 1096 over a remote or local wireless link. For example, handheld computing device 12 may communicate with computer 1096 over a local IR or RF wireless link. Handheld computing device 12 may transmit financial information to computer 1096 to purchase products or services from facility 1098 in a wireless purchase transaction.

Figure 117:
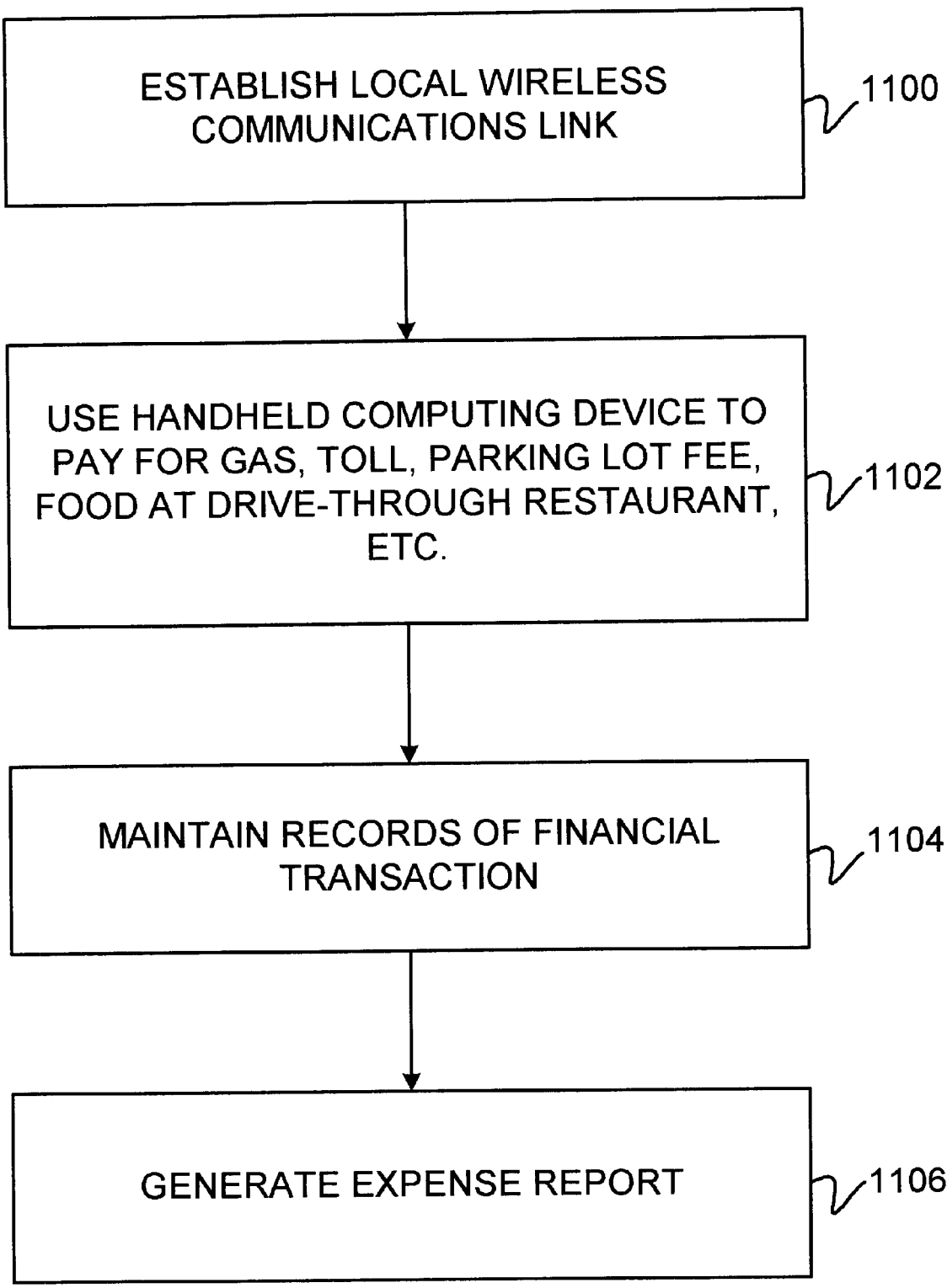
FIG. 117 is a flow chart of illustrative steps involved in using the handheld computing device in an automobile in accordance with the present invention.

Illustrative steps involved in using handheld computing device 12 to purchase products or services from facility 1098 of FIG. 116 are shown in FIG. 117. At step 1100, handheld computing device 12 may establish a wireless link with computer 1096. For example, handheld computing device 12 may establish a local RF wireless communications link with computer 1096.

At step 1102, handheld computing device 12 may provide financial information to computer 1096 such as account information, credit or debit card information, or other information that allows computer 1096 to charge the user for the product or service being purchased. Computer 1096 may charge the user using any suitable technique, such as charging the user's credit cards, deducting the financial amount of the transaction from the user's account, etc. The amount of the transaction may be displayed on the display of handheld computing device 12 if desired.

At step 1104, financial records of the payment transactions may be maintained. For example, information on the payment transactions may be maintained in memory in handheld computing device 12 or may be stored remotely (e.g., on a service provider computer or a computer associated with facility 1098, or any other suitable computer). The records may or may not be accessible to the user.

If the records are accessible to the user, an expense report or other financial report may be generated at step 1106, based on the financial information in the records. If desired, purchase transactions with handheld computing device 12 may be classified (e.g., as food, lodging, travel, etc.). Purchase transactions may be classified manually by the user by reviewing the transactions on the screen of handheld computing device 12 and assigning each transaction to an appropriate category. Different files or folders may be established for different groups of transactions. Purchase transactions may also be assigned automatically, based on information on the nature of the transaction (e.g., the name of facility 1098, etc.) that is obtained from facility 1098 during the transaction. Further expense report features and features related to maintaining financial records are described in connection with FIG. 11.

Financial information and records from the wireless purchase transactions between handheld computing device 12 and computers such as computer 1096 may also be e-mailed using a remote wireless link, etc.

Figure 118:
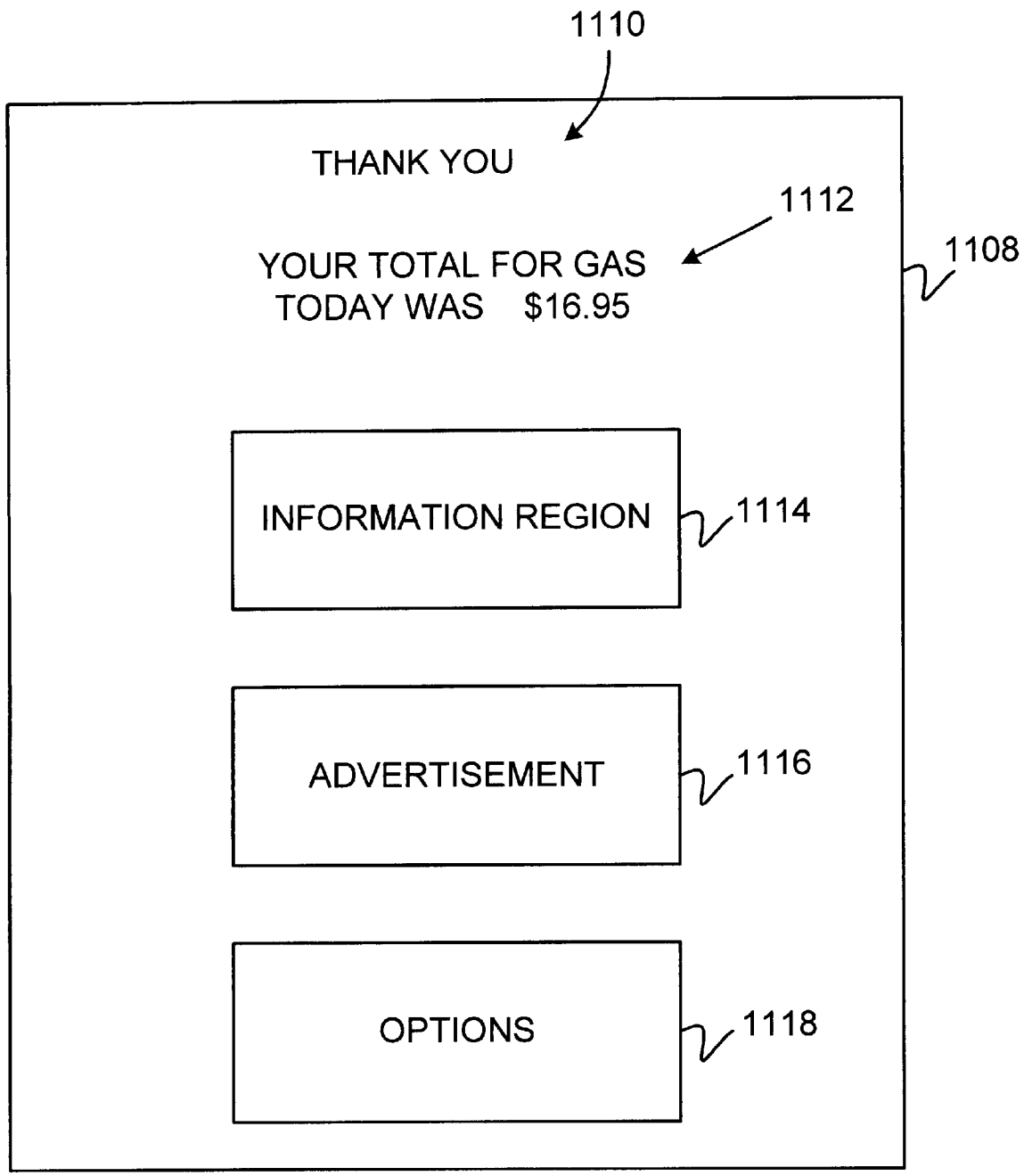
FIG. 118 shows an illustrative screen that the handheld computing device may display following a wireless transaction performed from within an automobile in accordance with the present invention.

An illustrative screen 1108 that handheld computing device 12 may display for the user when performing an automobile-related wireless financial transaction such as purchasing gasoline from a gas station, paying tolls on highways, paying for parking in parking garages and parking lots, paying for food at drive-through restaurants, etc. is shown in FIG. 118. Screen 1108 may contain a thank you message 1110 and information 1112 on the nature of the financial transaction and the amount of the transaction. An information region 1114 may be provided that contains detailed information on the transaction, general or current information on road or traffic conditions, safe driving tips, etc. The information for regions such as region 1114 may be obtained, for example, from a computer of a traffic news service provider that is in communication with computer 1096 of facility 1098 over a communications network.

Screen 1108 may also contain promotional information such as advertisement 1116. Promotional information such as advertisement 1116 may be interactive. The user may obtain information on products or services or may order products or services by selecting advertisement 1116 and responding to on-screen options that handheld computing device 12 displays in response to the user's selection. Other options 1118 (e.g., expense report options, etc.) may also be provided on screen 1108 if desired. Screen 1108 is merely an illustrative example of the type of screen that handheld computing device 12 may display following a wireless transaction performed from within an automobile. Any suitable screen may be displayed if desired.

Although the features of the systems described above have been described primarily in the context of handheld computing devices, the systems may be based on any suitable electronic devices or mobile electronic devices if desired. An example of a mobile electronic device for use in a supermarket is a shopping-cart-mounted electronic device. Suitable portable computing devices include laptop computers, notebook computers, and automobile personal computers. Personal computers and in-home electronic devices such as residential gateways, electronic devices connected to residential gateways, web appliances, and other in-home microprocessor-based communications-enabled electronics equipment may also be used in place of handheld computing device 12 for many functions. Certain functions may be performed using smart cards, smart cards with displays, smart cards with displays and communications functions, MP3 players with wireless communications capabilities, MP3 players with wireless communications capabilities and displays, etc. or other more dedicated electronic devices.

Moreover, various system features have been described in the context of systems for shopping malls, department stores, supermarkets, and other types of establishments. In general, the on-screen options and features provided in such systems are illustrative and features described in connection with one type of merchant or establishment may be used with any other suitable type of merchant or establishment if desired.

The foregoing is merely illustrative of the principles of this invention and various modifications can be made by those skilled in the art without departing from the scope and spirit of the invention.

What is claimed is:

1. A method for providing a user at a handheld computing device with a shopping assistance service for an establishment having a plurality of stores, comprising:

allowing the handheld computing device to be used to establish a local wireless link with wireless communications equipment associated with the establishment;

displaying an on-screen option on the handheld computing device that allows the user to use the handheld computing device to obtain directory information identifying each of the plurality of stores over the local wireless link;

monitoring the user's location within the establishment; and displaying promotional material on the handheld computing device based on the user's location.

2. The method defined in claim 1 further comprising using the handheld computing device to obtain mall directory information over a local wireless infrared link with the wireless communications equipment.

3. The method defined in claim 1 further comprising displaying a map showing the location of at least one of the stores within the establishment.

4. The method defined in claim 1 further comprising:

displaying store category information on the handheld computing device; and displaying promotional information on the handheld computing device that is associated with at least one of the stores, wherein the store category information and the promotional information are displayed on a common screen by the handheld computing device.

5. A method for providing shopping assistance to a user with a handheld computing device in a store in an establishment having a plurality of stores, comprising:

using the handheld computing device in the store to establish a wireless link with a computer associated with the store;

displaying an on-screen option on the handheld computing device that provides the user with an opportunity to place a request for a product to be picked up and paid for in the store;

allowing the handheld computing device to be used to establish a local wireless link with wireless communications equipment associated with the establishment;

displaying an on-screen option on the handheld computing device that allows the user to use the handheld computing device to obtain directory information identifying each of the plurality of stores over the local wireless link;

monitoring the user's location within the establishment; and displaying promotional material on the handheld computing device based on the user's location.

6. The method defined in claim 5 wherein the on-screen option allows the user to place a request for deli products at a deli within the store.

7. The method defined in claim 5 further comprising displaying information on the handheld computing device on the locations within the store of various products offered for sale in the store.

8. The method defined in claim 5 further comprising:

using a local radio-frequency wireless link to communicate between the handheld computing device and the computer associated with the store; and displaying promotional information related to products offered for sale in the store on the handheld computing device.

9. The method defined in claim 5 further comprising:

displaying an interactive advertisement related to a product offered for sale in the store on the handheld computing device; and providing the user with a financial benefit at checkout if the user responds to the interactive advertisement.

10. The method defined in claim 5 further comprising transmitting an electronic message to the handheld computing device when the requested product is ready to be picked up.

11. A method for using a mobile electronic device to provide shopping assistance to a customer who is shopping in a retail store in an establishment having a plurality of stores, comprising:

using the mobile electronic device to establish a wireless link with a computer;

using the mobile electronic device in the retail store to display an on-screen option that allows the customer to obtain information from the computer on where products are located in the store;

allowing the handheld computing device to be used to establish a local wireless link with wireless communications equipment associated with the establishment;

displaying an on-screen option on the handheld computing device that allows the user to use the handheld computing device to obtain directory information identifying each of the plurality of stores over the local wireless link;

monitoring the user's location within the establishment; and displaying promotional material on the handheld computing device based on the user's location.

12. The method defined in claim 11 further comprising displaying promotional material to the user with the mobile electronic device.

13. The method defined in claim 11 further comprising using the mobile electronic device to display an on-screen option that allows the user to search for products within the store using the computer.

14. The method defined in claim 11 wherein the mobile electronic device is a handheld computer, the method further comprising:

allowing the user to use the handheld computer to input a product name; and displaying information on the product from the computer based on the product name; and displaying interactive advertisements for products in the store on the handheld computer.

15. The method defined in claim 11 further comprising:

using the mobile electronic device to wirelessly identify a product in the store; and adding the identified product to a list with the mobile electronic device.

16. The method defined in claim 11 further comprising using the mobile electronic device to display a video to the user in the store.

17. The method defined in claim 11 further comprising:

allowing the user to create a shopping list using an in-home electronic device; and using the mobile electronic device to access the shopping list in the store.

18. A method for providing shopping assistance to a user in a store with a mobile electronic device in an establishment having a plurality of stores, comprising:

using the mobile electronic device to establish a local wireless link with a computer;

displaying a screen on the mobile electronic device that contains promotional information from the computer on products offered for sale in the store;

allowing the handheld computing device to be used to establish a local wireless link with wireless communications equipment associated with the establishment;

displaying an on-screen option on the handheld computing device that allows the user to use the handheld computing device to obtain directory information identifying each of the plurality of stores over the local wireless link;

monitoring the user's location within the establishment; and displaying promotional material on the handheld computing device based on the user's location.

19. The method defined in claim 18 wherein the mobile electronic device is a handheld computer, the method further comprising using the handheld computer to provide the user with an opportunity to order products over a remote wireless link.

20. The method defined in claim 18 wherein the promotional information is an interactive offer related to a product in the store, the method further comprising:

allowing the user to accept the offer using the mobile electronic device; and providing the user with a financial benefit related to the offer at checkout.

21. The method defined in claim 18 further comprising:

monitoring the user's location within the store; and using the mobile electronic device to display information to the user based on the user's location within the store.

* * * * *

UNITED STATES PATENT AND TRADEMARK OFFICE
CERTIFICATE OF CORRECTION

PATENT NO. : 6,587,835 B1  Page 1 of 1
APPLICATION NO. : 09/501053
DATED : July 1, 2003
INVENTOR(S) : Treyz et al.

It is certified that error appears in the above-identified patent and that said Letters Patent is hereby corrected as shown below:

In Column 68, line 56, in claim 11, delete "handheld computing device" and insert -- mobile electronic device --, therefor.

In Column 68, lines 59-60, in claim 11, delete "handheld computing device" and insert -- mobile electronic device --, therefor.

In Column 68, lines 60-61, in claim 11, delete "handheld computing device" and insert -- mobile electronic device --, therefor.

In Column 68, lines 66-67, in claim 11, delete "handheld computing device" and insert -- mobile electronic device --, therefor.

In Column 70, line 4, in claim 18, delete "handheld computing device" and insert -- mobile electronic device --, therefor.

In Column 70, lines 8-9, in claim 18, delete "handheld computing device" and insert -- mobile electronic device --, therefor.

In Column 70, lines 9-10, in claim 18, delete "handheld computing device" and insert -- mobile electronic device --, therefor.

In Column 70, lines 16-17, in claim 18, delete "handheld computing device" and insert -- mobile electronic device --, therefor.

Signed and Sealed this

Second Day of June, 2009

JOHN DOLL
*Acting Director of the United States Patent and Trademark Office*